(12) United States Patent
Fukagawa et al.

(10) Patent No.: US 11,733,435 B2
(45) Date of Patent: Aug. 22, 2023

(54) POLARIZING PLATE PROTECTIVE FILM, POLARIZING PLATE, AND LIQUID CRYSTAL DISPLAY DEVICE

(71) Applicant: FUJIFILM Corporation, Tokyo (JP)

(72) Inventors: Nobutaka Fukagawa, Kanagawa (JP); Yu Naito, Kanagawa (JP); Hiroki Kuwahara, Kanagawa (JP); Daisuke Sasaki, Kanagawa (JP); Hidetomo Furuyama, Kanagawa (JP); Natsuru Chikushi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 16/822,367

(22) Filed: Mar. 18, 2020

(65) Prior Publication Data

US 2020/0217993 A1    Jul. 9, 2020

Related U.S. Application Data

(63) Continuation of application No. PCT/JP2018/036494, filed on Sep. 28, 2018.

(30) Foreign Application Priority Data

Sep. 29, 2017   (JP) .................................. 2017-192085
Dec. 25, 2017   (JP) .................................. 2017-247933
(Continued)

(51) Int. Cl.
*G02B 1/14*        (2015.01)
*C08J 5/18*        (2006.01)
(Continued)

(52) U.S. Cl.
CPC .................. *G02B 1/14* (2015.01); *C08J 5/18* (2013.01); *C08K 5/3445* (2013.01);
(Continued)

(58) Field of Classification Search
None
See application file for complete search history.

(56) References Cited

U.S. PATENT DOCUMENTS 10,247,980 B2   4/2019   Cho et al.
2009/0080074 A1   3/2009   Fukagawa et al.
(Continued)

FOREIGN PATENT DOCUMENTS

CN   101300307 A   11/2008
CN   101382615 A    3/2009
(Continued)

OTHER PUBLICATIONS

Office Action, issued by the State Intellectual Property Office dated Nov. 19, 2021, in connection with Chinese Patent Application No. 201880060755.7.
(Continued)

*Primary Examiner* — Anthony J Frost
(74) *Attorney, Agent, or Firm* — Edwards Neils LLC; Jean C. Edwards, Esq.

(57) ABSTRACT

Provided are a polarizing plate protective film including a resin and a coloring agent having an absorption maximum wavelength in a range of 560 to 620 nm or 460 to 520 nm in an amount of 0.1 parts by mass or more with respect to 100 parts by mass of the resin, in which a film thickness is 1 to 18 μm, and a moisture content is 0.5% by mass or less, a polarizing plate in which the protective film is used, and a liquid crystal display device in which the polarizing plate is used.

9 Claims, 1 Drawing Sheet

(30) Foreign Application Priority Data

| | | | |
|---|---|---|---|
| Feb. 28, 2018 | (JP) | ................................ | 2018-035024 |
| May 31, 2018 | (JP) | ................................ | 2018-104900 |
| Jun. 27, 2018 | (JP) | ................................ | 2018-122094 |

(51) Int. Cl.
  *C08K 5/3445* (2006.01)
  *G02F 1/1335* (2006.01)

(52) U.S. Cl.
  CPC ..... *G02F 1/133528* (2013.01); *C08J 2325/06* (2013.01); *C08J 2345/00* (2013.01); *C09K 2323/031* (2020.08)

(56) References Cited

U.S. PATENT DOCUMENTS

| | | | |
|---|---|---|---|
| 2011/0001908 A1 | 1/2011 | Fukagawa et al. | |
| 2011/0049446 A1* | 3/2011 | Ishida | ................. C09B 23/0066 |
| | | | 252/586 |
| 2011/0273646 A1 | 11/2011 | Fukagawa et al. | |
| 2012/0197026 A1 | 8/2012 | Maeda et al. | |
| 2014/0264202 A1* | 9/2014 | Nagaya | ................... G02B 5/208 |
| | | | 252/587 |
| 2016/0062010 A1 | 3/2016 | Nam et al. | |
| 2016/0116838 A1* | 4/2016 | Hara | ....................... C09B 11/24 |
| | | | 430/7 |
| 2016/0238771 A1 | 8/2016 | Lee et al. | |
| 2016/0349573 A1* | 12/2016 | Ohmuro | .................... G02B 1/14 |
| 2016/0369115 A1* | 12/2016 | Shimoju | .............. C07D 239/60 |
| 2018/0210288 A1 | 7/2018 | Lee et al. | |

FOREIGN PATENT DOCUMENTS

| | | | |
|---|---|---|---|
| CN | 101784947 A | | 7/2010 |
| CN | 104395788 A | | 3/2015 |
| CN | 105874361 A | | 8/2016 |
| CN | 106133564 A | | 11/2016 |
| JP | 2003-029376 A | | 1/2003 |
| JP | 2008-298820 A | | 12/2008 |
| JP | 2011-144280 A | | 7/2011 |
| JP | 2012-058433 A | | 3/2012 |
| JP | 2014-119539 A | | 6/2014 |
| JP | 2014-157284 A | | 8/2014 |
| JP | 2016-500833 A | | 1/2016 |
| JP | 2016-075738 A | | 5/2016 |
| JP | 2016-090998 A | | 5/2016 |
| JP | 2016075738 A | * | 5/2016 |
| JP | 2016-188304 A | | 11/2016 |
| JP | 2017-111226 A | | 6/2017 |
| TW | 201700572 A | | 1/2017 |
| WO | 2006/016542 A1 | | 2/2006 |
| WO | 2006/035555 A1 | | 4/2006 |
| WO | 2008/090757 A1 | | 7/2008 |
| WO | 2013/054864 A1 | | 4/2013 |
| WO | 2015/098906 A1 | | 7/2015 |
| WO | 2017/048077 A1 | | 3/2017 |
| WO | 2017/145469 A1 | | 8/2017 |

OTHER PUBLICATIONS

Office Action, issued by the Korean Intellectual Property Office dated Dec. 23, 2021, in connection with Korean Patent Application No. 10-2020-7008043.

Office Action, issued by the Korean Intellectual Property Office dated Oct. 27, 2021, in connection with Korean Patent Application No. 10-2020-7008043.

Office Action, issued by the Japanese Patent Office dated Apr. 6, 2021, in connection with Japanese Patent Application No. 2019-545179.

International Search Report issued in connection with International Patent Application No. PCT/JP2018/036494 dated Jan. 8, 2019.

Written Opinion of the International Searching Authority issued in connection with International Patent Application No. PCT/JP2018/036494 dated Jan. 8, 2019.

International Preliminary Report on Patentability (Chapter I of PCT) issued in connection with International Patent Application No. PCT/JP2018/036494 dated Mar. 31, 2020.

Office Action, issued by the Japanese Patent Office dated Oct. 6, 2020, in connection with Japanese Patent Application No. 2019-545179.

Office Action, issued by the Korean Intellectual Property Office dated Apr. 19, 2021, in connection with Korean Patent Application No. 10-2020-7008043.

Office Action, issued by the State Intellectual Property Office dated Jun. 3, 2021, in connection with Chinese Patent Application No. 201880060755.7.

Office Action, issued by the Japanese Patent Office dated Jul. 5, 2022, in connection with Japanese Patent Application No. 2021-111749.

Office Action, which was issued by the Korean Intellectual Property Office dated May 18, 2023, in connection with Korean Patent Application No. 10-2022-7031133.

* cited by examiner

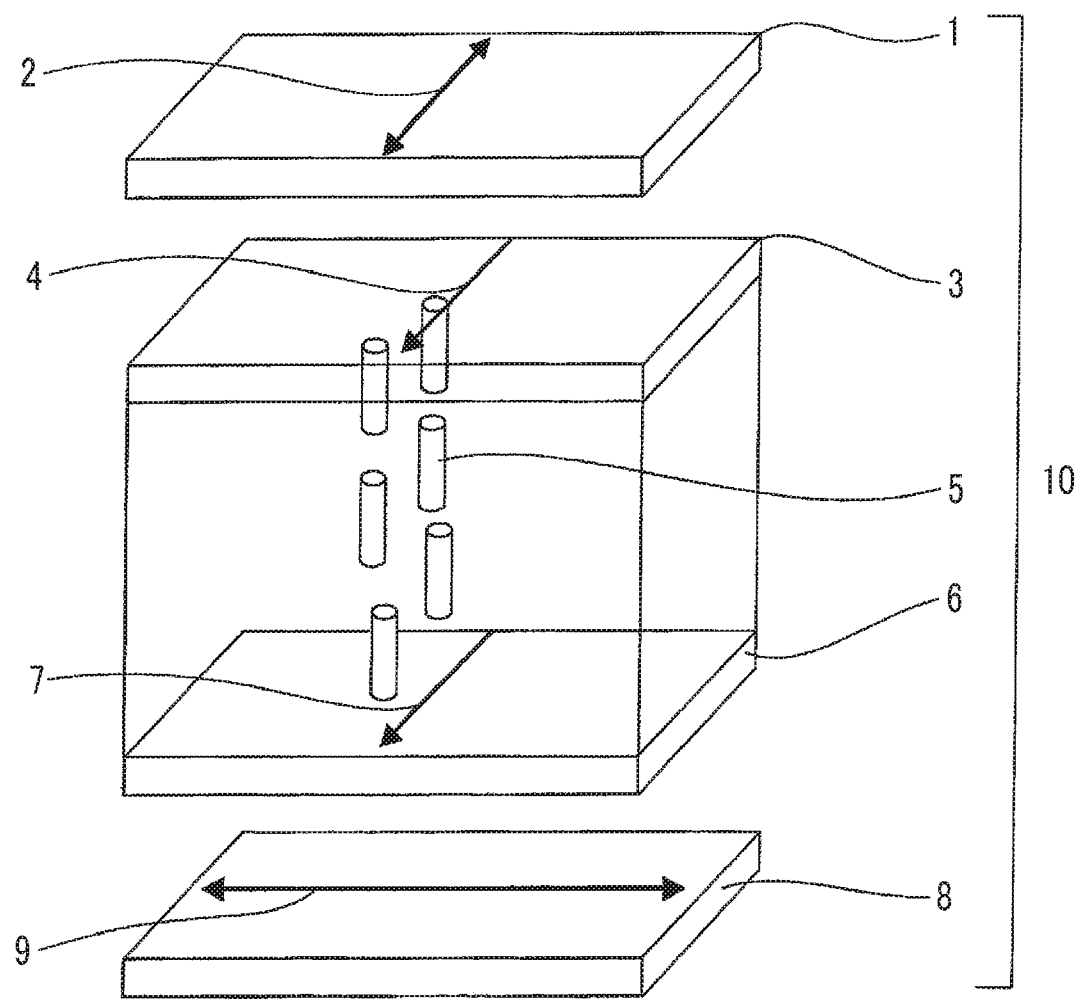

POLARIZING PLATE PROTECTIVE FILM, POLARIZING PLATE, AND LIQUID CRYSTAL DISPLAY DEVICE

CROSS-REFERENCE TO RELATED APPLICATIONS

This application is a Continuation of PCT International Application No. PCT/JP2018/036494 filed on Sep. 28, 2018, which was published under Article 21(2) in Japanese, and which claims priority under 35 U.S.C. § 119 (a) to Japanese Patent Application No. 2017-192085 filed in Japan on Sep. 29, 2017, Japanese Patent Application No. 2017-247933 filed in Japan on Dec. 25, 2017, Japanese Patent Application No. 2018-035024 filed in Japan on Feb. 28, 2018, Japanese Patent Application No. 2018-104900 filed in Japan on May 31, 2018 and Japanese Patent Application No. 2018-122094 filed in Japan on Jun. 27, 2018. The above applications are hereby expressly incorporated by reference, in their entirety, into the present application.

BACKGROUND OF THE INVENTION

1. Field of the Invention

The present invention relates to a polarizing plate protective film, a polarizing plate using this polarizing plate protective film, and a liquid crystal display device using this polarizing plate.

2. Description of the Related Art

Liquid crystal display devices are being used in a broadening range of uses as space-saving image display devices having a low power consumption. For liquid crystal display devices requiring high-quality images such as televisions, there is a demand for realizing not only a high resolution but also high color reproducibility, excellent contrast, and the like.

In liquid crystal display devices, a liquid crystal panel that displays images is a non-light emitting element that does not emit light. Therefore, into a liquid crystal display device, a backlight unit is combined. This backlight unit is disposed on a rear surface of the liquid crystal panel and supplies light to the liquid crystal panel.

Recently, as a light source for the backlight unit, a white LED has been used. As a white LED light emitting device, a device of producing white light by mixing blue light radiated from a blue LED and light radiated from a yellow fluorescent body or a green fluorescent body and a red fluorescent body is known. However, the above-described device has a problem in that, compared to organic light emitting diodes (OLED) and the like which are attracting attention as next-generation displays, the color reproduction range is narrow, and there is a demand for new techniques for overcoming this problem.

In response to such a demand, JP2016-090998A discloses a method in which a coating layer including a coloring agent is provided on a diffusion film in a backlight unit, thereby blocking light having an unnecessary wavelength that is emitted from a white LED.

In addition, WO2008/090757A describes a technique relating to an optical filter containing a squaraine coloring agent with a specific structure.

SUMMARY OF THE INVENTION

As a result of repeating studies, the present inventors found that the color reproducibility of a liquid crystal display device can be enhanced by adding a coloring agent having a specific absorption wavelength to a protective film (a film that protects a polarizer) for a polarizing plate used in the liquid crystal display device. On the other hand, it was also clarified that the coloring agent blended into the polarizing plate protective film degrades the polarizing performance of the polarizing plate due to depolarization attributed to fluorescent light emitted by the coloring agent, which disadvantageously functions in realizing high contrast, and the coloring agent is likely to deteriorate over time by irradiation with light.

Therefore, an object of the present invention is to provide a liquid crystal display device having favorable color reproducibility, excellent contrast, and excellent light fastness and a polarizing plate or a polarizing plate protective film that is used in the liquid crystal display device.

As a result of repeating intensive studies in consideration of the above-described object, the present inventors found that, in a case where a highly hydrophobic resin is used as a base to control the moisture content, a coloring agent exhibiting a specific absorption maximum wavelength is added thereto, and then a film formed in a thin film shape in a specific thickness range is used as a protective film for a polarizing plate, it is possible to realize a liquid crystal display device having excellent color reproducibility, excellent contrast, and excellent light fastness.

The present invention has been completed by further repeating studies on the basis of the above-described finding.

The above-described object of the present invention is achieved by the following means.

[1] A polarizing plate protective film comprising: a resin; and a coloring agent having an absorption maximum wavelength in a range of 560 to 620 nm or 460 to 520 nm in an amount of 0.1 parts by mass or more with respect to 100 parts by mass of the resin, in which a film thickness is 1 to 18 μm, and a moisture content is 0.5% by mass or less.

[2] The polarizing plate protective film according to <1>, in which the coloring agent is a squaraine-based coloring agent represented by General Formula (I).

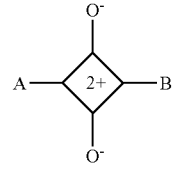

General Formula (1)

in General Formula (1), A and B each independently represent an aryl group that may have a substituent, a heterocyclic group that may have a substituent, or —CH=G. G represents a heterocyclic group that may have a substituent.

[3] The polarizing plate protective film according to [1] or [2], in which the polarizing plate protective film contains an electron-donating quencher, and a HOMO energy level of the coloring agent and a HOMO energy level of the electron-donating quencher satisfy a relational expression [A-1] below.

$$E_{Hq} - E_{Hd} \leq 0.40 \text{ eV} \quad \text{Relational expression [A-1]}$$

Here, $E_{Hd}$ and $E_{Hq}$ each represent values below.
$E_{Hd}$: HOMO energy level of coloring agent
$E_{Hq}$: HOMO energy level of electron-donating quencher.

[4] The polarizing plate protective film according to [1] or [2], in which the polarizing plate protective film contains an electron-accepting quencher, and a LUMO energy level of the coloring agent and a LUMO energy level of the electron-accepting quencher satisfy a relational expression [B-1] below.

$$E_{Ld}-E_{Lq} \leq 0 \text{ eV} \qquad \text{Relational expression [B-1]}$$

Here, $E_{Ld}$ and $E_{Lq}$ each represent values below.
$E_{Ld}$: LUMO energy level of coloring agent
$E_{Lq}$: LUMO energy level of electron-accepting quencher.

[5] The polarizing plate protective film according to any one of [1] to [4], in which the resin satisfies a relational expression [C] below.

$$0.80 \leq fd \leq 0.95 \qquad \text{Relational expression [C]}$$

Here, the fd value is defined by a relational expression I below.

$$fd = \delta d/(\delta d + \delta p + \delta h) \qquad \text{Relational expression I}$$

In the relational expression I, δd, δp, and δh each represent a term corresponding to a London dispersion force, a term corresponding to a dipole-dipole force, and a term corresponding to a hydrogen bond force relative to a solubility parameter δt computed by a Hoy method.

[6] The polarizing plate protective film according to any one of [1] to [5], in which the resin includes a polystyrene resin.

[7] The polarizing plate protective film according to any one of [1] to [5], in which the resin includes a cyclic polyolefin resin.

[8] A polarizing plate comprising: the polarizing plate protective film according to any one of [1] to [7].

[9] A liquid crystal display device comprising: the polarizing plate according to [8].

[10] The liquid crystal display device according to [9], in which the polarizing plate protective film according to any one of [1] to [7] is disposed between a liquid crystal cell and a polarizer.

In the present specification, numerical ranges expressed using "to" include numerical values before and after "to" as the lower limit value and the upper limit value.

In the present specification, in a case where there is a plurality of substituents, linking groups, repeating structures, or the like (hereinafter, referred to as substituents or the like) represented by a specific reference or a plurality of substituents or the like is defined at the same time, unless particularly otherwise described, the respective substituents or the like may be identical to or different from each other. This is also true in the case of defining the number of substituents or the like. In addition, in a case where a plurality of substituents or the like is close (particularly, adjacent) to each other, unless particularly otherwise described, the substituents or the like may be linked together to form a ring. In addition, rings, for example, aliphatic rings, aromatic rings, or heterocycles may be further fused together to form a fused ring.

The liquid crystal display device of the present invention has favorable color reproducibility, excellent contrast, and excellent light fastness. The polarizing plate or the protective film of the present invention is capable of realizing a liquid crystal display device having favorable color reproducibility, excellent contrast, and excellent light fastness by being applied to the liquid crystal display device.

BRIEF DESCRIPTION OF THE DRAWINGS

FIG. 1 is a schematic view showing a scheme of an embodiment of a liquid crystal display device including a polarizing plate of the present invention.

DESCRIPTION OF THE PREFERRED EMBODIMENTS

A preferred embodiment of the present invention will be described below.

[Polarizing Plate Protective Film]

A polarizing plate protective film of an embodiment of the present invention is a film that is directly or indirectly provided on at least one surface of a polarizer. The polarizing plate protective film of the embodiment of the present invention includes a combination of a specific amount of a coloring agent having an absorption maximum wavelength in a range of 560 to 620 nm or 460 to 520 nm and a specific amount of a resin. The thickness of the polarizing plate protective film of the embodiment of the present invention is 1 to 18 μm, and the moisture content is 0.5% by mass or less.

<Coloring Agent>

The coloring agent that the polarizing plate protective film of the embodiment of the present invention is a coloring agent having a main absorption wavelength range in a wavelength of 460 to 520 nm (hereinafter, referred to as a dye A) or a coloring agent having a main absorption wavelength range in a wavelength of 560 to 620 nm (hereinafter, referred to as a dye B). In the present invention, the term "or" is used as a meaning of including "and".

The detail will be described below, and a polarizing plate of the embodiment of the present invention is also capable of containing dyes other than the dye A and the dye B.

The dye A is not particularly limited as long as the dye has a main absorption wavelength range in a wavelength of 460 to 520 nm, and a variety of dyes can be used. As the dye A, there are a lot of dyes that exhibit fluorescent light.

In the present invention, an expression "having a main absorption wavelength range in a wavelength of XX to YY nm" means that, in the visible light absorption spectrum (a wavelength range of 380 to 750 nm), a wavelength at which the absorption maximum wavelength appears is present in a wavelength range of XX to YY nm. Therefore, in a case in which this wavelength is present in the above-described wavelength range, the entire absorption range including this wavelength may be in the above-described wavelength range or may also extend up to the outside of the above-described wavelength range. In addition, in a case where there is a plurality of wavelengths of absorption maximum, a absorption maximum wavelength at which absorbance that is not highest appears may be present outside the wavelength range of XX to YY nm. Meanwhile, in a case where there is a plurality of wavelengths at which the absorption maximum wavelength appears, one of the wavelengths may be present in the above-described wavelength range.

Specific examples of the dye A include, for example, individual dyes such as a pyrrole methine (PM)-based dye, a rhodamine (RH)-based dye, a boron dipyrromethene (BODIPY)-based dye, and a squarine (SQ)-based dye.

For example, it is also possible to preferably use a commercially available product such as FDB-007 (trade name, merocyanine-based dye, manufactured by Yamada Chemical Co., Ltd.) as the dye A.

The dye B is not particularly limited as long as the dye has a main absorption wavelength range in a wavelength of 560 to 620 nm, and a variety of dyes can be used. As the dye B, there are a lot of dyes that exhibit weaker fluorescent light than the dye A or exhibit no fluorescent light.

Specific examples of the dye B include, for example, individual dyes such as tetraaza porphyrin (TAP)-based dyes and cyanine (CY)-based dyes. In addition, it is also possible to preferably use a commercially available product such as PD-311S (trade name, tetraaza porphyrin-based dye, manufactured by Yamada Chemical Co., Ltd.) and FDG-006 (trade name, tetraaza porphyrin-based dye, manufactured by Yamada Chemical Co., Ltd.) as the dye B.

Among these, the dye A and the dye B are preferably squarine-based coloring agents and more preferably squarine-based coloring agents represented by General Formula (1).

In the present invention, in coloring agents represented by individual general formulae below, a cation is present in a delocalized manner, and a plurality of tautomer structures is present. Therefore, in the present invention, in a case where at least one tautomer structure of a certain coloring agent matches the individual general formulae, the certain coloring agent is considered as the coloring agents represented by the individual general formulae. Therefore, a coloring agent represented by a specific general formula can also be said to be a coloring agent having at least one tautomer structure that can be represented by the specific general formula. In the present invention, a coloring agent represented by a general formula may have any tautomer structure as long as at least one tautomer structure of the coloring agent matches the general formula.

General Formula (1)

In General Formula (1), A and B each independently represent an aryl group that may have a substituent, a heterocyclic group that may have a substituent, or —CH=G. G represents a heterocyclic group that may have a substituent.

An aryl group that can be employed as A or B is not particularly limited and may be a group formed of a single ring or a group formed of a fused ring. The number of carbon atoms in the aryl group is preferably 6 to 30, more preferably 6 to 20, and still more preferably 6 to 12. Examples of the aryl group include individual groups formed of a benzene ring or a naphthalene ring, and groups formed of a benzene ring are more preferred.

A heterocyclic group that can be employed as A or B is not particularly limited, examples thereof include groups formed of an aliphatic heterocycle or an aromatic heterocycle, and groups formed of an aromatic heterocycle are preferred. Examples of a heteroaryl group that is an aromatic heterocyclic group include heteroaryl groups that can be employed as a substituent X described below. The aromatic heterocyclic group that can be employed as A or B is preferably a group of a five-membered ring or a six-membered ring and more preferably a group of a nitrogen-containing five-membered ring. Specific examples thereof preferably include a pyrrole ring, a furan ring, a thiophene ring, an imidazole ring, a pyrazole ring, a thiazole ring, an oxazole ring, a triazole ring, an indole ring, an indolenine ring, an indoline ring, a pyridine ring, a pyrimidine ring, a quinoline ring, a benzothiazole ring, a benzoxazole ring, and a pyrazolotriazole ring. Among these, a pyrrole ring, a pyrazole ring, a thiazole ring, a pyridine ring, a pyrimidine ring, or a pyrazolotriazole ring is preferred. The pyrazolotriazine ring needs to be formed of a fused ring of a pyrazole ring and a triazole ring and be a fused ring formed by fusing at least one pyrazole ring and at least one triazole ring, and examples thereof include fused rings in General Formulae (4) and (5) described below.

G in —CH=G that can be employed as A or B represents a heterocyclic group that may have a substituent, and examples thereof preferably include examples listed as A and B. Among them, groups formed of a benzoxazole ring, a benzothiazole ring, or an indoline ring and the like are preferred.

Each of A, B, and G may have the substituent X, and, in a case where A, B, or G has the substituent X, adjacent substituents may bond together to further form a ring structure. In addition, a plurality of substituents X may be present.

Examples of the substituent X include substituents that can be employed as $R^1$ in General Formula (2) described below, and specific examples thereof include a halogen atom, a cyano group, a nitro group, an alkyl group, an alkenyl group, an alkynyl group, an aryl group, a heteroaryl group, an aralkyl group, —$OR^{10}OR^{11}$, —$COOR^{12}$, —$OCOR^{13}$, —$NR^{14}R^{15}$, —$NHCOR^{16}$, —$CONR^{17}R^{18}$, —$NHCONR^{19}R^{20}$, —$NHCOOR^{21}$, —$SR^{22}$, —$SO_2R^{23}$, —$SO_3R^{24}$, —$NHSO_2R^{25}$, —$SO_2NR^{26}R^{27}$, and —$OR^{28}$.

In General Formula (1), $R^{10}$ to $R^{28}$ each independently represent a hydrogen atom, an aliphatic group, an aromatic group, or a heterocyclic group. An aliphatic group and an aromatic group that can be employed as $R^{10}$ to $R^{28}$ are not particularly limited and can be appropriately selected from the substituents that can be employed as $R^1$ in General Formula (2) described below. A heterocyclic group that can be employed as $R^{10}$ to $R^{28}$ may be an aliphatic group or an aromatic group and can be appropriately selected from heteroaryl groups or heterocyclic groups that can be employed as $R^1$ in General Formula (2) described below.

Meanwhile, in a case where $R^{12}$ in —$COOR^{12}$ is a hydrogen atom (that is, a carboxyl group), the hydrogen atom may be dissociated (that is, a carbonate group) or may be in a salt state. In addition, in a case where $R^{24}$ in —$SO_3R^{24}$ is a hydrogen atom (that is, a sulfo group), the hydrogen atom may be dissociated (that is, a sulfonate group) or may be in a salt state.

As the halogen atom that can be employed as the substituent X, a fluorine atom, a chlorine atom, a bromine atom, and an iodine atom are exemplified.

The number of carbon atoms in the alkyl group that can be employed as the substituent X is preferably 1 to 20, more preferably 1 to 15, and still more preferably 1 to 8. The number of carbon atoms in the alkenyl group is preferably 2 to 20, more preferably 2 to 12, and still more preferably 2 to 8. The number of carbon atoms in the alkynyl group is preferably 2 to 40, more preferably 2 to 30, and still more preferably 2 to 25. The alkyl group, the alkenyl group, and the alkynyl group each may be any of linear, branched, or cyclic and are preferably linear or branched.

The aryl group that can be employed as the substituent X includes a group of a single ring or a fused ring. The number of carbon atoms in the aryl group is preferably 6 to 30, more preferably 6 to 20, and still more preferably 6 to 12.

An alkyl portion in the aralkyl group that can be employed as the substituent X is identical to that in the alkyl group. An aryl portion in the aralkyl group is identical to that in the aryl group. The number of carbon atoms in the aralkyl group is preferably 7 to 40, more preferably 7 to 30, and still more preferably 7 to 25.

The heteroaryl group that can be employed as the substituent X includes a group formed of a single ring or a fused ring, and a group formed of a single ring or a fused ring having two to eight rings is preferred, and a group formed of a single ring or a fused ring having two to four rings is more preferred. The number of hetero atoms configuring the ring in the heteroaryl group is preferably one to three. Examples of the hetero atoms configuring the ring in the heteroaryl group include a nitrogen atom, an oxygen atom, a sulfur atom, and the like. The heteroaryl group is preferably a group formed of a five-membered ring or a six-membered ring. The number of carbon atoms configuring the ring in the heteroaryl group is preferably 3 to 30, more preferably 3 to 18, and still more preferably 3 to 12. Examples of the heteroaryl group include individual groups formed of a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, or a thiadiazole ring.

The alkyl group, the alkenyl group, the alkynyl group, the aralkyl group, the aryl group, and the heteroaryl group exemplified as the examples of the substituent X may respectively further have a substituent and may be unsubstituted. The substituent that the above-described groups may further have is not particularly limited, but is preferably a substituent selected from an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthiol group, an aromatic heterocyclic thio group, a sulfonyl group, a hydroxyl group, a mercapto group, a halogen atom, a cyano group, a sulfo group, and a carboxyl group, and more preferably a substituent selected from an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxyl group, a mercapto group, a halogen atom, a cyano group, a sulfo group, and a carboxyl group. These groups can be appropriately selected from the substituents that can be employed as $R^1$ in General Formula (2) described below.

As a preferred embodiment of the coloring agent represented by General Formula (1), a coloring agent represented by General Formula (2) is exemplified.

General Formula (2)

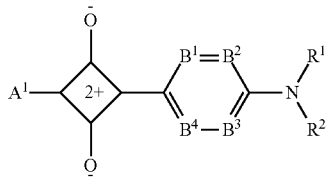

In General Formula (2), $A^1$ is identical to A in General Formula (1). Among them, the heterocyclic group that is a nitrogen-containing five-membered ring is preferred.

In General Formula (2), $R^1$ and $R^2$ each independently represent a hydrogen atom or a substituent. $R^1$ and $R^2$ may be identical to or different from each other, and $R^1$ and $R^2$ may bond together to form a ring.

Substituents that can be employed as $R^1$ and $R^2$ are not particularly limited, and examples thereof include alkyl groups (a methyl group, an ethyl group, a propyl group, an isopropyl group, a butyl group, a t-butyl group, an isobutyl group, a pentyl group, a hexyl group, an octyl group, a dodecyl group, a trifluoromethyl group, and the like), cycloalkyl groups (a cyclopentyl group, a cyclohexyl group, and the like), alkenyl groups (a vinyl group, an allyl group, and the like), alkynyl group (an ethynyl group, a propargyl group, and the like), aryl groups (a phenyl group, a naphthyl group, and the like), heteroaryl groups (a furyl group, a thienyl group, a pyridyl group, a pyridazyl group, a pyrimidyl group, a pyrazyl group, a triazyl group, an imidazolyl group, a pyrazolyl group, a thiazolyl group, a benzoimidazolyl group, a benzoxazolyl group, a quinazolyl group, a phthalazyl group, and the like), heterocyclic groups (also referred to as heterocyclic groups, for example, a pyrrolidyl group, an imidazolidyl group, a morpholyl group, an oxazolidyl group, and the like), alkoxy groups (a methoxy group, an ethoxy group, a propyloxy group, and the like), cycloalkoxy groups (a cyclopentyloxy group, a cyclohexyloxy group, and the like), aryloxy groups (a phenoxy group, a naphthyloxy group, and the like), heteroaryloxy groups (an aromatic heterocyclic oxy group), alkylthio groups (a methylthio group, an ethylthio group, a propylthio group, and the like), cycloalkylthio groups (a cyclopentylthio group, a cyclohexylthio group, and the like), arylthio groups (a phenylthio group, a naphthylthio group, and the like), heteroarylthio groups (an aromatic heterocyclic thio group), alkoxycarbonyl groups (a methyloxycarbonyl group, an ethyloxycarbonyl group, a butyloxycarbonyl group, an octyloxycarbonyl group, and the like), aryloxycarbonyl groups (a phenyloxycarbonyl group, a naphthyloxycarbonyl group, and the like), phosphoryl groups (dimethoxyphosphonyl and diphenylphosphoryl), sulfamoyl groups (an aminosulfonyl group, a methylaminosulfonyl group, a dimethylaminosulfonyl group, a butylaminosulfonyl group, a cyclohexylaminosulfonyl group, an octylaminosulfonyl group, a phenylaminosulfonyl group, a 2-pyridylaminosulfonyl group, and the like), acyl groups (an acetyl group, an ethylcarbonyl group, a propylcarbonyl group, a cyclohexylcarbonyl group, an octylcarbonyl group, a 2-ethylhexylcarbonyl group, a phenylcarbonyl group, a naphthylcarbonyl group, a pyridylcarbonyl group, and the like), acyloxy groups (an acetyloxy group, an ethylcarbonyloxy group, a butylcarbonyloxy group, an octylcarbonyloxy group, a phenylcarbonyloxy group, and the like), amide groups (a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group, a naphthylcarbonylamino group, and the like), sulfonamide groups (a methylsulfonylamino group, an octylsulfonylamino group, a 2-ethylhexylsulfonylamino group, a trifluoromethylsulfonylamino group, and the like), carbamoyl groups (an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, a 2-pyridylaminocarbonyl group, and the like), ureido groups (a methylureido group, an ethylureido group, a pentylureido group, a cyclohexylureido group, an octylureido group, a dodecylureido group, a phenylureido group, a naphthylureido group, a 2-pyridylaminoureido group, and the like), alkylsulfonyl groups (a methylsulfonyl group, an ethylsulfonyl group, a butylsulfonyl group, a cyclohexylsulfonyl group, a 2-ethylhexylsulfonyl group, and the like), arylsulfonyl groups (a phenylsulfonyl group, a naphthyl sulfonyl group, a 2-pyridylsulfonyl group, and the like), amino groups (an amino group, an ethylamino group, a dimethylamino group, a butylamino group, a dibutylamino group, a cyclopentylamino group, a 2-ethylhexylamino group, a dodecylamino group, an anilino group, a naphthylamino group, a 2-pyridylamino group, and the like), alkylsulfonyloxy groups (methanesulfonyloxy group), a cyano group, a nitro group, halogen atoms (a fluorine atom, a chlorine atom, a bromine atom, and the like), a hydroxyl group, and the like.

Among these, an alkyl group, an alkenyl group, an aryl group, or a heteroaryl group is preferred, an alkyl group, an aryl group, or a heteroaryl group is more preferred, and an alkyl group is still more preferred.

A substituent that can be employed as $R^1$ and $R^2$ may further have a substituent. As the substituent that can be employed as $R^1$ and $R^2$ may further have, the above-described substituents that can be employed as $R^1$ and $R^2$ are exemplified. In addition, $R^1$ and $R^2$ may bond together or bond with a substituent that $B^2$ or $B^3$ has to form a ring. As the ring that is formed at this time, a heterocycle or a heteroaryl ring is preferred, and the size of the ring being formed is not particularly limited, but a five-membered ring or a six-membered ring is preferred.

In General Formula (2), $B^1$, $B^2$, $B^3$, and $B^4$ each independently represent a carbon atom or a nitrogen atom. The ring including $B^1$, $B^2$, $B^3$, and $B^4$ is an aromatic ring. At least two or more of $B^1$ to $B^4$ are preferably carbon atoms, and all of $B^1$ to $B^4$ are more preferably carbon atoms.

A carbon atom that can be employed as $B^1$ to $B^4$ has a hydrogen atom or a substituent. Among carbon atoms that can be employed as $B^1$ to $B^4$, the number of carbon atoms having a substituent is not particularly limited, but is preferably zero, one, or two and more preferably one. Particularly, it is preferable that $B^1$ and $B^4$ are carbon atoms and at least one has a substituent.

The substituent that the carbon atom that can be employed as $B^1$ to $B^4$ has is not particularly limited, and examples thereof include the above-described substituents that can be employed as $R^1$ and $R^2$. Among them, an alkyl group, an alkoxy group, an alkoxycarbonyl group, an aryl group, an acyl group, an amide group, a sulfonylamide group, a carbamoyl group, an alkylsulfonyl group, an arylsulfonyl group, an amino group, a cyano group, a nitro group, a halogen atom, or a hydroxyl group is preferred, and an alkyl group, an alkoxy group, an alkoxycarbonyl group, an aryl group, an acyl group, an amide group, a sulfonylamide group, a carbamoyl group, an amino group, a cyano group, a nitro group, a halogen atom, or a hydroxyl group is more preferred.

As the substituent that the carbon atom that can be employed as $B^1$ and $B^4$ has, an alkyl group, an alkoxy group, a hydroxyl group, an amide group, a sulfonylamide group, or a carbamoyl group is still more preferred, an alkyl group, an alkoxy group, a hydroxyl group, an amide group, or a sulfonylamide group is particularly preferred, and a hydroxyl group, an amide group, or a sulfonylamide group is most preferred.

As the substituent that the carbon atom that can be employed as $B^2$ and $B^3$ has, an alkyl group, an alkoxy group, an alkoxycarbonyl group, an acyl group, an amino group, a cyano group, a nitro group, or a halogen atom is still more preferred, and it is particularly preferable that the substituent in any one of $B^2$ and $B^3$ is an electron-withdrawing group (for example, an alkoxycarbonyl group, an acyl group, a cyano group, a nitro group, or a halogen atom).

The coloring agent represented by General Formula (2) is preferably a coloring agent represented by any of General Formula (3), General Formula (4), and General Formula (5).

General Formula (3)

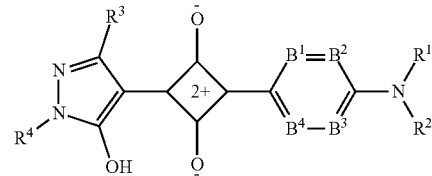

In General Formula (3), $R^1$ and $R^2$ each independently represent a hydrogen atom or a substituent and are identical to $R^1$ and $R^2$ in General Formula (2), and the preferred ranges are also identical.

In General Formula (3), $B^1$ to $B^4$ each independently represent a carbon atom or a nitrogen atom and are identical to $B^1$ to $B^4$ in General Formula (2), and the preferred ranges are also identical.

In General Formula (3), $R^3$ and $R^4$ each independently represent a hydrogen atom or a substituent. A substituent that can be employed as $R^3$ and $R^4$ is not particularly limited, and the same substituents as the substituents that can be employed as $R^1$ and $R^2$ can be exemplified.

However, the substituent that can be employed as $R^3$ is preferably an alkyl group, an alkoxy group, an amino group, an amide group, a sulfonylamide group, a cyano group, a nitro group, an aryl group, a heteroaryl group, a heterocyclic group, an alkoxycarbonyl group, a carbamoyl group, or a halogen atom, more preferably an alkyl group, an aryl group, or an amino group, and still more preferably an alkyl group.

The substituent that can be employed as $R^4$ is preferably an alkyl group, an aryl group, a heteroaryl group, a heterocyclic group, an alkoxy group, an alkoxycarbonyl group, an acyl group, an acyloxy group, an amide group, a carbamoyl group, an amino group, or a cyano group, more preferably an alkyl group, an alkoxycarbonyl group, an acyl group, a carbamoyl group, or an aryl group, and still more preferably an alkyl group.

An alkyl group that can be employed as $R^3$ and $R^4$ may be any of linear, branched, or cyclic and is preferably linear or branched. The number of carbon atoms in the alkyl group is preferably 1 to 12 and more preferably 1 to 8. As examples of the alkyl group, a methyl group, an ethyl group, an n-propyl group, an isopropyl group, a t-butyl group, a 2-ethylhexyl group, and a cyclohexyl group are preferred, and a methyl group ad a t-butyl group are more preferred.

General Formula (4)

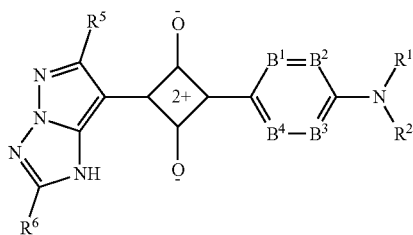

In General Formula (4), $R^1$ and $R^2$ each independently represent a hydrogen atom or a substituent and are identical to $R^1$ and $R^2$ in General Formula (2), and the preferred ranges are also identical.

In General Formula (4), $B^1$ to $B^4$ each independently represent a carbon atom or a nitrogen atom and are identical to $B^1$ to $B^4$ in General Formula (2), and the preferred ranges are also identical.

In General Formula (4), $R^5$ and $R^6$ each independently represent a hydrogen atom or a substituent. A substituent that can be employed as $R^5$ and $R^6$ is not particularly limited, and the same substituents as the substituents that can be employed as $R^1$ and $R^2$ can be exemplified.

However, the substituent that can be employed as $R^5$ is preferably an alkyl group, an alkoxy group, an aryloxy group, an amino group, a cyano group, an aryl group, a heteroaryl group, a heterocyclic group, an acyl group, an acyloxy group, an amide group, a sulfonylamide group, an ureido group, or a carbamoyl group, more preferably an alkyl group, an alkoxy group, an acyl group, an amide group, or an amino group, and still more preferably an alkyl group.

An alkyl group that can be employed as $R^5$ is identical to the alkyl group that can be employed as $R^3$ in General Formula (3), and the preferred range is also identical.

In General Formula (4), the substituent that can be employed as $R^6$ is preferably an alkyl group, an alkenyl group, an aryl group, a heteroaryl group, a heterocyclic group, an alkoxy group, a cycloalkoxy group, an aryloxy group, an alkoxycarbonyl group, an acyl group, an acyloxy group, an amide group, a sulfonylamide group, an alkylsulfonyl group, an arylsulfonyl group, a carbamoyl group, an amino group, a cyano group, a nitro group, or a halogen atom, more preferably an alkyl group, an aryl group, a heteroaryl group, or a heterocyclic group, and still more preferably an alkyl group or an aryl group.

An alkyl group that can be employed as $R^6$ is identical to the alkyl group that can be employed as $R^4$ in General Formula (3), and the preferred range is also identical.

An aryl group that can be employed as $R^6$ is preferably an aryl group having 6 to 12 carbon atoms and more preferably a phenyl group. This aryl group may have a substituent, as such a substituent, groups selected from the following substituent group A are exemplified, and, particularly, an alkyl group, a sulfonyl group, an amino group, an acylamino group, a sulfonylamino group, and the like which have 1 to 10 carbon atoms are preferred. These substituents may further have a substituent. Specifically, the substituent is preferably an alkylsulfonylamino group.

—Substituent Group A—

A halogen atom, an alkyl group, an alkenyl group, an alkynyl group, an aryl group, a heterocyclic group, a cyano group, a hydroxyl group, a nitro group, a carboxyl group, an alkoxy group, an aminooxy group, an aryloxy group, a silyloxy group, a heterocyclic oxy group, an acyloxy group, a carbamoyloxy group, an amino group, an acylamino group, an aminocarbonylamino group, an alkoxycarbonylamino group, an aryloxycarbonylamino group, a sulfamoylamino group, a sulfonylamino group (including an alkyl or arylsulfonylamino group), a mercapto group, an alkylthio group, an arylthio group, a heterocyclic thio group, a sulfamoyl group, a sulfo group, an alkyl or arylsulfinyl group, a sulfonyl group (including an alkyl or arylsulfonyl group), an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, and the like.

General Formula (5)

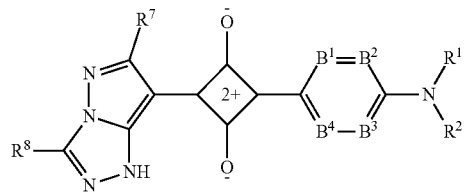

In General Formula (5), $R^1$ and $R^2$ each independently represent a hydrogen atom or a substituent and are identical to $R^1$ and $R^2$ in General Formula (2), and the preferred ranges are also identical.

In General Formula (5), $B^1$ to $B^4$ each independently represent a carbon atom or a nitrogen atom and are identical to $B^1$ to $B^4$ in General Formula (2), and the preferred ranges are also identical.

In General Formula (5), $R^7$ and $R^8$ each independently represent a hydrogen atom or a substituent. A substituent that can be employed as $R^7$ and $R^8$ is not particularly limited, and the same substituents as the substituents that can be employed as $R^1$ and $R^2$ can be exemplified.

However, a preferred range, a more preferred range, and a still more preferred group of the substituent that can be employed as $R^7$ are identical to those of the substituent that can be employed as $R^5$ in General Formula (4). An alkyl group that can be employed as $R^5$ is identical to the alkyl group that can be employed as $R^3$, and the preferred range is also identical.

In General Formula (5), a preferred range, a more preferred range, and a still more preferred range of the substituent that can be employed as $R^8$ are identical to those of the substituent that can be employed as $R^6$ in General Formula (4). Preferred ranges of an alkyl group and an aryl group that can be employed as $R^8$ are identical to those of the alkyl group and the aryl group that can be employed as $R^6$ in General Formula (4), and the preferred ranges are also identical.

In the present invention, in a case where a squarine-based dye is used as the dye A, any squarine-based dyes can be used without any particular limitation as long as the squarine coloring agents are represented by any of General Formulae (1) to (5). Examples thereof include compounds described in, for example, JP2006-160618A, WO2004/005981A, WO2004/007447A, Dyes and Pigment, 2001, 49, pp. 161 to 179, WO2008/090757A, WO2005/121098A, and JP2008-275726A.

Hereinafter, specific examples of the coloring agents represented by any of General Formula (1) to General Formula (5) will be shown. However, the present invention is not limited thereto.
In the following specific examples, Me represents methyl, Et represents ethyl, and Ph represents phenyl respectively.
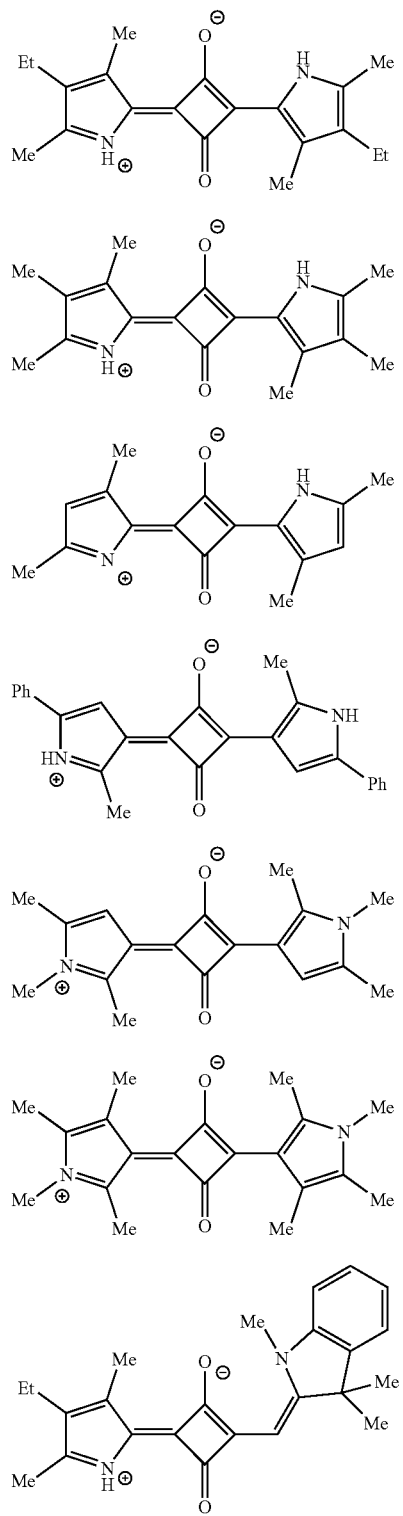
A-1
A-2
A-3
A-4
A-5
A-6
A-7
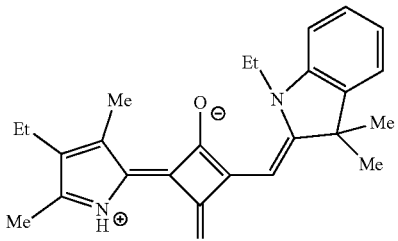
A-8
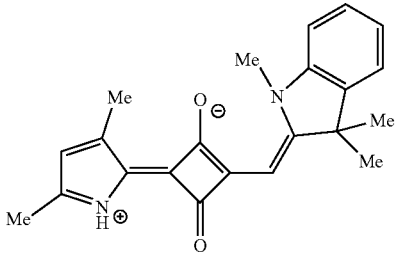
A-9
A-10
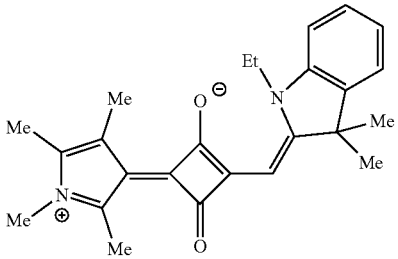
A-11
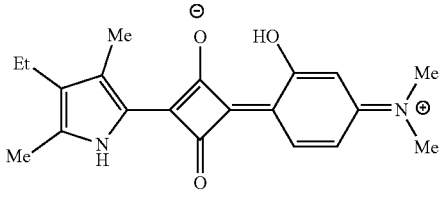
A-12
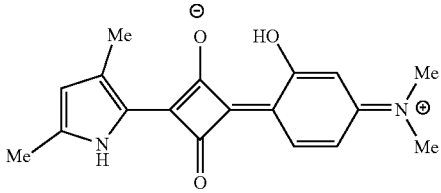
A-13
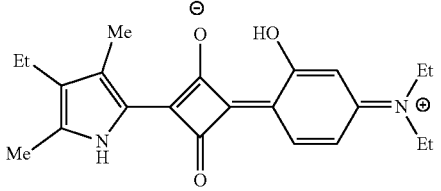
A-14
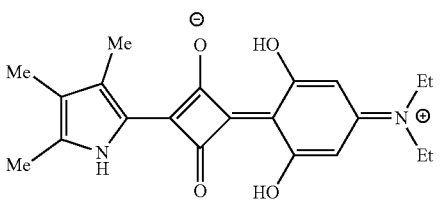

-continued

A-15
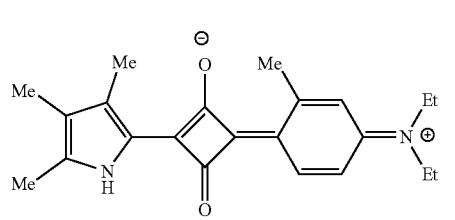

B-1
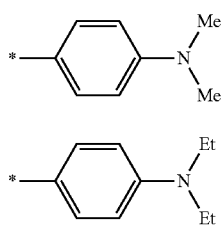

B-2

A-16
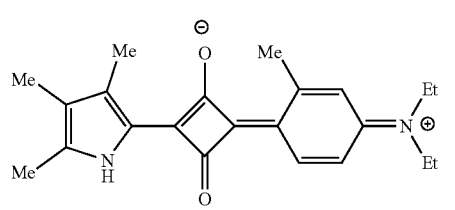

B-3
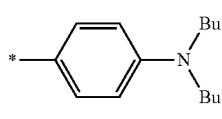

A-17
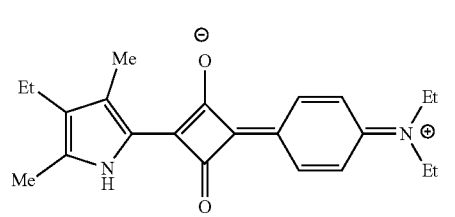

B-4
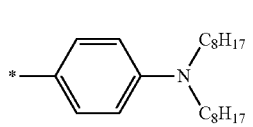

B-5
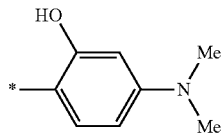

A-18
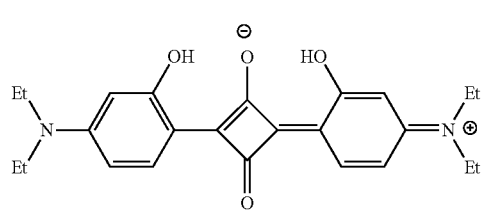

B-6
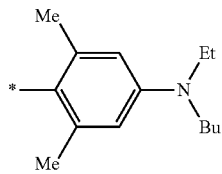

A-19
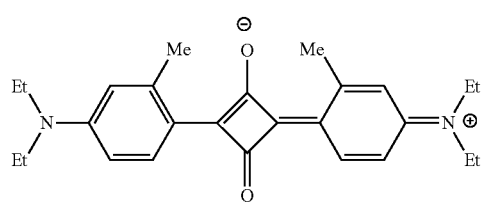

B-7
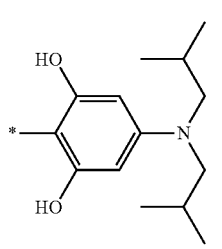

A-20
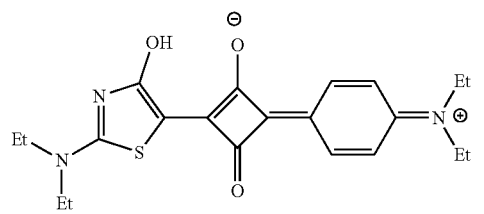

B-8

B-9
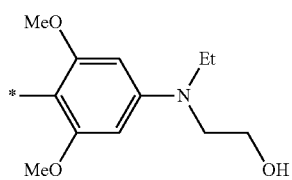

B-10
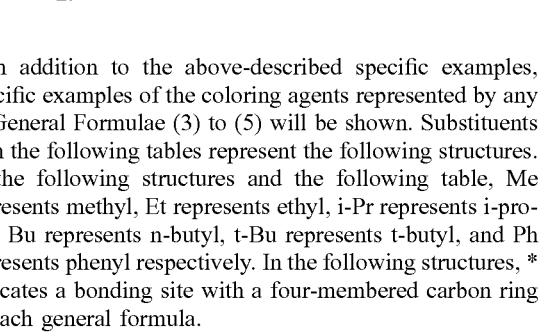

In addition to the above-described specific examples, specific examples of the coloring agents represented by any of General Formulae (3) to (5) will be shown. Substituents B in the following tables represent the following structures. In the following structures and the following table, Me represents methyl, Et represents ethyl, i-Pr represents i-propyl, Bu represents n-butyl, t-Bu represents t-butyl, and Ph represents phenyl respectively. In the following structures, * indicates a bonding site with a four-membered carbon ring in each general formula.

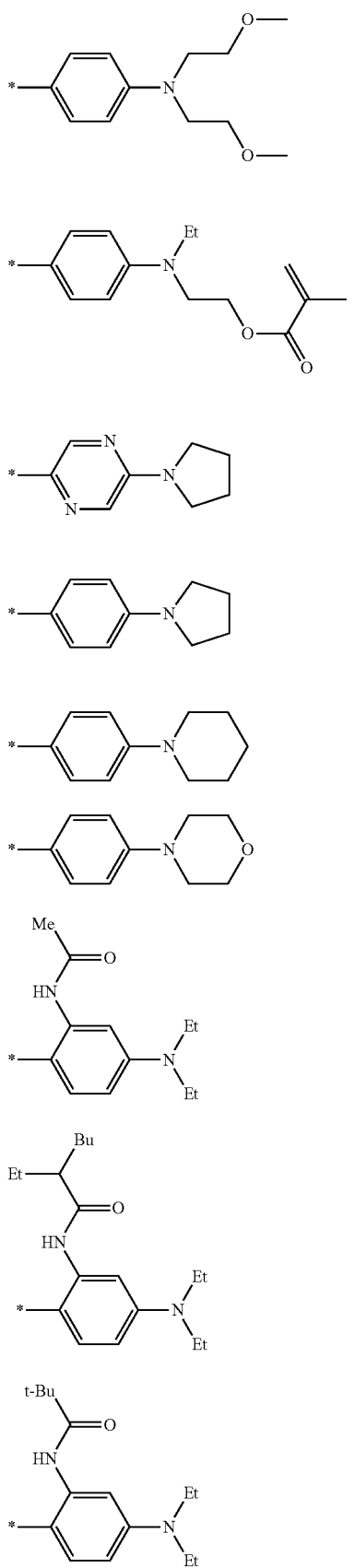
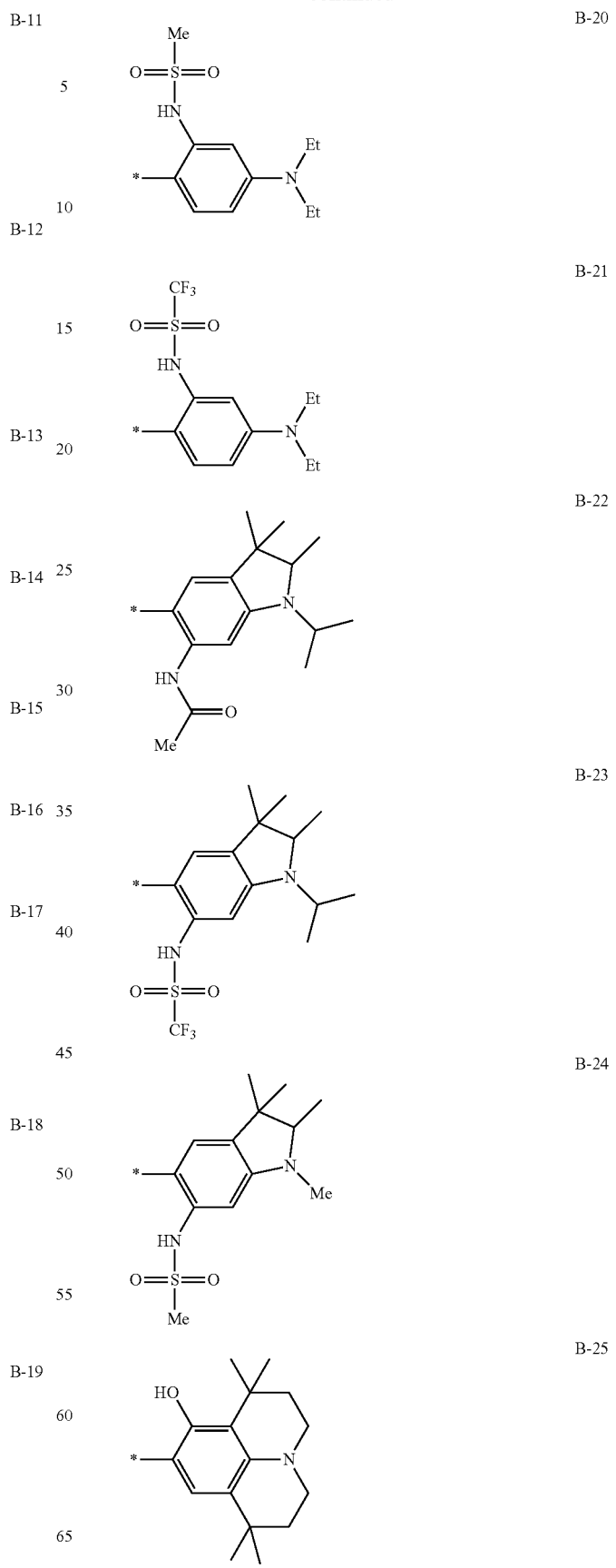

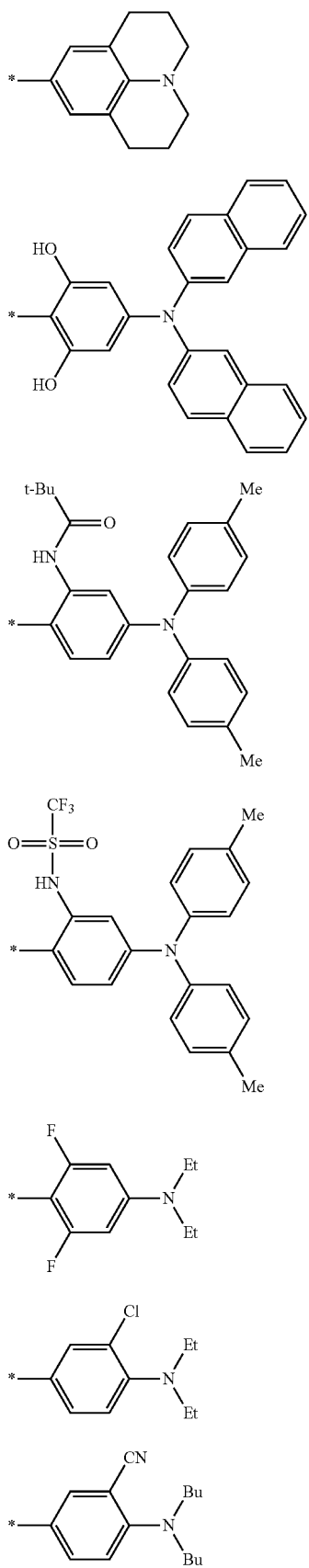

-continued

B-45

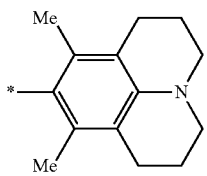

B-46

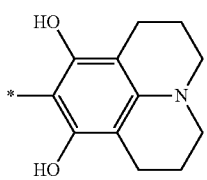

B-47

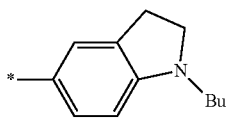

B-48

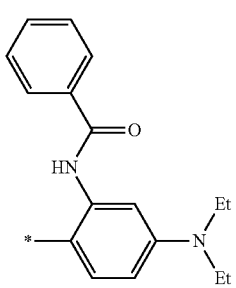

B-49

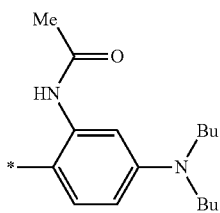

B-50

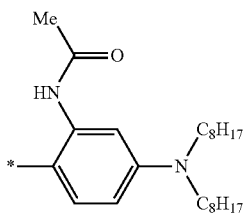

B-51

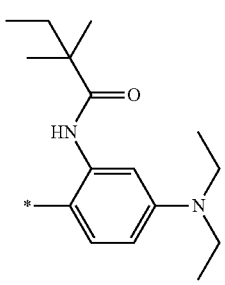

General Formula (3)

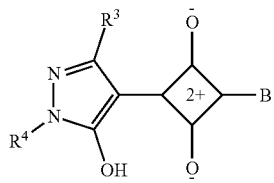

| Compound No. | R³ | R⁴ | B |
|---|---|---|---|
| 3-1 | Me | Me | B-3 |
| 3-2 | Me | Me | B-4 |
| 3-3 | Me | Me | B-5 |
| 3-4 | Me | Me | B-10 |
| 3-5 | Me | Me | B-14 |
| 3-6 | Me | Me | B-16 |
| 3-7 | Me | Me | B-17 |
| 3-8 | Me | Me | B-18 |
| 3-9 | Me | Me | B-19 |
| 3-10 | Me | Me | B-20 |
| 3-11 | Me | Me | B-21 |
| 3-12 | Me | Me | B-22 |
| 3-13 | Me | Me | B-23 |
| 3-14 | Me | Me | B-26 |
| 3-15 | Me | Me | B-32 |
| 3-16 | Me | Me | B-33 |
| 3-17 | Me | Me | B-38 |
| 3-18 | Me | Me | B-49 |
| 3-19 | Et | *-2-pyridyl | B-28 |
| 3-20 | Me | *-(4-methyl-6-hydroxypyrimidin-2-yl) | B-29 |
| 3-21 | H | H | B-23 |
| 3-22 | Et | t-Bu | B-21 |
| 3-23 | t-Bu | Me | B-18 |
| 3-24 | CF₃ | i-Pr | B-12 |
| 3-25 | COOEt | Et | B-6 |
| 3-26 | CN | Ph | B-11 |
| 3-27 | NMe₂ | Me | B-2 |
| 3-28 | i-Pr | Me | B-17 |
| 3-29 | OEt | Bu | B-27 |
| 3-30 | NH₂ | i-Pr | B-9 |
| 3-31 | t-Bu | Me | B-17 |
| 3-32 | t-Bu | Bu | B-21 |
| 3-33 | CF₃ | Me | B-18 |
| 3-34 | OEt | Et | B-33 |
| 3-35 | NMe₂ | i-Pr | B-2 |
| 3-36 | Et | Me | B-17 |
| 3-37 | Bu | Me | B-18 |
| 3-38 | NH₂ | Ph | B-19 |
| 3-39 | OEt | *-(2,4,6-trichlorophenyl) | B-25 |

-continued

| Compound No. | R³ | R⁴ | B |
|---|---|---|---|
| 3-40 | Me | 2-benzothiazolyl (*-C=N fused benzothiazole, S) | B-2 |
| 3-41 | Me | Ph | B-17 |
| 3-42 | Me | Ph | B-21 |
| 3-43 | Me | Ph | B-36 |
| 3-44 | Me | t-Bu | B-17 |
| 3-45 | Me | t-Bu | B-18 |
| 3-46 | Me | t-Bu | B-10 |
| 3-47 | OEt | Me | B-17 |
| 3-48 | OEt | Me | B-10 |
| 3-49 | Me | 2,4,6-trichlorophenyl (2,6-diCl, 4-Cl) | B-17 |
| 3-50 | Me | 2,4,6-trichlorophenyl | B-19 |
| 3-51 | Me | 2,4,6-trichlorophenyl | B-21 |
| 3-52 | Me | 2,4,6-trimethylphenyl (mesityl) | B-17 |
| 3-53 | Me | mesityl | B-20 |
| 3-54 | Me | mesityl | B-21 |
| 3-55 | t-Bu | Me | B-17 |
| 3-56 | t-Bu | Me | B-10 |
| 3-57 | t-Bu | Me | B-44 |
| 3-58 | t-Bu | t-Bu | B-17 |
| 3-59 | t-Bu | t-Bu | B-10 |
| 3-60 | t-Bu | t-Bu | B-6 |
| 3-61 | NBu₂ | Me | B-17 |
| 3-62 | NBu₂ | Me | B-10 |
| 3-63 | t-Bu | 2,4,6-trichlorophenyl | B-17 |
| 3-64 | t-Bu | 2,4,6-trichlorophenyl | B-19 |
| 3-65 | t-Bu | 2,4,6-trichlorophenyl | B-21 |
| 3-66 | t-Bu | mesityl | B-17 |
| 3-67 | t-Bu | mesityl | B-20 |
| 3-68 | t-Bu | mesityl | B-21 |
| 3-69 | Me | t-Bu | B-51 |

General Formula (4)

$$\text{pyrazolo-triazole fused ring with } R^5, R^6 \text{ substituents, connected to squarylium (cyclobutene-1,3-diyl-dioxide, 2+) — B}$$

| Compound No. | R⁵ | R⁶ | B |
|---|---|---|---|
| 4-1 | t-Bu |  *—⟨C₆H₄⟩—NHSO₂C₈H₁₇ | B-2 |
| 4-2 | t-Bu |  *—⟨C₆H₄⟩—NHSO₂C₈H₁₇ | B-6 |
| 4-3 | t-Bu |  *—⟨C₆H₄⟩—NHSO₂C₈H₁₇ | B-10 |
| 4-4 | Me |  *—⟨C₆H₄⟩—NHSO₂C₈H₁₇ | B-4 |
| 4-5 | t-Bu |  *—⟨C₆H₄⟩—NHSO₂CF₃ | B-6 |
| 4-6 | t-Bu |  *—⟨C₆H₄⟩—NHSO₂CF₃ | B-14 |
| 4-7 | NHCOCH₃ |  *—⟨C₆H₄⟩—NHSO₂CF₃ | B-1 |
| 4-8 | t-Bu |  *—⟨C₆H₄⟩—NHSO₂CH₃ | B-6 |
| 4-9 | t-Bu |  *—⟨C₆H₄⟩—NHSO₂CH₃ | B-16 |
| 4-10 | OEt |  *—⟨C₆H₄⟩—NHSO₂CH₃ | B-11 |
| 4-11 | t-Bu |  *—⟨C₆H₄⟩—NHC(=O)CH(Et)Bu | B-6 |
| 4-12 | t-Bu |  *—⟨C₆H₄⟩—NHC(=O)CH(Et)Bu | B-12 |
| 4-13 | OEt |  *—⟨C₆H₄⟩—NHC(=O)CH(Et)Bu | B-31 |
| 4-14 | H | H | B-22 |
| 4-15 | Me | Me | B-23 |
| 4-16 | Me | Me | B-17 |
| 4-17 | Me | Et | B-18 |
| 4-18 | Ph | Ph | B-8 |
| 4-19 | Et | t-Bu | B-17 |
| 4-20 | OEt | t-Bu | B-3 |
| 4-21 | OEt | Bu | B-26 |
| 4-22 | OEt | 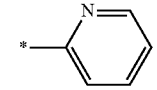 *—pyridin-2-yl | B-2 |
| 4-23 | CF3 | t-Bu | B-19 |
| 4-24 | NHCOCH₃ | t-Bu | B-2 |
| 4-25 | NHCOCH₃ | Me | B-1 |
| 4-26 | NMe₂ | t-Bu | B-6 |
| 4-27 | NMe₂ | Et | B-17 |
| 4-28 | H | Me | B-2 |
| 4-29 | t-Bu | t-Bu | B-18 |
| 4-30 | t-Bu | Me | B-17 |

General Formula (5)

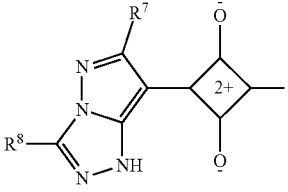

| Compound No | R⁷ | R⁸ | B |
|---|---|---|---|
| 5-1 | t-Bu | 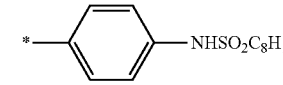 *—⟨C₆H₄⟩—NHSO₂C₈H₁₇ | B-2 |
| 5-2 | Me | 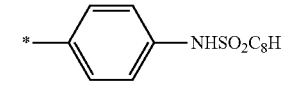 *—⟨C₆H₄⟩—NHSO₂C₈H₁₇ | B-6 |
| 5-3 | t-Bu | 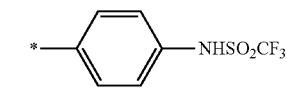 *—⟨C₆H₄⟩—NHSO₂CF₃ | B-4 |
| 5-4 | Me | 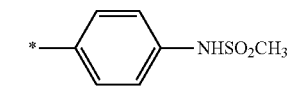 *—⟨C₆H₄⟩—NHSO₂CH₃ | B-10 |
| 5-5 | t-Bu | 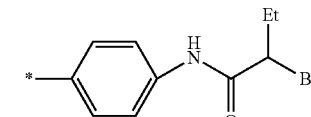 *—⟨C₆H₄⟩—NHC(=O)CH(Et)Bu | B-6 |
| 5-6 | t-Bu | 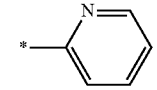 *—pyridin-2-yl | B-14 |
| 5-7 | Me | 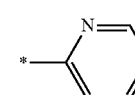 *—2,4,6-trichlorophenyl | B-1 |

-continued

| Compound No | R⁷ | R⁸ | B |
|---|---|---|---|
| 5-8 | Me | 3,4-dichlorophenyl | B-6 |
| 5-9 | Me | 3,4,5-trimethylphenyl | B-16 |
| 5-10 | t-Bu | 3,4,5-trimethylphenyl | B-11 |
| 5-11 | Me | Me | B-17 |
| 5-12 | Me | t-Bu | B-18 |
| 5-13 | Ph | Ph | B-8 |
| 5-14 | Ph | 3,4,5-trimethylphenyl | B-17 |
| 5-15 | Et | Ph | B-17 |
| 5-16 | OEt | t-Bu | B-3 |
| 5-17 | OEt | Bu | B-26 |
| 5-18 | CF3 | t-Bu | B-19 |
| 5-19 | NHCOCH₃ | t-Bu | B-2 |
| 5-20 | NHCOCH₃ | 3,4,5-trimethylphenyl | B-1 |
| 5-21 | t-Bu | 3-OC₁₀H₂₁-phenyl | B-2 |

As a preferred embodiment of the coloring agent represented by General Formula (1), a coloring agent represented by General Formula (6) is exemplified.

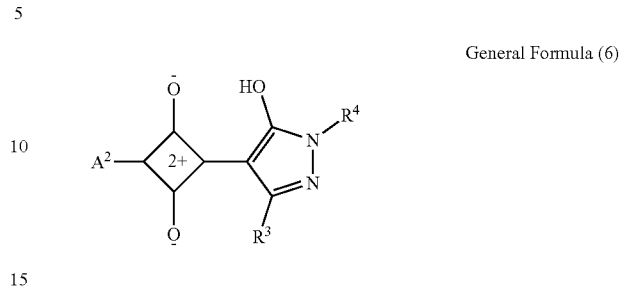

General Formula (6)

In General Formula (6), $R^3$ and $R^4$ each independently represent a hydrogen atom or a substituent and are identical to $R^3$ and $R^4$ in General Formula (3), and the preferred ranges are also identical.

In General Formula (6), $A^2$ is identical to A in General Formula (1). Among them, the heterocyclic group that is a nitrogen-containing five-membered ring is preferred.

The coloring agent represented by General Formula (6) is preferably a coloring agent represented by any of General Formula (7), General Formula (8), and General Formula (9).

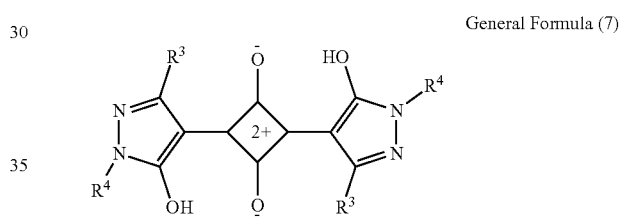

General Formula (7)

In General Formula (7), $R^3$ and $R^4$ each independently represent a hydrogen atom or a substituent and are identical to $R^3$ and $R^4$ in General Formula (3), and the preferred ranges are also identical. Two $R^3$'s and two $R^4$'s may be identical to or different from each other.

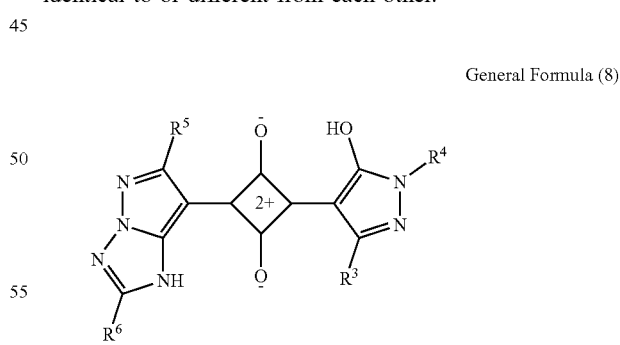

General Formula (8)

In General Formula (8), $R^3$ and $R^4$ each independently represent a hydrogen atom or a substituent and are identical to $R^3$ in General Formula (3), and the preferred ranges are also identical.

In General Formula (8), $R^5$ and $R^6$ each independently represent a hydrogen atom or a substituent and are identical to $R^5$ and $R^6$ in General Formula (4), and the preferred ranges are also identical.

General Formula (9)

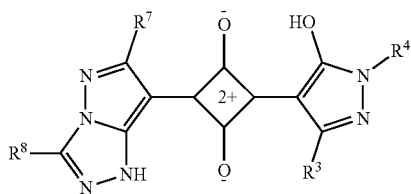

In General Formula (9), $R^3$ and $R^4$ each independently represent a hydrogen atom or a substituent and are identical to $R^3$ and $R^4$ in General Formula (3), and the preferred ranges are also identical.

In General Formula (9), $R^7$ and $R^8$ each independently represent a hydrogen atom or a substituent and are identical to $R^7$ and $R^8$ in General Formula (5), and the preferred ranges are also identical.

In the present invention, in a case where a squarine-based dye is used as the dye B, any squarine-based dyes can be used without any particular limitation as long as the squarine-based dyes are represented by any of General Formulae (6) to (9). Examples thereof include compounds described in, for example, JP2002-097383A and JP2015-068945A.

Hereinafter, specific examples of the coloring agents represented by any of General Formula (6) to General Formula (9) will be shown. However, the present invention is not limited thereto.

In the following specific examples, Me represents methyl, Et represents ethyl, i-Pr represents i-propyl, t-Bu represents t-butyl, and Ph represents phenyl respectively. In the following structures, * indicates a bonding site with a four-membered carbon ring in each general formula.

General Formula (7)

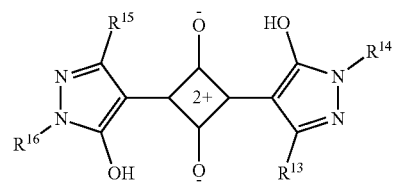

| Compound No. | $R^{13}$ | $R^{14}$ | $R^{15}$ | $R^{16}$ |
|---|---|---|---|---|
| 7-1 | Me | Me | Me | Me |
| 7-2 | Et | Me | Et | Me |
| 7-3 | Me | 2,4,6-trichlorophenyl* | Me | 2,4,6-trichlorophenyl* |
| 7-4 | t-Bu | 2,4,6-trimethylphenyl* | t-Bu | 2,4,6-trimethylphenyl* |
| 7-5 | NMe$_2$ | Me | NMe$_2$ | Me |
| 7-6 | CN | Me | CN | Me |
| 7-7 | OEt | Me | OEt | Me |
| 7-8 | Me | 4-methyl-6-hydroxypyrimidin-2-yl* | Me | 4-methyl-6-hydroxypyrimidin-2-yl* |
| 7-9 | Et | pyridin-2-yl* | Et | pyridin-2-yl* |
| 7-10 | i-Pr | pyridin-2-yl* | i-Pr | pyridin-2-yl* |
| 7-11 | t-Bu | t-Bu | t-Bu | t-Bu |
| 7-12 | CF$_3$ | Ph | CF$_3$ | Ph |
| 7-13 | COOEt | Me | COOEt | Me |
| 7-14 | NH$_2$ | Me | NH$_2$ | Me |

-continued
| Compound No. | $R^{13}$ | $R^{14}$ | $R^{15}$ | $R^{16}$ |
|---|---|---|---|---|
| 7-15 | Me | Me | Me | 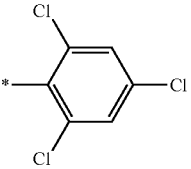 [SMILES: *c1c(Cl)cc(Cl)cc1Cl] |
| 7-16 | Me | Me | t-Bu | t-Bu |
| 7-17 | Me | Me | $NMe_2$ | Me |
| 7-18 | Me | Me | Me | Ph |
| 7-19 | Et | Me | Et | 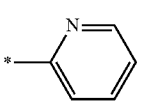 [SMILES: *c1ccccn1] |
| 7-20 | COOEt | Me | Me | 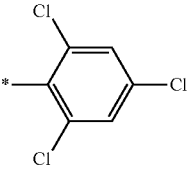 [SMILES: *c1c(Cl)cc(Cl)cc1Cl] |
General Formula (8)
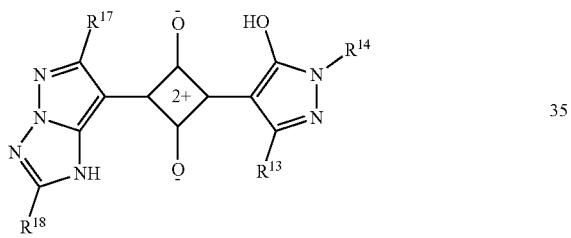
| Compound No. | $R^{13}$ | $R^{14}$ | $R^{17}$ | $R^{18}$ |
|---|---|---|---|---|
| 8-1 | Me | Me | Me | Me |
| 8-2 | Me | Me | t-Bu | 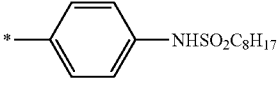 |
| 8-3 | Me | Me | t-Bu | 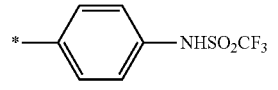 |
| 8-4 | Me | Me | t-Bu | 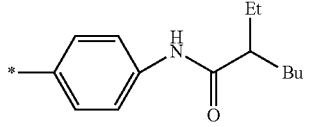 |
| 8-5 | Me | 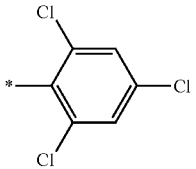 | Me | Me |

-continued
| Compound No. | R$^{13}$ | R$^{14}$ | R$^{17}$ | R$^{18}$ |
|---|---|---|---|---|
| 8-6 | Me | 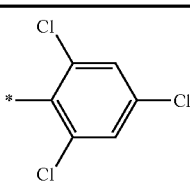 | t-Bu | 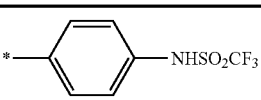 |
| 8-7 | Me | Ph | t-Bu | 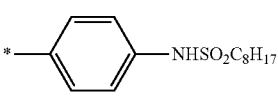 |
| 8-8 | Me | 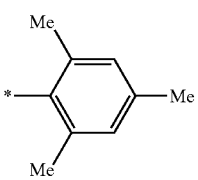 [SMILES: *c1c(C)cc(C)cc1C] | Me | Me |
| 8-9 | Et | Me | Me | Me |
| 8-10 | i-Pr | Me | Me | Me |
| 8-11 | t-Bu | Me | Me | Me |
| 8-12 | Me | Me | OEt | Bu |
| 8-13 | COOEt | Me | Me | Me |
| 8-14 | NH$_2$ | Me | Me | Me |
| 8-15 | Me | Me | CF$_3$ | t-Bu |
General Formula (9)
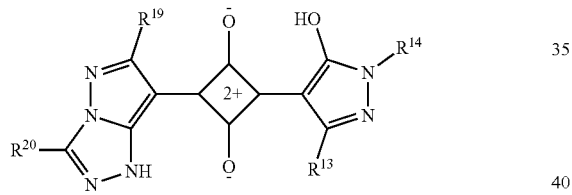
| Compound No. | R$^{13}$ | R$^{14}$ | R$^{19}$ | R$^{20}$ |
|---|---|---|---|---|
| 9-1 | Me | Me | Me | Me |
| 9-2 | Me | Me | t-Bu | 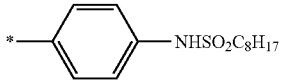 |
| 9-3 | Me | Me | Me | 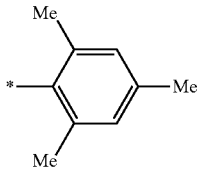 [SMILES: *c1c(C)cc(C)cc1C] |
| 9-4 | Me | Me | Me | 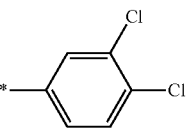 [SMILES: *c1ccc(Cl)c(Cl)c1] |

-continued

| Compound No. | $R^{13}$ | $R^{14}$ | $R^{19}$ | $R^{20}$ |
|---|---|---|---|---|
| 9-5 | Me | 2,4,6-trichlorophenyl (*-C₆H₂Cl₃) | Me | Me |
| 9-6 | Me | 2,4,6-trichlorophenyl | Me | 2,4,6-trichlorophenyl |
| 9-7 | t-Bu | Me | t-Bu | 2,4,6-trimethylphenyl (mesityl) |
| 9-8 | t-Bu | Me | Me | Me |
| 9-9 | Et | Me | t-Bu | Me |
| 9-10 | i-Pr | Me | Me | 2,4,6-trimethylphenyl (mesityl) |

The content of the coloring agent having an absorption maximum wavelength in a range of 560 to 620 nm or 460 to 520 nm in the polarizing plate protective film of the embodiment of the present invention is, in total, 0.1 parts by mass or more, more preferably 0.15 parts by mass or more, still more preferably 0.2 parts by mass or more, particularly preferably 0.25 parts by mass or more, and especially preferably 0.3 parts by mass or more with respect to 100 parts by mass of the resin forming the polarizing plate protective film. In a case where the coloring agent is highly contained in the polarizing plate protective film in a certain amount or more as described above, and furthermore, the protective film is produced as a thin film defined by the present invention, it is possible to alleviate depolarization attributed to fluorescent light emitted by the coloring agent and realize a desired excellent degree of polarization.

In addition, the content of the coloring agent having an absorption maximum wavelength in a range of 560 to 620 nm or 460 to 520 nm in the polarizing plate protective film is, in total, generally 1 part by mass or less, preferably 0.6 parts by mass or less, and more preferably 0.45 parts by mass or less with respect to 100 parts by mass of the resin forming the polarizing plate protective film.

As the dye that is used in the present invention, in addition to the dyes A and B, a fluorescent dye having a main absorption wavelength range in a wavelength range other than RGB and having a main light emission wavelength range in a wavelength range that corresponds to a wavelength range of RGB or a combination of two or more of such fluorescent dyes (a second aspect of the dye) are exemplified.

In the present invention, examples of the wavelength range other than RGB include individual wavelength ranges of 430 nm or lower (for example, 380 nm to 430 nm), 480 nm to 510 nm, and 560 nm to 610 nm. In addition, examples of the wavelength range of RGB include individual wavelength ranges of 430 nm to 480 nm, 510 nm to 580 nm, and 610 nm or higher (for example, 600 nm to 650 nm).

In the present invention, the main absorption wavelength range being in the wavelength range other than RGB means that, in the visible light absorption spectrum (a wavelength range of 380 to 750 nm), among wavelengths of absorption maximum, a wavelength at which the highest absorbance appears is in any of wavelength ranges other than RGB. In addition, the main light emission wavelength range being in the wavelength range that corresponds to the wavelength range of RGB means that, in the visible light absorption spectrum (a wavelength range of 380 to 750 nm), among wavelengths of maximum light emission, a wavelength at which the highest degree of light emission appears is in any of the wavelength range of RGB.

The above-described fluorescent dye is not particularly limited as long as the fluorescent dye has the above-described characteristics, and examples thereof include individual fluorescent dyes such as anthracene-based fluorescent dyes, anthraquinone-based fluorescent dyes, arylmethine-based fluorescent dyes, azo-based fluorescent dyes, azomethine-based fluorescent dyes, bimane-based fluorescent dyes, coumarin-based fluorescent dyes, 1,5-diazabicyclo[3.3.0]octadiene-based fluorescent dyes, diketo-pyrrole-based fluorescent dyes, naphthalenol-imine-based fluorescent dyes, naphthalimide-based fluorescent dyes, perylene-based fluorescent dyes, phenolphthalein-based fluorescent dyes, pyrrole methine-based fluorescent dyes, pyran-based fluorescent dyes, pyrene-based fluorescent dyes, porphycene-based fluorescent dyes, porphyrin-based fluorescent dyes, quinacridone-based fluorescent dyes, rhodamine-based fluorescent dyes, rubrene-based fluorescent dyes, and stilbene-based fluorescent dyes.

Combinations of two or more fluorescent dyes selected from the group consisting of individual fluorescent dyes such as perylene-based fluorescent dyes, azo-based fluorescent dyes, pyrrole methine-based fluorescent dyes, pyran-based fluorescent dyes, and coumarin-based fluorescent dyes are preferably exemplified, and combinations of two or more fluorescent dyes selected from the group consisting of individual fluorescent dyes such as perylene-based fluorescent dyes, pyrrole methine-based fluorescent dyes, pyran-based fluorescent dyes, and coumarin-based fluorescent dyes are more preferably exemplified.

<Resin>

The resin included in the polarizing plate protective film of the embodiment of the present invention (hereinafter, also referred to as "the resin that is used in the present invention" or "the matrix resin") is preferably a resin exhibiting certain hydrophobicity. That is, the resin that is used in the present invention is capable of adjusting the moisture content of the protective film to 0.5% or less by being used in the polarizing plate protective film. The light fastness of the polarizing plate protective film can be further improved by using a combination of a highly hydrophobic resin as described above and the coloring agent.

In the resin included in the polarizing plate protective film of the embodiment of the present invention, from the viewpoint of imparting a sharp-pointed absorption waveform and high polarizing performance, an fd value computed by a relational expression I below preferably satisfies a relational expression [C] below.

$$fd=\delta d/(\delta d+\delta p+\delta h)$$ Relational expression I $$0.80 \leq fd \leq 0.95$$ Relational expression [C]

In the relational expression I, $\delta d$, $\delta p$, and $\delta h$ each represent a term corresponding to the London dispersion force, a term corresponding to the dipole-dipole force, and a term corresponding to the hydrogen bond force relative to a solubility parameter $\delta t$ computed by the Hoy method. That is, fd represents the ratio of $\delta d$ to the sum of $\delta d$, $\delta p$, and $\delta h$.

In a case where the fd value is set to 0.95 or less, it is possible to further enhance the solubility of the matrix resin in a solvent capable of dissolving the coloring agent. In addition, in a case where the fd value is set to 0.80 or more, it becomes easy to obtain a more sharp-pointed absorption waveform, it is possible to further decrease the quantum yield of fluorescent light emitted by the coloring agent, and contribution is made to the improvement of the degree of polarization.

In addition, in a case where the polarizing plate protective film includes two or more matrix resins, the fd value is computed as described below.

$$fd=\Sigma(wi \cdot fdi)$$

Here, wi represents the mass fraction of the $i^{th}$ matrix resin, and fdi represents the fd value of the $i^{th}$ matrix resin.

—Term Corresponding to London Dispersion Force $\delta d$—

The term corresponding to the London dispersion force $\delta d$ refers to $\delta d$ required for amorphous polymers described in Section "2) Method of Hoy (1985, 1989)", pp. 214 to 220 of document "Properties of Polymers $3^{rd}$, ELSEVIER, (1990)" and is computed according to the description of the above-described section of the above-described document.

—Term Corresponding to Dipole-Dipole Force $\delta p$—

The term corresponding to the dipole-dipole force $\delta p$ refers to $\delta p$ required for amorphous polymers described in Section "2) Method of Hoy (1985, 1989)", pp. 214 to 220 of document "Properties of Polymers $3^{rd}$, ELSEVIER, (1990)" and is computed according to the description of the above-described section of the above-described document.

—Term Corresponding to Hydrogen Bond Force $\delta h$—

The term corresponding to the hydrogen bond force $\delta h$ refers to $\delta h$ required for amorphous polymers described in Section "2) Method of Hoy (1985, 1989)", pp. 214 to 220 of document "Properties of Polymers $3^{rd}$, ELSEVIER, (1990)" and is computed according to the description of the above-described section of the above-described document.

As preferred examples of the resin that is used in the present invention, for example, a polystyrene resin and a cyclic polyolefin resin are exemplified. In addition, it is also preferable to use, for example, a resin that imparts functionality to the polarizing plate protective film which will be described below in addition to the above-described resins.

(Polystyrene Resin)

The polystyrene resin refers to a resin including a styrene component. The polystyrene resin preferably includes 50% by mass or more of a styrene component. In the present invention, only one polystyrene resin may be used or two or more polystyrene resins may be jointly used. Here, the styrene component refers to a constitutional unit derived from a monomer having a styrene skeleton in the structure.

The polystyrene resin more preferably includes 70% by mass or more of the styrene component and still more preferably includes 85% by mass or more of the styrene component for the purpose of controlling the polarizing plate protective film to a preferred photoelastic coefficient and controlling the polarizing plate protective film to a preferred hygroscopicity. In addition, the polystyrene resin is also preferably made from the styrene component alone.

As the polystyrene resin, homopolymers of a styrene compound and copolymers of two or more styrene compounds are exemplified. Here, the styrene compound refers to a compound having a styrene skeleton in the structure and also refers to a compound having, in addition to styrene, a substituent introduced to a portion other than an ethylenic unsaturated bond of styrene. As the styrene compound, for example, styrene; alkyl styrene such as α-methyl styrene, o-methyl styrene, m-methyl styrene, p-methyl styrene, 1,3-dimethyl styrene, 2,4-dimethyl styrene, o-ethyl styrene, p-ethyl styrene, and tert-butyl styrene; substituted styrene having a hydroxyl group, an alkoxy group, a carboxyl group, a halogen, or the like introduced to a benzene nucleus of styrene such as hydroxyl styrene, tert-butoxy styrene, vinyl benzoate, o-chlorostyrene, and p-chlorostyrene, and the like are exemplified. From the viewpoint of easy procurement, material costs, and the like, among these, the polystyrene that is used in the present invention is preferably a homopolymer of styrene (that is, polystyrene).

In addition, configurational components other than the styrene component which can be included in the polystyrene resin are not particularly limited. That is, the polystyrene resin may be a styrene-diene copolymer, a styrene-polymerizable unsaturated carboxylate ester copolymer, or the like. In addition, it is also possible to use a mixture of polystyrene and synthetic rubber (for example, polybutadiene, polyisoprene, or the like). In addition, high impact polystyrene (HIPS) obtained by graft-polymerizing styrene to synthetic rubber is also preferred. In addition, polystyrene obtained by dispersing a rubber-form elastic body in a continuous phase of a polymer including the styrene component (for example, a copolymer of the styrene component and a (meth)acrylate ester component) and graft-polymerizing the copolymer to the rubber-form elastic body (referred to as graft-type high impact polystyrene "graft HIPS") is also preferred. Furthermore, so-called styrene-based elastomers can also be preferably used.

In addition, the polystyrene resin may be hydrogenated (may be a hydrogenated polystyrene resin). The hydrogenated polystyrene resin is not particularly limited, but is preferably a hydrogenated styrene-diene-based copolymer such as a hydrogenated styrene-butadiene-styrene block copolymer (SEBS) or a hydrogenated styrene-isoprene-styrene block copolymer (SEPS) that is a resin obtained by adding hydrogen to SBS or SIS. The hydrogenated polystyrene resin may be used singly or two or more polystyrene resins may be used.

As the polystyrene resin, a plurality of kinds of polystyrene resins having different compositions, molecular weights, or the like can be jointly used.

The polystyrene-based resin can be obtained by a well-known anion, massive, suspension, emulsification, or solution polymerization method. In addition, to the polystyrene resin, an unsaturated double bond of a benzene ring of a conjugated diene or styrene-based monomer may be hydrogenated. The hydrogen addition rate can be measured using a nuclear magnetic resonance device (NMR).

As the polystyrene resin, a commercially available product may be used, and, for example, "CLEAREN 530L", "CLEAREN 730L" manufactured by Denka Company Limited, "TUFPRENE 126S", "ASAPRENE T411" manufactured by Asahi Kasei Corporation, "KRATON D1102A", "KRATON D1116A" manufactured by Kraton Corporation, "STYROLUX S", "STYROLUX T" manufactured by INEOS Styrolution Group GmbH, "ASAFLEX 840", "ASAFLEX 860" (all are SBS) manufactured by Asahi Kasei Corporation, "679", "HF77", "SGP-10" manufactured by PS Japan Corporation, "DICKSTYRENE XC-515", "DICKSTYRENE XC-535" (all are GPPS) manufactured by DIC Corporation, "475D", "H0103", "HT478" manufactured by PS Japan Corporation, "DICKSTYRENE GH-8300-5" (all is HIPS) manufactured by DIC Corporation, and the like are exemplified. As the hydrogenated polystyrene-based resin, for example, "TUFTEC H Series" manufactured by Asahi Kasei Corporation, "KRATON G Series" manufactured by Shell Japan Limited (all is SEBS), "DYNARON" manufactured by JSR Corporation (hydrogenated styrene-butadiene random copolymer), "SEPTON" (SEPS) manufactured by Kuraray Co., Ltd., and the like are exemplified. In addition, as a modified polystyrene-based resin, for example, "TUFTEC M Series" manufactured by Asahi Kasei Corporation, "EPOFRIEND" manufactured by Daicel Corporation, "polar group-modified DYNARON" manufactured by JSR Corporation, "RESEDA" manufactured by Toagosei Co., Ltd., and the like are exemplified.

As the polystyrene resin, a polystyrene resin exhibiting an adhesiveness-improving action (also referred to as an adhesiveness-improving resin) is also preferably contained. The adhesiveness-improving resin is more preferably a resin imparting a functional group that imparts adhesiveness to the above-described polystyrene resin and/or a thermal crosslinking group.

The functional group that imparts adhesiveness is a group that hydrogen-bonds to polyvinyl alcohol, and an oxazoline group, a carbonamide group, a sulfonamide group, a hydroxyl group, and the like are exemplified.

In addition, the adhesiveness-improving resin also preferably has a thermal crosslinking group. The thermal crosslinking group is a group that causes a crosslinking reaction by heating and forms a crosslink, and specific examples thereof include a carboxyl group, an oxazoline group, a hydroxyl group, an isocyanate group, a maleimide group, an acetoacetoxy group, an epoxy group, an amino group, a furyl group, an acid anhydride group, and the like. In a case where both the adhesiveness-improving resin and a copolymer (a) described below have thermal crosslinking groups, it is possible to fix the copolymer (a) to the surface of the polarizing plate protective film by causing the thermal crosslinking groups to react with each other, and it becomes possible to develop more favorable adhesiveness. The reaction between the thermal crosslinking groups can be caused by heating. In this case, the copolymer (a) can be fixed to the surface of the polarizing plate protective film by causing the thermal crosslinking groups to react with each other by heating, and thus a process in which a compound (monomer) having a reactive group is added to the molecular and the monomer is cured by irradiation with ionizing radiation such as ultraviolet rays, thereby fixing the copolymer (a) to the surface of a functional film becomes unnecessary, which is preferable.

Hereinafter, as examples of the adhesiveness-improving resin, specific examples of a styrene-based resin having the thermal crosslinking group will be shown, but the present invention is not limited thereto.

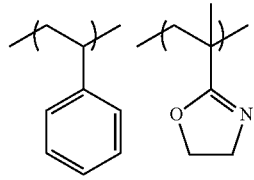

BD-1

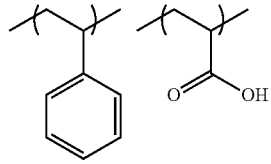

BD-2

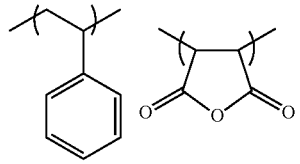

BD-3

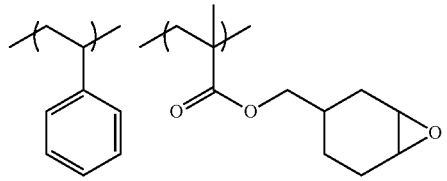

BD-4

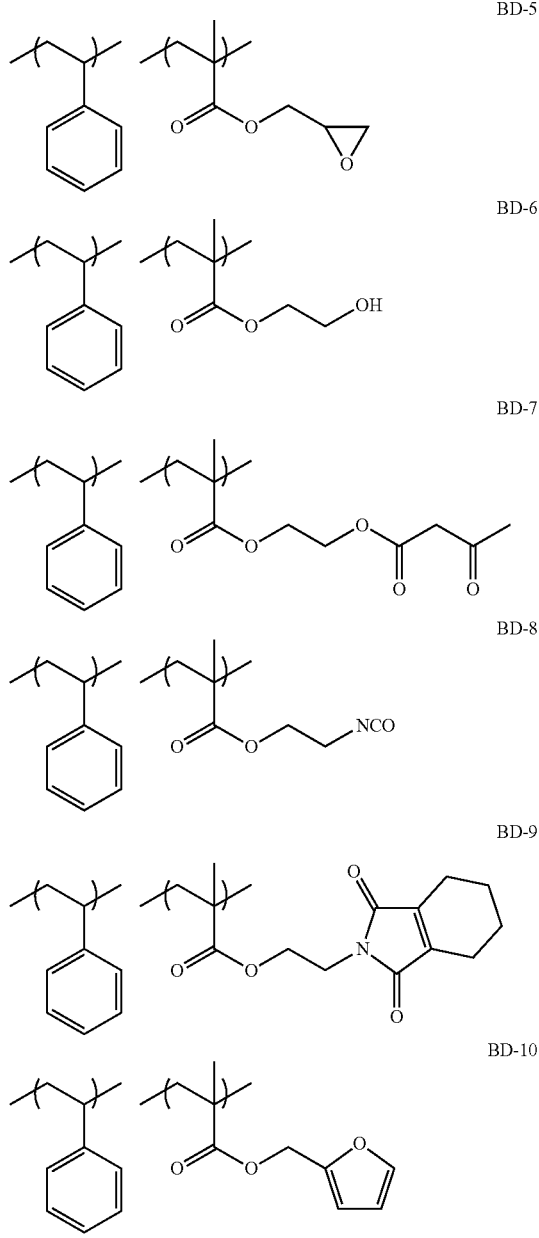

In addition, the above-described hydrogenated polystyrene resin and the hydrogenated polystyrene resin imparted with the functional group that imparts adhesiveness and/or the thermal crosslinking group can also be preferably used as the adhesiveness-improving resin. Specifically, "TUFTEC H Series" manufactured by Asahi Kasei Corporation, "KRATON G Series" manufactured by Shell Japan Limited (SEBS), "DYNARON" manufactured by JSR Corporation (hydrogenated styrene-butadiene random copolymer), "SEPTON" (SEPS) manufactured by Kuraray Co., Ltd., "TUFTEC M Series" manufactured by Asahi Kasei Corporation, "EPOFRIEND" manufactured by Daicel Corporation, "polar group-modified DYNARON" manufactured by JSR Corporation, "RESEDA" manufactured by Toagosei Co., Ltd., and the like are exemplified.

The adhesiveness-improving resin may be used singly, and a plurality of kinds of adhesiveness-improving resins that differs in the composition, molecular weight, or the like of the repeating unit can be jointly used.

The adhesiveness-improving resin can be obtained by a well-known anion, massive, suspension, emulsification, or solution polymerization method. In addition, to the adhesiveness-improving resin, an unsaturated double bond of a benzene ring of a conjugated diene or styrene-based monomer may be hydrogenated. The hydrogen addition rate can be measured using a nuclear magnetic resonance device (NMR).

The content of the adhesiveness-improving resin needs to be in the range of the content of the matrix resin.

The polarizing plate protective film of the embodiment of the present invention also preferably contains a polyphenylene ether resin in addition to the polystyrene resin. In the case of mixing a polyphenylene ether resin into the polystyrene resin, the toughness of the polarizing plate protective film further improves, and defects such as cracks are not generated even in a harsh environment such as a high temperature and a high humidity, which is preferable. As the polyphenylene ether resin that is used in the polarizing plate protective film of the embodiment of the present invention, it is possible to preferably use XYRON S201A, XYRON S202A, or XYRON S203A manufactured by Asahi Kasei Corporation or the like. In addition, a resin obtained by mixing the polystyrene resin and the polyphenylene ether resin in advance is also preferred as the resin in the polarizing plate protective film of the embodiment of the present invention. For example, it is possible to preferably use XYRON 1002H, XYRON 1000H, XYRON 600H, XYRON 500H, XYRON 400H, XYRON 300H, or XYRON H200H manufactured by Asahi Kasei Corporation or the like.

In the polarizing plate protective film of the embodiment of the present invention, the mass ratio (polystyrene resin/polyphenylene ether resin) of the polystyrene resin and the polyphenylene ether resin is preferably 99/1 to 50/50, more preferably 98/2 to 60/40, and most preferably 95/5 to 70/30. In a case where the ratio of the polyphenylene ether resin is in the above-described range, the toughness of the polarizing plate protective film does not easily become insufficient, and, even in the case of forming the film using a solution, it is possible to appropriately sublime a solvent.

(Cyclic Polyolefin Resin)

A cyclic olefin compound that forms the cyclic polyolefin resin is not particularly limited as long as the cyclic olefin compound is a compound having a ring structure including a carbon-carbon double bond, and examples thereof include norbornene compounds and monocyclic olefin compounds, cyclic conjugated diene compounds, vinyl alicyclic hydrocarbon compounds, which are not norbornene compounds, and the like.

Examples of the cyclic polyolefin resin include (1) polymers including a structural unit derived from a norbornene compound, (2) polymers including a structural unit derived from a monocyclic olefin compound other that is not a norbornene compound, (3) polymers including a structural unit derived from a cyclic conjugated diene compound, (4) polymers including a structural unit derived from a vinyl alicyclic hydrocarbon compound, hydrides of polymers including a structural unit derived from each of the compounds (1) to (4), and the like. In the present invention, ring-opening polymers of the respective compounds are considered as the polymers including a structural unit derived from a norbornene compound and the polymers including a structural unit derived from a monocyclic olefin compound.

The cyclic polyolefin resin is not particularly limited, but a polymer having a structural unit derived from a norbornene compound, which is represented by General Formula (A-II) or (A-III), is preferred. The polymer having the structural unit represented by General Formula (A-II) is an addition polymer of a norbornene compound, and the polymer having the structural unit represented by General Formula (A-III) is a ring-opening polymer of a norbornene compound.

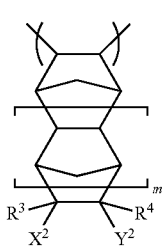

General Formula (A-II)

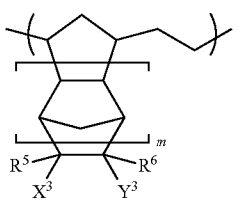

General Formula (A-III)

In General Formula (A-II) or (A-III), m represents an integer of 0 to 4 and is preferably 0 or 1.

In General Formula (A-II) or (A-III), $R^3$ to $R^6$ each independently represent a hydrogen atom or a hydrocarbon group having 1 to 10 carbon atoms.

In the present invention, a hydrocarbon group is not particularly limited as long as the hydrocarbon group is a group made up of a carbon atom and a hydrogen atom, and an alkyl group, an alkenyl group, an alkynyl group, an aryl group (an aromatic hydrocarbon group), and the like are exemplified. Among these, an alkyl group or an aryl group is preferred.

In General Formula (A-II) or (A-III), $X^2$, $X^3$, $Y^2$, and $Y^3$ each independently represent a hydrogen atom, a hydrocarbon group having 1 to 10 carbon atoms, a halogen atom, a hydrocarbon group having 1 to 10 carbon atoms which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or —(CO)$_2$O or —(CO)$_2$NR$^{15}$ which is formed by the bonding between $X^2$ and $Y^2$ or $X^3$ and $Y^3$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$ (R$^{17}$ represents a hydrocarbon group having 1 to 10 carbon atoms. p is an integer of 0 to 3). n is an integer of 0 to 10, preferably 0 to 8, and more preferably 0 to 6.

In General Formula (A-II) or (A-III), $R^3$ to $R^6$ are each preferably a hydrogen atom or —CH$_3$, and, from the viewpoint of moisture permeability, more preferably a hydrogen atom.

$X^2$ and $X^3$ are each preferably a hydrogen atom, —CH$_3$, or —C$_2$H$_5$ and, from the viewpoint of moisture permeability, more preferably a hydrogen atom.

$Y^2$ and $Y^3$ are each preferably a hydrogen atom, a halogen atom (particularly a chlorine atom), or —(CH$_2$)nCOOR$^{11}$ (particularly —COOCH$_3$) and, from the viewpoint of moisture permeability, more preferably a hydrogen atom.

The other groups are appropriately selected.

The polymer having the structural unit represented by General Formula (A-II) or (A-III) may further include at least one structural unit represented by General Formula (A-I).

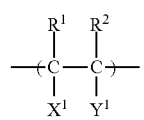

General Formula (A-I)

In General Formula (A-I), $R^1$ and $R^2$ each independently represent a hydrogen atom or a hydrocarbon group having 1 to 10 carbon atoms, and $X^1$ and $Y^1$ each independently represent a hydrogen atom, a hydrocarbon group having 1 to 10 carbon atoms, a halogen atom, a hydrocarbon group having 1 to 10 carbon atoms which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or —(CO)$_2$O or —(CO)$_2$NR$^{15}$ which is formed by the bonding between $X^1$ and $Y^1$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$ (R$^{17}$ represents a hydrocarbon group having 1 to 10 carbon atoms). p is an integer of 0 to 3). n represents an integer of 0 to 10.

From the viewpoint of adhesiveness to the polarizer, the content of the above-described structural unit derived from a norbornene compound in the cyclic polyolefin having the structural unit represented by General Formula (A-II) or (A-III) is preferably 90% by mass or less, more preferably 30% to 85% by mass, still more preferably 50% to 79% by mass, and most preferably 60% to 75% by mass with respect to the total mass of the cyclic polyolefin. Here, the proportion of the structural unit derived from a norbornene compound represents the average value in the cyclic polyolefin.

The addition (co)polymer of a norbornene compound is described in JP1998-007732A (JP-H10-007732A), JP2002-504184A, US2004/229157A1A, or WO2004/070463A.

The polymer of a norbornene compound is obtained by the addition polymerization of norbornene compounds (for example, polycyclic unsaturated compounds of norbornene).

In addition, as the polymer of a norbornene compound, copolymers obtained by the addition copolymerization of, as necessary, a norbornene compound, olefin such as ethylene, propylene, or butene, conjugated diene such as butadiene or isoprene, unconjugated diene such as ethylidene norbornene, and an ethylenically unsaturated compound such as acrylonitrile, acrylic acid, methacrylic acid, maleic acid anhydride, acrylic acid ester, methacrylic acid ester, maleimide, vinyl acetate, or vinyl chloride are exemplified. Among these, copolymers with ethylene are preferred.

Examples of the above-described addition (co)polymers of a norbornene compound include APL8008T (Tg: 70° C.), APL6011T (Tg: 105° C.), APL6013T (Tg: 125° C.), and APL6015T (Tg: 145° C.) which are launched by Mitsui Chemicals, Inc. under a trade name of APEL and have mutually different glass transition temperatures (Tg). In addition, pellets such as TOPAS8007, TOPAS6013, and TOPAS6015 are put on the market by Polyplastics Co., Ltd. Furthermore, Appear3000 is put on the market by Film Ferrania S. R. L.

As the above-described polymer of a norbornene compound, commercially available products can be used. For example, polymers are put on the market by ISR Corporation under a trade name of Arton G or Arton F, and polymers are put on the market by Zeon Corporation under a trade name of Zeonor ZF14, Zf16, Zeonex 250, or Zeonex 280.

The hydride of a polymer of a norbornene compound can be synthesized by the addition polymerization or the metathesis ring-opening polymerization of a norbornene compound or the like and then the addition of hydrogen. A synthesis method is described in, for example, JP1989-240517A (JP-H1-240517A), JP1995-196736A (JP-H7-196736A), JP1985-026024A (JP-S60-026024A), JP1987-019801A (JP-S62-019801A), JP2003-159767A, JP2004-309979A, and the like.

The molecular weight of the cyclic polyolefin resin that is used in the present invention is appropriately selected depending on the intended use, but the polyisoprene or polystyrene-equivalent mass-average molecular weight measured by the gel permeation chromatography of a cyclohexane solution (a toluene solution in a case where the polymer is not dissolved) is in a range of, generally, 5,000 to 500,000, preferably 8,000 to 200,000, and more preferably 10,000 to 100,000. A polymer having a molecular weight in the above-described range is capable of satisfying both the mechanical strength and the molding workability of compacts at a high level in a well-balanced manner.

The content of the matrix resin in the polarizing plate protective film of the embodiment of the present invention is preferably 5% by mass or more, more preferably 20% by mass or more, still more preferably 50% by mass or more, still more preferably 70% by mass or more, still more preferably 80% by mass or more, and preferably 90% by mass or more.

The content of the matrix resin in the polarizing plate protective film of the embodiment of the present invention is generally 99.90% by mass or less and preferably 99.85% by mass or less.

The number of the cyclic polyolefin resins that the polarizing plate protective film contains may be two or more, and polymers having different compositional ratios and/or molecular weights may be jointly used. In this case, the total content of the respective polymers needs to be in the above-described range.

(Stretchable Resin Component)

The polarizing plate protective film of the embodiment of the present invention is capable of preferably including an appropriately-selected component that exhibits stretchability (stretchable resin component) as the resin component. Specifically, an acrylonitrile-butadiene-styrene resin (ABS resin), a styrene-butadiene resin (SB resin), an isoprene resin, a butadiene resin, an isobutylene-isobutene resin, a polyether-urethane resin, a silicone resin, and the like can be exemplified. In addition, these resins may be further, appropriately, hydrogenated.

As the stretchable resin component, an ABS resin or an SB resin is preferably used, and an SB resin is more preferably used.

As the SB resin, for example, a commercially available SB resin can also be used, and, as such a commercially available product, TR2000, TR2003, TR2250 (all are trade names and manufactured by JSR Corporation), CLEAREN 210M, 220M, 730 V (all are trade names and manufactured by Denka Company Limited), ASAFLEX 800S, 805, 810, 825, 830, 840 (all are trade names and manufactured by Asahi Kasei Corporation), ESPOLEX SB2400, SB2610, SB2710 (all are trade names and manufactured by Sumitomo Chemical Co., Ltd.), and the like can be exemplified.

The content of the stretchable resin component needs to be in the range of the content of the matrix resin. The polarizing plate protective film of the embodiment of the present invention preferably includes 15% to 95% by mass of the stretchable resin component in the solid content. The content is more preferably 20% to 50% by mass and still more preferably 25% to 45% by mass.

The fracture elongation of the stretchable resin component is preferably 10% or more and more preferably 20% or more in the case of being measured at 25° C. using a specimen having a thickness of 30 μm and a width of 10 mm.

(Peel Property-Controlling Resin Component)

The polarizing plate protective film of the embodiment of the present invention is capable of including a component for controlling the peel property (peel property-controlling resin component) in a step of peeling the polarizing plate protective film from a base material. In the case of controlling the peel property of the polarizing plate protective film from the base material, it is possible to prevent the generation of a peel trace in the peeled polarizing plate protective film, additionally, it becomes possible to deal with a variety of working rates in a peeling step, and it is possible to obtain a preferable effect for improving the quality or productivity of polarizing plates.

The peel property-controlling resin component is not particularly limited and can be appropriately selected depending on the kind of the base material. In the case of using a polyester-based polymer film as the base material as described below, as the peel property-controlling resin component, for example, a polyester resin (also referred to as the polyester-based additive) is preferred.

The polyester-based additive can be obtained by a well-known method such as a dehydration condensation reaction between a polyvalent basic acid and a polyhydric alcohol or the addition and dehydration condensation reaction of a dibasic acid anhydride to a polyhydric alcohol and is preferably a polycondensed ester formed from a dibasic acid and a diol.

The mass-average molecular weight (Mw) of the polyester-based additive is preferably 500 to 50,000, more preferably 750 to 40,000, and still more preferably 2,000 to 30,000.

The mass-average molecular weight of the polyester-based additive is preferably 500 or more from the viewpoint of brittleness and moisture-heat resistance and is preferably 50,000 or less from the viewpoint of compatibility with resins.

As the mass-average molecular weight of the polyester-based additive, the mass-average molecular weight (Mw) and the molecular weight distribution (Mw/Mn) in terms of standard polystyrene are measured under the following conditions. Mn represents the number-average molecular weight in terms of standard polystyrene.

GPC: Gel permeation chromatography device (HLC-8220GPC manufactured by Tosoh Corporation, columns; a guard column HXL-H, TSK gel G7000HXL, two TSK gel GMHXLs, and TSK gel G2000HXL, all of which are manufactured by Tosoh Corporation, are sequentially coupled together, eluent: tetrahydrofuran, flow rate: 1 mL/min, sample concentration; 0.7% to 0.8% by mass; amount of sample injected: 70 µL, measurement temperature: 40° C., detector; differential refractometer (RI) (40° C.), standard substance: TSK standard polystyrene manufactured by Tosoh Corporation)

As a dibasic acid component configuring the polyester-based additive, dicarboxylic acid can be preferably exemplified.

As this dicarboxylic acid, an aliphatic dicarboxylic acid, an aromatic dicarboxylic acid, and the like are exemplified, and an aromatic dicarboxylic acid or a mixture of an aromatic dicarboxylic acid and an aliphatic dicarboxylic acid can be preferably used.

Among aromatic dicarboxylic acids, an aromatic carboxylic acid having 8 to 20 carbon atoms is preferred, an aromatic dicarboxylic acid having 8 to 14 carbon atoms is more preferred, and, specifically, at least one selected from phthalic acid, isophthalic acid, or terephthalic acid is preferred.

Among aliphatic dicarboxylic acids, an aliphatic dicarboxylic acid having 3 to 8 carbon atoms is preferred, an aliphatic dicarboxylic acid having 4 to 6 carbon atoms is more preferred, and, specifically, at least one selected from succinic acid, maleic acid, adipic acid, or glutaric acid is preferred, and at least one selected from succinic acid or adipic acid is more preferred.

In addition, as a diol component configuring the polyester-based additive, an aliphatic diol, an aromatic diol, and the like are exemplified, and an aliphatic diol is particularly preferred.

Among aliphatic diols, an aliphatic diol having 2 to 4 carbon atoms is preferred, and an aliphatic diol having 2 to 3 carbon atoms is more preferred.

As the aliphatic diol, for example, ethylene glycol, diethylene glycol, 1,2-propylene glycol, 1,3-propylene glycol, 1,3-butylene glycol, 1,4-butylene glycol, and the like can be exemplified, and these aliphatic diols can be used singly or two or more aliphatic diols can be jointly used.

The polyester-based additive is particularly preferably a compound obtained by condensing at least one selected from phthalic acid, isophthalic acid, or terephthalic acid and the aliphatic diol.

The terminal of the polyester-based additive may be sealed by being reacted with monocarboxylic acid. The monocarboxylic acid that is used for sealing is preferably aliphatic monocarboxylic acid, preferably acetic acid, propionic acid, butanoic acid, benzoic acid or a derivative thereof, more preferably acetic acid or propionic acid, and most preferably acetic acid.

As commercially available polyester-based additives, ester-based resin POLYESTER manufactured by Nippon Synthetic Chemical Industry Co., Ltd. (for example, LP050, TP290, LP035, LP033, TP217, TP220), ester-based resin VYLON manufactured by Toyobo Co., Ltd. (for example, VYLON 245, VYLON GK890, VYLON 103, VYLON 200, VYLON 550.GK880), and the like are exemplified.

The content of the peel property-controlling resin component needs to be in the range of the content of the matrix resin. In the polarizing plate protective film of the embodiment of the present invention, the content of the peel property-controlling resin component is preferably 0.05% by mass or more and more preferably 0.1% by mass or more of the total mass of the polarizing plate protective film (with respect to 100% by mass of the total mass of the polarizing plate protective film). In addition, the amount of the peel property-controlling component is preferably 25% by mass or less, more preferably 20% by mass or less, and still more preferably 15% by mass or less of the total mass of the polarizing plate protective film. From the viewpoint of obtaining appropriate adhesiveness, the above-described range is preferred.

(Adhesiveness-Improving Resin Component)

A component that enhances adhesiveness to layers or the like that come into contact with the polarizing plate protective film (adhesiveness-improving resin component) is also preferably contained in the matrix resin, thereby developing more favorable adhesiveness between the polarizing plate protective film and other layers or films or other products. Particularly, a component that improves adhesiveness between the polarizing plate protective film and the polarizer is preferably contained.

In the following description, a case where a subject to which the polarizing plate protective film adheres (adhesion subject) is an adhesive layer or the polarizer will be described as an example, but the adhesion subject is not limited thereto.

—Boronic Acid Group or Boronic Acid Ester Group-Containing Copolymer—

The polarizing plate protective film of the embodiment of the present invention may contain, as a component that enhances adhesiveness to other layers or the like, a boronic acid group or boronic acid ester group-containing copolymer, for example, a copolymer including a repeating unit represented by General Formula (ID) and including a repeating unit represented by General Formula (IID) (hereinafter, also referred to as the "copolymer (a)") and/or a crosslink reaction product derived from the copolymer (a).

The polarizing plate protective film of the embodiment of the present invention preferably contains at least one of the copolymer (a) or the crosslink reactant derived from the copolymer (a) and may contain any one or both thereof.

(ID)

In General Formula (ID), $R^1$ represents a hydrogen atom or an alkyl group having 1 to 20 carbon atoms. $R^2$ represents an alkyl group having 1 to 20 carbon atoms which has at least one fluorine atom as a substituent or a group including —Si($R^{a3}$)($R^{a4}$)O—. $R^{a3}$ and $R^{a4}$ each independently represent an alkyl group having 1 to 12 carbon atoms or an aryl group which may have a substituent. L represents a divalent linking group formed of at least one selected from the group consisting of —O—, —(C=O)O—, —O(C=O)—, a divalent aliphatic chain-like group, or a divalent aliphatic cyclic group.

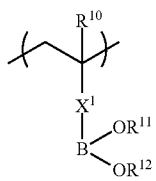

(IID)

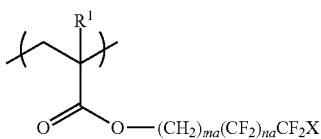

(IIID)

In General Formula (IID), $R^{10}$ represents a hydrogen atom or an alkyl group having 1 to 20 carbon atoms. $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group, and $R^{11}$ and $R^{12}$ may be linked to each other. $X^1$ represents a divalent linking group.

—Copolymer (a) or Crosslink Reactant Derived from Copolymer (a)—

Hereinafter, the copolymer (a) or the crosslink reactant derived from the copolymer (a) that is contained in the polarizing plate protective film will be described.

$R^1$ in General Formula (ID) represents a hydrogen atom or an alkyl group having 1 to 20 carbon atoms and is preferably a hydrogen atom or an alkyl group having 1 to 10 carbon atoms, more preferably a hydrogen atom or an alkyl group having 1 to 4 carbon atoms, and still more preferably a hydrogen atom or a methyl group.

$R^2$ in General Formula (ID) is preferably an alkyl group having 1 to 20 carbon atoms which has at least one fluorine atom as a substituent (fluoroalkyl group), more preferably a fluoroalkyl group having 1 to 18 carbon atoms, and still more preferably a fluoroalkyl group having 2 to 15 carbon atoms. In addition, the number of fluorine atoms in the fluoroalkyl group is preferably 1 to 25, more preferably 3 to 21, and most preferably 5 to 21.

L in General Formula (ID) represents a divalent linking group formed of at least one selected from the group consisting of —O—, —(C=O)O—, —O(C=O)—, a divalent aliphatic chain-like group, or a divalent aliphatic cyclic group. —(C=O)O— indicates that a carbon atom on the $R^1$ side and C=O bond to each other and $R^2$ and O bond to each other, and —O(C=O)— indicates that a carbon atom on the $R^1$ side and O bond to each other and $R^2$ and C=O bond to each other.

As the divalent aliphatic chain-line group that can be employed as L, an alkylene group having 1 to 20 carbon atoms is preferred, and an alkylene group having 1 to 10 carbon atoms is more preferred.

As the divalent aliphatic cyclic group that can be employed as L, a cycloalkylene group having 3 to 20 carbon atoms is preferred, and a cycloalkylene group having 3 to 15 carbon atoms is more preferred.

As L, —(C=O)O— or —O(C=O)— is preferred, and —(C=O)O— is more preferred.

From the viewpoint of a surface concentration property (a function of concentrating the copolymer (a) on the surface of the polarizing plate protective film) that is advantageous to adhesiveness and the viewpoint of a radical polymerization property, the repeating unit represented by General Formula (ID) is particularly preferably a repeating unit represented by General Formula (IIID).

In General Formula (IIID), $R^1$ represents a hydrogen atom or an alkyl group having 1 to 20 carbon atoms. ma and na each are independently an integer of 1 to 18 and satisfy ma+na≤19. X represents a hydrogen atom or a fluorine atom.

$R^1$ in General Formula (IIID) is identical to $R^1$ in General Formula (ID), and a preferred range thereof is also identical thereto.

ma and na in General Formula (IIID) each are independently an integer of 1 to 18.

From the viewpoint of surface concentration that is advantageous to adhesiveness and the viewpoint of easiness in raw material procurement and manufacturing, ma in General Formula (IIID) is preferably an integer of 1 to 8 and more preferably an integer of 1 to 5. In addition, na is preferably an integer of 1 to 15, more preferably an integer of 1 to 12, still more preferably an integer of 2 to 10, and most preferably an integer of 5 to 7.

X in General Formula (IIID) represents a hydrogen atom or a fluorine atom and is preferably a fluorine atom.

The repeating unit represented by General Formula (ID) or General Formula (IIID) may further have a substituent in the case of being substitutable. As the substituent, a substituent selected from a substituent group Y described below is preferred, and a hydroxyl group is preferred.

The repeating unit represented by General Formula (ID) or General Formula (IIID) can be introduced by the polymerization of a monomer. As preferred monomers, for example, 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, 3-(perfuroro-7-methyl-octyl)-2-hydroxypropyl (meth)acrylate, and the like are exemplified.

$R^2$ in General Formula (ID) may be a group including —Si($R^{a3}$)($R^{a4}$)O— (siloxane bond) and also preferably has a polysiloxane structure including the siloxane bond represented by —($R^{a3}$)($R^{a4}$)O— as a repeating unit as another aspect. In this case, the copolymer (a) is preferably a graft copolymer having the polysiloxane structure introduced to a side chain. A compound having the siloxane bond for obtaining this graft copolymer is more preferably a compound represented by General Formula (IVD).

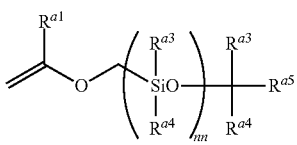

(IVD)

$R^{a3}$ and $R^{a4}$ each independently represent an alkyl group having 1 to 12 carbon atoms (including a haloalkyl group) or an aryl group. As the alkyl group, an alkyl group having 1 to 10 carbon atoms is preferred. For example, a methyl group, an ethyl group, and a hexyl group can be exemplified. The alkyl group may be a haloalkyl group obtained by substituting the alkyl group with a halogen atom, and, as the haloalkyl group, a fluorinated alkyl group having 1 to 10 carbon atoms is preferred. For example, a trifluoromethyl group and a pentafluoroethyl group can be exemplified. As the aryl group, an aryl group having 6 to 20 carbon atoms is preferred. For example, a phenyl group and a naphthyl group can be exemplified. Among these, $R^{a3}$ and $R^{a4}$ are preferably a methyl group, a trifluoromethyl group, or a phenyl group and particularly preferably a methyl group.

$R^{a1}$ represents a hydrogen atom or an alkyl group having 1 to 20 carbon atoms.

$R^{a5}$ represents an alkyl group having 1 to 12 carbon atoms and is preferably an alkyl group having 1 to 4 carbon atoms.

nn is preferably an integer of 10 to 1,000, more preferably an integer of 20 to 500, and still more preferably an integer of 30 to 200.

$R^{a3}$'s that number nn in General Formula (IVD) may be identical to or different from each other, and $R^{a g}$'s that number nn may be identical to or different from each other.

As a compound having a siloxane bond for graft copolymerization, single-terminal (meth)acryloyl group-containing polysiloxane macromers (for example, SILAPLANE 0721 and SILAPLANE 0725 (all are trade names, manufactured by JNC Corporation), AK-5, AK-30, AK-32 (all are trade names, manufactured by Toagosei Co., Ltd.), KF-100T, X-22-169AS, KF-102, X-22-37011E, X-22-164B, X-22-164C, X-22-5002, X-22-173B, X-22-174D, X-22-167B, X-22-161AS (all are trade names, manufactured by Shin-Etsu Chemical Co., Ltd.), and the like can be exemplified.

Next, General Formula (IID) will be described.

The copolymer (a) includes, in addition to the repeating unit represented by General Formula (ID), the repeating unit represented by General Formula (IID). In the copolymer (a), the repeating unit represented by General Formula (IID) has a strong interaction with a hydroxyl group. That is, in a case where a coating fluid of a composition for forming the polarizing plate protective film is applied onto the base material, and then an adhesive layer having a hydroxyl group is provided on the surface of the coating fluid, part or all of the repeating unit represented by General Formula (IID) interacts with the hydroxyl group, whereby the copolymer (a) diffuses in the interface with the adhesive layer having the hydroxyl group and in the adhesive layer and is adsorbed.

Therefore, after the polarizing plate protective film and the adhesive layer come into contact with each other, the copolymer (a) having the repeating unit represented by General Formula (IID) added to the coating fluid is present in the polarizing plate protective film, the adhesive layer, and the interface therebetween as a copolymer having a chemical structure of General Formula (IID) or a derivative having a structure formed by a reaction between the repeating unit represented by General Formula (IID) and the hydroxyl group in the adhesive layer (crosslink reactant).

As described above, the copolymer (a) having the repeating unit represented by General Formula (IID) interacts with the adhesive layer, and thus the adhesiveness between the polarizing plate protective film including the copolymer (a) and the adhesive layer can be enhanced regardless of the ratio of the copolymer (a) present in the adhesive layer and/or the polarizing plate protective film, and consequently, it is possible to enhance the adhesiveness to the polarizer.

In addition, even in a case where the polarizing plate protective film is attached to a subject other than the adhesive layer, adhesiveness can be enhanced as in the case of the adhesive layer in a case where the subject has a hydroxyl group on the surface.

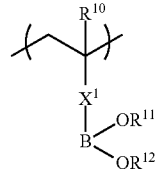

(IID)

In General Formula (IID), $R^{10}$ is preferably a hydrogen atom or an alkyl group having 1 to 10 carbon atoms, more preferably a hydrogen atom or an alkyl group having 1 to 4 carbon atoms, and most preferably a hydrogen atom or methyl group.

In General Formula (IID), as the substituted or unsubstituted aliphatic hydrocarbon group that can be employed as $R^{11}$ and $R^{12}$, for example, substituted or unsubstituted alkyl group, alkenyl group, and alkynyl group are exemplified.

As specific examples of the alkyl group, linear, branched, or cyclic alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, and a 2-norbornyl group are exemplified.

As specific examples of the alkenyl group, linear, branched, or cyclic alkenyl groups such as a vinyl group, a 1-propenyl group, a 1-butenyl group, a 1-methyl-1-propenyl group, a 1-cyclopentenyl group, and a 1-cyclohexenyl group are exemplified.

As specific examples of the alkynyl group, an ethynyl group, a 1-propynyl group, a 1-butynyl group, a 1-octynyl group and the like are exemplified.

As specific examples of a substituted or unsubstituted aryl group that can be employed as $R^{11}$ and $R^{12}$, phenyl groups are exemplified. In addition, groups obtained by removing one hydrogen atom from a fused ring formed of two to four benzene rings and groups obtained by removing one hydrogen atom from a fused ring formed of a benzene ring and an unsaturated five-membered ring can be exemplified, and, as specific examples, a naphthyl group, an anthryl group, a phenanthryl group, an indenyl group, an acenabutenyl group, a fluorenyl group, a pyrenyl group, and the like are exemplified.

In addition, as examples of a substituted or unsubstituted heteroaryl group that can be employed as $R^{11}$ and $R^{12}$, heteroaryl groups produced by removing one hydrogen atom on a heteroaromatic ring including one or more hetero atoms selected from the group consisting of a nitrogen atom, an oxygen atom, or a sulfur atom are included. As specific examples of the heteroaromatic ring including one or more hetero atoms selected from the group consisting of a nitrogen atom, an oxygen atom, or a sulfur atom, pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazolebenzimidazole, anthranyl, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridin, and the like are exemplified.

$R^{11}$ and $R^{12}$ may be linked to each other, and, in this case, it is preferable that $R^{11}$ and $R^{12}$ each are independently an alkyl group or an aryl group and are linked to each other, and it is more preferable that $R^{11}$ and $R^{12}$ are an alkyl group and are linked to each other.

In General Formula (IID), as the divalent linking group represented by $X^1$, a linking group including at least one bond selected from —(C═O)O—, —O(C═O)—, —(C═O)NH—, —O—, —CO—, —NH—, —O(C═O)NH—, —O(C═O)—O—, or —CH$_2$— and having 7 or more carbon atoms is preferred. The divalent linking group represented by $X^1$ is also preferably an arylene group.

$R^{11}$, $R^{12}$, and $X^1$ in General Formula (IID) may also be substituted with one or more substituents in the case of being substitutable. As the substituent, a group of monovalent non-metallic atom groups excluding a hydrogen atom can be exemplified, and the substituent can be selected from, for example, the following substituent group Y.

Substituent group Y:

Halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group and conjugate base groups thereof, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and conjugate base groups thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and conjugate base groups thereof, an N-alkylsulfonylsulfamoyl group (—SO$_2$NHSO$_2$ (alkyl)) and conjugate base groups thereof, an N-arylsulfonylsulfamoyl group (—SO$_2$NHSO$_2$ (aryl)) and conjugate base groups thereof, an N-alkylsulfonylcarbamoyl group (—CONHSO$_2$ (alkyl)) and conjugate base groups thereof, an N-arylsulfonylcarbamoyl group (—CONHSO$_2$ (aryl)) and conjugate base groups thereof, an alkoxysilyl group (—Si(Oalkyl)$_3$), an aryloxysilyl group (—Si(Oaryl)$_3$), a hydroxysilyl group (—Si(OH)$_3$) and conjugate base groups thereof, a phosphono group (—PO$_3$H$_2$) and conjugate base groups thereof, a dialkylphosphono group (—PO$_3$ (alkyl)$_2$), a diarylphosphono group (—PO$_3$ (aryl)$_2$), an alkylarylphosphono group (—PO$_3$ (alkyl)(aryl)), a monoalkylphosphono group (—PO$_3$H (alkyl)) and conjugate base groups thereof, a monoarylphosphono group (—PO$_3$H (aryl)) and conjugate base groups thereof, a phosphonooxy group (—OPO$_3$H$_2$) and conjugate base groups thereof, a dialkylphosphonooxy group (—OPO$_3$ (alkyl)$_2$), a diarylphosphonooxy group (—OPO$_3$ (aryl)$_2$), an alkylarylphosphonooxy group (—OPO$_3$ (alkyl)(aryl)), a monoalkylphosphonooxy group (—OPO$_3$H (alkyl)) and conjugate base groups thereof, a monoarylphosphonooxy group (—OPO$_3$H (aryl)) and conjugate base groups thereof, a cyano group, a nitro group, an aryl group, an alkenyl group, and an alkynyl group.

In addition, these substituents may bond to, if possible, the substituent or a hydrocarbon group substituted with the substituent to form a ring.

It is preferable that $R^{11}$ and $R^{12}$ in General Formula (IID) each are independently a hydrogen atom or an alkyl group or both are an alkyl group and bond to each other to form a ring, and it is preferable that $R^{11}$ and $R^{12}$ are both a hydrogen atom or both are an alkyl group and bond to each other to form a ring.

From the viewpoint of adhesiveness, the repeating unit represented by General Formula (IID) is preferably a repeating unit represented by General Formula (VD). Improvement in adhesiveness by the repeating unit represented by General Formula (VD) is assumed to result from an effect for making the polarity to that of the adhesive layer having a hydroxyl group.

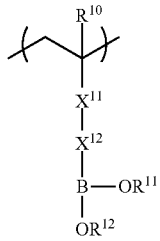

(VD)

In General Formula (VD), $R^{10}$, $R^{11}$, and $R^{12}$ each are identical to $R^{10}$, $R^{11}$, and $R^{12}$ in General Formula (IID). $X^{11}$ represents a divalent linking group selected from the group consisting of —(C=O)O—, —O(C=O)—, —(C=O)NH—, —O—, —CO—, and —CH$_2$—. $X^{12}$ represents a divalent linking group which includes at least one bond selected from —(C=O)O—, —O(C=O)—, —(C=O)NH—, —O—, —CO—, —NH—, —O(C=O)—NH—, —O(C=O)—O—, or —CH$_2$— and includes at least one substituted or unsubstituted aromatic ring. Here, the total number of carbon atoms in $X^{11}$ and $X^{12}$ is 7 or more.

As $X^{11}$ in General Formula (VD), —(C=O)O—, —O(C=O)—, and —(C=O)NH— are preferred, and —(C=O)O— is most preferred.

The number of aromatic rings in $X^{12}$ is preferably 1 to 5, more preferably 2 to 4, and most preferably 2 or 3. As the aromatic ring that $X^{12}$ has, a benzene ring, a naphthalene ring, and the like are exemplified.

Preferred ranges of $R^{10}$, $R^{11}$, and $R^{12}$ in General Formula (VD) each are identical to $R^{10}$, $R^{11}$, and $R^{12}$ in General Formula (IID).

The repeating unit represented by General Formula (IID) or (VD) is more preferably a repeating unit represented by General Formula (VID).

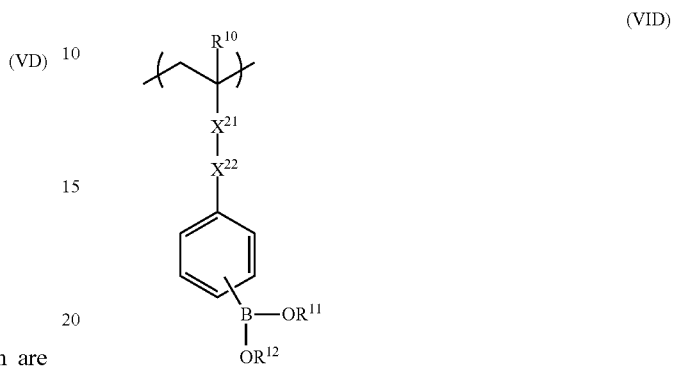

(VID)

In General Formula (VID), $X^{21}$ represents —(C=O)O— or —(C=O)NH—. $X^7$ is a divalent linking group including at least one bond selected from —(C=O)O—, —O(C=O)—, —(C=O)NH—, —O—, —CO—, —NH—, —O(C=O)—NH—, —O(C=O)—O—, or —CH$_2$—. $X^{22}$ may include a substituted or unsubstituted aromatic ring.

Preferred ranges of $R^{10}$, $R^{11}$, and $R^{12}$ in General Formula (VID) each are identical to $R^{10}$, $R^{11}$, and $R^{12}$ in General Formula (IID). The aromatic ring that $X^{22}$ has is identical to the aromatic ring that $X^{12}$ has.

The repeating unit represented by General Formula (IID), (VD), or (VID) can be obtained by the polymerization of a monomer. Specific examples of a preferred monomer imparting the repeating unit represented by General Formula (IID), (VD), or (VID) will be shown, but the present invention is not limited thereto.

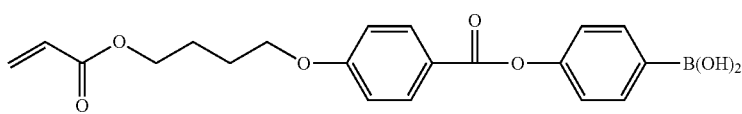

IID-1

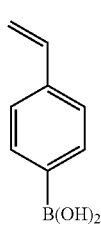

IID-2

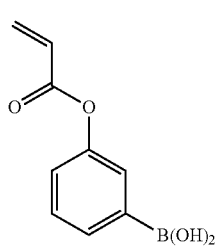

IID-3

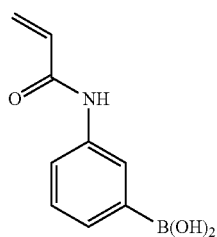

IID-4

-continued
IID-5
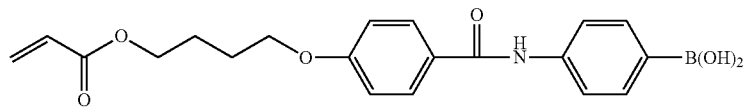
IID-6
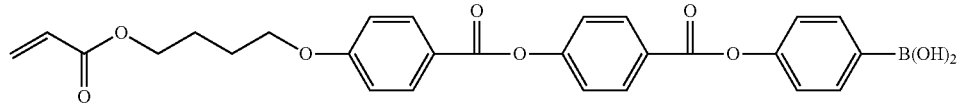
IID-7
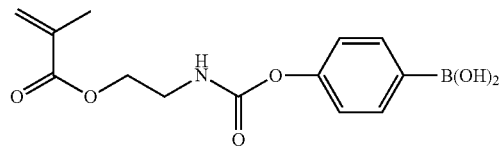
IID-8
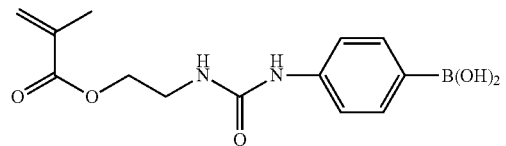
IID-9
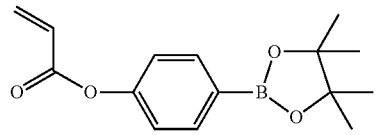
IID-10
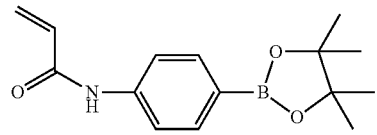
IID-11
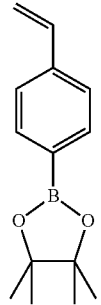
IID-12
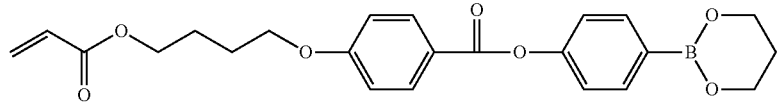
IID-13
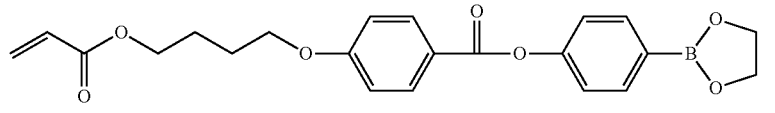
IID-14
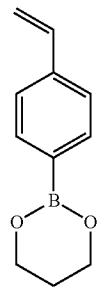
IID-15
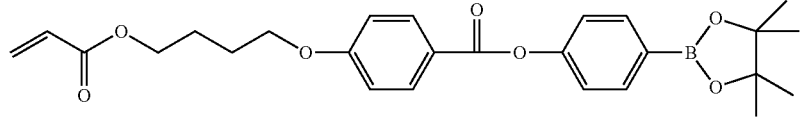

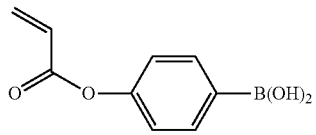

IID-16

In addition, the copolymer (a) in the present invention may have, if necessary, repeating units other than the repeating unit represented by General Formula (ID) and the repeating unit represented by General Formula (IID) (other repeating units).

As other kinds of monomers imparting other repeating units, it is possible to use monomers described in Polymer-Handbook $2^{nd}$ ed., J. Brandrup, Wiley Interscience (1975) Chapter 2 Pages 1 to 483. For example, compounds having one addition polymerizable unsaturated bond selected from acrylic acid, methacrylic acid, acrylic acid esters, methacrylic acid esters, acrylamides, methacrylamides, allyl compounds, vinyl ethers, vinyl esters, dialkyl itaconates, dialkyl esters or monoalkyl esters of fumaric acid, and the like can be exemplified.

As the monomers imparting other repeating units, specifically, the following monomers can be exemplified.

Acrylic Acid Esters:

Methyl acrylate, ethyl acrylate, propyl acrylate, chloroethyl acrylate, 2-hydroxyethyl acrylate, trimethylolpropane monoacrylate, benzyl acrylate, methoxybenzyl acrylate, phenoxyethyl acrylate, furfuryl acrylate, tetrahydrofurfuryl acrylate, 2-acryloyloxyethyl succinate, 2-carboxyethyl acrylate, and the like, Methacrylic Acid Esters:

Methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, phenoxyethyl methacrylate, furfuryl methacrylate, tetrahydrofurfuryl methacrylate, ethylene glycol monoacetoacetate monomethacrylate, 2-methacryloyloxyethyl phthalate, 2-methacryloyloxyethyl succinate, 2-methacryloyloxyethyl hexahydrophthalate, 2-carboxyethyl methacrylate, and the like, Acrylamides:

Acrylamide, N-alkylacrylamide (as an alkyl group, an alkyl group having 1 to 3 carbon atoms, for example, a methyl group, an ethyl group, or a propyl group), N,N-dialkylacrylamide (as an alkyl group, an alkyl group having 1 to 6 carbon atoms), N-hydroxyethyl-N-methylacrylamide, N-2-acetamidoethyl-N-acetylacrylamide, and the like.

Methacrylamides:

Methacrylamide, N-alkylmethacrylamide (as an alkyl group, an alkyl group having 1 to 3 carbon atoms, for example, a methyl group, an ethyl group, or a propyl group), N,N-dialkylmethacrylamide (as an alkyl group, an alkyl group having 1 to 6 carbon atoms), N-hydroxyethyl-N-methylmethacrylamide, N-2-acetamidoethyl-N-acetylmethacrylamide, and the like.

Allyl Compounds:

Allyl esters (for example, allyl acetate, allyl caproate, allyl caprylate, allyl laurate, allyl palmitate, allyl stearate, allyl benzoate, allyl acetoacetate, allyl lactate, and the like), allyloxyethanol, and the like.

Vinyl Ethers:

Alkyl vinyl ether (for example, hexyl vinyl ether, octyl vinyl ether, decyl vinyl ether, ethyl hexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether, and the like.

Vinyl Esters:

Vinyl acetate, vinyl butyrate, vinyl isobutyrate, vinyl trimethyl acetate, vinyl diethyl acetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, vinylcyclohexylcarboxylate, and the like.

Dialkyl Itaconates:

Dimethyl itaconate, diethyl itaconate, dibutyl itaconate, and the like.

Dialkyl esters or monoalkyl esters of fumaric acid: dibutyl fumarate and the like.

As the monomers imparting other repeating units, crotonic acid, itaconic acid, acrylonitrile, methacrylonitrile, malelonitrile, styrene, 4-vinylbenzoic acid, a styrene macromer (AS-6S manufactured by Toagosei Co., Ltd.), a methyl methacrylate macromer (AA-6 manufactured by Toagosei Co., Ltd.), and the like are also exemplified.

In addition, it is also possible to convert the structure of a polymer after polymerization by a polymer reaction and introduce a structure other than the repeating unit represented by General Formula (ID) or General Formula (IID).

In addition, the copolymer (a) preferably has a thermal crosslinking group. As the thermal crosslinking group that the copolymer (a) has, it is possible to use the same thermal crosslinking groups as described in the section of the polystyrene resin. The copolymer (a) preferably includes a repeating unit including the thermal crosslinking group. As a monomer imparting the repeating unit including the thermal crosslinking group, the above-described monomers imparting other repeating units which have the thermal crosslinking group or monomers imparting other repeating units which have the thermal crosslinking group as a substituent are exemplified.

The copolymer (a) particularly preferably thermally crosslinks with other compounds included in the polarizing plate protective film. In such a case, it is possible to fix the copolymer (a) to the surface of the polarizing plate protective film, and it becomes possible to develop more favorable adhesiveness between the polarizing plate protective film and other layers or films or other products. Particularly, it is preferable that the copolymer (a) and a styrene-based resin described below each have the thermal crosslinking group having reactivity to each other.

The content of the repeating unit represented by General Formula (ID) in the copolymer (a) is preferably 5% to 95% by mass, more preferably 8% to 90% by mass, and still more preferably 10% to 85% by mass of the total mass of the copolymer (a).

The content of the repeating unit represented by General Formula (IID) in the copolymer (a) is preferably 0.5% to 80% by mass, more preferably 1% to 70% by mass, and still more preferably 2% to 60% by mass of the total mass of the copolymer (a).

The content of the repeating unit having the thermal crosslinking group in the copolymer (a) is preferably 0.5% to 60% by mass, more preferably 1% to 50% by mass, and still more preferably 2% to 40% by mass of the total mass of the copolymer (a).

The mass-average molecular weight (Mw) of the copolymer (a) is preferably 1,000 to 200,000, more preferably 1,800 to 150,000, still more preferably 2,000 to 150,000, particularly preferably 2,500 to 140,000, and extremely preferably 20,000 to 120,000. The number-average molecular weight (Mn) of the copolymer (a) is preferably 500 to 160,000, more preferably 600 to 120,000, still more preferably 600 to 100,000, particularly preferably 1,000 to 80,000, and extremely preferably 2,000 to 60,000. The degree of dispersion (Mw/Mn) of the copolymer (a) is preferably 1.00 to 18.00, more preferably 1.00 to 16.00, still more preferably 1.00 to 14.00, particularly preferably 1.00 to 12.00, and extremely preferably 1.00 to 10.00.

The mass-average molecular weight and the number-average molecular weight are values measured by gel permeation chromatography (GPC) under the following conditions.

[Eluent] N-methyl-2-pyrrolidone (NMP)
[Device name] EcoSEC HLC-8320GPC (manufactured by Tosoh Corporation)
[Column] TSKgel SuperAW M-H (manufactured by Tosoh Corporation)
[Column temperature] 40° C.
[Flow rate] 0.50 ml/min The copolymer (a) can be synthesized using a well-known method.

Specific examples of the copolymer (a) will be shown below, but the present invention is not limited thereto.

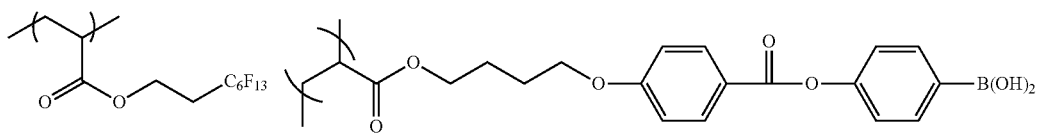
AD-1

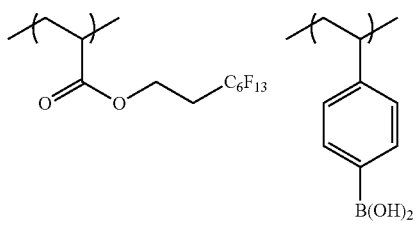
AD-2

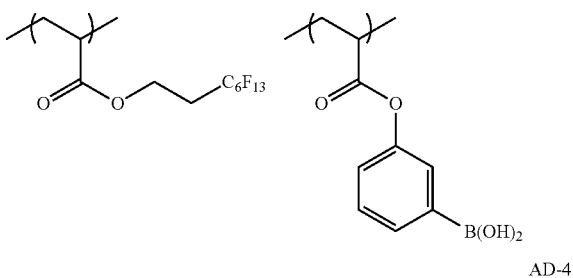
AD-3

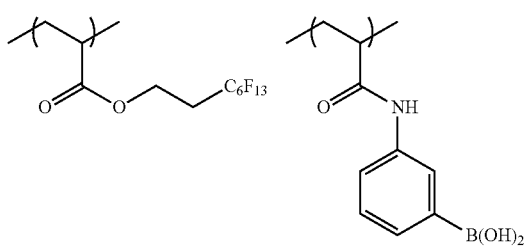
AD-4

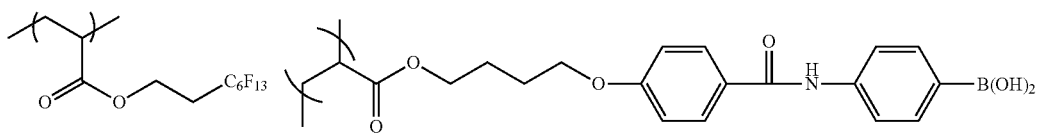
AD-5

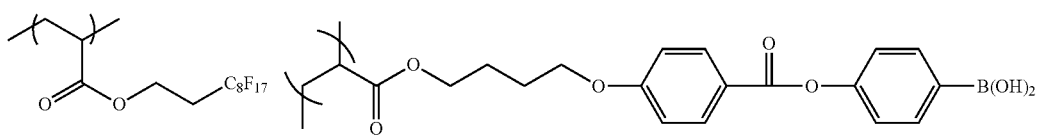
AD-6

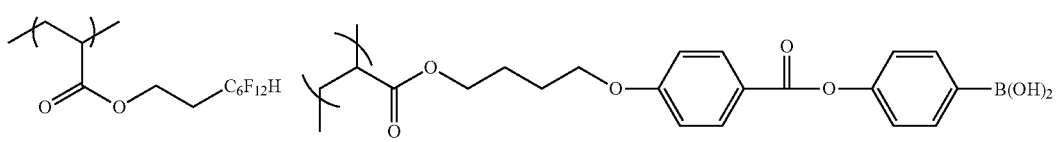
AD-7

-continued
AD-8
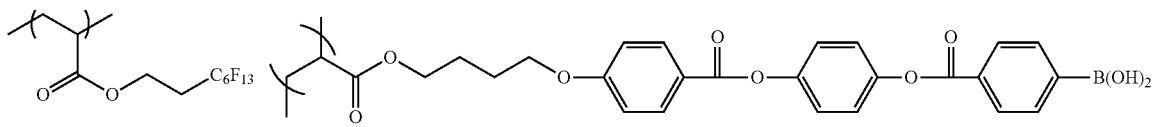
AD-9
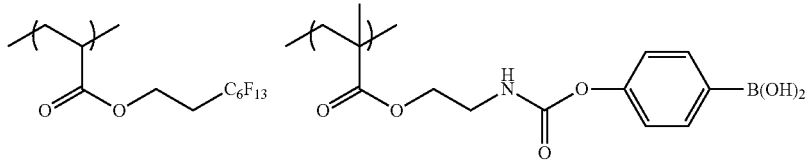
AD-10
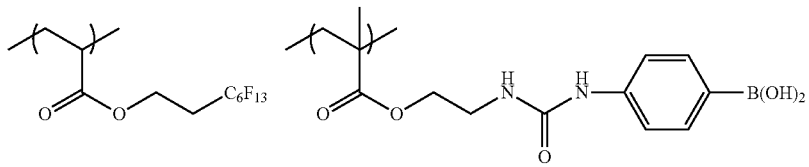
AD-11
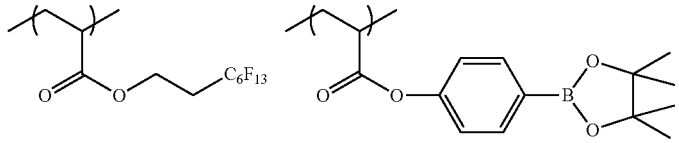
AD-12
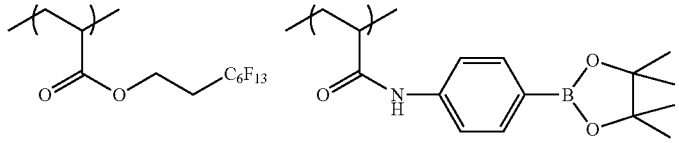
AD-13
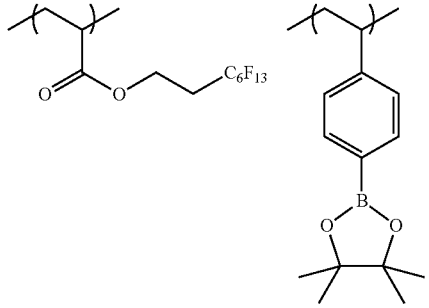
AD-14
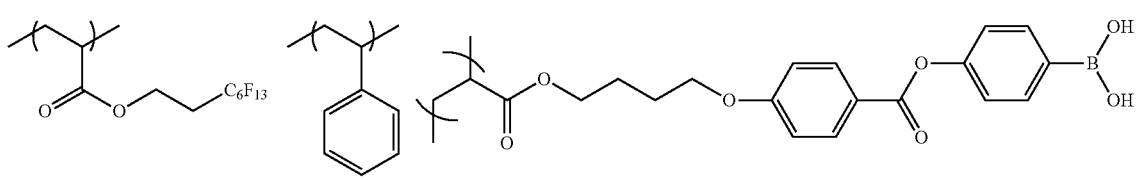
AD-15
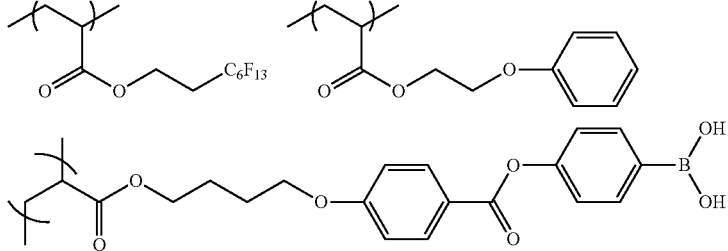

-continued
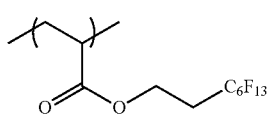 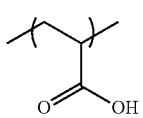 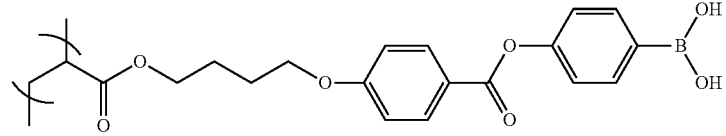
AD-16
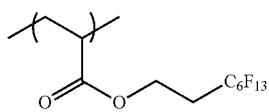 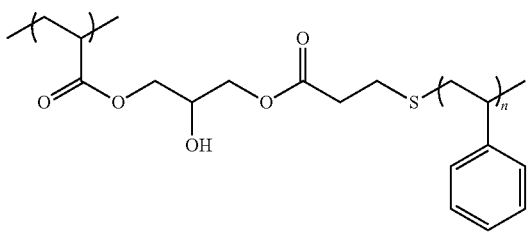
AD-17
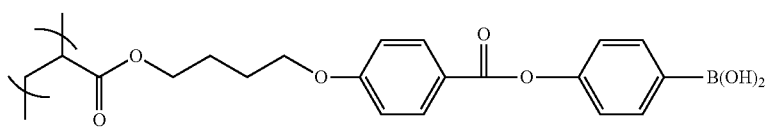
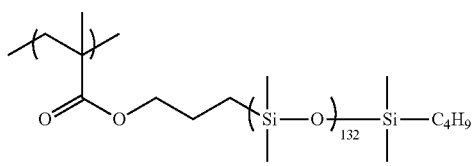
AD-18
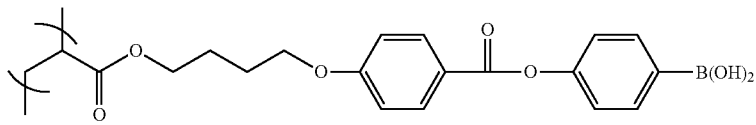
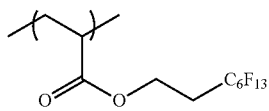 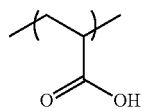
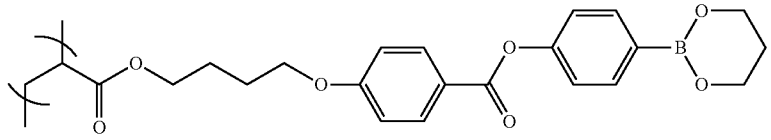
AD-19
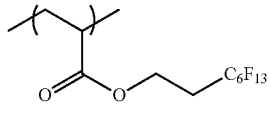 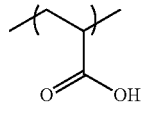
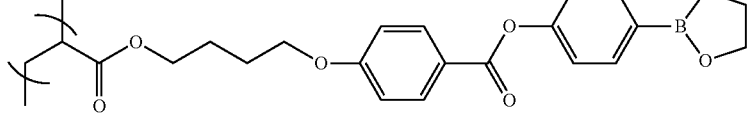
AD-20
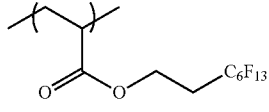 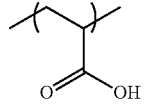
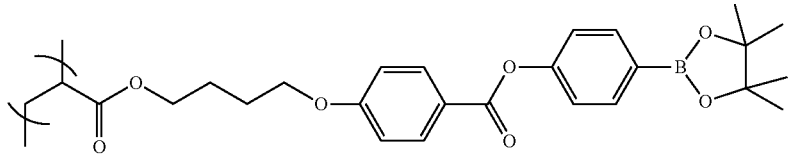
AD-21

-continued
AD-22
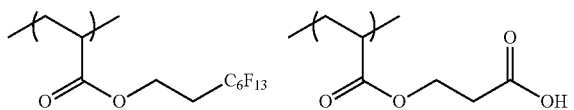
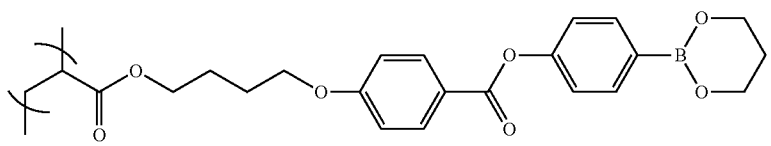
AD-23
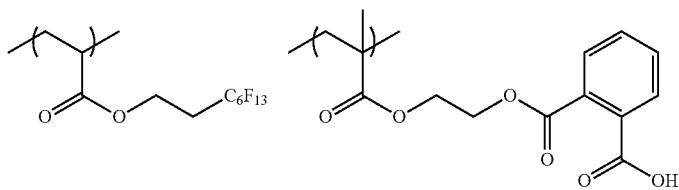
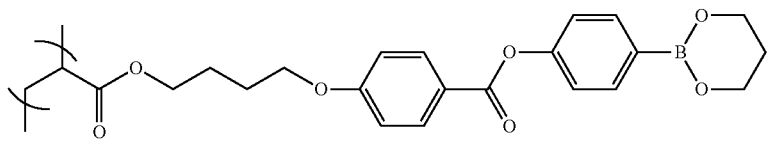
AD-24
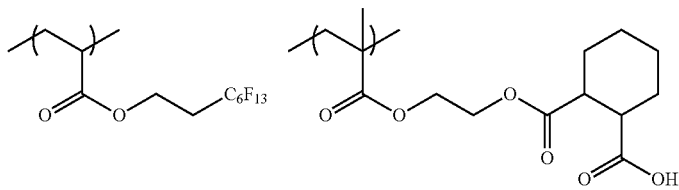
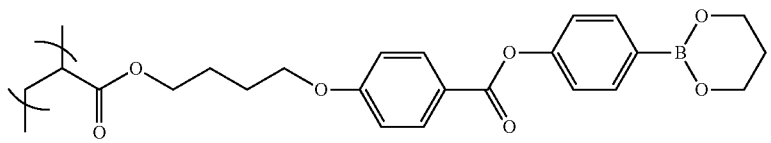
AD-25
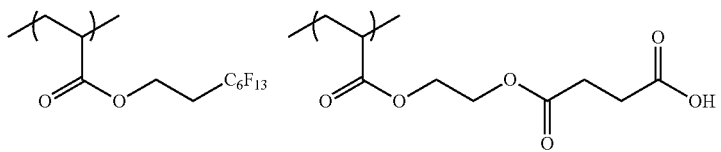
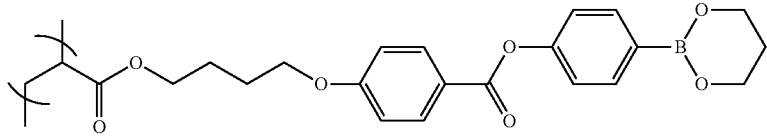
AD-26
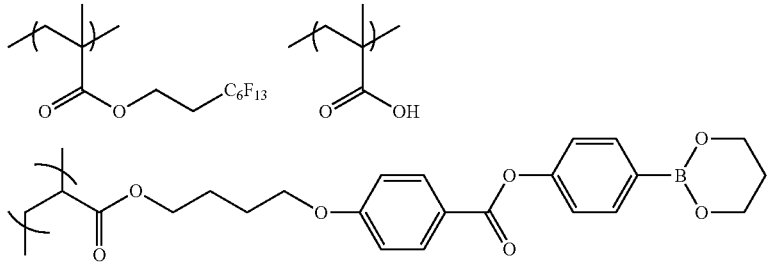

-continued
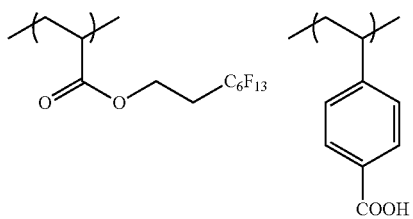
AD-27
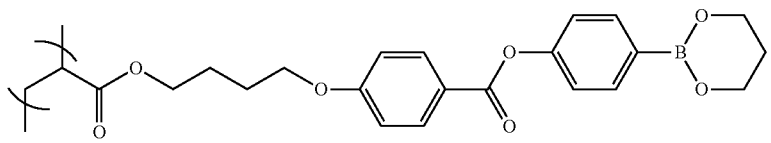
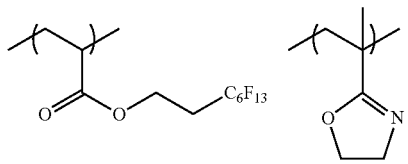
AD-28
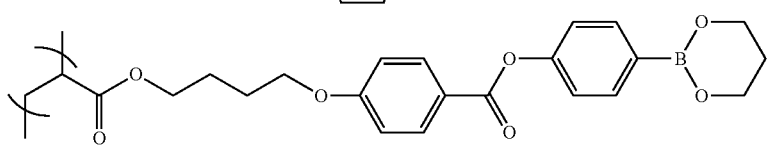
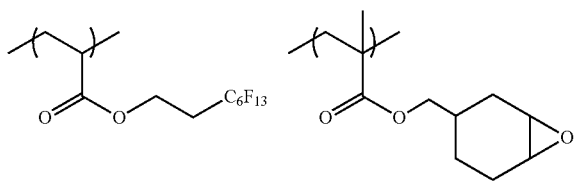
AD-29
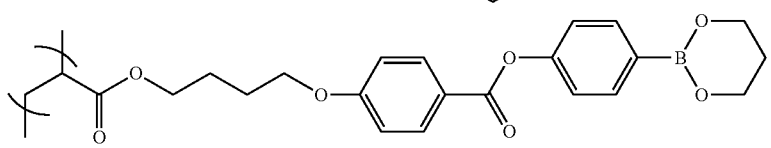
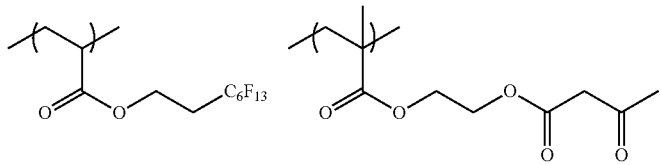
AD-30
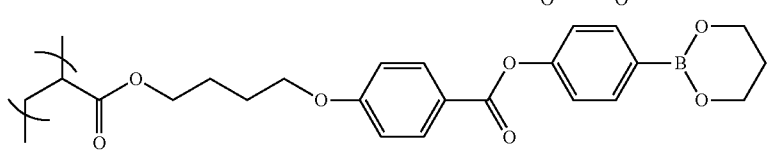
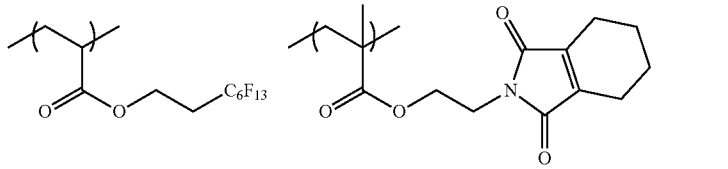
AD-31
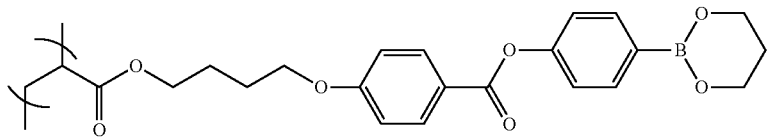

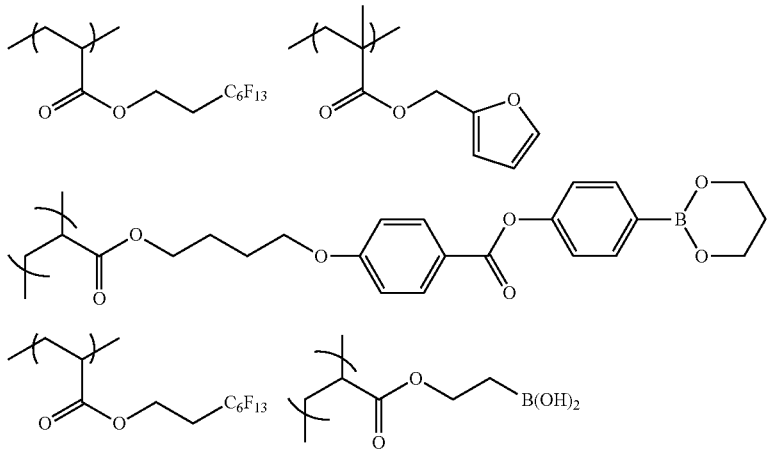

AD-32

AD-33

The content of the copolymer (a) needs to be in the range of the content of the matrix resin. In a case where the total solid content (all components excluding a solvent) of the polarizing plate protective film of the embodiment of the present invention is set to 100% by mass, the content of the copolymer (a) is preferably 0.0001% to 40% by mass, more preferably 0.001% to 20% by mass, and still more preferably 0.005% to 100% by mass from the viewpoint of strengthening adhesion to an adhesive or the like without impairing the function of the polarizing plate protective film.

The matrix resin may contain, separately from the adhesiveness-improving resin, a resin imparted with the functional group that imparts adhesiveness and/or the thermal crosslinking group.

<Other Components>

The polarizing plate protective film of the embodiment of the present invention may include, in addition to the coloring agent and the matrix resin described above, a polarization degree-improving agent, a discoloration preventer, a matting agent, a leveling agent, or the like.

(Polarization Degree-Improving Agent)

The polarizing plate protective film of the embodiment of the present invention preferably contains a polarization degree-improving agent. In a case where fluorescent light emitted by the coloring agent is quenched using the polarization degree-improving agent, it is possible to improve the polarization degree of the polarizing plate.

The polarization degree-improving agent that is used in the present invention is preferably an electron-donating quencher or an electron-accepting quencher. Hereinafter, the electron-donating quencher and the electron-accepting quencher that are used in the present invention will be described.

—Electron-Donating Quencher—

The electron-donating quencher that is used in the present invention is an agent that donates an electron to SOMO on a low energy level between two SOMOs of a coloring agent in an excited state and then accepts an electron from SOMO on the high energy level of the coloring agent, thereby deactivating the coloring agent in the excited state to a ground state.

The HOMO energy level of the electron-donating quencher that is used in the present invention preferably satisfies a relational expression [A-1] below relative to the HOMO energy level of the coloring agent.

$E_{Hq}-E_{Hd} \leq 0.40$ eV        Relational expression [A-1]

Here, $E_{Hd}$ and $E_{Hq}$ each represent values below.

$E_{Hd}$: The HOMO energy level of the coloring agent
$E_{Hq}$: The HOMO energy level of the electron-donating quencher In a case where the energy levels satisfy the above-described relationship, it becomes possible to effectively suppress fluorescent light emitted by the coloring agent.

The HOMO energy level of the electron-donating quencher that is used in the present invention more preferably satisfies a relational expression [A-2] and most preferably satisfies a relational expression [A-3].

$E_{Hq}-E_{Hd} \leq 0.20$ eV        Relational expression [A-2]

$E_{Hq}-E_{Hd} \leq 0.10$ eV        Relational expression [A-3]

—Method for Computing Energy Level—

Regarding the energy levels of the coloring agent and the polarization degree-improving agent that are used in the present invention, a value obtained from the oxidation potential is used for HOMO, and a value obtained from the reduction potential is used for LUMO. Hereinafter, methods for measuring and computing the respective potentials will be described.

—Measurement of Oxidation Potential of Coloring Agent, Oxidation Potential of Polarization Degree-Improving Agent, and Reduction Potential of Polarization Degree-Improving Agent—

The oxidation potential of the coloring agent that is used in the present invention and the oxidation potential and reduction potential of the polarization degree-improving agent that is used in the present invention are measured using an electrochemical analyzer (660A manufactured by ALS Technology Co., Ltd.), a gold electrode as a working electrode, a platinum black electrode as an antipole, a Ag wire as a reference electrode, and tetrabutylammonium hexafluorophosphate as a supporting electrolyte respectively and are shown as values relative to a ferrocene/ferricinium ion system (Fc/Fc$^+$) measured under the same conditions as a standard potential. For a polarization degree-improving agent-containing coloring agent, two oxidation potentials are detected, the positive potential is assigned as the oxidation potential of a coloring agent portion, and the negative potential is assigned as the oxidation potential of a polarization degree-improving agent portion.

—Computation of Reduction Potential of Coloring Agent—

First, the absorption spectrum of the coloring agent is measured using a spectrophotometer (8430 manufactured by Hewlett-Packard Company), and, similarly, the fluorescent spectrum is measured using a fluorophotometer (Fluorog3 manufactured by Horiba, Ltd.). As a measurement solvent, the same solvent as in the above-described potential measurement is used.

Next, the absorption spectrum and the fluorescent spectrum obtained above are respectively standardized using the absorbance at the absorption maximum wavelength and the emission intensity at the light emission maximum wavelength, a wavelength at which both spectra intersect each other is obtained, and the value of this wavelength is converted to an energy unit (eV) and regarded as the HOMO-LUMO band gap.

The value of the HOMO-LUMO band gap is added to the value (eV) of the oxidation potential of the coloring agent measured above, thereby computing the reduction potential of the coloring agent.

Hereinafter, compounds that are preferably used as the electron-donating quencher in the present invention will be described.

A structure represented by General Formula (I) or (I') can be preferably used as the electron-donating quencher that is used in the present invention.

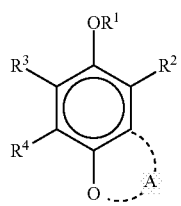

General Formula (I)

In General Formula (I), $R^1$ represents a hydrogen atom, an alkyl group, an acyl group, a sulfonyl group, a carbamoyl group, a sulfamoyl group, an alkoxycarbonyl group, an aryloxycarbonyl group, or a trialkylsilyl group, and A represents a non-metallic atom necessary to complete a five-membered or six-membered ring. $R^2$, $R^3$, and $R^4$ each represent a hydrogen atom, an alkyl group, a cycloalkyl group, an alkoxy group, an aryl group, an aryloxy group, an aralkyl group, an aralkoxy group, an alkenyl group, an alkenoxy group, an acylamino group, a halogen atom, an alkylthio group, a diacylamino group, an arylthio group, an alkoxycarbonyl group, an acyloxy group, an acyl group, or a sulfonamide group, and $R^2$, $R^3$, and $R^4$ may be identical to or different from each other. Furthermore, in the compound represented by General Formula (I), a bis-spiro compound that is a structure in which a ring A includes a spiro atom is included.

Regarding preferred examples of $R^1$ in General Formula (I), as the alkyl group, for example, methyl, ethyl, propyl, and the like; as the acyl group, for example, acetyl, benzoyl, and the like; as the sulfonyl groups, for example, methanesulfonyl, butanesulfonyl, benzenesulfonyl, toluenesulfonyl, and the like; as the carbamoyl group, for example, N-methylcarbamoyl, N,N-diethylcarbamoyl, N-phenylcarbamoyl, and the like; as the sulfamoyl group, for example, N-methylsulfamoyl, N,N-dimethylsulfamoyl, N-phenylsulfamoyl, and the like; as the alkoxycarbonyl group, for example, methoxycarbonyl, ethoxycarbonyl, benzyloxycarbonyl, and the like; as the aryloxycarbonyl group, for example, phenoxycarbonyl and the like; as the trialkylsilyl group, for example, trimethylsilyl, dimethyl-butylsilyl, and the like are exemplified.

A in General Formula (I) represents a non-metallic atom necessary to complete a five-membered or six-membered ring, and this ring may have a substituent. As preferred examples of this substituent, an alkyl group (for example, methyl or the like), an alkoxy group (for example, methoxy or the like), an aryl group (for example, phenyl or the like), an aryloxy group (for example, phenoxy or the like), an aralkyl group (for example, benzyl or the like), an aralkoxy group (for example, benzyloxy or the like), an alkenyl group (for example, allyl or the like), an N-substituted amino group (for example, an alkylamino group, a dialkylamino group, an N-alkyl-N-arylamino group, piperazino, or the like), a heterocyclic group (for example, benzothiazolyl, benzoxazolyl, or the like), and the like are exemplified. In addition, the ring may have a residue forming a fused ring. The alkyl group and the aryl group as the substituent that the A may have may further have a substituent, and, as preferred examples of this substituent, a halogen atom, a hydroxyl group, a carboxyl group, an alkoxycarbonyl group, an acyloxy group, a sulfo group, a sulfonyloxy group, an amide group (for example, acetamido, ethanesulfonamide, benzoamide, or the like), an alkoxy group, an aryloxy group, and the like are exemplified.

Regarding preferred examples of $R^2$, $R^3$, and $R^4$ in General Formula (I), as the alkyl group, for example, methyl, ethyl, propyl, or the like; as the cycloalkyl group, for example, cyclohexyl or the like; as the alkoxy group, for example, methoxy, ethoxy, butoxy, or the like; as the aryl group, for example, phenyl or the like; as the aryloxy group, for example, phenoxy or the like; as the aralkyl group, for example, benzyl or the like; as the aralkoxy group, for example, benzyloxy or the like; as the alkenyl group, for example, allyl or the like; as the alkenoxy group, for example, allyloxy or the like; as the acylamino group, for example, acetylamino, benzamide, or the like; as the halogen atom, for example, a chloro atom, a bromine atom, or the like; as the alkylthio group, for example, ethylthio or the like; as the diacylamino group, for example, succinimide, hydantoinyl, or the like; as the arylthio groups, for example, phenylthio or the like; as the alkoxycarbonyl group, for example, methoxycarbonyl, ethoxycarbonyl, benzyloxycarbonyl, or the like; as the acyloxy group, for example, acetyloxy, benzoyloxy, or the like; as the acyl group, for example, methylcarbonyl or the like; as the sulfonamide group, for example, dimethylsulfonamide, diethylsulfonamide, or the like are exemplified.

As the bis-spiro compound that is a preferred aspect of the compound represented by General Formula (I), the following compound represented by General Formula (I') is exemplified.

General Formula (I')

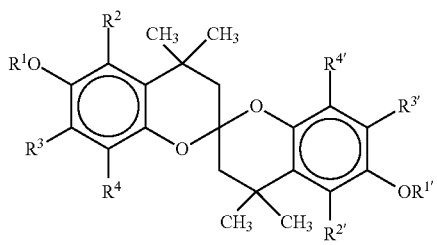

R$^1$, R$^2$, R$^3$, and R$^4$ in General Formula (I') are identical to R$^1$, R$^2$, R$^3$, and R$^4$ in General Formula (I). In addition, R$^{1'}$, R$^{2'}$, R$^{3'}$, and R$^{4'}$ in General Formula (I') are identical to R$^1$, R$^2$, R$^3$, and R$^4$ in General Formula (I).

The total of carbon atoms included in R$^2$, R$^3$, and R$^4$ in General Formula (I) and the ring A is preferably 20 or less and particularly preferably 12 or less. In addition, for an ordinary purpose, the total number of carbon atoms included in the molecule of the compound represented by General Formula (I) is preferably approximately 30, and a 5-hydroxycoumaran compound and a 6-hydroxychromane compound for which one of R$^2$ and R$^3$ in General Formula (I) is a hydrogen atom and 6,6'-dihydroxybis-2,2'-spirochromane compound that is included in General Formula (I') are particularly useful. It is more preferable that R$^2$, R$^3$, R$^4$, R$^{2'}$, R$^{3'}$, and R$^{4'}$ in General Formula (I) and General Formula (I') are respectively an alkyl group, an alkoxy group, an aryl group, an aryloxy group, or an alkylthio group.

Specific examples of the compound represented by General Formula (I) or (I') will be shown below.

General Formula (I)

I-1
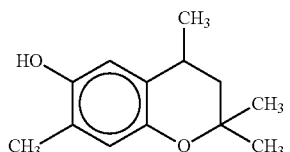

I-2
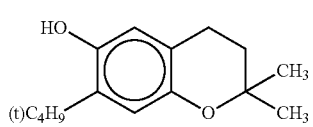

I-3
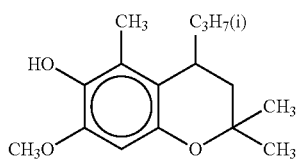

I-4
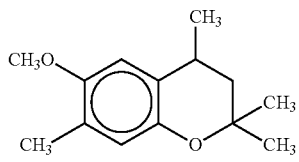

I-5
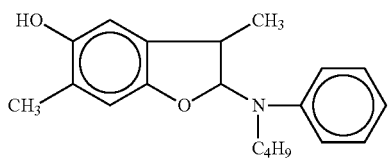

I-6
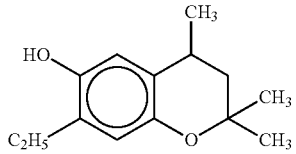

I-7
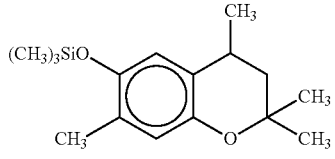

I-8
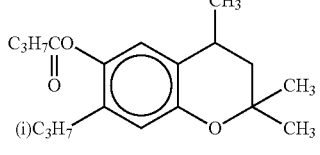

I-9
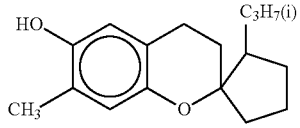

I-10
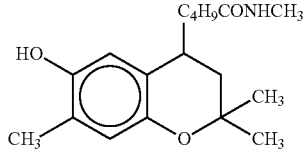

I-11
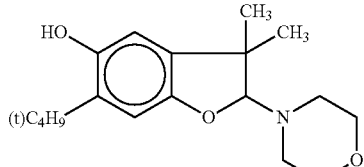

I-12
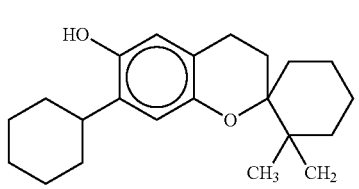

I-13
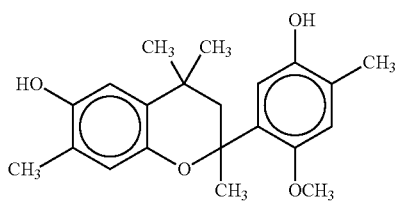

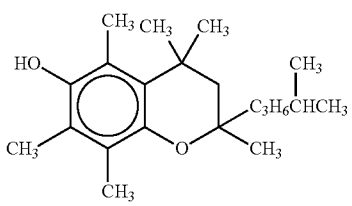

General Formula (I')

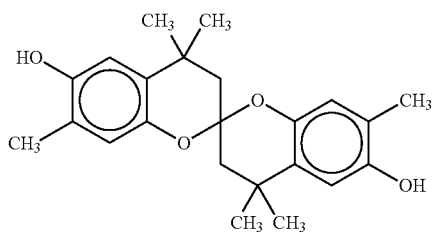
I'-1

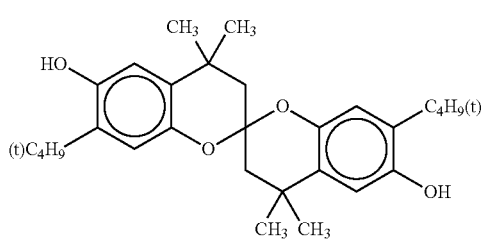
I'-2

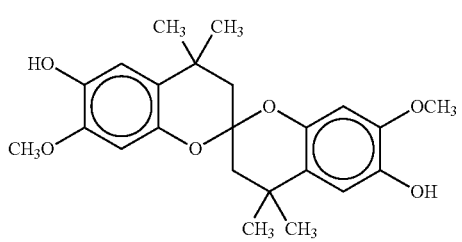
I'-3

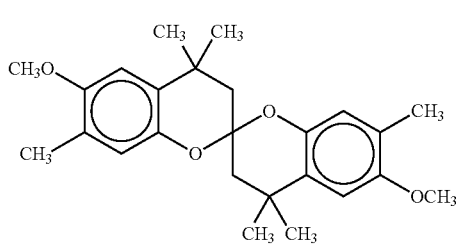
I'-4

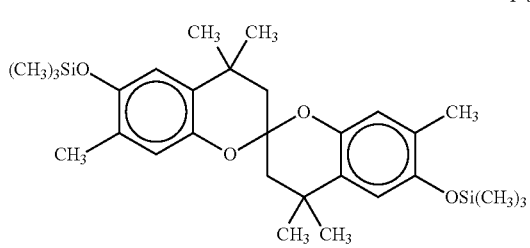
I'-5

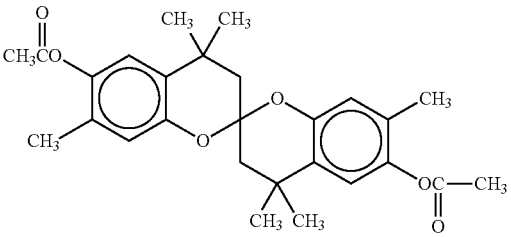
I'-6

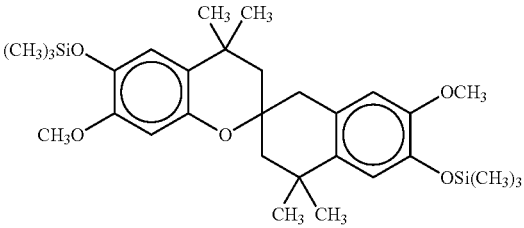
I'-7

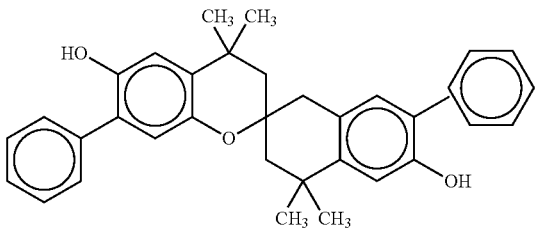
I'-8

A metallocene represented by General Formula (L) is also preferred as the electron-donating quencher that is used in the present invention.

General Formula (L)

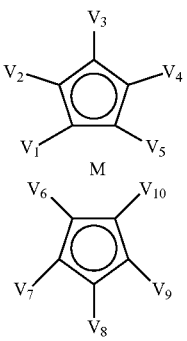

In General Formula (L), M represents Fe, Ti, V, Cr, Co, Ni, Ru, Os, or Pd. $V_1$, $V_2$, $V_3$, $V_4$, $V_5$, $V_6$, $V_7$, $V_8$, $V_9$, and $V_{10}$ represent a hydrogen atom or a monovalent substituent. Furthermore, preferably, there is a case where M is Fe, and such a compound is referred to as ferrocene.

Hereinafter, General Formula (L) will be described in detail.

In General Formula (L), $V_1$, $V_2$, $V_3$, $V_4$, $V_5$, $V_6$, $V_7$, $V_8$, $V_9$, and $V_{10}$ represent a hydrogen atom or a monovalent substituent. As the substituent, any substituent may be used, but the following substituents are preferably exemplified.

For example, an unsubstituted alkyl group (for example, a methyl group, an ethyl group, a propyl group, an isopropyl group, a butyl group, an isobutyl group, a hexyl group, an octyl group, a dodecyl group, an octadecyl group, a cyclopentyl group, a cyclopropyl group, or a cyclohexyl group), a substituted alkyl group {in a case where the substituent is represented by V, the substituent represented by V (substituent V) is not particularly limited, and, for example, a carboxyl group, a sulfo group, a cyano group, a halogen atom (for example, a fluorine atom, a chlorine atom, a bromine atom, or an iodine atom), a hydroxyl group, an alkoxycarbonyl group (for example, a methoxycarbonyl group, an ethoxycarbonyl group, a phenoxycarbonyl group, or a benzyloxycarbonyl group), an alkoxy group (for example, a methoxy group, an ethoxy group, a benzyloxy group, or a phenethyloxy group), an aryloxy group having 18 or less carbon atoms (for example, a phenoxy group, a 4-methylphenoxy group, or an α-naphthoxy group), an acyloxy group (for example, an acetyloxy group or a propionyloxy group), an acyl group (for example, an acetyl group, a propionyl group, a benzoyl group, or a mesyl group), a carbamoyl group (for example, a carbamoyl group, an N,N-dimethylcarbamoyl group, a morpholinocarbonyl group, or a piperidinocarbonyl group), a sulfamoyl group (for example, a sulfamoyl group, an N,N-dimethylsulfamoyl group, a morpholinosulfonyl group, or a piperidinosulfonyl group), an aryl group (for example, a phenyl group, a 4-chlorophenyl group, a 4-methylphenyl group, or a α-naphthyl group), a heterocyclic group (for example, a 2-pyridyl group, a tetrahydrofurfuryl group, a morpholino group, or a 2-thiopheno group), an amino group (for example, an amino group, a dimethylamino group, an anilino group, or a diphenylamino group), an alkylthio group (for example, a methylthio group or an ethylthio group), an alkylsulfonyl group (for example, a methylsulfonyl group or a propylsulfonyl group), an alkylsulfinyl group (for example, a methylsulfinyl group), a nitro group, a phosphate group, an acylamino group (for example, an acetylamino group), an ammonium group (for example, a trimethylammonium group or a tributylammonium group), a mercapto group, a hydrazino group (for example, a trimethylhydrazino group), an ureido group (for example, an ureido group or an N,N-dimethylureido group), an imide group, an unsaturated hydrocarbon group (for example, a vinyl group, an ethynyl group, a 1-cyclohexenyl group, a benzylidine group, or a benzylidene group), a formyl group, and a boric acid group. The substituent V may be a substituent that a typical example of a compound represented by General Formula (L) described below has. The number of carbon atoms in the substituent V is preferably 18 or less. In addition, these substituents may be further substituted with V.} an unsubstituted aryl group (for example, a phenyl group, or a 1-naphthyl group), a substituted aryl group (as the substituent, the above-described V is exemplified), an unsubstituted heterocyclic group (for example, a 2-pyridyl group, a 2-thiazolyl group, a morpholino group, or a 2-thiopheno group), a substituted heterocyclic group (as the substituent, the above-described V is exemplified), or the above-described substituent V is preferably used.

More specifically, an alkyl group (for example, a methyl group, an ethyl group, a carboxymethyl group, a 2-carboxyethyl group, a 3-carboxypropyl group, a 4-carboxybutyl group, a sulfomethyl group, a 2-sulfoethyl group, a 3-sulfopropyl group, a 4-sulfobutyl group, a 3-sulfobutyl group, a 2-hydroxy-3-sulfopropyl group, a 2-cyanoethyl group, a 2-chloroethyl group, a 2-bromoethyl group, a 2-hydroxyethyl group, a 3-hydroxypropyl group, a hydroxymethyl group, a 2-hydroxyethyl group, a 4-hydroxybutyl group, a 2,4-dihydroxybutyl group, a 2-methoxyethyl group, a 2-ethoxyethyl group, a methoxymethyl group, a 2-ethoxycarbonylethyl group, a methoxycarbonylmethyl group, a 2-methoxyethyl group, a 2-ethoxyethyl group, a 2-phenoxyethyl group, a 2-acetyloxyethyl group, a 2-propionyloxyethyl group, a 2-acetylethyl group, a 3-benzoylpropyl group, a 2-carbamoylethyl group, a 2-morpholinocarbonylethyl group, a sulfamoylmethyl group, a 2-(N,N-dimethylsulfamoyl)ethyl group, a benzyl group, a 2-naphthylethyl group, a 2-(2-pyridyl) ethyl group, an allyl group, a 3-aminopropyl group, a dimethylaminomethyl group, a 3-dimethylaminopropyl group, a methylthiomethyl group, a 2-methylsulfonylethyl group, a methylsulfinylmethyl group, a 2-acetylaminoethyl group, an acetylaminomethyl group, a trimethylammonium methyl group, a 2-mercaptoethyl group, a 2-trimethylhydrazinoethyl group, a methylsulfonylcarbamoylmethyl group, a (2-methoxy) ethoxymethyl group, or the like is exemplified, an aryl group (for example, a phenyl group, a 1-naphthyl group, or a p-chlorophenyl group), a heterocyclic group (for example, a 2-pyridyl group, a 2-thiazolyl group, or a 4-phenyl-2-thiazolyl group), or the substituent V (for example, a carboxyl group, a formyl group, an acetyl group, a benzoyl group, a 3-carboxypropanoyl group, a 3-hydroxypropanoyl group, a chlorine atom, an N-phenylcarbamoyl group, an N-butylcarbamoyl group, a boric acid group, a sulfo group, a cyano group, a hydroxyl group, a methoxy group, a methoxycarbonyl group, an acetyloxy group, or a dimethylamino group) is preferred.

In addition, among $V_1$ to $V_{10}$, two may bond to each other to form a ring. These rings may be any of an aliphatic ring and an aromatic ring. In addition, these rings may be substituted with, for example, the above-described substituent V.

Among $V_1$ to $V_{10}$, two may bond to each other to form a linking group.

A plurality of the metallocenes represented by General Formula (L) may bond to each other to form a multimer.

Hereinafter, typical examples of the compound represented by General Formula (L) will be shown, but are not limited thereto.

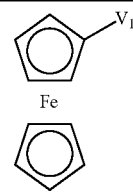

| Compound No. | $V_1$ |
|---|---|
| I-1 | H |
| I-2 | $CO_2H$ |
| I-3 | $(CH_2)_{11}N^+(CH_3)_3I^-$ |
| I-4 | CHO |
| I-5 | $SO_3H$ |
| I-6 | CO—⟨phenyl⟩ |

-continued
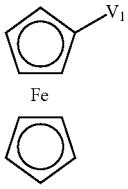
| Compound No. | V₁ |
|---|---|
| I-7 | 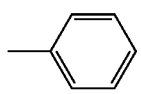 |
| I-8 | B(OH)₂ |
| I-9 | CH₂N⁺(CH₃)₃I⁻ |
| I-10 | CH₂N(CH₃)₂ |
| I-11 | CO(CH₂)₂CO₂H |
| I-12 | COCH₃ |
| I-13 | 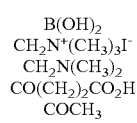 |
| I-14 | CONH—(CH₂)₃CH₃ |
| I-15 | CH₂OH |
| I-16 | Cl |
| I-17 | 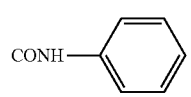 |
| I-18 | CO(CH₂)₃Br |
| I-19 | CO(CH₂)₃OH |
| I-20 | CO(CH₂)₂OH |
| I-21 | CH=N—OH |
| I-22 | CH=N⁺—O⁻ |
| I-23 | CH₂SO₃⁻Na⁺ |
| I-24 | CH₂OCH₃ |
| I-25 | CH₂NHCOCH₃ |
| I-26 | C₂H₅ |
| I-27 | CH(OH)CH₃ |
| I-28 | C(OH)(CH₃)₂ |
| I-29 | (CH₂)₄OH |
| I-30 | CH(OH)(CH₂)₂CH₂OH |
I-31
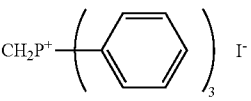
I-32
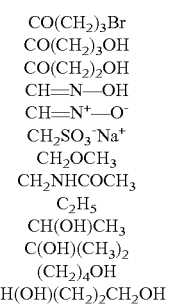
I-33
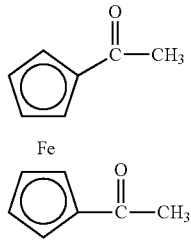
I-34
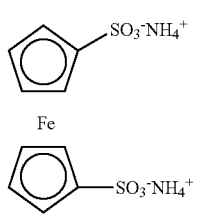
I-35
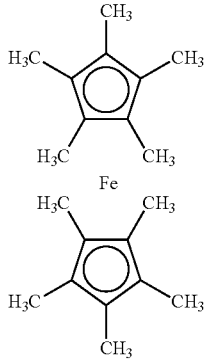
I-36
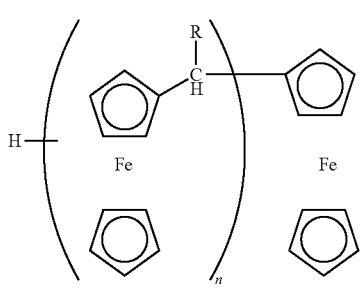
I-37
R=H
R = 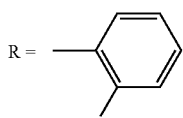
I-38
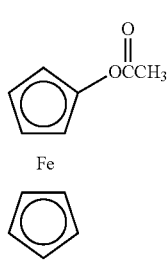

-continued
I-39
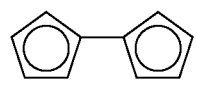
I-40
I-41
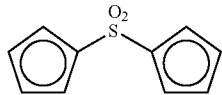
I-42
I-43
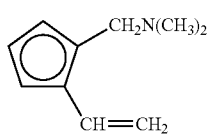
I-44
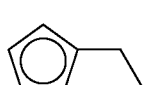
I-45
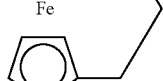
-continued
I-46
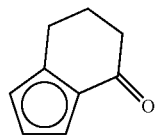
I-47
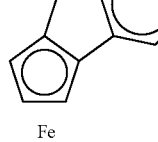
I-48
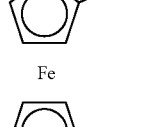
I-50
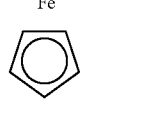
I-51
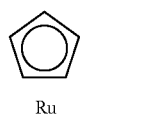
I-52

-continued

I-53

The metallocene that is used in the present invention can be synthesized with reference to a method described in D. E. Bublitz et al.'s Organic Reactions, Vol. 17, pp. 1 to 154 (1969) or the like. Regarding a method for expressing metallocene and ferrocene, in addition to expressions shown in the present invention, expressions as shown below are known, but those expressions indicate the same compound.

Expression Method of Present Invention a)

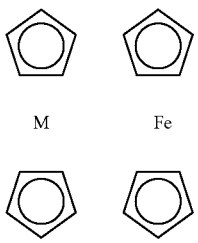

Other Expression Methods b)

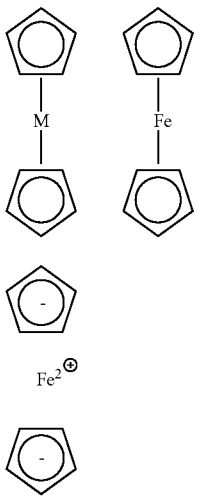

c)

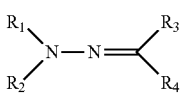

A compound represented by General Formula (IA) is also preferred as the electron-donating quencher in the present invention.

General Formula (IA)

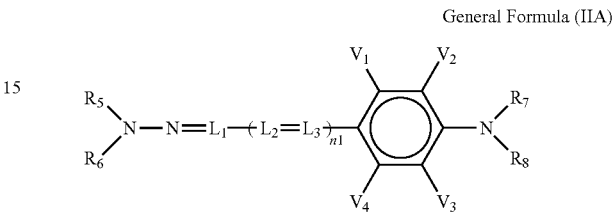

In General Formula (IA), $R_1$, $R_2$, and $R_3$ each represent an alkyl group, an aryl group, or a heterocyclic group. Here, in each of $R_1$ and $R_2$, an oxo group, a thioxo group, or an imino group does not substitute a carbon atom directly bonding to a nitrogen atom. $R_4$ is a hydrogen atom, an alkyl group, an aryl group, or a heterocyclic group.

In addition, the compound represented by General Formula (IA) is preferably a compound represented by General Formula (IIA).

General Formula (IIA)

$$R_5\underset{R_6}{\diagdown}N-N=L_1-(L_2=L_3)_{n1}\underset{V_4\ V_3}{\overset{V_1\ V_2}{\text{(benzene ring)}}}N\underset{R_8}{\overset{R_7}{\diagup}}$$

In General Formula (IIA), $R_5$ and $R_6$ each are identical to $R_1$ and $R_2$ in General Formula (IA). $R_7$ and $R_8$ each represent a hydrogen atom, an alkyl group, an aryl group, or a heterocyclic group. $V_1$, $V_2$, $V_3$, and $V_4$ each represent a hydrogen atom or a monovalent substituent. $L_1$, $L_2$, and $L_3$ each represents a methine group. $n_1$ represents 0 or 1.

Hereinafter, General Formula (IA) will be described in detail.

In General Formula (IA), as $R_1$, $R_2$, and $R_3$, for example, an unsubstituted alkyl group (for example, a methyl group, an ethyl group, a propyl group, an isopropyl group, a butyl group, an isobutyl group, a hexyl group, an octyl group, a dodecyl group, an octadecyl group, a cyclopentyl group, a cyclopropyl group, or a cyclohexyl group), a substituted alkyl group {in a case where the substituent is represented by Va, the substituent represented by Va is not particularly limited, and, for example, a carboxyl group, a sulfo group, a cyano group, a halogen atom (for example, a fluorine atom, a chlorine atom, a bromine atom, or an iodine atom), a hydroxyl group, an alkoxycarbonyl group (for example, a methoxycarbonyl group, an ethoxycarbonyl group, a phenoxycarbonyl group, or a benzyloxycarbonyl group), an alkoxy group (for example, a methoxy group, an ethoxy group, a benzyloxy group, or a phenethyloxy group), an aryloxy group having 18 or less carbon atoms (for example, a phenoxy group, a 4-methylphenoxy group, or an α-naphthoxy group), an acyloxy group (for example, an acetyloxy group or a propionyloxy group), an acyl group (for example, an acetyl group, a propionyl group, a benzoyl group, or a mesyl group), a carbamoyl group (for example, a carbamoyl group, an N,N-dimethylcarbamoyl group, a morpholinocarbonyl group, or a piperidinocarbonyl group), a sulfamoyl group (for example, a sulfamoyl group, an N,N-dimethylsulfamoyl group, a morpholinosulfonyl group, or a piperidinosulfonyl group), an aryl group (for example, a phenyl group, a 4-chlorophenyl group, a 4-methylphenyl group, or a α-naphthyl group), a heterocyclic group (for example, a 2-pyridyl group, a tetrahydrofurfuryl group, a morpholino group, or a 2-thiopheno group), an amino group (for example, an amino group, a dimethylamino group, an anilino group, or a diphenylamino group), an alkylthio group (for example, a methylthio group or an ethylthio group), an alkylsulfonyl group (for example, a methylsulfonyl group or a propylsulfonyl group), an alkylsulfinyl group (for example, a methylsulfinyl group), a nitro group, a phosphate group, an acylamino group (for example, an acetylamino group), an ammonium group (for example, a trimethylammonium group or a tributy-lammonium group), a mercapto group, a hydrazino group (for example, a trimethylhydrazino group), an ureido group (for example, an ureido group or an N,N-dimethylureido group), an imide group, an unsaturated hydrocarbon group (for example, a vinyl group, an ethynyl group, a 1-cyclohexenyl group, a benzylidine group, or a benzylidene group) are exemplified. The number of carbon atoms in the substituent Va is preferably 18 or less. In addition, these substituents may be further substituted with Va.

More specifically, an alkyl group (for example, a carboxymethyl group, a 2-carboxyethyl group, a 3-carboxypropyl group, a 4-carboxybutyl group, a 2-sulfoethyl group, a 3-sulfopropyl group, a 4-sulfobutyl group, a 3-sulfobutyl group, a 2-hydroxy-3-sulfopropyl group, a 2-cyanoethyl group, a 2-chloroethyl group, a 2-bromoethyl group, a 2-hydroxyethyl group, a 3-hydroxypropyl group, a hydroxymethyl group, a 2-hydroxyethyl group, a 2-methoxyethyl group, a 2-ethoxyethyl group, a 2-ethoxycarbonylethyl group, a methoxycarbonylmethyl group, a 2-methoxyethyl group, a 2-ethoxyethyl group, a 2-phenoxyethyl group, a 2-acetyloxyethyl group, a 2-propionyloxyethyl group, a 2-acetylethyl group, a 3-benzoylpropyl group, a 2-carbamoylethyl group, a 2-morpholinocarbonylethyl group, a sulfamoylmethyl group, a 2-(N,N-dimethylsulfamoyl)ethyl group, a benzyl group, a 2-naphthylethyl group, a 2-(2-pyridyl)ethyl group, an allyl group, a 3-aminopropyl group, a 3-dimethylaminopropyl group, a methylthiomethyl group, a 2-methylsulfonylethyl group, a methylsulfinylmethyl group, a 2-acetylaminoethyl group, a 3-trimethylammoniumethyl group, a 2-mercaptoethyl group, a 2-trimethylhydrazinoethyl group, a methylsulfonylcarbamoylmethyl group, a (2-methoxy)ethoxymethyl group, and the like are exemplified}, an aryl group (for example, a phenyl group, an α-naphthyl group, a j-naphthyl group, for example, a phenyl group or a naphthyl group substituted with the above-described unsubstituted alkyl group or the above-described substituent Va), a heterocyclic group (for example, a 2-pyridyl group, a 2-thiazolyl group, or a 2-pyridyl group substituted with the substituent Va) is preferred.

In addition, in General Formula (IA), $R_1$ and $R_2$ and $R_3$ and $R_4$ may bond to each other to form a ring. These rings may be substituted with the substituent Va. Here, an oxo group, a thioxo group, or an imino group does not substitute a carbon atom directly bonding to a nitrogen atom in $R_1$ and $R_2$. For example, $R_1$ and $R_2$ are not an acetyl group, a carboxyl group, a benzoyl group, a formyl group, a thioacetyl group, a thioaldehyde group, a thiocarboxyl group, a thiobenzoyl group, an imino group, an N-methylimino group, or an N-phenylimino group, and, in a case where two ($R_1$ and $R_2$) form a ring, the ring is not a malonyl group, a succinyl group, a glutaryl group, or an adipoyl group.

In General Formula (IA), $R_1$ and $R_2$ are more preferably the unsubstituted alkyl group and the substituted alkyl group described above regarding General Formula (IA). Particularly preferred are an unsubstituted alkyl group (for example, a methyl group, an ethyl group, a propyl group, or a butyl group), a substituted alkyl group {for example, a sulfoalkyl group (for example, a 2-sulfoethyl group, a 3-sulfopropyl group, a 4-sulfobutyl group, or a 3-sulfobutyl group), a carboxyalkyl group (for example, a carboxymethyl group or a 2-carboxyethyl group), and a hydroxyalkyl group (for example, a 2-hydroxyethyl group)}.

In General Formula (IA), $R_3$ is more preferably a substituent represented by General Formula (IIIA) in some cases.

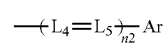

General Formula (IIIA)

In General Formula (IIIA), $L_4$ and $L_5$ each represent a methine group. Ar represents an aryl group. $n_2$ is an integer of 0 or more. Ar is preferably a phenyl group or a substituted phenyl group (as the substituent, the above-described V is exemplified). $L_4$ and $L_5$ are preferably an unsubstituted methine group. $n_2$ is preferably 0 or 1.

In General Formula (IA), as $R_4$, a hydrogen atom or a substituent that is identical to $R_1$, $R_2$, and $R_3$ in General Formula (IA) is used. $R_4$ is preferably a hydrogen atom.

A hydrazone compound represented by General Formula (IA) may be isolated as a salt in a case where such isolation is advantageous in terms of synthesis and storage. In such a case, any compound may be used as long as the compound is capable of forming a salt with hydrazones, and, as preferred salts, the following salts are exemplified. For example, aryl sulfonate (for example, p-toluene sulfonate or p-chlorobenzene sulfonate), aryl disulfonate (for example, 1,3-benzene disulfonate, 1,5-naphthalene disulfonate, or 2,6-naphthalene disulfonate), thiocyanate, picrate, carboxylate (for example, oxalate, acetate, benzoate, or hydrogen oxalate), a halogen oxide salt (for example, a hydrochloric acid salt, a hydrofluoric acid salt, a hydrobromic acid salt, or a hydroiodic acid salt), sulfate, perchlorate, tetrafluoroborate, sulfite, nitrate, phosphate, carbonate, and bicarbonate are exemplified. A hydrogen oxalate salt, oxalate, and a hydrochloric acid salt are preferred.

Hereinafter, General Formula (IIA) will be described in detail.

In General Formula (IIA), $R_5$ and $R_6$ are preferably identical to $R_1$ and $R_2$ in General Formula (IA).

In General Formula (IIA), $R_7$ and $R_8$ are preferably a hydrogen atom or those identical to the examples exemplified as $R_1$ and $R_2$ in General Formula (IA). An unsubstituted alkyl group and a substituted alkyl group are more preferred, and an unsubstituted alkyl group (for example, a methyl group, an ethyl group, a propyl group, or a butyl group), a substituted alkyl group {for example, a sulfoalkyl group (for example, a 2-sulfoethyl group, a 3-sulfopropyl group, a 4-sulfobutyl group, or a 3-sulfobutyl group), a carboxyalkyl group (for example, a carboxymethyl group or a 2-carboxyethyl group), and a hydroxyalkyl group (for example, a 2-hydroxyethyl group)} are particularly preferred.

In General Formula (IIA), $V_1$, $V_2$, $V_3$, and $V_4$ represent a hydrogen atom or a monovalent substituent, the substituent is not particularly limited, and $R_1$, $R_2$, and $R_3$ in General Formula (IA) and the substituent represented by Va are exemplified. Particularly preferably, an unsubstituted alkyl group (for example, a methyl group or an ethyl group), a substituted alkyl group (for example, a 2-sulfobutyl group or a 2-carboxyethyl group), and an alkoxy group (for example, a methoxy group or an ethoxy group) are exemplified.

In General Formula (IIA), $L_1$, $L_2$, and $L_3$ represent an unsubstituted methine group or a substituted methine group (as the substituent, for example, $R_1$, $R_2$, and $R_3$ in General Formula (IA) and the substituent represented by Va are exemplified). An unsubstituted methine group is preferred. $n_1$ is preferably 0.

Hereinafter, typical examples of the compound represented by General Formulae (IA) and (IIA) will be shown, but are not limited thereto.

Compound represented by General Formula (IA) (the compound represented by General Formula (IA) includes the compound represented by General Formula (IIA). However, here, as the compound represented by General Formula (IA), examples excluding the compound represented by General Formula (IIA) will be exemplified.)

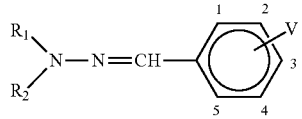

| Compound No. | R₁ | R₂ | V |
|---|---|---|---|
| IA-1 | CH₃ | CH₃ | H |
| IA-2 | CH₃ | CH₃ | 3-OCH₃ |
| IA-3 | CH₃ | CH₃ | 3-Cl |
| IA-4 | (CH₂)₂SO₃Na | CH₃ | H |
| IA-5 | (CH₂)₄SO₃Na | CH₃ | 1-CH₃ |
| IA-6 | (CH₂)₂SO₃Na | CH₃ | 1-OCH₃ |
| IA-7 | (CH₂)₂CO₂H | (CH₂)₂CO₂H | 2-OCH₃ |
| IA-8 | (CH₂)₂CO₂H | C₂H₅ | H |
| IA-9 | (CH₂)₃OH | CH₃ | 3-SCH₃ |
| IA-10 | (CH₂)₂CO₂C₂H₅ | CH₃ | 2,4-Cl₂ |
| IA-11 | (CH₂)₂CN | CH₃ | 1,5-(CH₃)₂ |
| IA-12 | (CH₂)₃NHCOCH₃ | CH₃ | H |
| IA-13 | (CH₂)₂SO₃Na | (CH₂)₂SO₃Na | H |
| IA-14 | CH₃ | phenyl | 3-OC₂H₅ |
| IA-15 | phenyl | phenyl | H |

IA-16
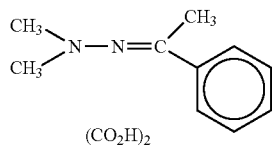

IA-17
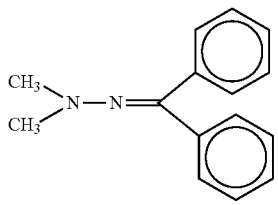

IA-18
(morpholine)N—N=CH—phenyl

IA-19
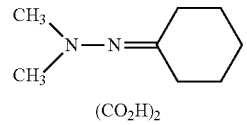
(CO₂H)₂

IA-20
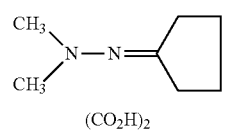
(CO₂H)₂

IA-21
(CH₃)₂N—N=C(diphenyl)

IA-22
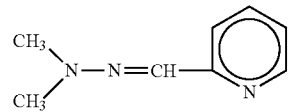
(CO₂H)₂

IA-23
(CH₃)₂N—N=cyclopentyl
(CO₂H)₂

IA-24
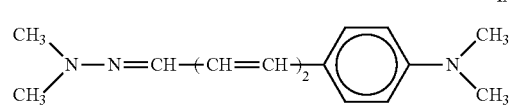

IA-25
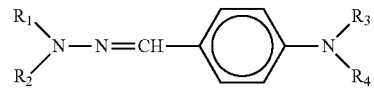

Compound represented by General Formula (IIA)

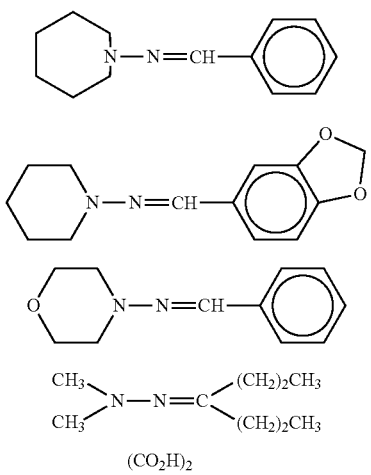

| Compound No. | R₁ | R₂ | R₃ | R₄ |
|---|---|---|---|---|
| IIA-1 | CH₃ | CH₃ | CH₃ | CH₃ |
| IIA-2 | CH₃ | CH₃ | CH₃ | (CH₂)₂OH |
| IIA-3 | CH₃ | CH₃ | CH₃ | (CH₂)₂OC₂H₅ |
| IIA-4 | CH₃ | CH₃ | CH₃ | CH₂CO₂H |
| IIA-5 | CH₃ | CH₃ | CH₃ | (CH₂)₂N(CH₃)₃⁺ I⁻ |
| IIA-6 | CH₃ | CH₃ | CH₂CO₂H | CH₂CO₂H |
| IIA-7 | CH₃ | CH₃ | CH₃ | (CH₂)₂SO₃Na |
| IIA-8 | CH₃ | CH₃ | CH₃ | (CH₂)₂Cl |
| IIA-9 | CH₃ | CH₃ | CH₃ | CH₂CN |
| IIA-10 | CH₃ | (CH₂)₂SO₃Na | CH₃ | CH₃ |
| IIA-11 | CH₃ | (CH₂)₂SO₃Na | CH₃ | (CH₂)₂SO₃Na |
| IIA-12 | (CH₂)₂SO₃Na | (CH₂)₂SO₃Na | CH₃ | CH₃ |

-continued

| Compound No. | R₁ | R₂ | R₃ | R₄ |
|---|---|---|---|---|
| IIA-13 | CH₃ | (CH₂)₃OH | CH₃ | CH₃ |
| IIA-14 | CH₃ | (CH₂)₂CO₂H | CH₃ | CH₃ |
| IIA-15 | CH₃ | (CH₂)₂CN | CH₃ | CH₃ |
| IIA-16 | CH₃ | (CH₂)₃NHCOCH₃ | CH₃ | CH₃ |
| IIA-17 | CH₃ | (CH₂)₂CO₂C₂H₅ | CH₃ | CH₃ |

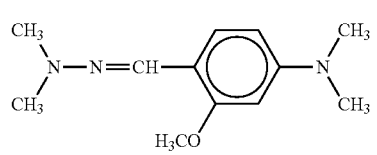

IIA-18

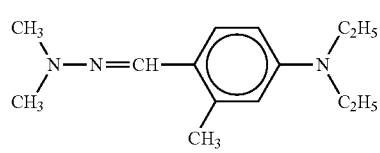

IIA-19

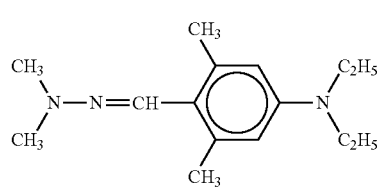

IIA-20

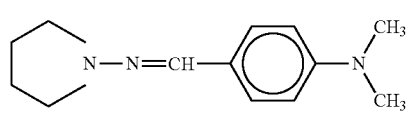

IIA-21

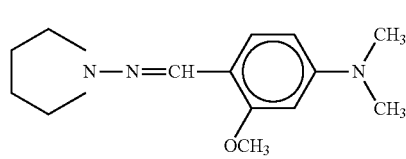

IIA-22

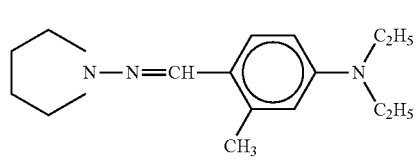

IIA-23

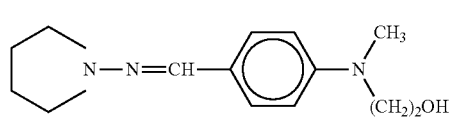

IIA-24

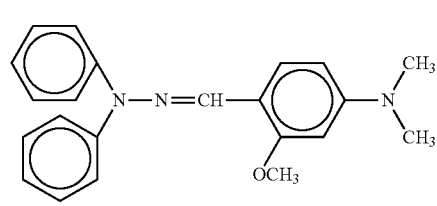

IIA-25

-continued

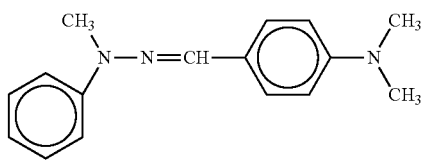

IIA-26

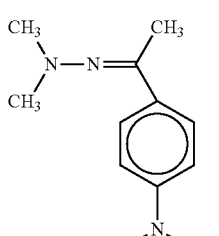

IIA-27

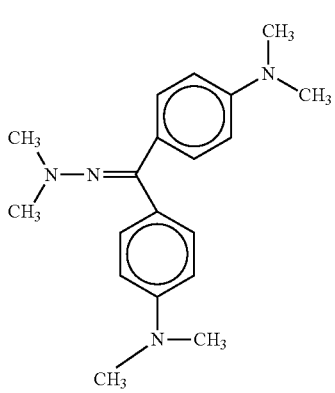

IIA-28

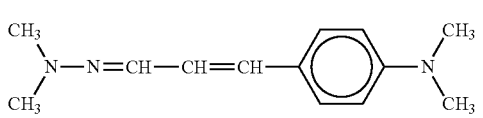

IIA-29

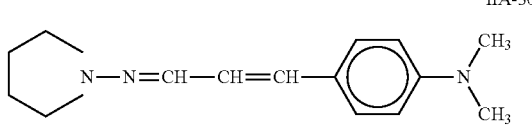

IIA-30

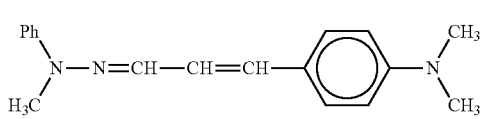

IIA-31

The compound represented by General Formula (IA) (including General Formula (IIA)) can be easily manufactured using a well-known method. That is, the compound can be obtained by condensing hydrazines and aldehydes or ketones by adding a small amount of an acid (for example, acetic acid or hydrochloric acid) as a condensing agent as necessary. Specific methods are described in JP1985-034099B (JP-S60-034099B), JP1985-034100B (JP-S60-034100B), and the like.

In addition, reductones represented by General Formula (A) or General Formula (B) are also preferred as the electron-donating quencher that is used in the present invention.

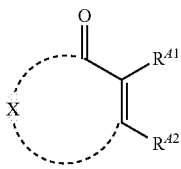

General Formula (A)

In General Formula (A), $R^{A1}$ and $R^{A2}$ each independently represent a hydroxyl group, an amino group, an acylamino group, an alkylsulfonylamino group, an arylsulfonylamino group, an alkoxycarbonylamino group, a mercapto group, or an alkylthio group. X is made up of a carbon atom and an oxygen atom and/or a nitrogen atom and represents a non-metallic atom group configuring a five to six-membered ring together with —C(=)—C($R^{A1}$)($R^{A2}$)—.

$R^{A1}$ and $R^{A2}$ are preferably a hydroxyl group, an amino group, an alkylsulfonylamino group, or an arylsulfonylamino group, more preferably a hydroxyl group or an amino group, and still more preferably a hydroxyl group.

In General Formula (A), X has at least one —O— bond and is preferably formed by combining one or more of —C($R^{A3}$)($R^{A4}$)—, —C($R^{A5}$)=, —C(=O)—, —N(Ra)—, and N=. Here, $R^{A3}$ to $R^{A5}$ each are independently preferably a hydrogen atom, an alkyl group which may have a substituent having 1 to 10 carbon atoms, an aryl group having 6 to 15 carbon atoms which may have a substituent, a hydroxyl group, or a carboxyl group.

In General Formula (A), examples of the five to six-membered ring formed through X include a cyclopentenone ring (2-cyclopentene-1-one ring; a compound to be formed becomes reductic acid), a furanone ring [2(5H)-furanone ring], a dihydropyranone ring [3,4-dihydro-2H-pyran-4-one ring (2,3-dihydro-4H-pyrone ring), a 3,6-dihydro-2H-pyran-2-one ring, a 3,6-dihydro-2H-pyran-6-one ring (5,6-dihydro-2-pyrone ring)], and a 3,4-dihydro-2H-pyrone ring, a cyclopentenone ring, a furanone ring, and a dihydropyrone ring are preferred, a furanone ring and a dihydropyrone ring are more preferred, and a furanone ring is particularly preferred.

These rings may be fused, and this ring to be fused may be any of a saturated ring or an unsaturated ring.

Among the reductones represented by General Formula (A), a compound represented by General Formula (A1) is preferred, and, particularly, a compound represented by General Formula (A2) is preferred.

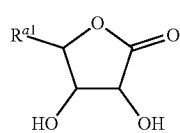

General Formula (A1)

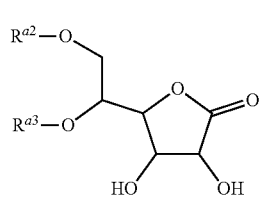

General Formula (A2)

In General Formula (A1), $R^{a1}$ represents a hydrogen atom, an alkyl group, an aryl group, or a heterocyclic group, and these may have a substituent.

$R^{a1}$ is preferably an alkyl group which may have a substituent, —CH(O$R^{a3}$)CH$_2$O$R^{a2}$ is more preferred, and, in this case, $R^{a1}$ becomes the compound represented by General Formula (A2).

In General Formula (A2), $R^{a2}$ and $R^{a3}$ each independently represent a hydrogen atom, an alkyl group, an acyl group, or an alkoxycarbonyl group, $R^{a2}$ and $R^{a3}$ may bond to each other to form a ring, and a ring to be formed is preferably a 1,3-dioxolane ring, and this ring may further have a substituent. A compound having a dioxolane ring can be synthesized by acetalization or ketalization by a reaction between ascorbic acid and ketones or aldehydes, and ketones or aldehydes that are a raw material can be used without any limitation.

In General Formula (A2), one of combinations of particularly preferred substituents is a compound in which Re is an acyl group and $R^{a3}$ is a hydrogen atom, the acyl group may be any of an aliphatic acyl group or an aromatic acyl group, and, in the case of the aliphatic acyl group, the number of carbon atoms is preferably 2 to 30, more preferably 4 to 24, and still more preferably 8 to 18. In the case of the aromatic acyl group, the number of carbon atoms is preferably 7 to 24, more preferably 7 to 22, and still more preferably 7 to 18. As preferred acyl groups, butanoyl, hexanoyl, 2-ethylhexanoyl, decanoyl, lauroyl, myristoyl, palmitoyl, stearoyl, palmitoleyl, myristoleyl, oleoyl, benzoyl, 4-methylbenzoyl, and 2-methylbenzoyl can be exemplified.

Similar to the compound represented by General Formula (A), a compound represented by General Formula (B) is also preferred.

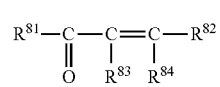

General Formula (B)

In General Formula (B), $R^{B1}$ and $R^{B2}$ each independently represent a hydrogen atom, an alkyl group, an alkenyl group, a cycloalkyl group, an aryl group, an acyl group, a carboxyl group, an amino group, an alkoxy group, an alkoxycarbonyl group, or a heterocyclic group, and $R^{B3}$ and $R^{B4}$ each independently represent a hydroxyl group, an amino group, an acylamino group, an alkylsulfonylamino group, an arylsulfonylamino group, an alkoxycarbonylamino group, or a mercapto group.

In the alkyl group as $R^{B1}$ and $R^{B2}$, the number of carbon atoms is preferably 1 to 10. This alkyl group is preferably methyl, ethyl, or t-butyl.

In the alkenyl group as $R^{B1}$ and $R^{B2}$, the number of carbon atoms is preferably 2 to 10. This alkenyl group is preferably vinyl or allyl and more preferably vinyl.

In the cycloalkyl group as $R^{B1}$ and $R^{B2}$, the number of carbon atoms is preferably 3 to 10. This cycloalkyl group is preferably cyclopropyl, cyclopentyl, or cyclohexyl.

These alkyl group, alkenyl group, and cycloalkyl group may have a substituent, and this substituent is preferably at least one selected from a hydroxyl group, a carboxyl group, or a sulfo group.

In a case where the alkenyl group is vinyl, a vinyl group having a substituted carboxyl group is preferred.

In the aryl group as $R^{B1}$ and $R^{B2}$, the number of carbon atoms is preferably 6 to 12. The aryl group may have a substituent, and this substituent is preferably at least one selected from an alkyl group, a hydroxyl group, a carboxyl group, a sulfo group, a halogen atom, a nitro group, or a cyano group.

The acyl group as $R^{B1}$ and $R^{B2}$ is preferably formyl, acetyl, isobutyryl, or benzoyl.

The amino group in $R^{B1}$ and $R^{B2}$ may be an amino group, an alkylamino group, and an arylamino group, and amino, methylamino, dimethylamino, ethylamino, diethylamino, dipropylamino, phenylamino, and N-methyl-N-phenylamino are preferred.

In the alkoxy group as $R^{B1}$ and $R^{B2}$, the number of carbon atoms is preferably 1 to 10. This alkoxy group is preferably methoxy or ethoxy.

The alkoxycarbonyl group as $R^{B1}$ and $R^{B2}$ is preferably methoxycarbonyl.

In the heterocyclic group as $R^{B1}$ and $R^{B2}$, a ring-configuring hetero atom is preferably an oxygen atom, a sulfur atom, or a nitrogen atom, and the ring structure is preferably a five-membered ring or a six-membered ring. This heterocyclic group may be an aromatic heterocyclic group or a saturated heterocyclic group and may be fused.

The heterocycle in the heterocyclic group is preferably a pyridine ring, a pyrimidine ring, a pyrrole ring, a furan ring, a thiophene ring, a pyrazole ring, a piperidine ring, a piperazine ring, or a morpholine ring.

$R^{B1}$ and $R^{B2}$ are more preferably an alkyl group having 1 to 6 carbon atoms or an aryl group having 6 to 12 carbon atoms.

The amino group as $R^{B3}$ and $R^{B4}$ includes an amino group, an alkylamino group, and an arylamino group and is preferably an amino group or an alkylamino group such as methylamino, ethylamino, n-butylamino, or hydroxyethylamino.

The acylamino group as $R^{B3}$ and $R^{B4}$ is preferably acetylamino or benzoylamino.

The alkylsulfonylamino group as $R^{B3}$ and $R^{B4}$ is preferably methylsulfonylamino.

The arylsulfonylamino group as $R^{B3}$ and $R^{B4}$ is preferably benzenesulfonylamino or p-toluenesulfonylamino.

The alkoxycarbonylamino group as $R^{B3}$ and $R^{B4}$ is preferably methoxycarbonylamino.

$R^{B3}$ and $R^{B4}$ are more preferably a hydroxyl group, an amino group, an alkylsulfonylamino group, or an arylsulfonylamino group.

The electron-donating quencher that is used in the present invention is more preferably reductones, and, specifically, compounds exemplified in Paragraphs 0014 to 0034 of JP1994-027599A (JP-H6-027599A), compounds exemplified in Paragraphs 0012 to 0020 of JP1994-110163A (JP-H6-110163A), and compounds exemplified in Paragraphs 0022 to 0031 of JP1996-114899A (JP-H8-114899A) can be exemplified.

Among these, myristic acid ester, palmitic acid ester, and stearic acid ester of L-ascorbic acid are particularly preferred.

Hydroquinones, aminophenols, aminonaphthols, 3-pyrazolidinones, saccharin, and precursors and picoliniums thereof are also preferred as the electron-donating quencher that is used in the present invention.

Hereinafter, examples of the electron-donating quencher will be shown.

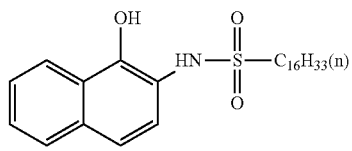
S-1

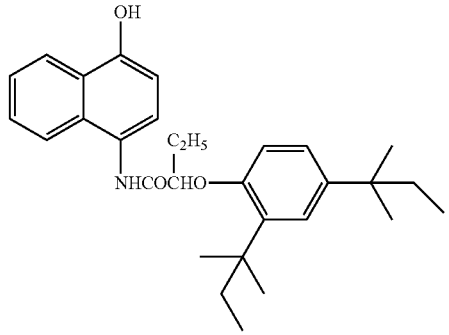
S-2

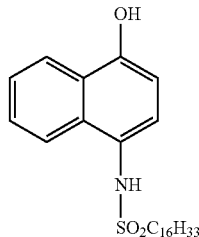
S-3

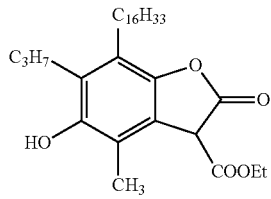
S-4

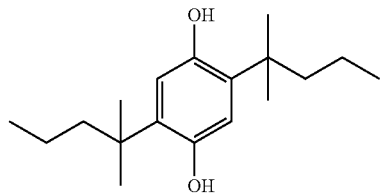
S-5

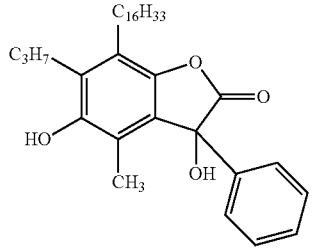
S-6

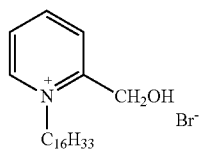
S-7

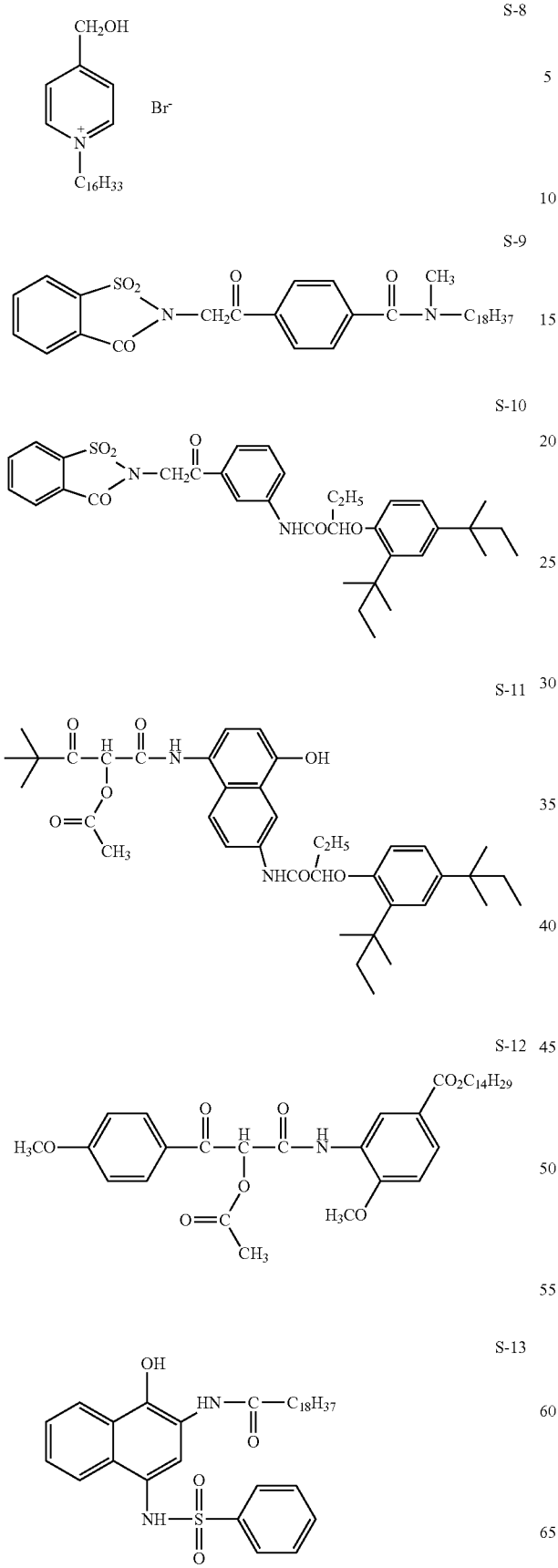

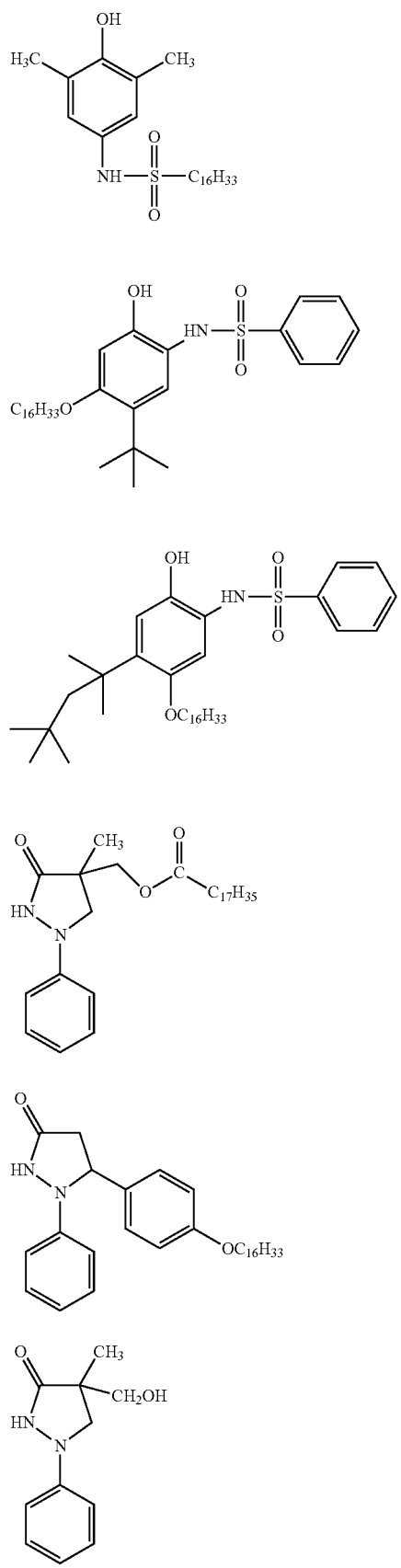
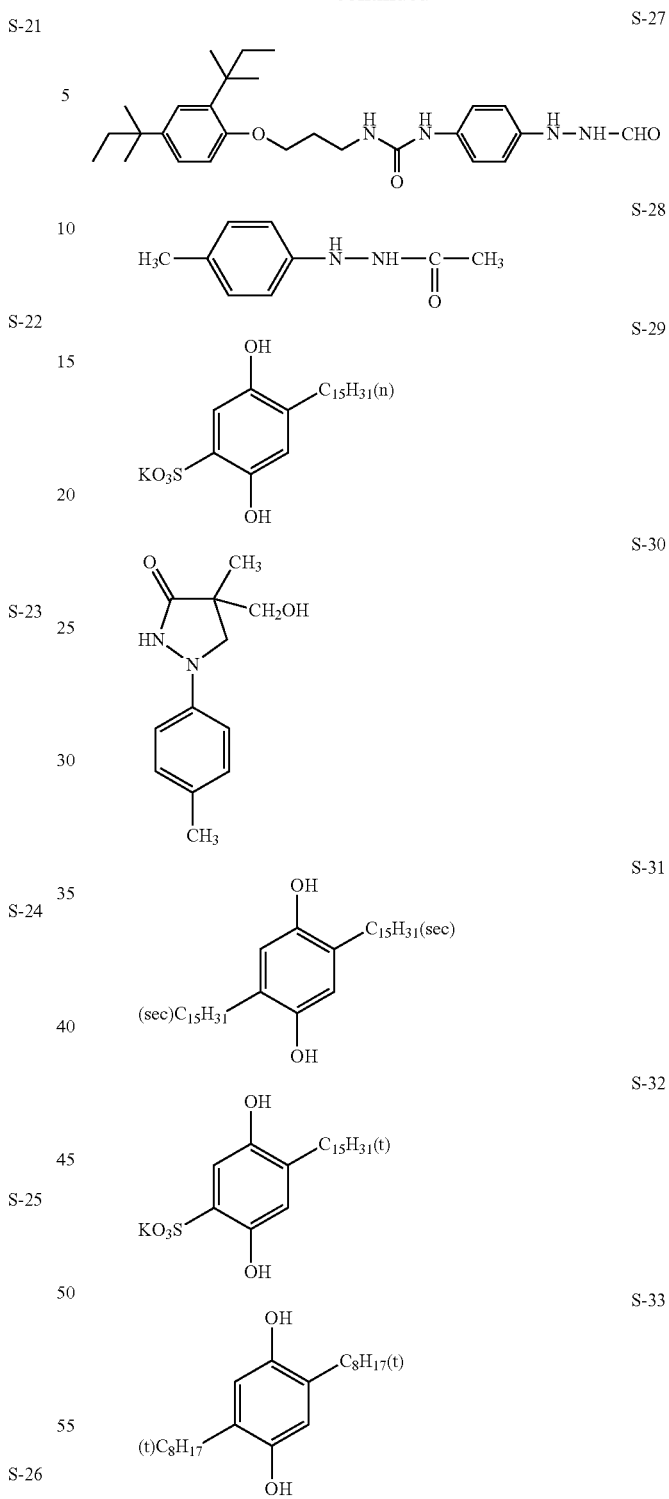
—Electron-Accepting Quencher—
Next, the electron-accepting quencher that is used in the present invention will be described.
The electron-accepting quencher that is used in the present invention is an agent that accepts an electron from SOMO on a high energy level between two SOMOs of a coloring agent in an excited state and then donates an electron to SOMO on the low energy level of the coloring agent, thereby deactivating the coloring agent in the excited state to a ground state.

The LUMO energy level of the electron-accepting quencher that is used in the present invention satisfies a relational expression [B-1] below relative to the LUMO energy level of the coloring agent that is used in the present invention.

$$E_{Ld}-E_{Lq} \leq 0 \text{ eV} \qquad \text{Relational expression [B-1]}$$

Here, $E_{Ld}$ and $E_{Lq}$ each represent values below.

$E_{Ld}$: LUMO energy level of coloring agent $E_{Lq}$: LUMO energy level of electron-accepting quencher In a case where the relational expression [B-1] is satisfied, it becomes easy for electrons to migrate from the coloring agent in an excited state to the electron-accepting quencher, and efficient quenching is possible.

The LUMO energy level of the electron-accepting quencher that is used in the present invention more preferably satisfies a relational expression [B-2] below and still more preferably satisfies a relational expression [B-3] below relative to the LUMO energy level of the coloring agent that is used in the present invention.

$$E_{Ld}-E_{Lq} \leq -0.2 \text{ eV} \qquad \text{Relational expression [B-2]}$$

$$E_{Ld}-E_{Lq} \leq -0.4 \text{ eV} \qquad \text{Relational expression [B-3]}$$

The energy levels of the coloring agent and the quencher can be computed using the same method as described in the description of the above-described electron-donating quencher.

A phthalimide compound represented by General Formula (E) can be preferably used as the electron-accepting quencher that is used in the present invention.

General Formula (E)

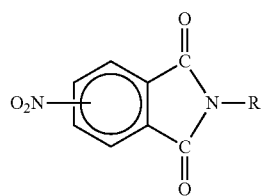

In General Formula (E), R represents a monovalent organic group having 1 to 14 carbon atoms which is selected from the group consisting of an alkyl group, an aromatic hydrocarbon group, and an aromatic hydrocarbon group substituted with a halogen atom, a nitro group, and/or an alkyl group.

Hereinafter, specific examples of the compound represented by General Formula (E) will be shown below.

E-1

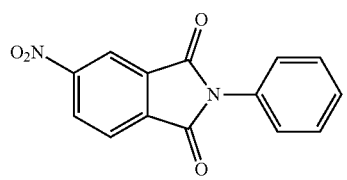

E-2

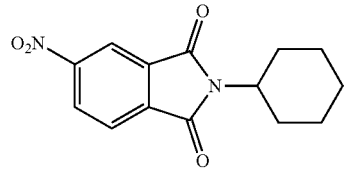

E-3

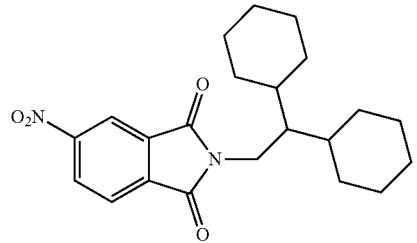

E-4

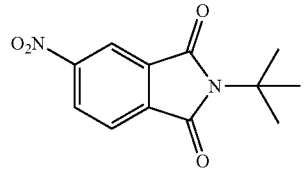

E-5

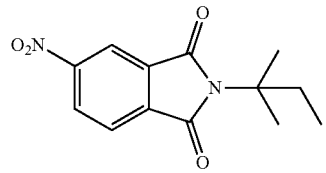

E-6

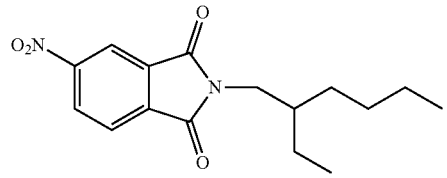

Naphthalimides having the following structure can also be preferably used as the electron-accepting quencher that is used in the present invention.

General Formula (IB)

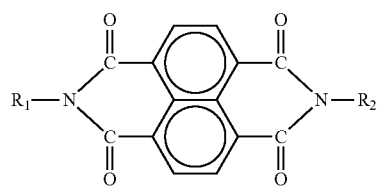

In General Formula (IB), $R_1$ and $R_2$ represent an alkyl group having 20 or less carbon atoms, a substituted alkyl group, or an aryl group which may or may not have a substituent and may be identical to or different from each other. As the substituted alkyl group, a hydroxyethyl group, a benzyl group, and the like are exemplified. As the aryl group, a phenyl group, a naphthyl group, and the like are exemplified, and, as a substituent thereof, a halogen, a lower alkyl group, a nitro group, an amino group, and the like are exemplified.

Phthalimides having the following structure can also be preferably used as the electron-accepting quencher that is used in the present invention.

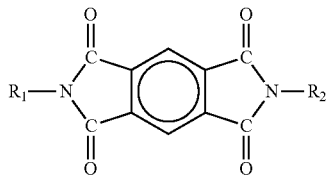

General Formula (IIB)

In General Formula (IIB), $R_1$ and $R_2$ represent an alkyl group having 20 or less carbon atoms (including a cycloalkyl group), a substituted alkyl group, or an aryl group which may or may not have a substituent and may be identical to or different from each other. As the substituted alkyl group, a hydroxyethyl group, a benzyl group, and the like are exemplified. As the aryl group, a phenyl group, a naphthyl group, and the like are exemplified, and, as a substituent thereof, a halogen, a (lower) alkyl group, a nitro group, an amino group, and the like are exemplified.

Hereinafter, specific examples will be shown.

1
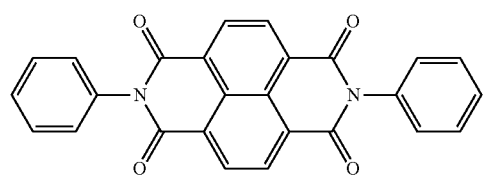

2
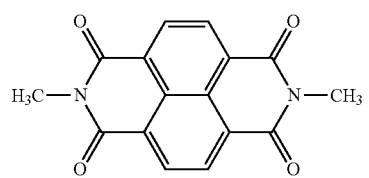

3
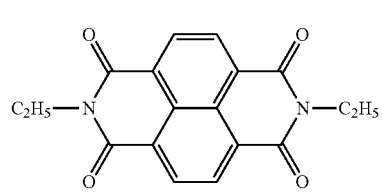

4
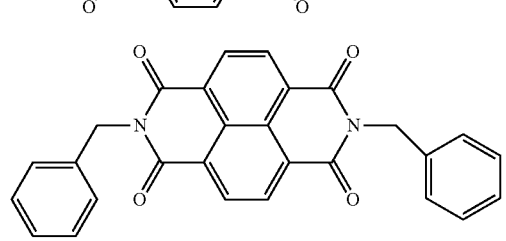

5
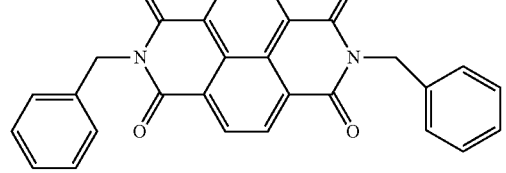

6
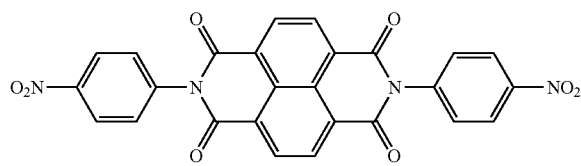

7
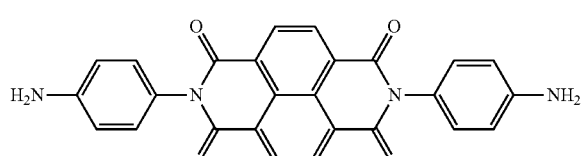

8
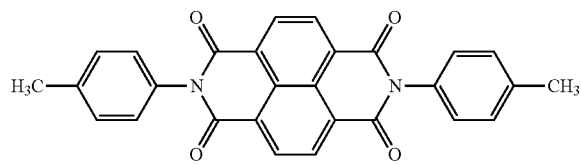

9
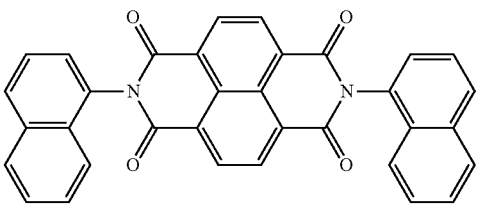

10
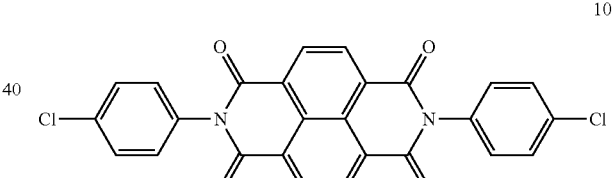

11
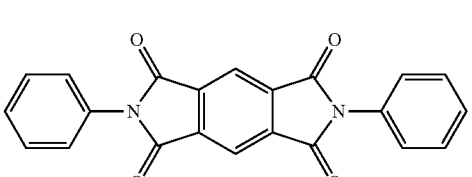

12
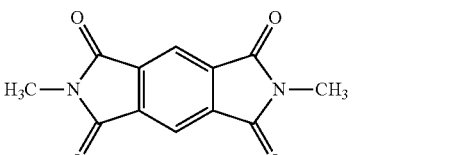

13
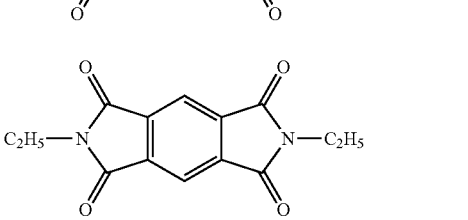

General Formula (IIC)

In General Formula (IIC), $R^{21}$, $R^{22}$, $R^2$, and $R^{24}$ each represent a hydrogen atom, a substituted or unsubstituted alkyl group having 1 to 10 carbon atoms, and a substituted or unsubstituted alkoxy group having 1 to 10 carbon atoms, a substituted or unsubstituted alkylthio group having 1 to 10 carbon atoms, a substituted or unsubstituted aryl group, a substituted or unsubstituted arylthio group, a substituted or unsubstituted aryloxy group, a halogen atom, or a cyano group. In addition, $R^{21}$, $R^{22}$, $R^{23}$, and $R^{24}$ may be linked to each other to form a ring.

Hereinafter, specific examples will be shown.

Quinones represented by General Formula (IIC) can also be preferably used as the electron-accepting quencher that is used in the present invention.

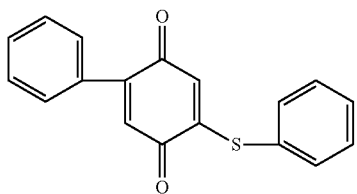
IIC-5

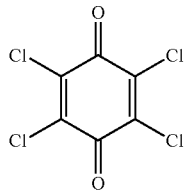
IIC-11

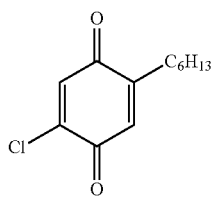
IIC-6

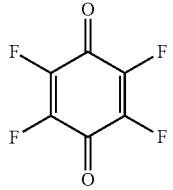
IIC-12

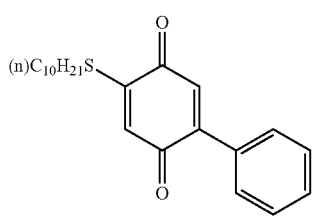
IIC-7

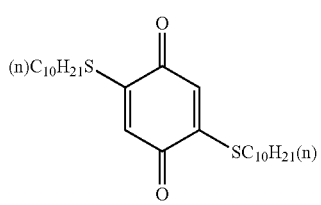
IIC-8

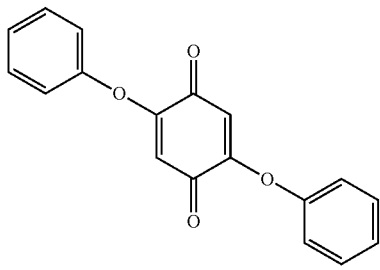
IIC-9

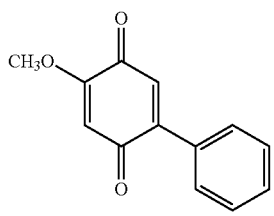
IIC-10

The content of the polarization degree-improving agent in the polarizing plate protective film of the embodiment of the present invention is preferably 0% to 6% by mass, more preferably 0.1% to 5% by mass, and still more preferably 0.3% to 4.5% by mass. In a case where the amount of the polarization degree-improving agent added is controlled to the above-described upper limit value or less, it is possible to improve the degree of polarization without causing any adverse effects such as the discoloration of the polarizing plate protective film.

(Polarization Degree-Improving Agent-Containing Coloring Agent)

It is also preferable that the polarization degree-improving agent that is used in the present invention is linked with the coloring agent by a covalent bond through a linking group as necessary, thereby forming a polarization degree-improving agent-containing coloring agent. Such a form of a coloring agent is also included in the squarine-based coloring agent of General Formula (1) defined in the present invention.

The energy levels of a coloring agent portion and a polarization degree-improving agent portion of the polarization degree-improving agent-containing coloring agent of the present invention can be computed using the same method as the method for computing the energy levels of the coloring agent and the polarization degree-improving agent. In the measurement of potentials, two oxidation potentials are detected for the polarization degree-improving agent-containing coloring agent that is used in the present invention, a value close to the oxidation potential of a coloring agent not containing the polarization degree-improving agent is regarded as the oxidation potential of the coloring agent portion, and a value far from the above-described oxidation potential is regarded as the oxidation potential of the polarization degree-improving agent portion.

Hereinafter, example of the polarization degree-improving agent-containing coloring agent that is used in the present invention will be shown.

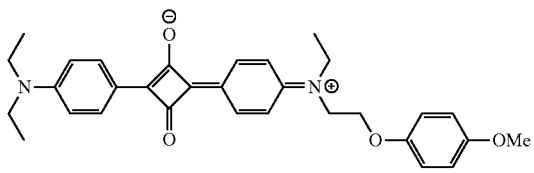
AA-1

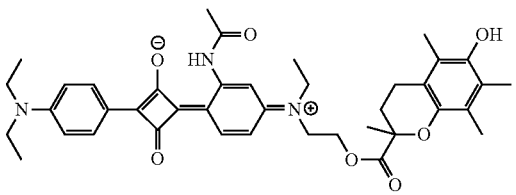
AA-2

AA-3
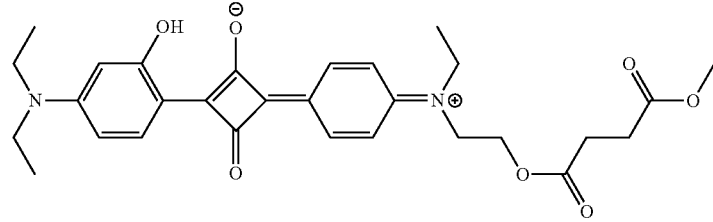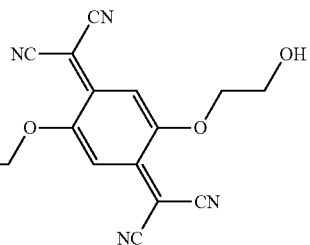
AA-4
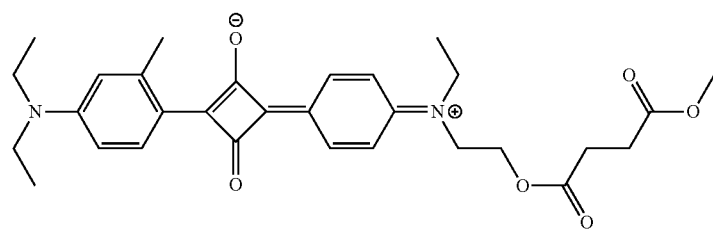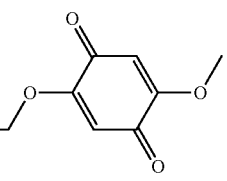
AA-5
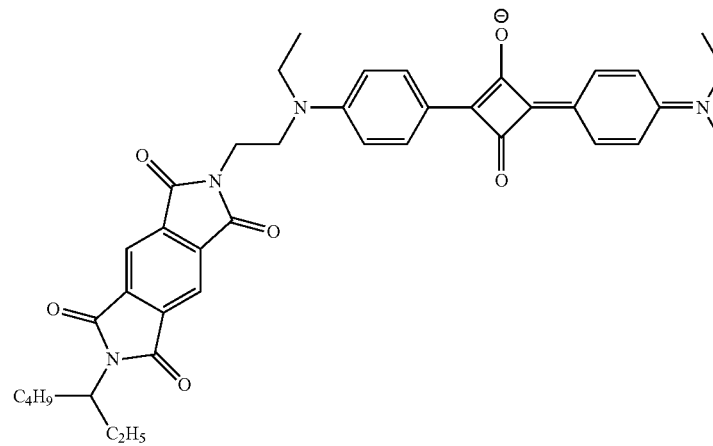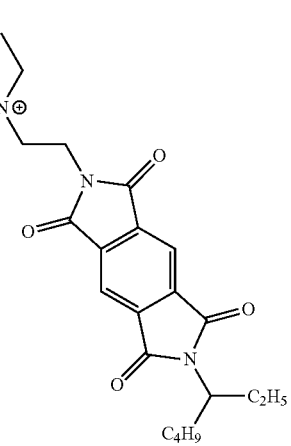
AA-6
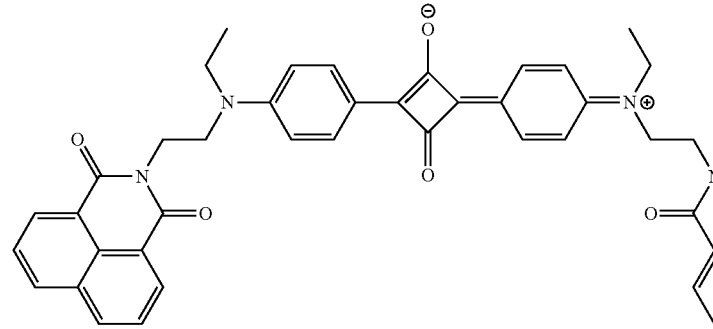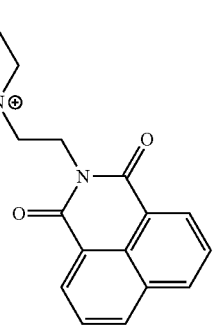
AA-7
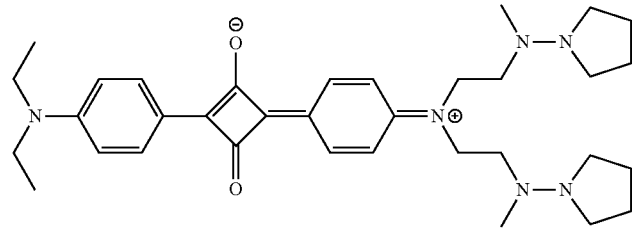

-continued
AA-8
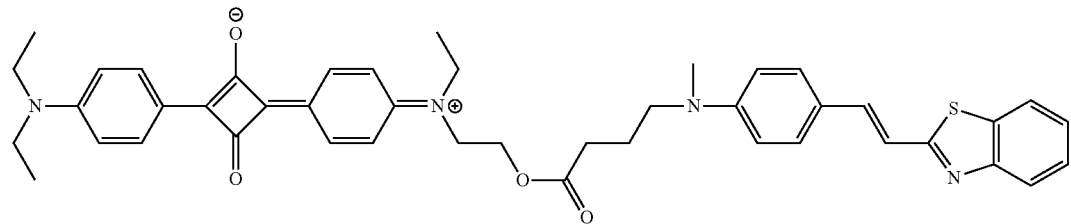
AA-9
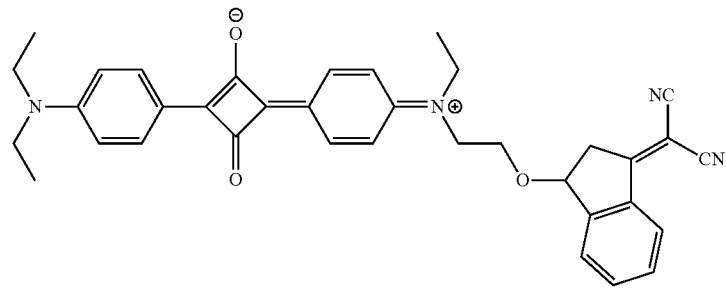
AA-10
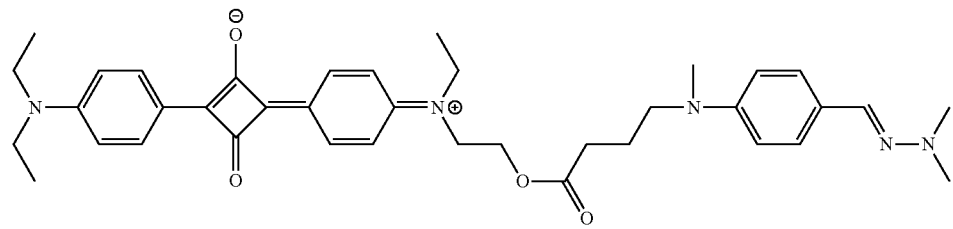
AA-11
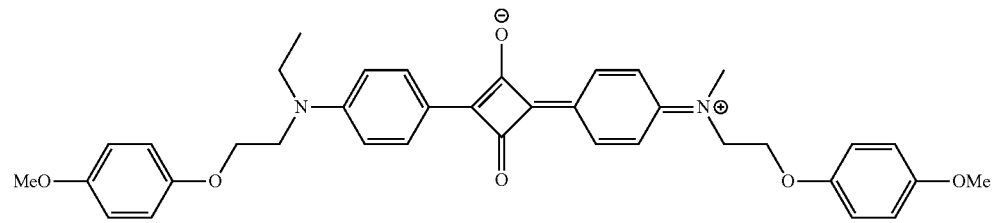
AA-12
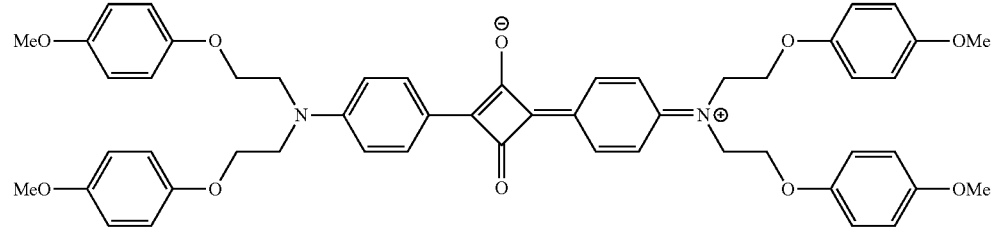
AA-13
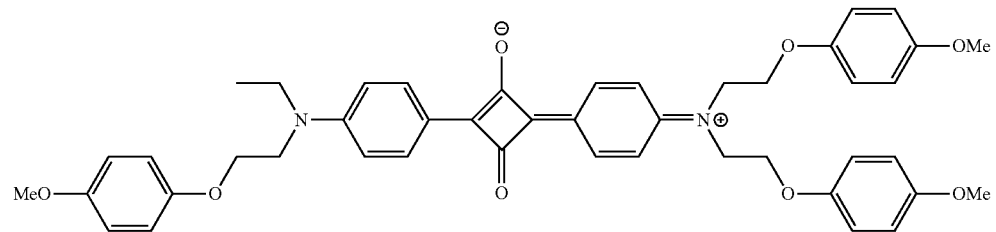

-continued
AA-14
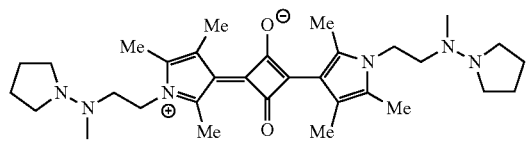
AA-15
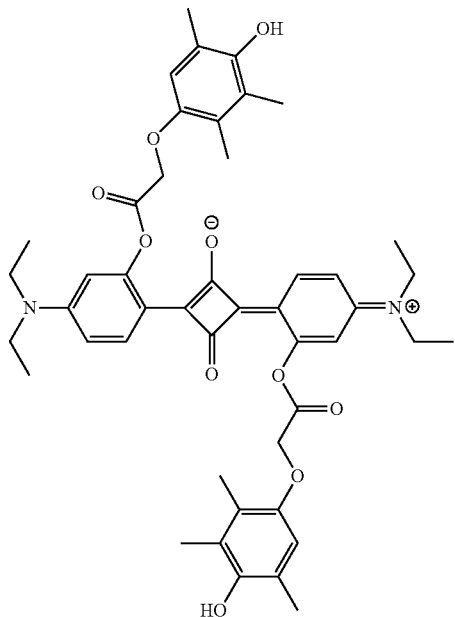
AA-16
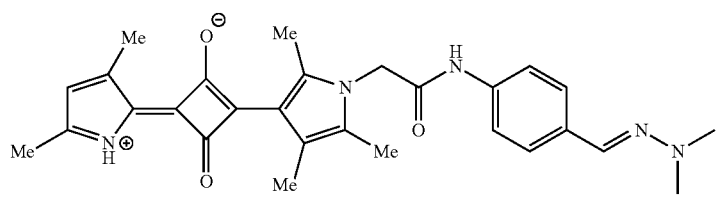
AA-17
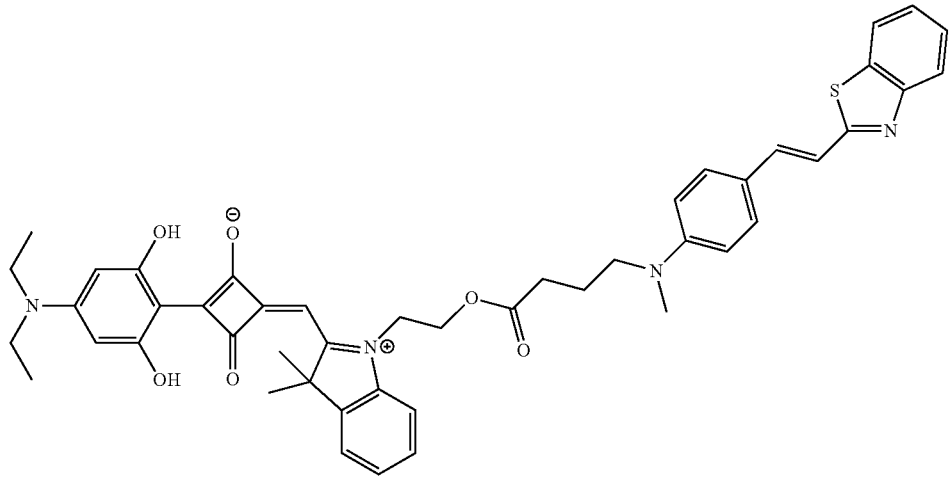
AA-18
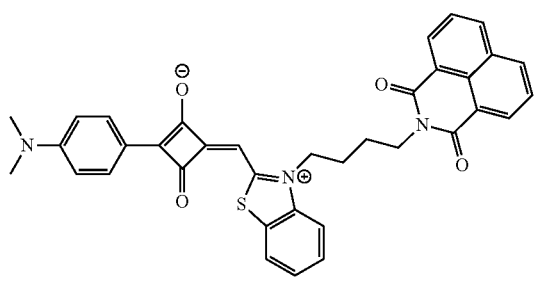
AA-19
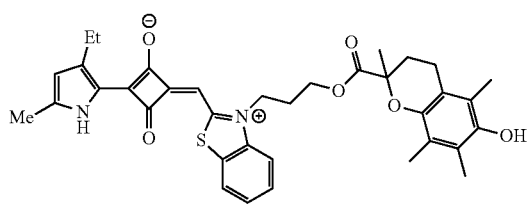

-continued
BB-1
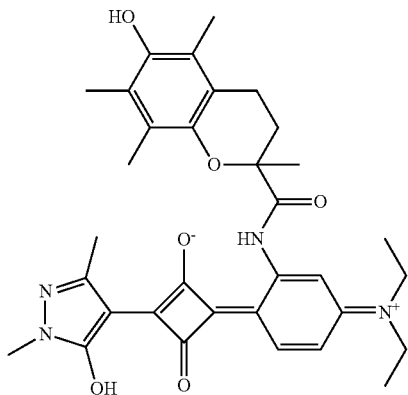
BB-2
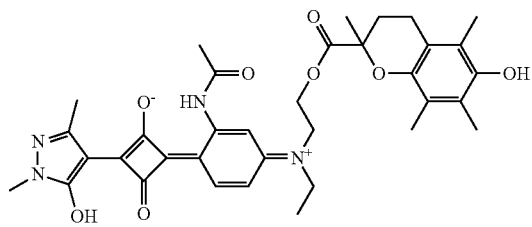
BB-3
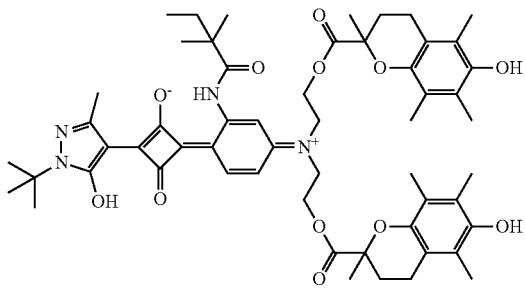
BB-4
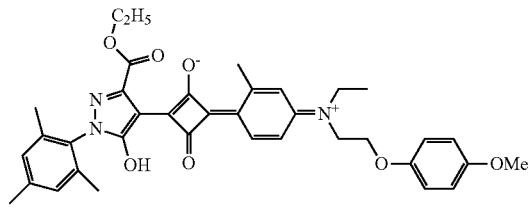
BB-5
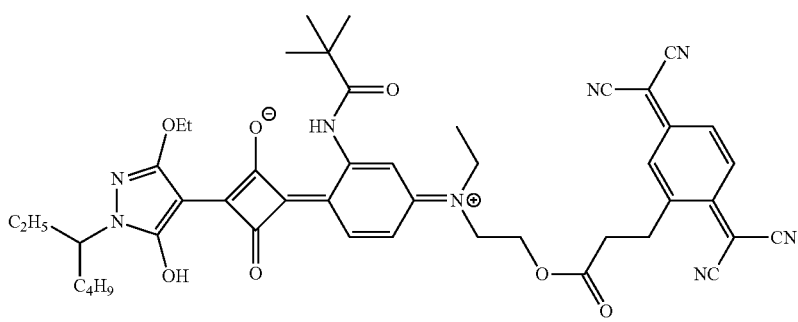
BB-6
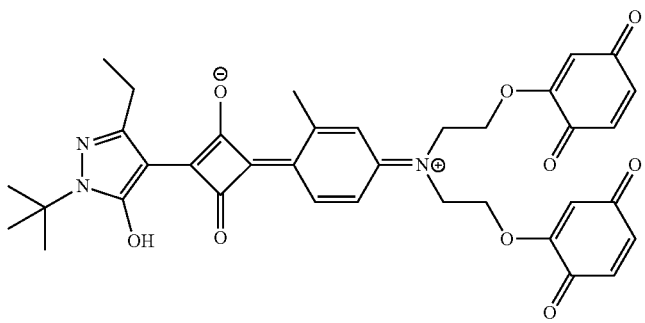

-continued
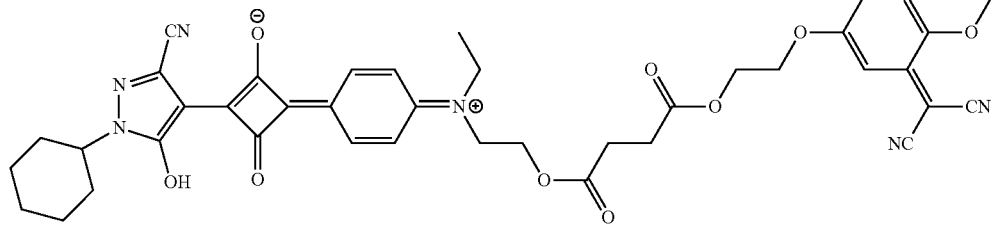
BB-7
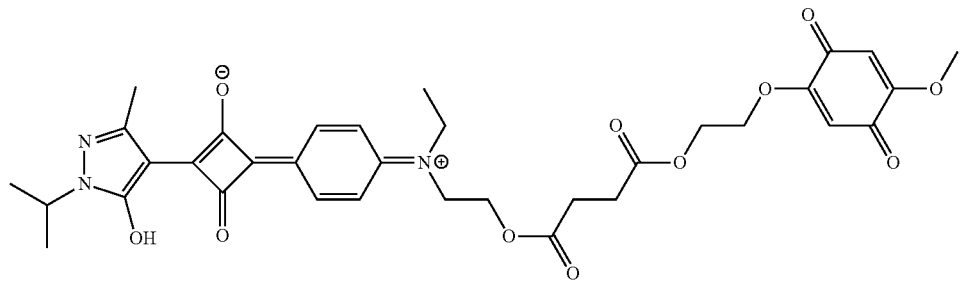
BB-8
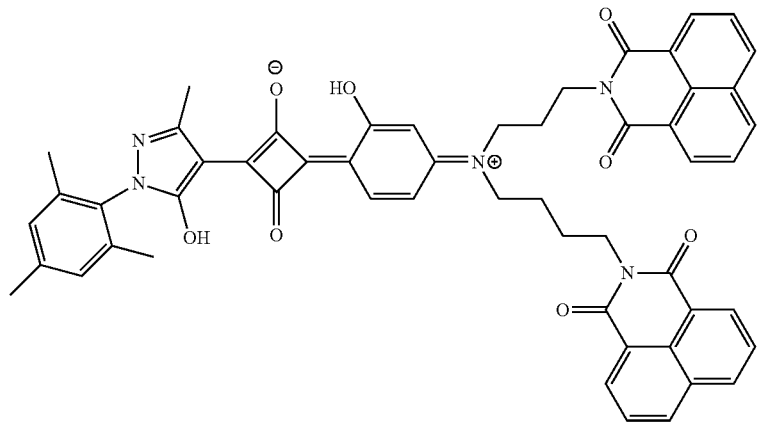
BB-9
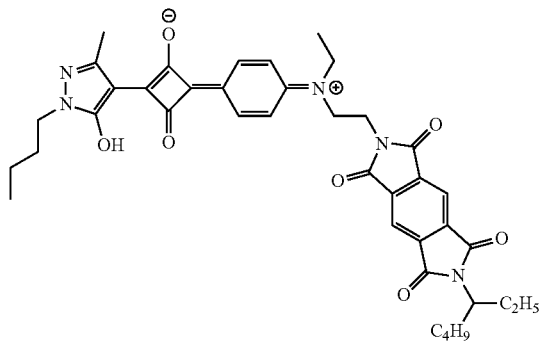
BB-10
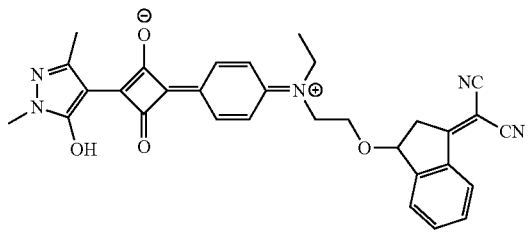
BB-11

-continued
BB-12
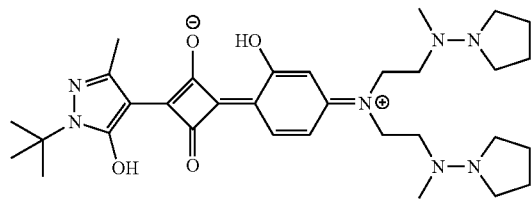
BB-13
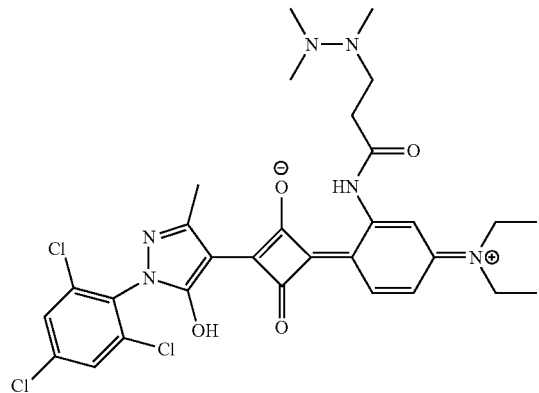
BB-14
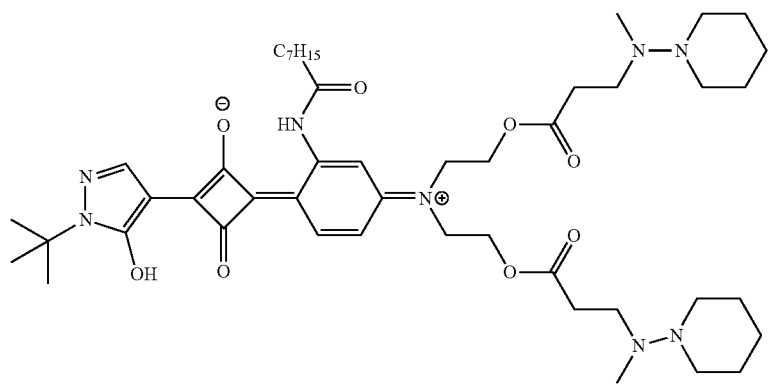
BB-15
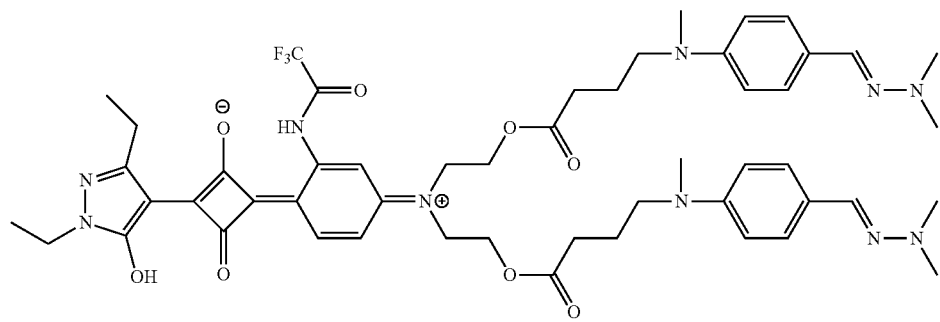
BB-16
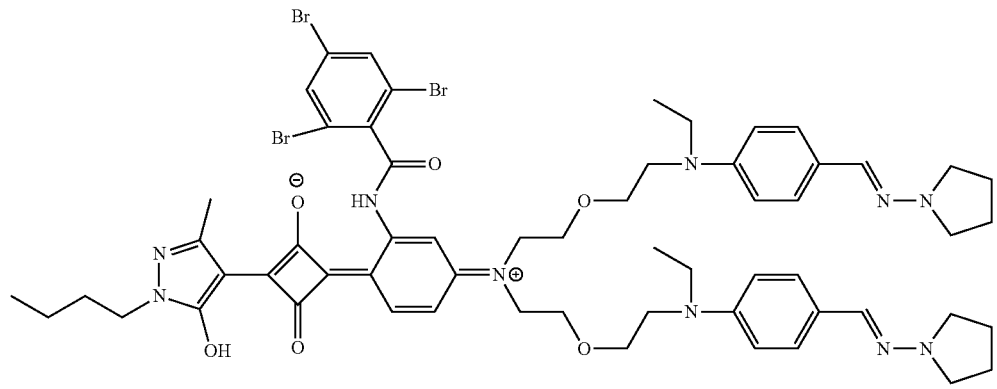

-continued
BB-17
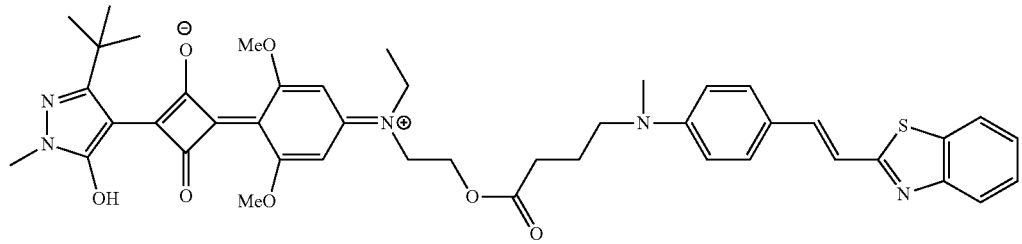
BB-18
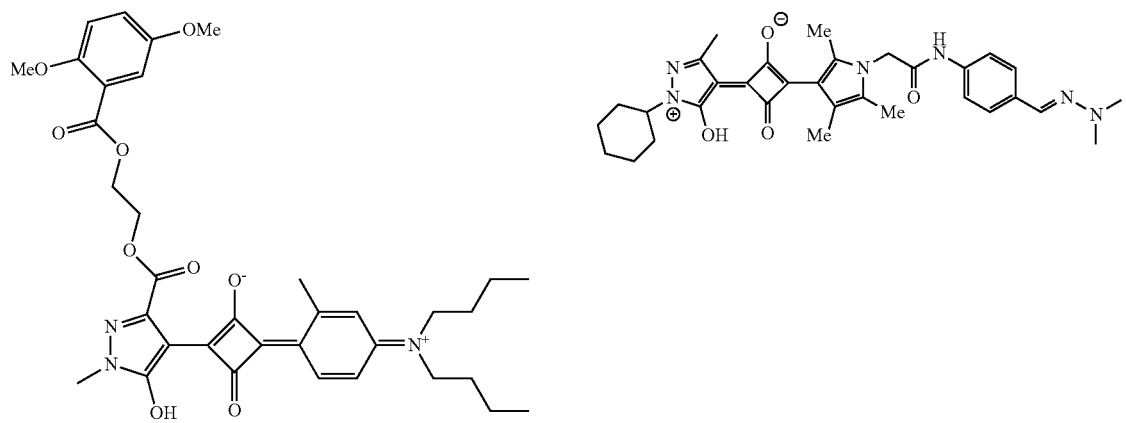
BB-19
BB-20
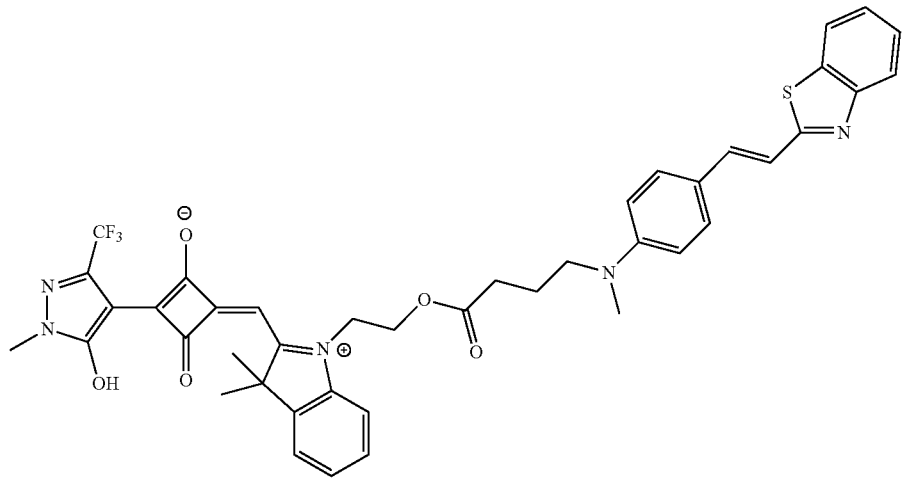
BB-21
BB-22
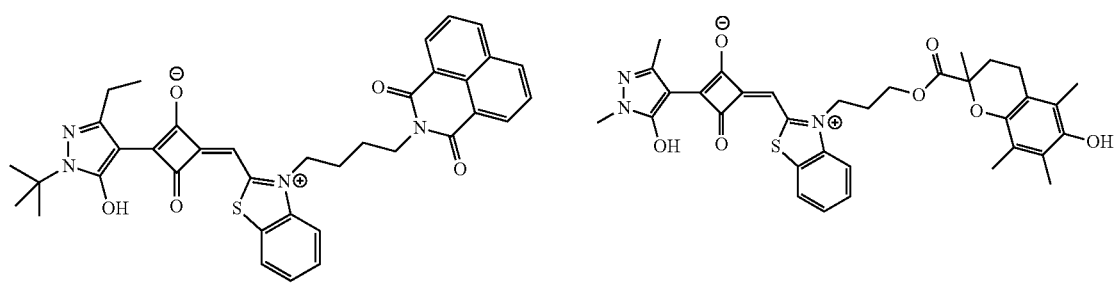

BB-23
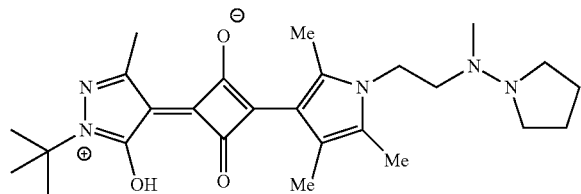
C-1
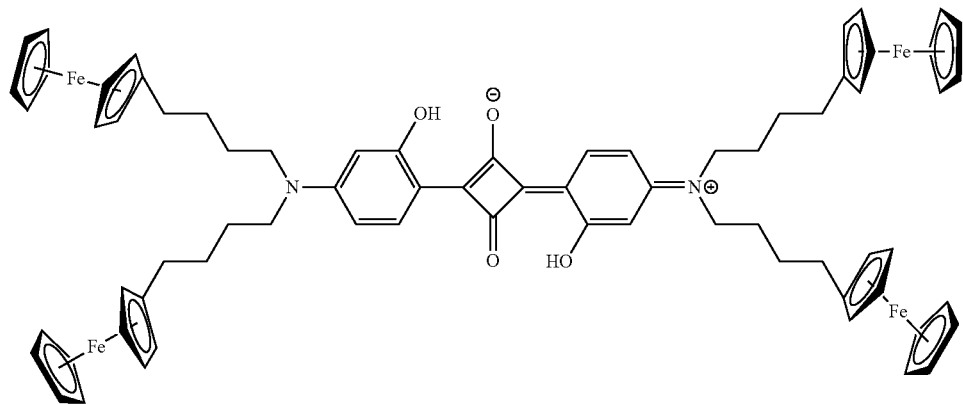
C-2
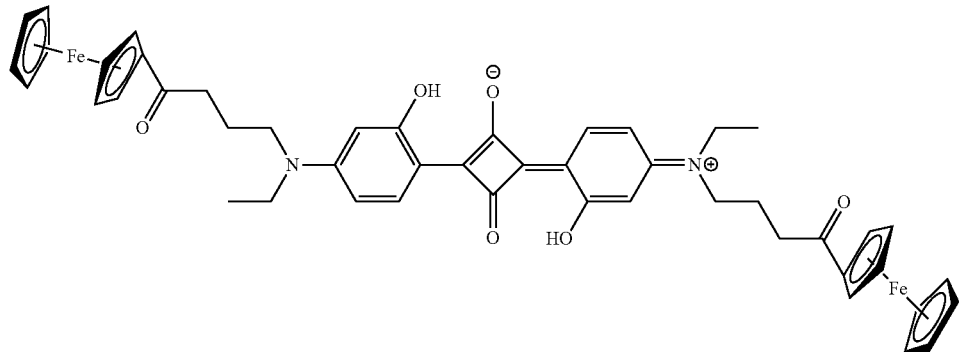
C-3
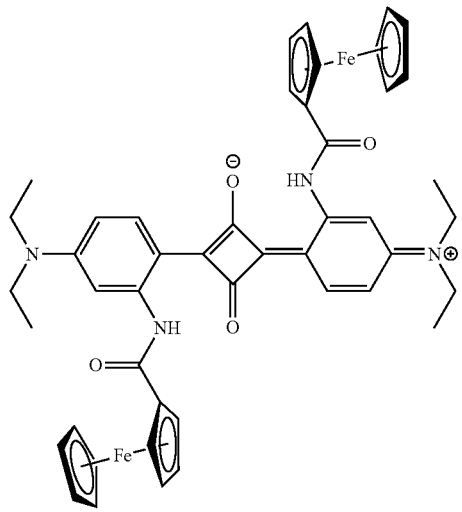
C-4
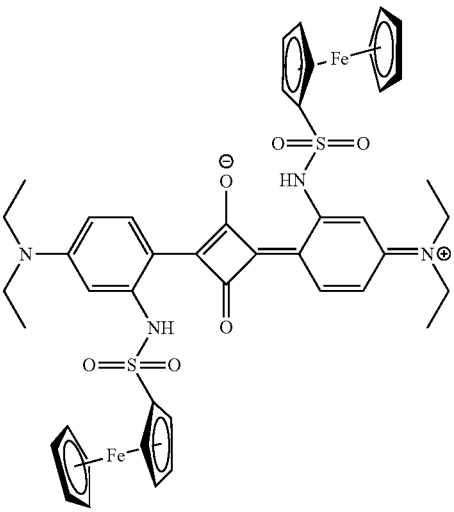

-continued
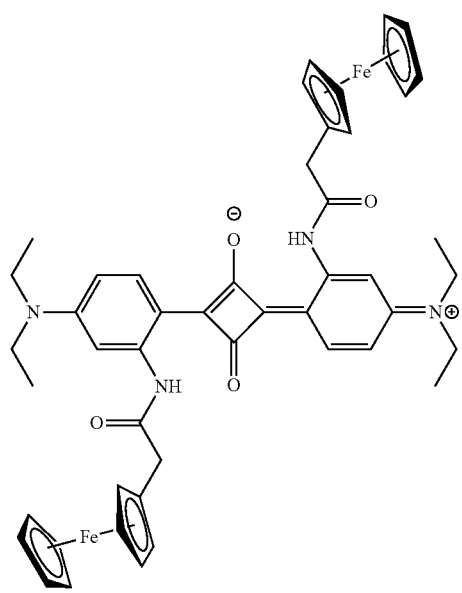
C-5
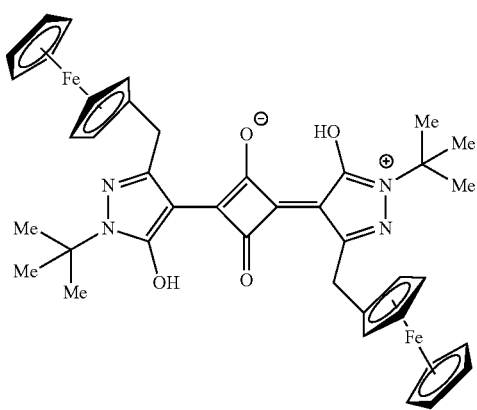
C-6
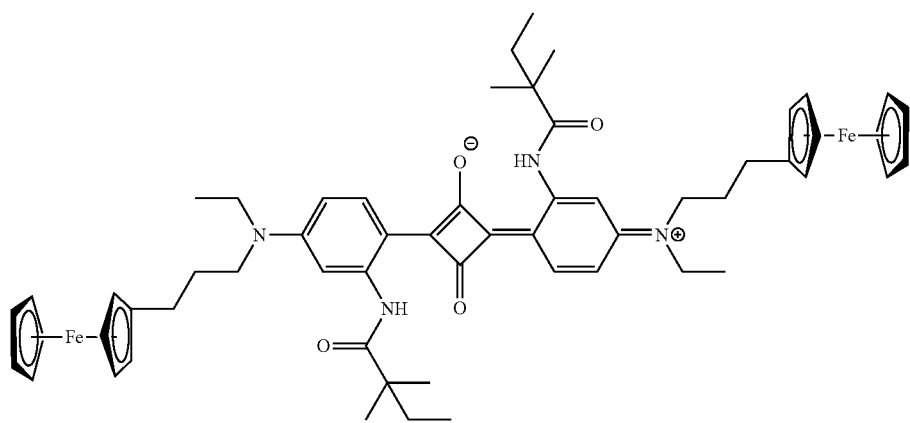
C-7
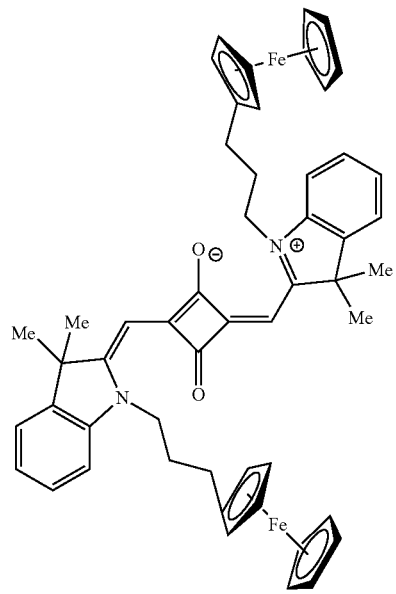
C-8

C-9
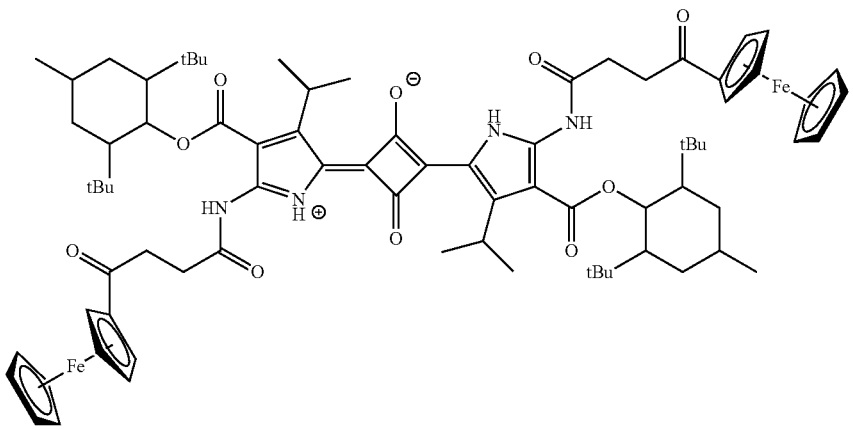
C-10
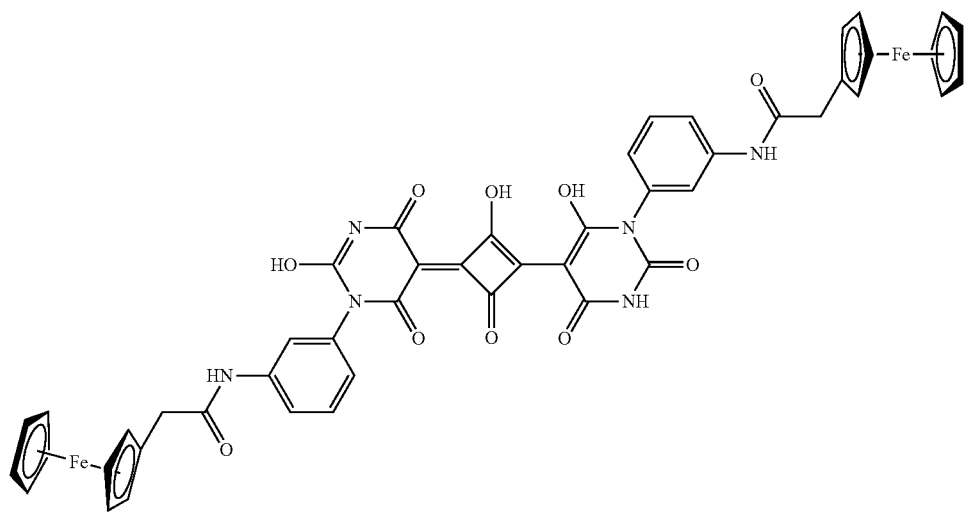
C-11
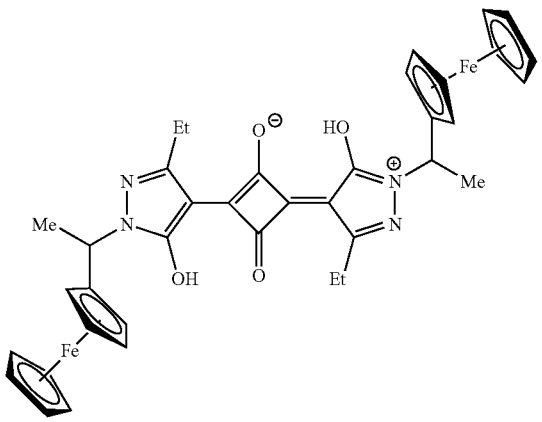
C-12
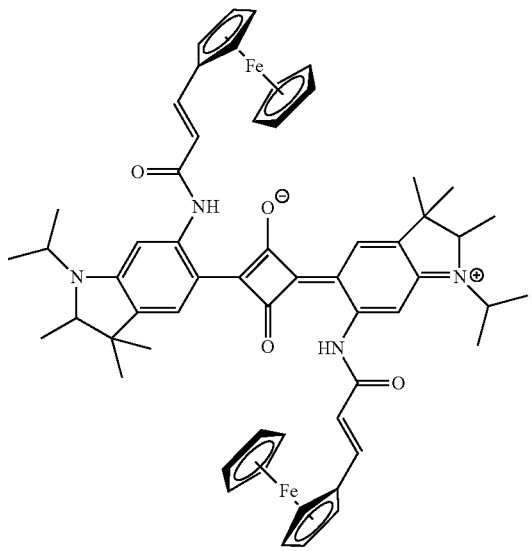

C-13
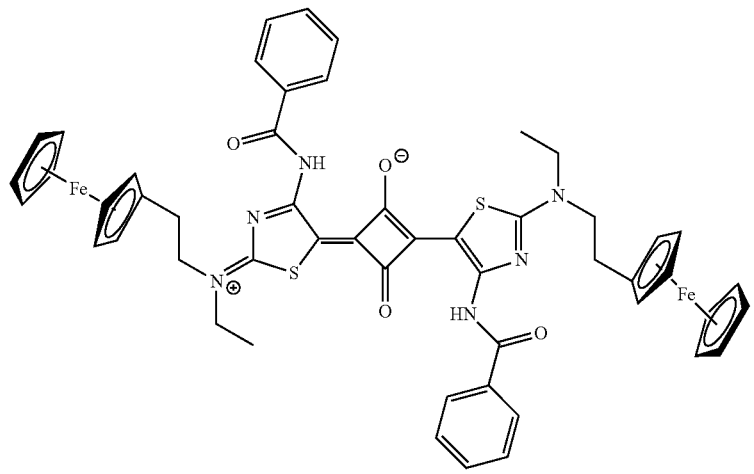
C-14
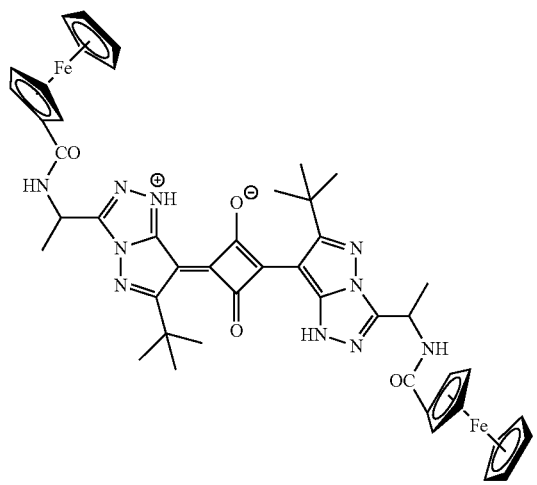
C-15
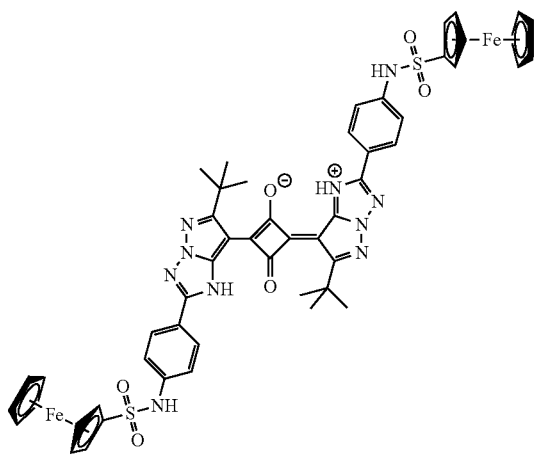
C-16
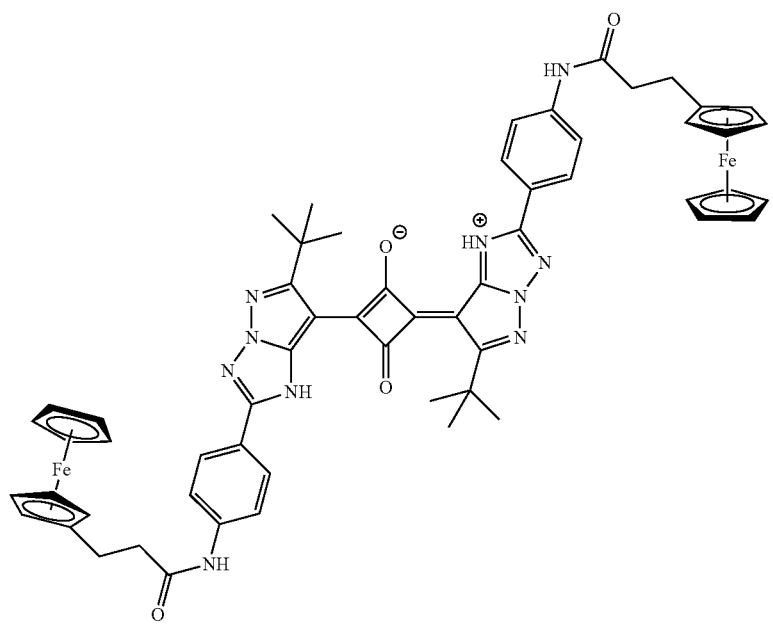

-continued
C-17
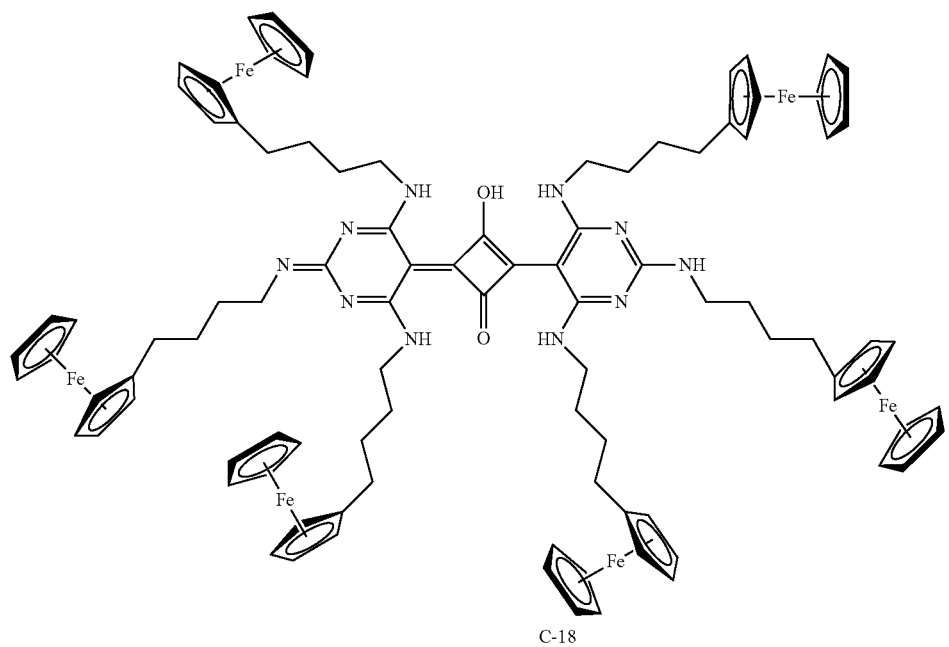
C-18
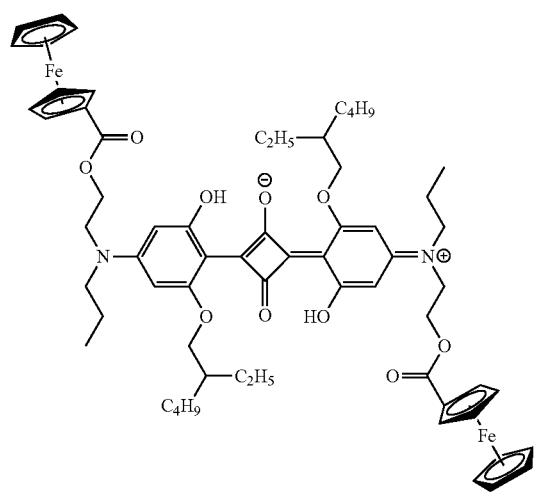
C-19
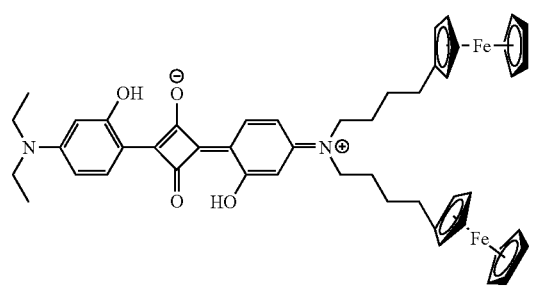
C-20
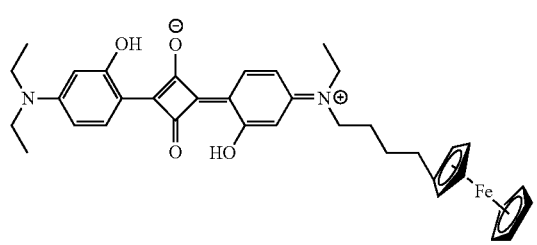
C-21
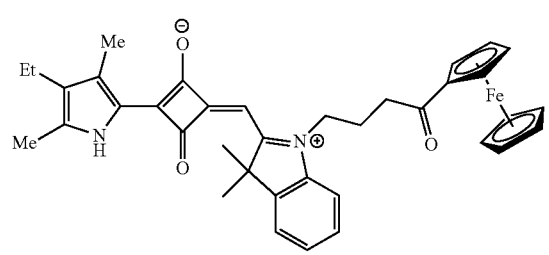
C-22
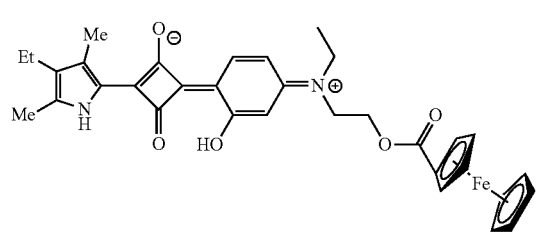
C-23
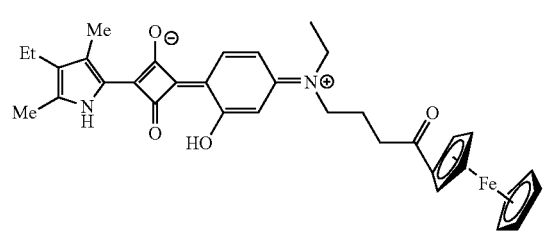

-continued
C-24
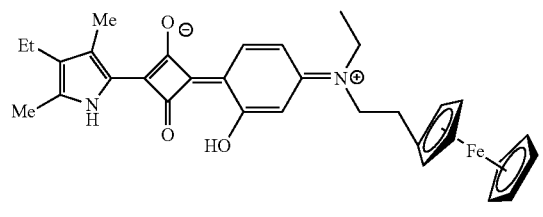
C-25
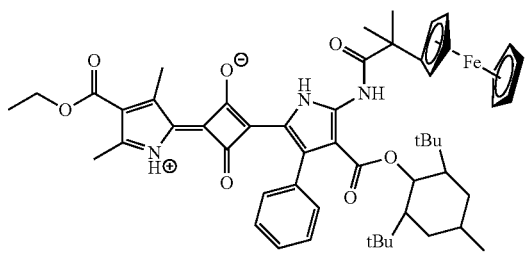
C-26
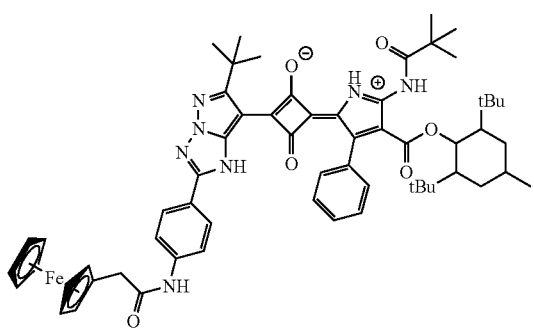
C-27
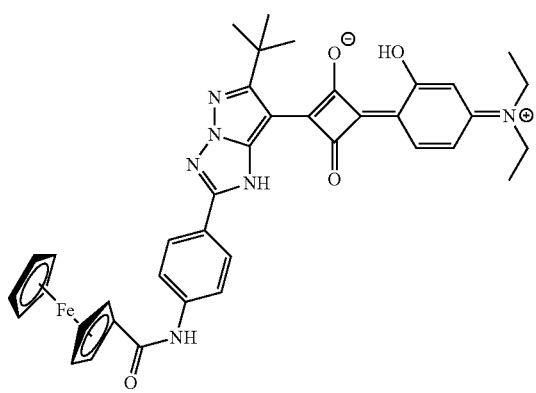
C-28
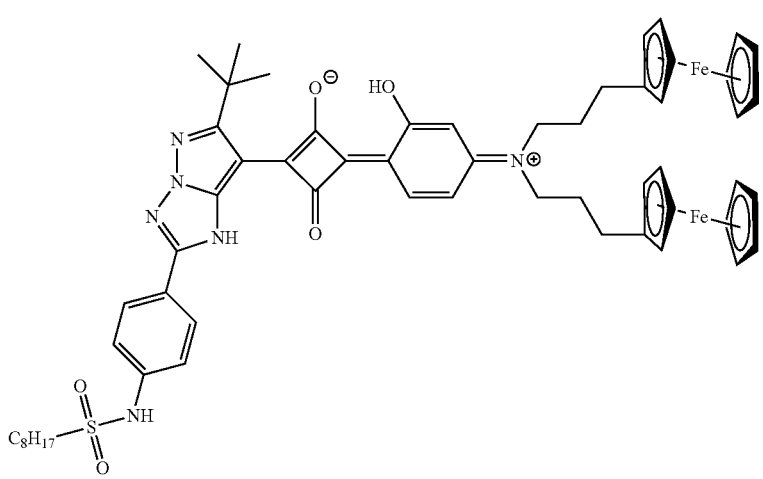

-continued
C-29
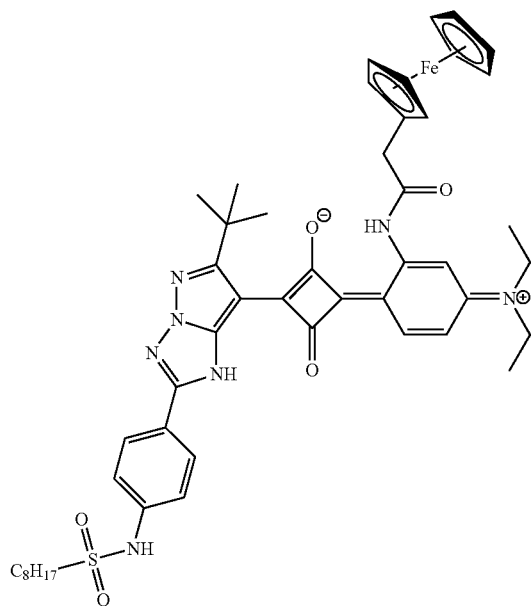
C-30
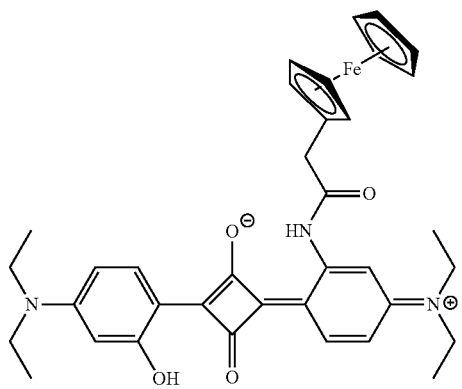
C-31
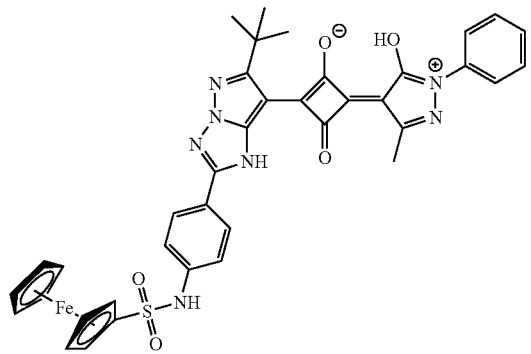
C-32
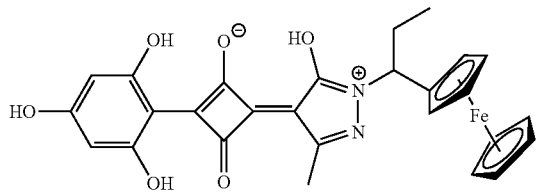
C-33
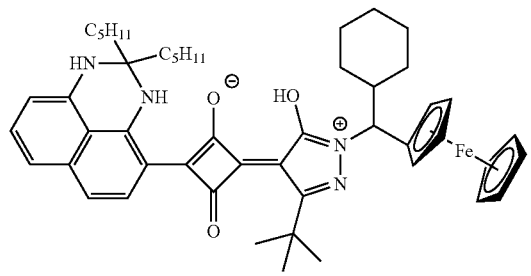
C-34
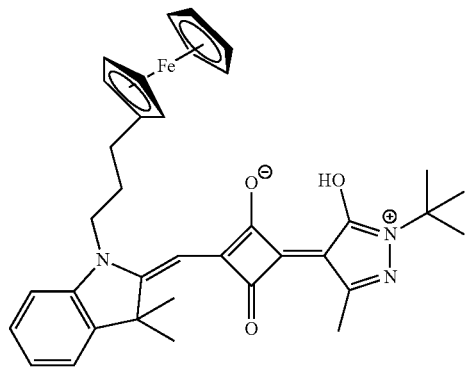

C-35
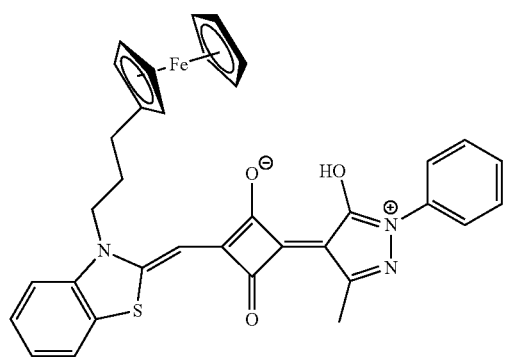
C-36
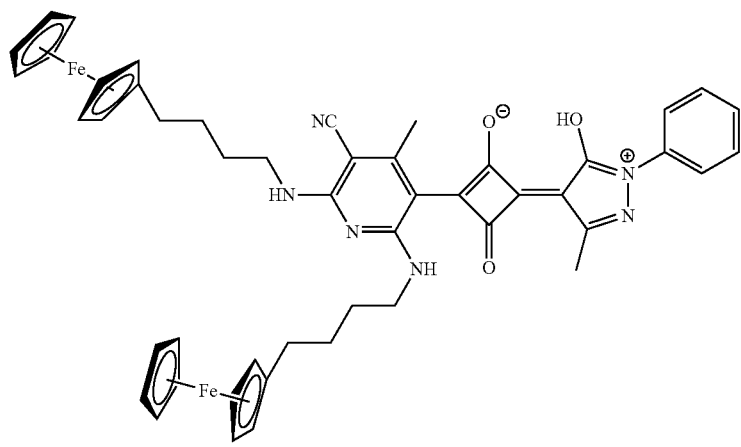
C-37
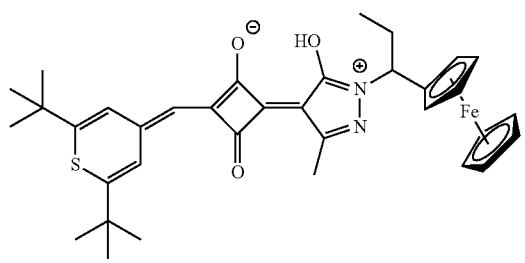
C-38
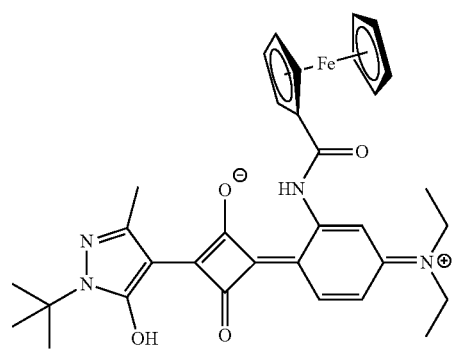

139 140
-continued
C-39
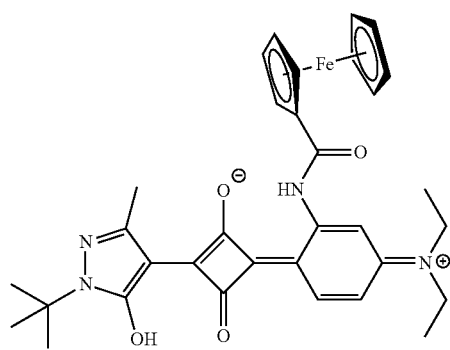
C-40
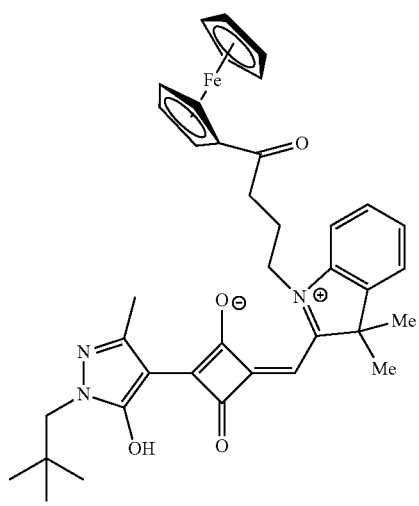
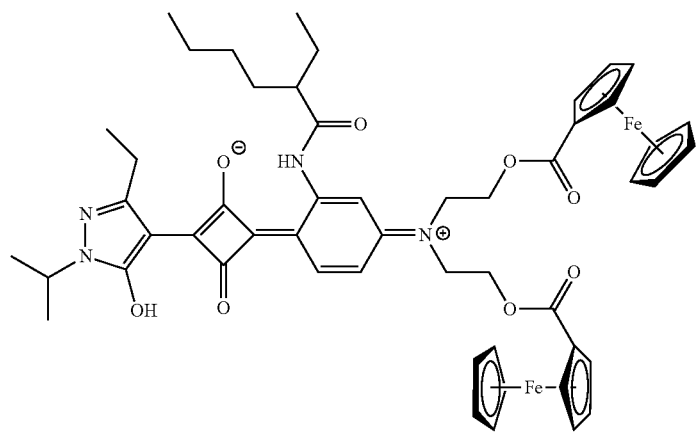
C-41
C-42
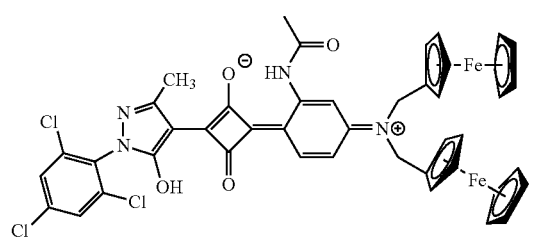
C-43
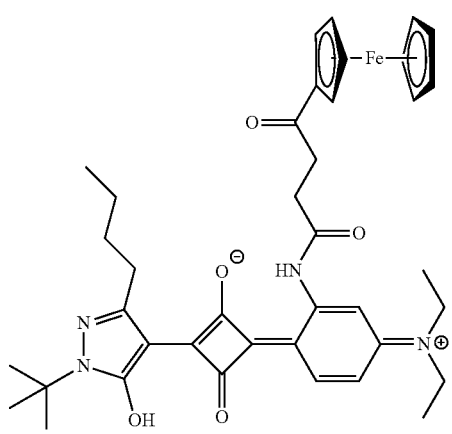

-continued
C-44
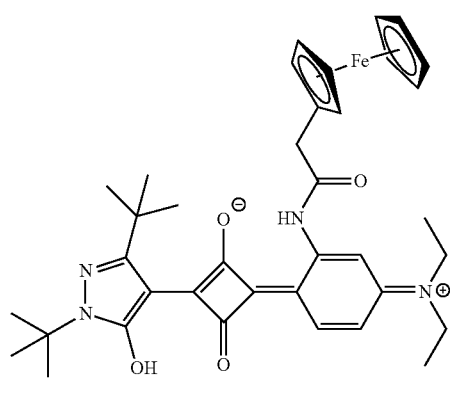
C-45
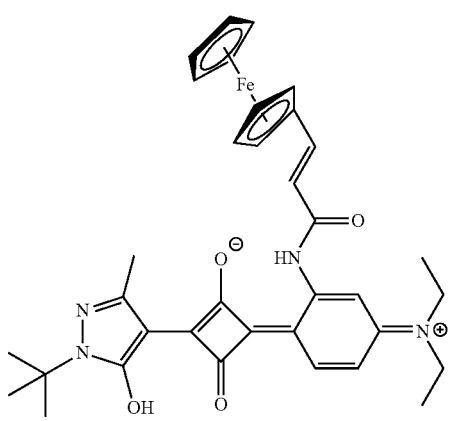
C-46
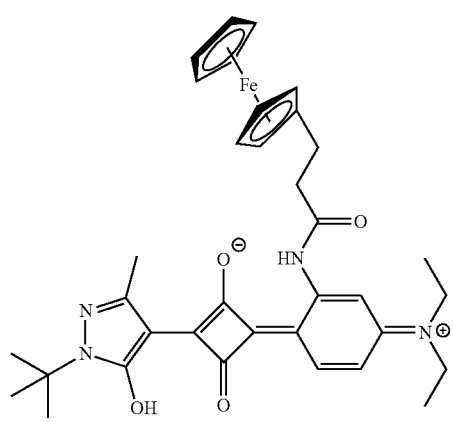
C-47
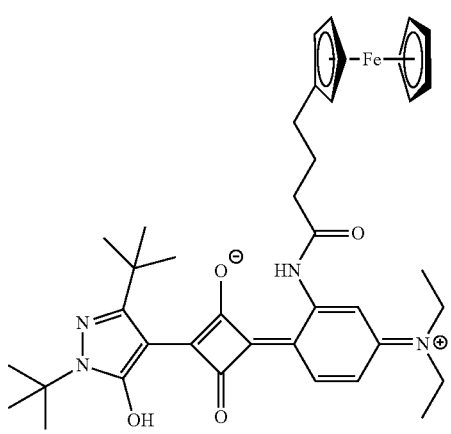
C-48
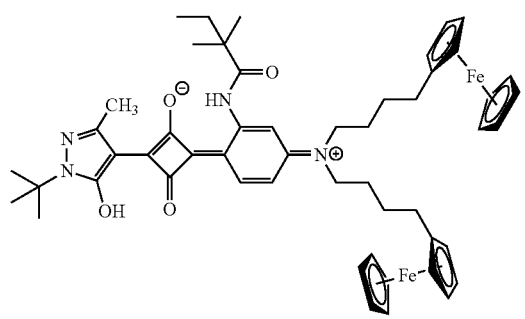
C-49
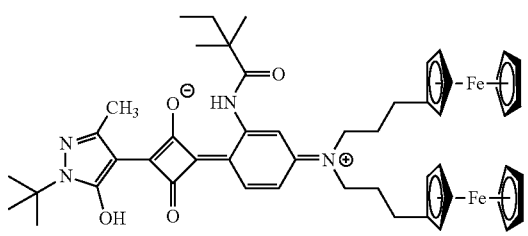
C-50
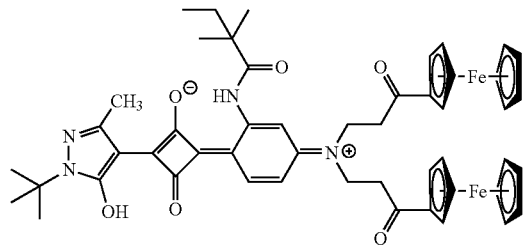
C-51
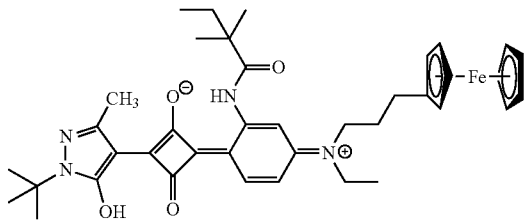

-continued
C-52
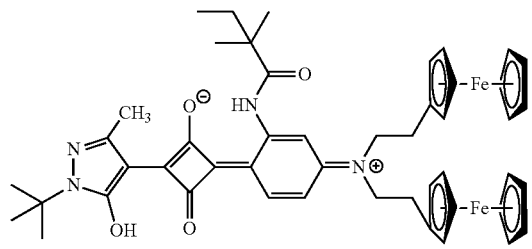
C-53
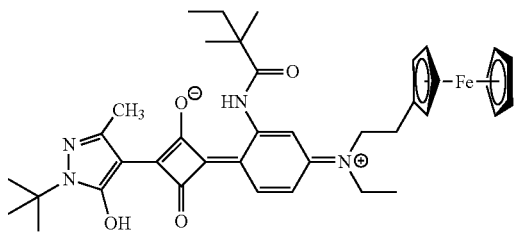
C-54
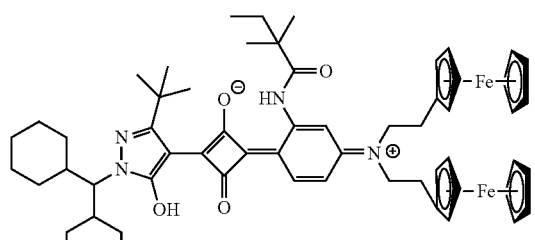
C-55
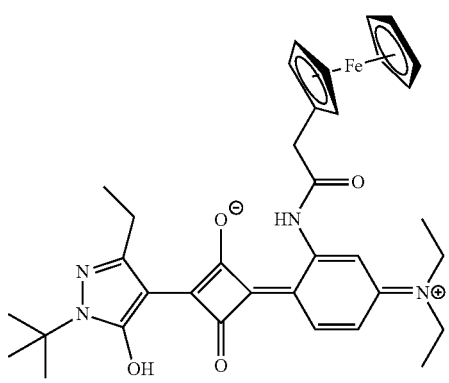
C-56
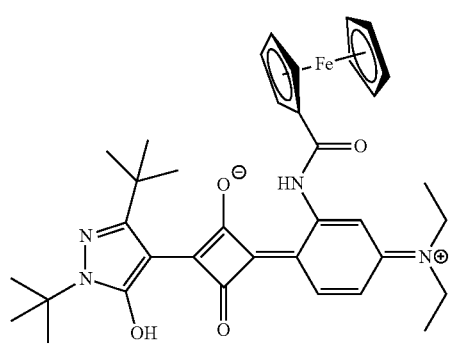
C-57
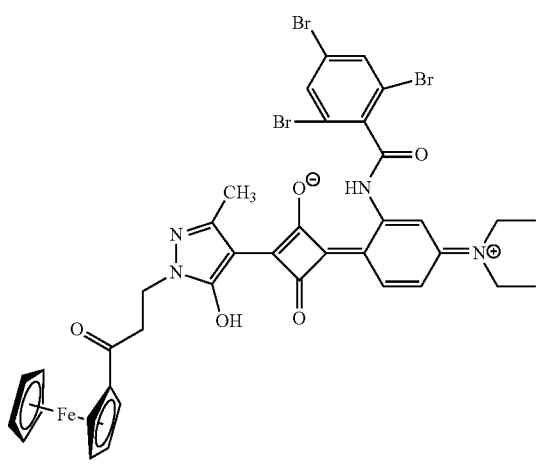
C-58
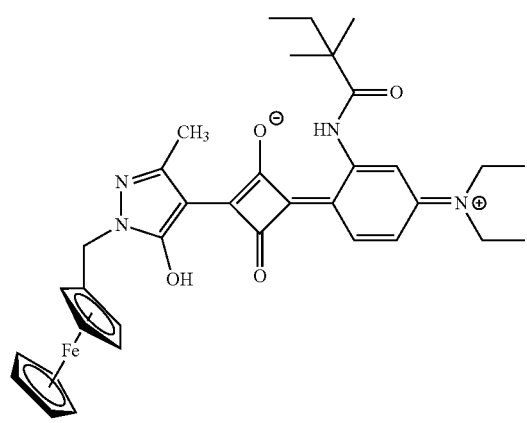
C-59
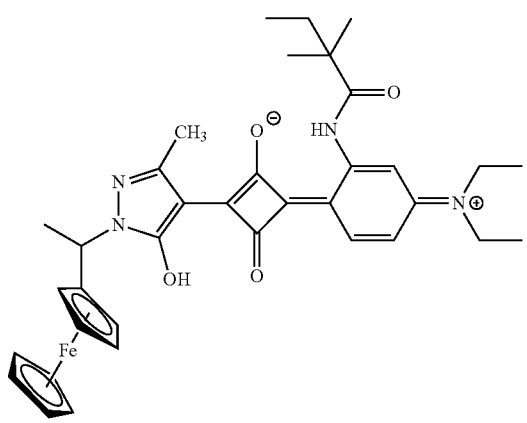

-continued
C-60
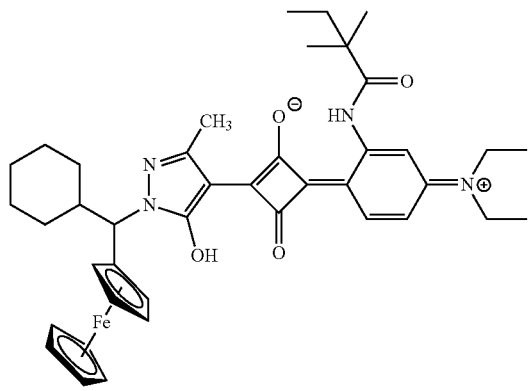
C-61
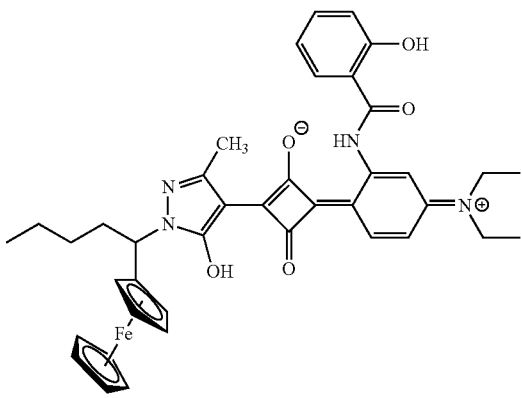
C-62
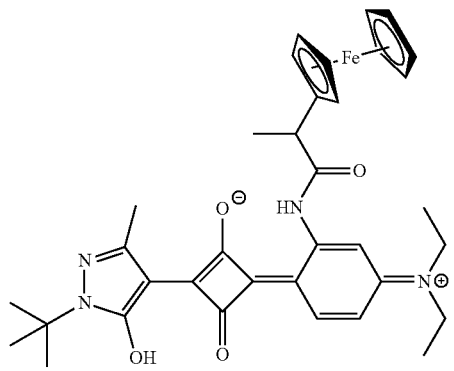
C-63
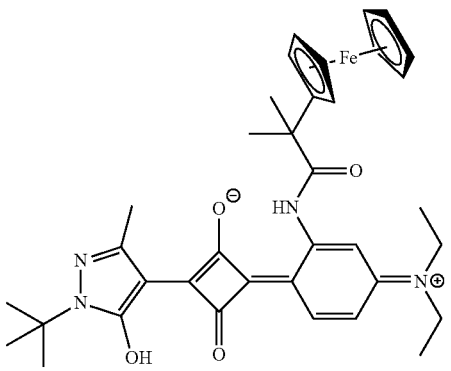
C-64
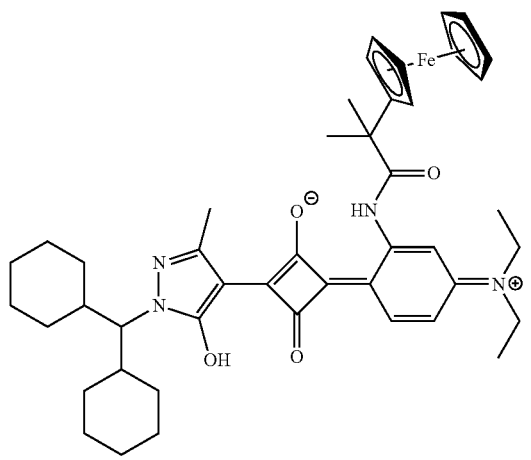
C-65
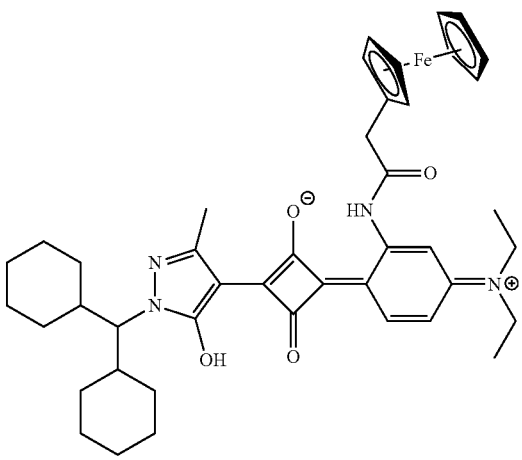
C-66
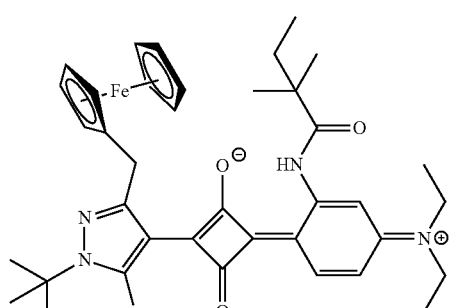
C-67
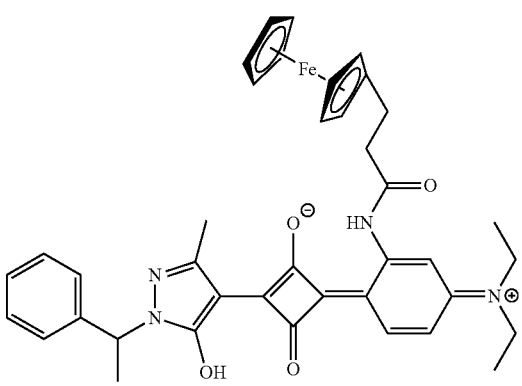

-continued
C-68
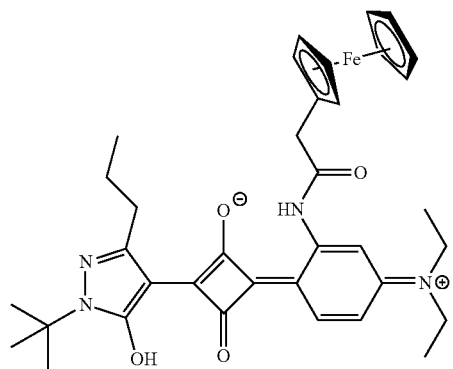
C-69
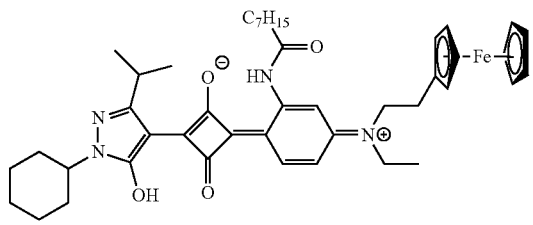
C-70
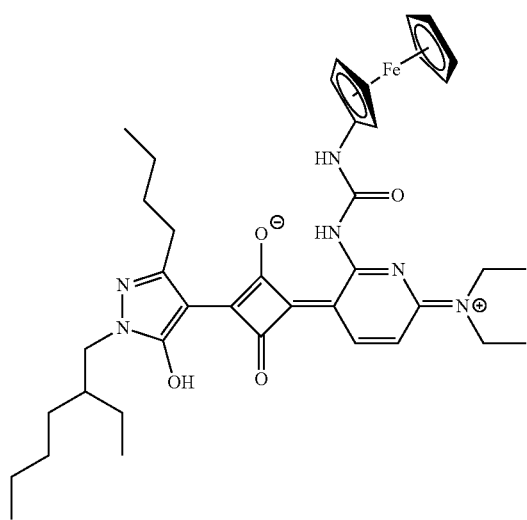
C-71
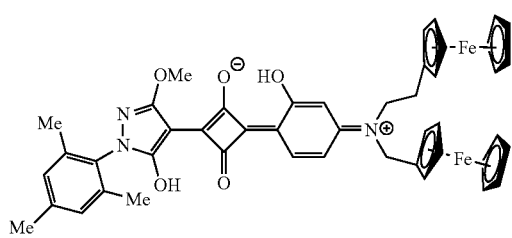
C-72
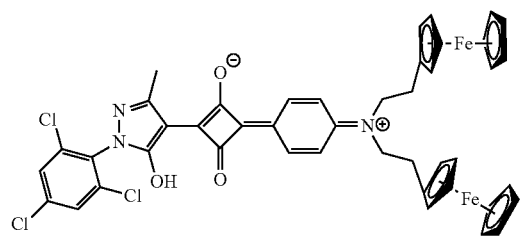
C-73
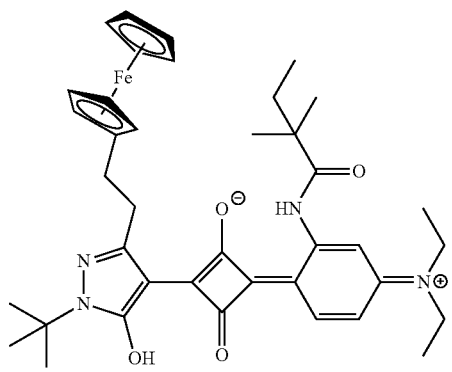

-continued

C-74
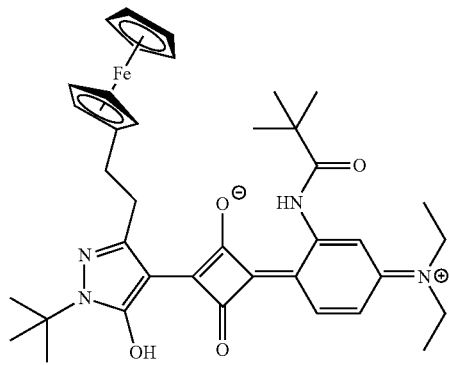

C-75
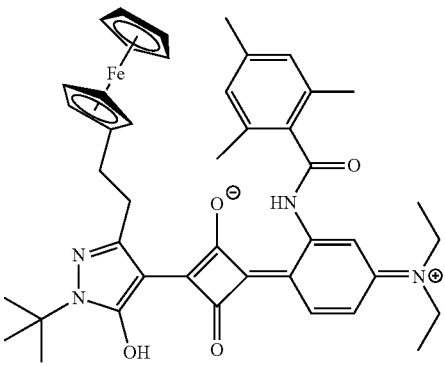

C-76
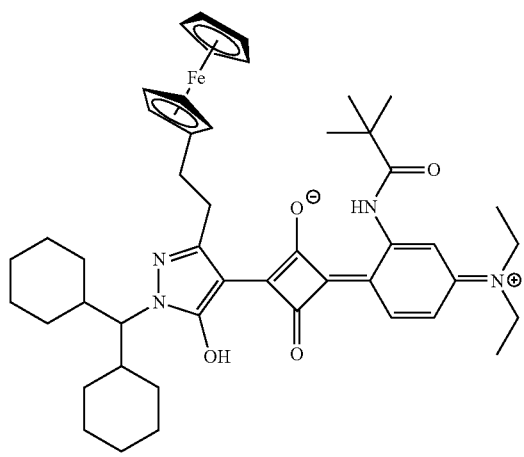

C-77
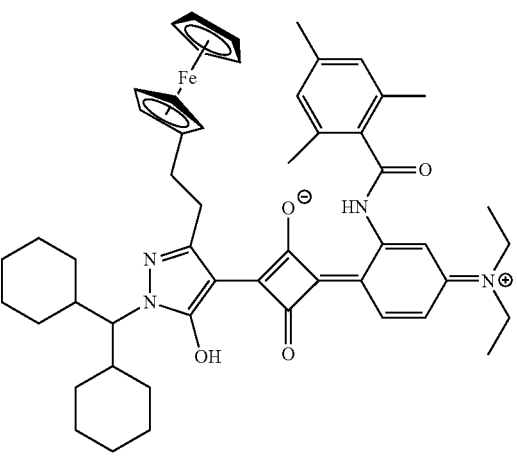

C-78
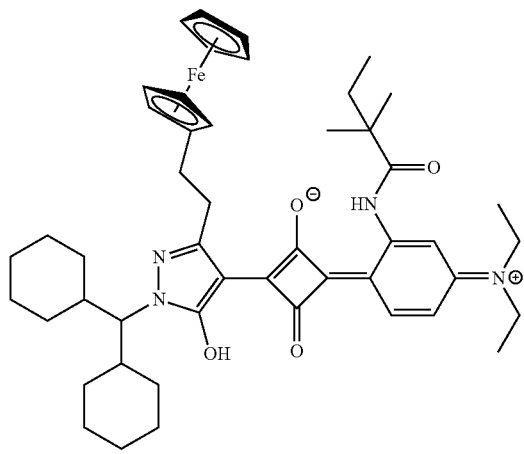

C-79
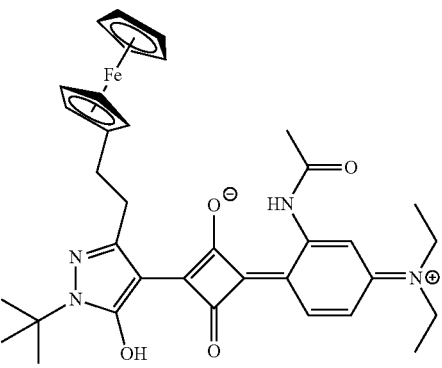

In the case of using the polarization degree-improving agent-containing coloring agent, the content of the polarization degree-improving agent-containing coloring agent in the polarizing plate protective film is set to the content of the coloring agent having an absorption maximum wavelength in a range of 560 to 620 nm or 460 to 520 nm. The content of this polarization degree-improving agent-containing coloring agent needs to be 0.1 parts by mass or more with respect to 100 parts by mass of the resin forming the polarizing plate protective film.

(Discoloration Preventer)

The polarizing plate protective film of the embodiment of the present invention preferably contains a discoloration preventer. As the discoloration preventer that is used in the present invention, it is possible to use an antioxidant described in Paragraphs [0143] to [0165] of WO2015/005398A, a radical trapping agent described in Paragraphs [0166] to [0199] of WO2015/005398A, and deterioration inhibitors described in Paragraphs [0205] and [0206] of WO2015/005398A.

A compound represented by General Formula (IV) can be preferably used as the discoloration preventer that is used in the polarizing plate protective film of the embodiment of the present invention.

General Formula (IV)

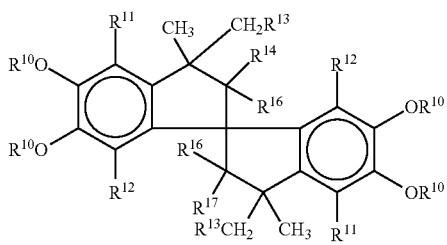

In Formula (IV), $R^{10}$ represents an alkyl group, an alkenyl group, an aryl group, an aralkyl group, a heterocyclic group, $R^{18}CO—$, $R^{19}SO_2—$, or $R^{20}NHCO—$. Here, $R^{18}$, $R^{19}$, and $R^{20}$ each represent an alkyl group, an alkenyl group, an aryl group, or a heterocyclic group. $R^{11}$ and $R^{12}$ each independently represent a hydrogen atom, a halogen atom, an alkyl group, an alkenyl group, an alkoxy group, or an alkenoxy group, and $R^{13}$, $R^{14}$, $R^{15}$, $R^{16}$, and $R^{17}$ each independently represent a hydrogen atom, an alkyl group, an alkenyl group, or an aryl group.

As the alkyl group represented by $R^{10}$ in Formula (IV), for example, methyl, ethyl, propyl, benzyl, and the like are exemplified; as the alkenyl group, for example, allyl and the like are exemplified; as the aryl group, for example, phenyl and the like are exemplified; as the aralkyl group, for example, benzyl and the like are exemplified; as the heterocyclic group, for example, tetrahydropyranyl, pyrimidyl, and the like are exemplified. In addition, $R^{18}$, $R^{19}$, and $R^{20}$ each independently represent an alkyl group (for example, methyl, ethyl, n-propyl, n-butyl, benzyl, or the like), an alkenyl group (for example, allyl or the like), an aryl group (for example, phenyl, methoxyphenyl, or the like), or a heterocyclic group (for example, pyridyl, pyrimidyl, or the like).

As the halogen atom represented by $R^{11}$ or $R^{12}$ in Formula (IV), for example, chlorine, bromine, and the like are exemplified; as the alkyl group, for example, methyl, ethyl, n-butyl, benzyl, and the like are exemplified; as the alkenyl group, for example, allyl and the like are exemplified; as the alkoxy group, for example, methoxy, ethoxy, benzyloxy, and the like are exemplified; as the alkenoxy group, for example, 2-propenyloxy and the like are exemplified.

As the alkyl group represented by $R^{13}$, $R^{14}$, $R^{15}$, $R^{16}$, or $R^{17}$ in Formula (IV), for example, methyl, ethyl, n-butyl, benzyl, and the like are exemplified; as the alkenyl group, for example, 2-propenyl and the like are exemplified; as the aryl group, for example, phenyl, methoxyphenyl, chlorophenyl and the like are exemplified.

$R^{10}$ to $R^{20}$ may further have a substituent, and, as the substituent, the respective groups represented by $R^{10}$ to $R^{20}$ are exemplified.

Specific examples of a compound represented by General Formula (IV) will be shown.

General Formula (IV)

IV-1

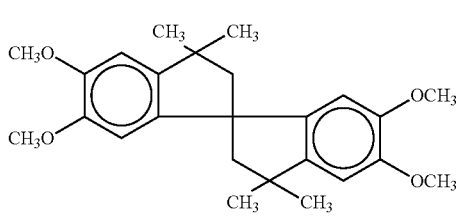

IV-2

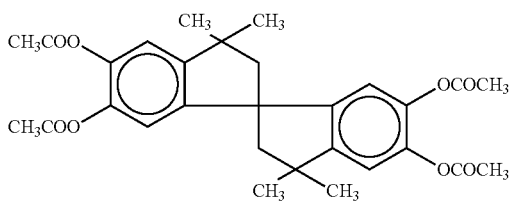

IV-3

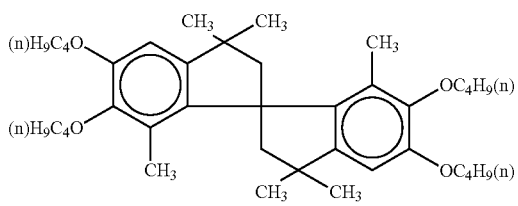

IV-4

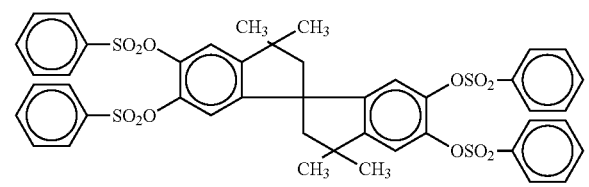

IV-5

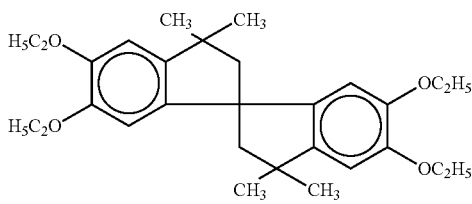

IV-6

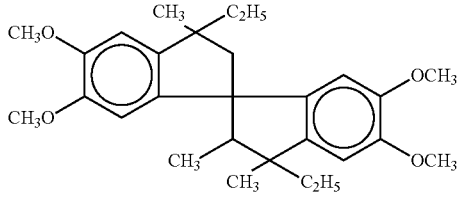

IV-7

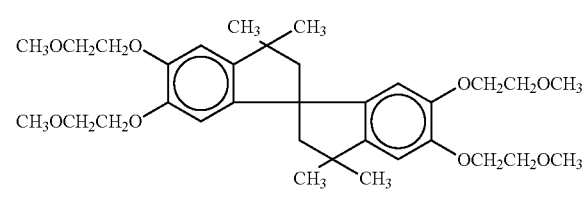

IV-8

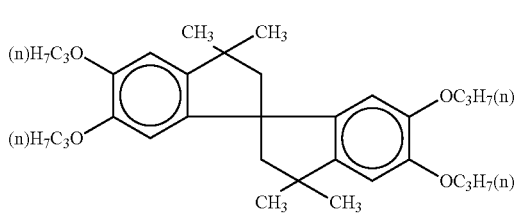

IV-9

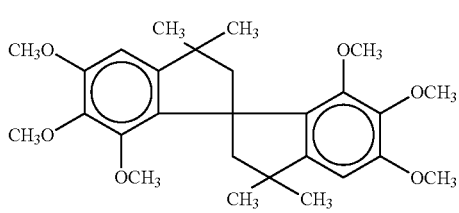

A compound represented by General Formula [III] can also be preferably used as the discoloration preventer that is used in the present invention.

General Formula [III]

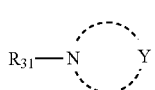

In General Formula [III], $R_{31}$ represents an aliphatic group or an aromatic group, and Y represents a non-metallic atom necessary to form a five-membered or seven-membered ring together with a nitrogen atom.

Next, in General Formula [III], $R_{31}$ represents an aliphatic group or an aromatic group and is preferably an alkyl group, an aryl group, or a heterocyclic group and most preferably an aryl group. As a heterocycle that is formed by Y together with a nitrogen atom, a piperidine ring, a piperazine ring, a morpholine ring, a thiomorpholine ring, a thiomorpholine-1,1-dione ring, a pyrrolidine ring, an imidazolidine ring, and the like are exemplified.

In addition, the heterocycle may further have a substituent, and, as the substituent, an alkyl group, an alkoxy group, and the like are exemplified.

Hereinafter, specific examples of the compound represented by General Formula [III] will be shown.

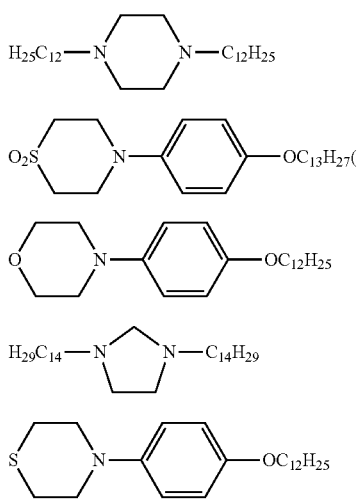

In addition to the above-shown specific examples, as specific examples of the compound represented by General Formula [III], exemplary compounds B-1 to B-65 described in pp. 8 to 11 of the specification of JP1990-167543A (JP-H2-167543A), exemplary compounds (1) to (120) described in pp. 4 to 7 of the specification of JP1988-095439A (JP-S63-095439A), and the like can be exemplified.

The content of the discoloration preventer in the polarizing plate protective film of the embodiment of the present invention is preferably 0% to 20% by mass, more preferably 0% to 5% by mass, still more preferably 0% to 3% by mass, and particularly preferably 0% to 2% by mass. In a case where the amount of the discoloration preventer added is controlled to the above-described upper limit value or less, it is possible to improve the fastness of the coloring agent without causing any adverse effects such as the discoloration of the polarizing plate protective film.

(Matting Agent)

It is preferable to add fine particles to the surface of the polarizing plate protective film of the embodiment of the present invention in order to impart a sliding property or prevent blocking. As these fine particles, silica (silicon dioxide, $SiO_2$) which has a surface coated with a hydrophobic group and has a secondary particle form is preferably used. As the fine particles, together with silica or instead of silica, fine particles of titanium dioxide, aluminum oxide, zirconium oxide, calcium carbonate, talc, clay, calcined kaolin, calcined calcium silicate, hydrated calcium silicate, aluminum silicate, magnesium silicate, calcium phosphate, or the like may be used. As commercially available products of the fine particles, trade name R972 or NX90S (all manufactured by Nippon Aerosil Co., Ltd.) and the like are exemplified.

These fine particles function as a so-called matting agent, the addition of the fine particles forms fine protrusions and recesses on a film surface, and these protrusions and recesses prevent attachments of films even in a case where the films overlap each other, and a sliding property of the films is ensured. An effect for improving the sliding property and the blocking property is significant particularly in a case where there are, in a square millimeter, $10^4$ particles/$nm^2$ or more protrusions having a height of 30 nm or more as the fine protrusions and recesses generated by protrusions formed by the fine particles protruding from the film surface at this time.

The fine particles of the matting agent are preferably imparted to a surface layer in order to improve the blocking property and the sliding property. As a method for imparting the fine particles to the surface layer, means such as multi-layer casting or coating is exemplified.

The content of the matting agent in the polarizing plate protective film is appropriately adjusted depending on the purpose.

(Leveling Agent)

A leveling agent (surfactant) can be appropriately mixed into the polarizing plate protective film of the embodiment of the present invention. As the leveling agent, well-known compounds in the related art are exemplified, and, particularly, a fluorine-containing surfactant is preferred. Specific examples thereof include a compound described in Paragraphs [0028] to [0056] in the specification of JP2001-330725A.

The content of the leveling agent in the polarizing plate protective film is appropriately adjusted depending on the purpose.

In addition to the respective components described above, the polarizing plate protective film of the embodiment of the present invention may contain a low-molecular-weight plasticizer, an oligomer-based plasticizer, a retardation adjuster, an ultraviolet absorber, a deterioration inhibitor, a peeling accelerator, an infrared absorber, an antioxidant, a filler, a compatibilizing agent, and the like.

<Method for Manufacturing Polarizing Plate Protective Film>

The polarizing plate protective film of the embodiment of the present invention can be produced using a solution film formation method, a melt extrusion method, or a method in which a coating layer is formed on a base material film (mold release film) using a well-known method (coating method), which are all well known, and stretching can also be appropriately combined therewith. The polarizing plate protective film of the embodiment of the present invention is preferably produced using a coating method.

(Solution Film Formation Method)

In the solution film formation method, a solution is prepared by dissolving a material of the polarizing plate protective film in an organic solvent or water, a condensation step, a filtration step, or the like is appropriately carried out, and then, the solution is uniformly cast on a support. Next, the half-dry film is peeled off from the support, and the solvent is dried in a drying zone by appropriately grasping both ends of a web using clips or the like. In addition, stretching can also be separately carried out in the middle of or after the drying of the film.

(Melt Extrusion Method)

In the melt extrusion method, the material of the polarizing plate protective film is melted by heat, a filtration step or the like is appropriately carried out, and then the material is uniformly cast on a support. Next, a cooled and fixed film can be peeled off and appropriately stretched. In a case where the main material of the polarizing plate protective film of the embodiment of the present invention is a thermoplastic polymer resin, it is possible to select a thermoplastic polymer resin as the main material of a base material film and form a film of the polymer resin in a molten state using a well-known co-extrusion method. At this time, the adhesive force between the polarizing plate protective film and the base material film can be controlled by adjusting the kinds of the polymers of the polarizing plate protective film and the base material film and additives that are mixed into the respective layers or adjusting the stretching temperature, stretching speed, stretching ratio, and the like of the co-extruded film.

As the co-extrusion method, for example, a co-extrusion T die method, a co-extrusion inflation method, a co-extrusion lamination method, and the like are exemplified. Among these, a co-extrusion T die method is preferred. As the co-extrusion T die method, there are a feed block method and a multi-manifold method. Between these, a multi-manifold method is particularly preferred since it is possible to reduce the variation in thickness.

In the case of employing the co-extrusion T die method, the melting temperature of the resin in an extruder having a T die is preferably set to equal to or higher than a temperature 80° C. higher and more preferably set to equal to or higher than a temperature 100° C. higher and preferably set to equal to or lower than a temperature 180° C. higher and more preferably set to equal to or lower than a temperature 150° C. higher than the glass transition temperatures (Tg) of the respective resins. In a case where the melting temperature of the resin in the extruder is set to equal to or higher than the lower limit value of the above-described range, it is possible to sufficiently enhance the fluidity of the resin, and, in a case where the melting temperature is set to equal to or lower than the upper limit value, it is possible to prevent the deterioration of the resin.

Generally, the sheet-shaped molten resin extruded from an opening portion of the die is caused to adhere to a cooling drum. A method for causing the molten resin to adhere to the cooling drum is not particularly limited, and, for example, an air knife method, a vacuum box method, an electrostatic adhesion method, and the like are exemplified.

The number of the cooling drums is not particularly limited, but is generally two or more. In addition, as a method for disposing the cooling drums, for example, linear disposition, Z disposition, L disposition, and the like are exemplified, but there is no particular limitation. In addition, a method for passing the molten resin extruded from the opening portion of the die through the cooling drums is also not particularly limited.

A jig for causing the extruded sheet-shaped resin to adhere to the cooling drums changes depending on the temperature of the cooling drum. In a case where the temperature of the cooling drum increases, the resin favorably adheres to the cooling drums; however, in a case where the temperature is excessively increased, there is a possibility that the sheet-shaped resin may not be peeled from the cooling drums and may be wound around the drums. Therefore, in a case where the glass transition temperature of, among the resins that are extruded from the die, the resin in a layer that comes into contact with the drum is represented by Tg, the temperature of the cooling drum is preferably set to (Tg+30°) C or lower and more preferably set in a range of (Tg−5°) C to (Tg−45°) C. In such a case, it is possible to prevent disadvantages such as slipping and scratching.

Here, the content of a residual solvent in the film to be stretched is preferably decreased. As means for decreasing the content, for example, means such as (1) decreasing the residual solvent of the resin which serves as a raw material and (2) preliminarily drying the resin before shaping the film to be stretched are exemplified. The preliminary drying is carried out using, for example, a hot-air dryer or the like on the resin in a pellet form. The drying temperature is preferably 100° C. or higher, and the drying time is preferably two hours or longer. The preliminary drying enables a decrease in the residual solvent in the film to be stretched and, furthermore, the prevention of the extruded sheet-shaped resin from releasing bubbles.

(Coating Method)

In the coating method, a solution of a polarizing plate protective film material is applied to the base material film, and a coating layer is formed. On the surface of the base material, an appropriate mold release agent or the like may be applied in advance in order to control the adhesiveness with the coating layer. The coating layer can be laminated with a polarizing layer through an adhesive layer in a post step and then used after the base material film is peeled off. Every base material film can be appropriately stretched in a state in which a polymer solution or the coating layer is laminated on the base material film.

A solvent that is used in the solution of the polarizing plate protective film material can be appropriately selected from the viewpoint of the fact that the solvent is capable of dissolving or dispersing the polarizing plate protective film material, the fact that a uniform surface property is easily obtained in an application step, a drying step, or the like, the fact that liquid preservability can be ensured, the fact that the solvent has an appropriate saturated vapor pressure, and the like.

—Addition of Coloring Agent—

The timing of the coloring agent being added to the polarizing plate protective film material is not particularly limited as long as the coloring agent is added thereto at the time of forming a film. For example, the coloring agent may be added thereto at the time of synthesizing the matrix resin or the coloring agent may be mixed with the polarizing plate protective film material at the time of preparing a coating fluid of the polarizing plate protective film material.

—Base Material Film—

Regarding the base material film that is used to form the polarizing plate protective film in the coating method or the like, the film thickness is preferably 5 to 100 μm, more preferably 10 to 75 μm, and still more preferably 15 to 55 μm. In a case where the film thickness is 5 μm or more, a sufficient mechanical strength is easily ensured, and defects such as curling, wrinkles, and buckling are not easily caused, which is preferable. In addition, in a case where the film thickness is 100 μm or less, it is easy to adjust the surface pressure being applied to a multilayer film of the polarizing plate protective film of the embodiment of the present invention and the base material film in an appropriate range in the case of storing the multilayer film in, for example, a long roll form, and defects in adhesion is not easily caused, which is preferable.

The surface energy of the base material film is not particularly limited, but it is possible to adjust the adhesive force between the polarizing plate protective film and the base material film by adjusting the relationship between the surface energy of the material of the polarizing plate protective film or the coating solution and the surface energy of the surface of the base material film on which the polarizing plate protective film is to be formed. In a case where the surface energy difference is decreased, there is a tendency that the adhesive force increases; in a case where the surface energy difference increases, there is a tendency that the adhesive force decreases, and it is possible to appropriately set the surface energy difference.

The surface energy of the base material film can be calculated from the contact angle values of water and methylene iodide using the Owens method. In the measurement of the contact angles, it is possible to use, for example, DM901 (manufactured by Kyowa Interface Science Inc., contact angle meter).

The surface energy of the base material film on the side on which the polarizing plate protective film is formed is preferably 41.0 to 48.0 mN/m and more preferably 42.0 to 48.0 mN/m. In a case where the surface energy is 41.0 mN/m or more, the uniformity of the thickness of the polarizing plate protective film is enhanced, which is preferable, and, in a case where the surface energy is 48.0 mN/m or less, it is easy to control the peel force of the polarizing plate protective film from the base material film in an appropriate range, which is preferable.

In addition, the surface unevenness of the base material film is not particularly limited, but it is possible to adjust the surface unevenness depending on the relationship between the surface energy, hardness, and surface unevenness of the surface of the polarizing plate protective film, the surface energy and hardness of a surface of the base material film opposite to the side on which the polarizing plate protective film is to be formed for the purpose of preventing adhesion defect, for example, in the case of storing the multilayer film of the present invention in a long roll form. In a case where the surface unevenness is increased, there is a tendency that adhesion defect is suppressed; in a case where the surface unevenness is decreased, there is a tendency that the surface unevenness of the polarizing plate protective film decreases and the haze of the polarizing plate protective film becomes small, and the surface unevenness can be appropriately set.

As such a base material film, it is possible to appropriately use a well-known material or film. As specific materials, a polyester-based polymer, a olefin-based polymer, a cycloolefin-based polymer, a (meth)acrylic polymer, a cellulose-based polymer, a polyamide-based polymer, and the like can be exemplified. In addition, it is possible to appropriately carry out a surface treatment for the purpose of adjusting the surface property of the base material film. In order to decrease the surface energy, it is possible to carry out, for example, a corona treatment, a normal-temperature plasma treatment, a saponification treatment, or the like, and, in order to increase the surface energy, it is possible to carry out a silicone treatment, a fluorine treatment, an olefin treatment, or the like.

—Peel Force Between Polarizing Plate Protective Film and Base Material Film—

In a case where the polarizing plate protective film that is used for the polarizing plate of the present invention is formed using the coating method, the peel force between the polarizing plate protective film and the base material film can be controlled by adjusting the material of the polarizing plate protective film, the material of the base material film, the internal distortion of the polarizing plate protective film, and the like. This peel force can be measured by, for example, a test in which the base material film is peeled off in a 90° direction, and the peel force at the time of being measured at a rate of 300 mm/minute is preferably 0.001 to 5 N/25 mm, more preferably 0.01 to 3 N/25 mm, and still more preferably 0.05 to 1 N/25 mm. In a case where the peel force is 0.001 N/25 mm or more, it is possible to prevent peeling in steps other than a peeling step of the base material film, and, in a case where the peel force is 5 N/25 mm or less, it is possible to prevent poor peeling (for example, zipping or the cracking of the polarizing plate protective film) in the peeling step.

<Film Thickness of Polarizing Plate Protective Film>

The film thickness of the polarizing plate protective film of the embodiment of the present invention is 1 to 18 μm, preferably 1 to 12 μm, and more preferably 2 to 8 μm. In the case of adding the coloring agent to a thin film at a high concentration, it is possible to suppress a decrease in polarization degree attributed to fluorescent light that is emitted from the coloring agent. In addition, the effect of the quencher or the discoloration preventer is also easily developed. In a case where the polarizing plate protective film is too thin, it becomes difficult to maintain the polarizing performance in the case of storing the polarizing plate protective film in a high-temperature and high-humidity environment for a long period of time.

In the present invention, the film thickness being 1 to 18 μm means that the thickness of the polarizing plate protective film is in a range of 1 to 18 m in the case of being measured in any portions. This is also true for the film thickness of 1 to 12 μm or 2 to 8 μm. The film thickness can be measured using an electronic micrometer manufactured by Anritsu.

<Absorbance of Polarizing Plate Protective Film>

The absorbance at a wavelength of 450 nm of the polarizing plate protective film of the embodiment of the present invention is preferably 0.05 or more and 3.0 or less. The absorbance is more preferably 0.01 or more and 2.0 or less and still more preferably 0.1 or more and 1.0 or less.

In addition, the absorbance at a wavelength of 590 nm is preferably 0.1 or more and 3.0 or less. The absorbance is more preferably 0.2 or more and 2.0 or less and still more preferably 0.3 or more and 1.5 or less.

In a case where a polarizing plate including a polarizing plate protective film having an absorbance adjusted in the above-described range is combined into a liquid crystal display device, display performance of a high brightness and favorable color reproducibility can be obtained.

The absorbance of the polarizing plate protective film of the embodiment of the present invention can be adjusted using the kind and the amount added of the coloring agent.

<Moisture Content of Polarizing Plate Protective Film>

Regardless of the film thickness, the moisture content of the polarizing plate protective film of the embodiment of the present invention is preferably 0.5% by mass or less and more preferably 0.3% by mass or less under conditions of 25° C. and a relative humidity of 80% from the viewpoint of durability in the case of attaching the polarizing plate protective film to the polarizer.

In the present specification, the moisture content of the polarizing plate protective film can be measured using a specimen having a film thickness thickened as necessary. The humidity of the specimen is adjusted for 24 hours or longer, then, the moisture content is measured in a moisture measurement instrument and a specimen drying device "CA-03" and "VA-05" (both manufactured by Mitsubishi Chemical Corporation) using the Karl Fischer method, and the amount (g) of moisture is divided by the mass (g, including the amount of moisture) of the specimen, whereby the moisture content can be computed.

<Glass Transition Temperature (Tg) of Polarizing Plate Protective Film>

The glass transition temperature (Tg) of the polarizing plate protective film of the embodiment of the present invention is preferably 50° C. or higher and 140° C. or lower. The glass transition temperature is more preferably 60° C. or higher and 130° C. or lower and still more preferably 70° C. or higher and 120° C. or lower. In a case where the glass transition temperature is too low, there is a problem of the deterioration of the polarizer that has been used at a high temperature. In addition, in a case where the glass transition temperature is too high, there is a problem in that an organic solvent used in a coating fluid is likely to remain in the polarizing plate protective film.

The glass transition temperature (Tg) of the polarizing plate protective film of the embodiment of the present invention can be measured using the following method.

In a differential scanning calorimetry device (X-DSC7000 (manufactured by IT Measurement Control Co., Ltd.)), the polarizing plate protective film (20 mg) is put into a measurement pan, heated up to 120° C. from 30° C. at a rate of 10° C./minute in a nitrogen stream, held for 15 minutes, and then cooled to 30° C. at −20° C./minute. After that, again, the polarizing plate protective film is heated up to 250° C. from 30° C., and a temperature at which the baseline begins to deviate from the low-temperature side is regarded as the glass transition temperature Tg.

The glass transition temperature of the polarizing plate protective film of the embodiment of the present invention can be adjusted by mixing two or more kinds of polymers having different glass transition temperatures or changing the amount of a low-molecular-weight compound such as the discoloration preventer added.

<Treatment of Polarizing Plate Protective Film>

On the polarizing plate protective film, it is preferable to carry out a hydrophilization treatment by a well-known glow discharge treatment, corona discharge treatment, alkali saponification treatment or the like, and the corona discharge treatment is most preferably used. Methods disclosed in JP1994-094915A (JP-H6-094915A) or JP1994-118232A (JP-H6-118232A) and the like are also preferably applied.

On a film to be obtained, it is possible to carry out a thermal treatment step, a superheated steam contact step, an organic solvent contact step, or the like as necessary. In addition, a surface treatment may be appropriately carried out.

[Polarizing Plate]

The polarizing plate of the embodiment of the present invention includes the polarizing plate protective film of the embodiment of the present invention. In more detail, the polarizing plate of the embodiment of the present invention has a polarizer (polarizing layer) and the polarizing plate protective film of the embodiment of the present invention on at least one surface of this polarizer. The polarizer and the polarizing plate protective film preferably adhere to each other through an adhesive layer.

<Polarizer (Polarizing Layer)>

The configuration of the polarizing layer is not particularly limited. For example, a polyvinyl alcohol film that has been immersed in an iodine solution and stretched can be used.

<Adhesive Layer>

The polarizing plate of the embodiment of the present invention is preferably a polarizing plate obtained by attaching the polarizing plate protective film and the polarizing layer through an adhesive layer. The film thickness of the adhesive layer is 1 to 10,000 nm, preferably 30 to 5,000 nm, and still more preferably 50 to 3,000 nm. In a case where the film thickness of the adhesive layer is set to 1 nm or more, it is possible to ensure the adhesiveness between the polarizing plate protective film and the polarizing layer, and, in a case where the film thickness is set to 10,000 nm or less, it is possible to decrease deformation defect.

The adhesive layer in the polarizing plate of the embodiment of the present invention preferably includes a water-soluble material. As described above, the polarizing plate protective film in the polarizing plate of the embodiment of the present invention has a high photoelastic coefficient. That is, it is considered that the polarizing plate protective film includes a material having a large dipole moment, and, the adhesive layer is made to be polar using a water-soluble material, whereby the interaction between the polarizing plate protective film and the adhesive layer becomes strong and the adhesiveness further improves.

Specifically, it is possible to directly attach the surface-treated surface of the polarizing plate protective film that is used in the polarizing plate of the embodiment of the present invention to a single surface or both surfaces of the polarizing layer using an adhesive made from an aqueous solution of a polyvinyl alcohol-based resin. As the adhesive, it is possible to use an aqueous solution of polyvinyl alcohol or polyvinyl acetal (for example, polyvinyl butyral) or an ultraviolet (UV)-curable adhesive, and an aqueous solution of fully saponified polyvinyl alcohol is most preferred.

A photocurable adhesive is also preferred as the adhesive that is used in the present invention. Hereinafter, the photocurable adhesive that is preferably used in the polarizing plate of the embodiment of the present invention will be described in detail.

(Photocurable Adhesive)

In the present invention, the photocurable adhesive for causing the polarizing plate protective film to adhere to the polarizer made of a polyvinyl alcohol film contains at least the following (A) and (B) and preferably contains three components (A) to (C).

(A) Photo-cation-curable component
(B) Photo-cationic polymerization initiator, and
(C) Photosensitizer —Photo-Cation-Curable Component (A)—

The photo-cation-curable component (A) that is a main component of the photocurable adhesive and imparts an adhesive force by polymerization curing preferably contains, among the following three compounds, at least (A1) and (A3) and may contain (A1) to (A3).

(A1) An alicyclic diepoxy compound represented by General Formula (XI)
(A2) An oxirane ring-containing epoxy cyclohexane compound represented by General Formula (XII), and
(A3) A diglycidyl compound represented by General Formula (XIII).

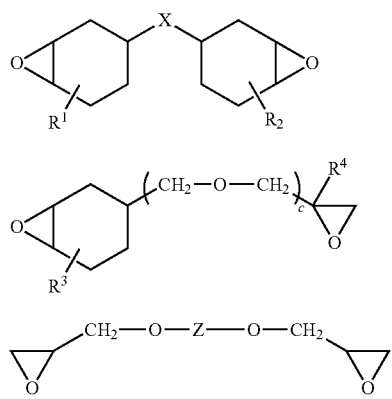

The amount of the alicyclic diepoxy compound (A1) in the photo-cation-curable component (A) is preferably 5% to 100% by mass and more preferably 10% to 70% by mass in the case of setting the total amount of the photo-cation-curable component (A) to 100% by mass. In a case where 5% to 100% by mass of the alicyclic diepoxy compound (A1) is contained in the photo-cation-curable component (A), it is possible to increase storage elastic modulus after the curing of the photocurable adhesive including the alicyclic diepoxy compound and prevent the cracking of the polarizer in the case of exposing the polarizing plate in which the polarizer and the polarizing plate protective film are attached to each other through the adhesive to a severe temperature history. In addition, in a case where the amount of the alicyclic diepoxy compound (A1) is set to 70% by mass or lower, the amount of the oxirane ring-containing epoxy cyclohexane compound (A2) and the diglycidyl compound (A3), which will be described below, becomes a preferred amount, the viscosity of the photocurable adhesive does not excessively increase, and it is possible to make application aptitude more favorable.

The amount of the oxirane ring-containing epoxy cyclohexane compound (A2) in the photo-cation-curable component (A) is preferably 0% to 35% by mass and more preferably 15% to 35% by mass in the case of setting the total amount of the photo-cation-curable component (A) to 100% by mass. In a case where the amount of the oxirane ring-containing epoxy cyclohexane compound (A2) in the photo-cation-curable component (A) is set to 0% to 35% by mass, the viscosity of the photocurable adhesive including the oxirane ring-containing epoxy cyclohexane compound is decreased, and favorable coatability is exhibited. In addition, the storage elastic modulus after the curing of the photocurable adhesive becomes sufficient, and the polarizer does not easily crack in the case of exposing the polarizing plate in which the polarizer and the polarizing plate protective film are attached to each other through the adhesive to a severe temperature history.

Furthermore, the amount of the diglycidyl compound (A3) in the photo-cation-curable component (A) is preferably 0% to 25% by mass and more preferably 5% to 25% by mass in the case of setting the total amount of the photo-cation-curable component (A) to 100% by mass. In a case where the diglycidyl compound (A3) is blended into the photo-cation-curable component (A) (in an amount of 5% to 25% by mass), it is possible to enhance the adhesiveness between the polarizer and the protective film while maintaining the storage elastic modulus after the curing of the photocurable adhesive including the diglycidyl compound at a high value. In addition, the storage elastic modulus after the curing of the photocurable adhesive becomes sufficient, and the polarizer does not easily crack in the case of exposing the polarizing plate in which the polarizer and the protective film are attached to each other through the adhesive to a severe temperature history.

The alicyclic diepoxy compound (A1) is a compound represented by General Formula (XI).

In General Formula (XI), $R^1$ and $R^2$ each independently represent a hydrogen atom or an alkyl group having 1 to 6 carbon atoms. In a case where the position of a cyclohexane ring bonding to X in General Formula (XI) is regarded as a first site (and thus the positions of epoxy groups in two cyclohexane rings are both a third site and a fourth site), this alkyl group is also capable of bonding to any position of the first to six sites. This alkyl group may be linear and may be branched in a case where the number of carbon atoms is three or more. In addition, in a case where the number of carbon atoms is three or more, the alkyl group may have an alicyclic structure. As a typical example of the alkyl group having an alicyclic structure, there is a cyclopentyl or cyclohexyl.

In General Formula (XI), X represents an oxygen atom, an alkanediyl group having 1 to 6 carbon atoms or a divalent group represented by any of General Formulae (XIa) to (XId). Here, the alkanediyl group is a concept including alkylene or alkylidene, and alkylene may be linear and may be branched in a case where the number of carbon atoms is three or more.

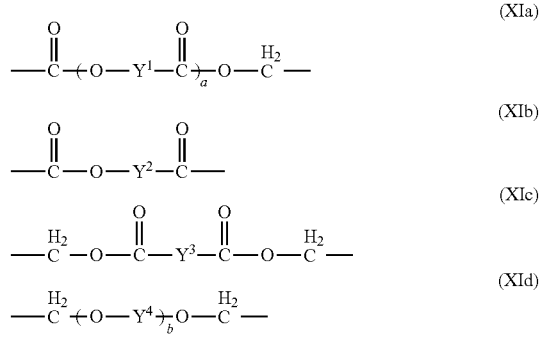

In the divalent group represented by any of General Formulae (XIa) to (XId), linking groups $Y^1$, $Y^2$, $Y^3$, and $Y^4$ in the respective formulae each represent an alkanediyl group having 1 to 20 carbon atoms. This alkanediyl group may be linear and may be branched in a case where the number of carbon atoms is three or more. In addition, in a case where the number of carbon atoms is three or more, the alkanediyl group may have an alicyclic structure. As a typical example of the alkanediyl group having an alicyclic structure, there is a cyclopentylene or cyclohexylene.

a is an integer of 0 to 20, and b is an integer of 0 to 20.

The alicyclic diepoxy compound (A1) represented by General Formula (XI) will be more specifically described.

A compound for which X in General Formula (XI) is represented by General Formula (XIa) and a is zero is an esterified substance of 3,4-epoxycyclohexylmethanol (an alkyl group having 1 to 6 carbon atoms may bond to the cyclohexane ring thereof) and 3,4-epoxycyclohexane carboxylate (an alkyl group having 1 to 6 carbon atoms may bond to the cyclohexane ring thereof). As specific examples thereof, there are 3,4-epoxycyclohexylmethyl 3,4-epoxycyclohexane carboxylate [a compound for which $R^1=R^2=H$ in General Formula (XI) (here, X is a divalent group represented by General Formula (XIa) in which a=0), 3,4-epoxy-6-methylcyclohexylmethyl 3,4-epoxy-6-methylcyclohexane carboxylate [a compound having the same X as described above for which $R^1$=6-methyl and $R^2$=6-methyl in General Formula (XI)], 3,4-epoxy-1-methylcyclohexylmethyl 3,4-epoxy-1-methylcyclohexane carboxylate [a compound having the same X as described above for which $R^1$=1-methyl and $R^2$=1-methyl in General Formula (XI)], 3,4-epoxy-3-methylcyclohexylmethyl 3,4-epoxy-3-methylcyclohexane carboxylate [a compound having the same X as described above for which $R^1$=3-methyl and $R^2$=3-methyl in General Formula (XI)], and the like.

A compound for which X in General Formula (XI) is a divalent group represented by General Formula (XIb) is an esterified substance of alkylene glycols and 3,4-epoxycyclohexane carboxylates (an alkyl group may bond to the cyclohexane ring thereof).

A compound for which X in General Formula (XI) is a divalent group represented by General Formula (XIc) is an esterified substance of aliphatic dicarboxylates and 3,4-epoxycyclohexyl methanol (an alkyl group may bond to the cyclohexane ring thereof).

In addition, a compound for which X in General Formula (XI) is a divalent group represented by General Formula (XId) is an etherified substance (in the case of b=0) of 3,4-epoxycyclohexyl methanol (an alkyl group may bond to the cyclohexane ring thereof) or an etherified substance (in the case of b>0) of alkylene glycols or polyalkylene glycols and 3,4-epoxycyclohexyl methanol (an alkyl group may bond to the cyclohexane ring thereof).

The oxirane ring-containing epoxy cyclohexane compound (A2) is a compound represented by General Formula (XII).

In General Formula (XII), $R^3$ and $R^4$ each independently represent a hydrogen atom or an alkyl group having 1 to 6 carbon atoms and may have an alicyclic structure in a case where the number of carbon atoms is three or more. In a case where $R^3$ bonding to an epoxycyclohexane ring is an alkyl group and the position of a cyclohexane ring having a bonding site in General Formula (XII) is regarded as a first site (and thus the positions of epoxy groups in the cyclohexane ring are a third site and a fourth site), this alkyl group is also capable of bonding to any position of the first to six sites. This alkyl group may be linear and may be branched in a case where the number of carbon atoms is three or more. In addition, as described above, in a case where the number of carbon atoms is three or more, the alkyl group may have an alicyclic structure. As a typical example of the alkyl group having an alicyclic structure, there is a cyclopentyl or cyclohexyl.

In General Formula (XII), c is an integer of 0 to 20.

A majority of the oxirane ring-containing epoxy cyclohexane compounds represented by General Formula (XII) are liquid at normal temperature and have a low viscosity and are thus used as a reactive diluent in some cases in the field of epoxy resins, and are typically a compound for which, particularly, c in the formula is zero. As specific examples thereof, there are 4-vinylcyclohexene diepoxide [a compound for which c=0 and $R^3=R_4=H$ in General Formula (XII)], limonene diepoxide [a compound for which c=0, $R^3$=4-methyl (here, the position number is as described above), and $R^4$=methyl in General Formula (XII)], and the like.

The diglycidyl compound (A3) is a compound represented by General Formula (XIII).

In General Formula (XIII), Z is an alkylene group having 1 to 9 carbon atoms, an alkylidene group having 3 or 4 carbon atoms, a divalent alicyclic hydrocarbon group, or a divalent group represented by Formula —$C_mH_{2m}$—$Z^1$—$C_nH_{2n}$—; here, —$Z^1$— is —O—, —CO—O—, —O—CO—, —$SO_2$—, —SO—, or —CO—, m and n each are independently an integer of 1 or more, but the total of m and n is 9 or less.

The alkylene group that can be employed as Z may be linear and may be branched in a case where the number of carbon atoms is three or more. In a case where Z is an alkylidene group, a bonding site may protrude from a carbon atom at the terminal as in propylidene or butylidene, or a bonding site may protrude from a carbon atom that is not at the terminal as in isopropylidene. As a typical example of the divalent alicyclic hydrocarbon group, there is a cyclopentylene or cyclohexylene.

A compound for which Z in General Formula (XIII) is an alkylene group is a diglycidyl ether of alkylene glycol. As specific examples, there are ethylene glycol diglycidyl ether, propylene glycol diglycidyl ether, 1,3-propanediol diglycidyl ether, 1,4-butanediol diglycidyl ether, 1,6-hexanediol diglycidyl ether, and the like.

In addition, in a case where Z in General Formula (XIII) is a divalent group represented by Formula —$C_mH_{2m}$—$Z^1$—$C_nH_{2n}$—, Z is an alkylene group having 2 or more carbon atoms, which corresponds to a C—C bond in the alkylene group being broken at —O—, —CO—O—, —O—CO—, —$SO_2$—, —SO—, or —CO—.

In the photo-cation-curable component (A) configuring the photocurable adhesive, the alicyclic diepoxy compound (A1), the oxirane ring-containing epoxy cyclohexane compound (A2), and the diglycidyl compound (A3), which have been described above, may include other cationic polymerizable compounds as long as the respective compounds do not exceed the amounts described above. As the other cationic polymerizable compounds, epoxy compounds or oxetane compounds other than the compounds represented by General Formula (XI), General Formula (XII), and General Formula (XIII) and the like can be exemplified.

As the epoxy compounds other than the compounds represented by General Formula (XI), General Formula (XII), and General Formula (XIII), there are alicyclic epoxy compounds having an epoxy group bonding to at least one alicyclic ring in the molecule which are not the compounds represented by General Formula (XI) and General Formula (XII), aliphatic epoxy compounds having an oxirane group bonding to an aliphatic carbon atom which are not the compound represented by General Formula (XIII), aromatic epoxy compounds having an aromatic ring and an epoxy group in the molecule, hydrogenated epoxy compounds in which an aromatic ring in an aromatic epoxy compound is hydrogenated, and the like.

As examples of the aliphatic epoxy compounds having an oxirane ring bonding to an aliphatic carbon atom which are not the compound represented by General Formula (XIII), there are triglycidyl ethers of glycerin, triglycidyl ethers of trimethylolpropane, diglycidyl ethers of polyethylene glycol, and the like.

The aromatic epoxy compound having an aromatic ring and an epoxy group in the molecule can be a glycidyl ether of an aromatic polyhydroxyl compound having at least two phenolic hydroxyl groups in the molecule. As specific examples thereof, there are diglycidyl ethers of bisphenol A, diglycidyl ethers of bisphenol F, diglycidyl ethers of bisphenol S, and glycidyl ethers of a phenol novolac resin, and the like.

The hydrogenated epoxy compound in which an aromatic ring in an aromatic epoxy compound is hydrogenated can be a substance obtained by glycidyl-etherifying a hydrogenated polyhydroxyl compound that is obtained by selectively causing a hydrogenation reaction of an aromatic ring in the presence of a catalyst under pressurization against the aromatic polyhydroxyl compound having at least two phenolic hydroxyl groups in the molecule that is a raw material of the aromatic epoxy compound. As specific examples thereof, there are diglycidyl ethers of hydrogenated bisphenol A, diglycidyl ethers of hydrogenated bisphenol F, and diglycidyl ethers of hydrogenated bisphenol S, and the like.

In addition, an oxetane compound that can be randomly a part of the photo-cation-curable component (A) is a compound having a four-membered ring ether (oxetanyl group) in the molecule. As specific examples thereof, there are 3-ethyl-3-hydroxymethyl oxetane, 1,4-bis[(3-ethyl-3-oxetanyl)methoxymethyl]benzene, 3-ethyl-3-(phenoxymethyl) oxetane, di[(3-ethyl-3-oxetanyl)methyl]ether, 3-ethyl-3-(2-ethylhexyloxymethyl)oxetane, 3-ethyl-3-(cyclohexyloxymethyl)oxetane, phenol novolak oxetane, 1,3-bis[(3-ethyloxetane-3-yl)methoxy]benzene, oxetanyl-silsesquioxane, oxetanyl silicate, and the like.

In a case where the oxetane compound is blended in a proportion of 80% by mass or less in 100% by mass (as the total amount) of the photo-cation-curable component (A), there is a case where an effect for improving a curing property can be expected compared with a case where only an epoxy compound is used as the photo-cation-curable component (A).

—Photo-Cationic Polymerization Initiator (B)—

In a form of using the photocurable adhesive of the present invention, the above-described photo-cation-curable component (A) is cured by cationic polymerization through irradiation with active energy rays, thereby forming the adhesive layer. Therefore, into a photocurable adhesive composition, the photo-cationic polymerization initiator (B) is blended. The photo-cationic polymerization initiator (B) generates a cationic species or a Lewis acid by being irradiated with active energy rays such as visible light rays, ultraviolet rays, X-rays, or electron beams and initiates a polymerization reaction of the photo-cation-curable component (A). The photo-cationic polymerization initiator (B) acts catalytically by light and is excellent in terms of storage stability or workability even in the case of being mixed into the photo-cation-curable component (A). As the compound that generates a cationic species or a Lewis acid by being irradiated with active energy rays, for example, aromatic diazonium salts; onium salts such as aromatic iodonium salts and aromatic sulfonium salts; iron-arene complexes, and the like can be exemplified.

As the aromatic diazonium salts, for example, the following compounds are exemplified.

Benzenediazonium hexafluoroantimonate,
benzenediazonium hexafluorophosphate,
benzenediazonium hexafluoroborate, and the like.

As the aromatic iodonium salts, for example, the following compounds are exemplified.

Diphenyliodonium tetrakis(pentafluorophenyl)borate,
diphenyliodonium hexafluorophosphate,
diphenyliodonium hexafluoroantimonate,
di(4-nonylphenyl)iodonium, hexafluorophosphate, and the like.

As the aromatic sulfonium salts, for example, the following compounds are exemplified.

Triphenylsulfonium hexafluorophosphate,
triphenylsulfonium hexafluoroantimonate,
triphenylsulfonium tetrakis(pentafluorophenyl)borate,
4,4'-bis(diphenylsulfonio)diphenyl sulfide bishexafluorophosphate,
4,4'-bis[di(β-hydroxyethoxy)phenylsulfonio]diphenyl sulfide bishexafluoroanti monate,
4,4'-bis[di(β-hydroxyethoxy)phenylsulfonio]diphenyl sulfide bishexafluorophosphate,
7-[di(p-toluyl)sulfonio]-2-isopropylthioxanthone hexafluoroantimonate,
7-[di(p-toluyl)sulfonio]-2-isopropylthioxanthone tetrakis (pentafluorophenyl)borate,
4-phenylcarbonyl-4'-diphenylsulfonio-diphenyl sulfide hexafluorophosphate,
4-(p-tert-butylphenylcarbonyl)-4'-diphenylsulfonio-diphenyl sulfide hexafluoroantimonate, 4-(p-tert-butylphenylcarbonyl)-4'-di(p-toluyl)sulfonio-diphenyl sulfide tetrakis(pentafluorophenyl)borate, and the like.

As the iron-arene complexes, for example, the following compounds are exemplified.

Xylene-cyclopentadienyl iron (II) hexafluoroantimonate,
cumene-cyclopentadienyl iron (II) hexafluorophosphate,
xylene-cyclopentadienyl iron (II) tris(trifluoromethylsulfonyl) methanide, and the like.

These photo-cationic polymerization initiators (B) may be respectively used singly or two or more photo-cationic polymerization initiators may be used in a mixture form. Among these, the aromatic sulfonium salt exhibits an ultraviolet absorption characteristic even in a wavelength range near 300 nm, is thus capable of imparting a cured substance that is excellent in terms of a curing property and has a favorable mechanical strength or adhesive strength, and thus can be preferably used.

The amount of the photo-cationic polymerization initiator (B) blended is set to 1 to 10 parts by mass of the total amount (100 parts by mass) of the photo-cation-curable component (A). In a case where 1 part by mass or more of the photo-cationic polymerization initiator (B) is blended per 100 parts by mass of the photo-cation-curable component (A), it is possible to sufficiently cure the photo-cation-curable component (A), and a high mechanical strength and a high adhesive strength are imparted to a polarizing plate to be obtained using the photo-cation-curable component. In a case where the amount of the photo-cationic polymerization initiator is too large, an ionic substance in the cured substance increases, and thus there is a possibility that the moisture absorbency of the cured substance may enhance and the durability performance of the polarizing plate may be degraded, and thus the amount of the photo-cationic polymerization initiator (B) is set to 10 parts by mass or less per 100 parts by mass of the photo-cation-curable component (A). The amount of the photo-cationic polymerization initiator (B) blended is preferably set to 2 parts by mass or more per 100 parts by mass of the photo-cation-curable component (A) and is preferably set to 6 parts by mass or less.

—Photosensitizer (C)—

The photocurable adhesive of the present invention may contain, in addition to the photo-cation-curable component (A) including the epoxy compound and the photo-cationic polymerization initiator (B) as described above, a photosensitizer (C) exhibiting absorption maximum to light having a wavelength longer than 380 nm. The photo-cationic polymerization initiator (B) exhibits absorption maximum at a wavelength near or shorter than 300 nm, senses light having a wavelength near 300 nm to generate a cationic species or a Lewis acid, and initiates the cationic polymerization of the photo-cation-curable component (A), but it is preferable to blend the photosensitizer (C) exhibiting absorption maximum to light having a wavelength longer than 380 nm so as for the photo-cationic polymerization initiator to sense light having a wavelength longer than 300 nm. As such a photosensitizer (C), an anthracene-based compound represented by General Formula (XV) can be preferably used.

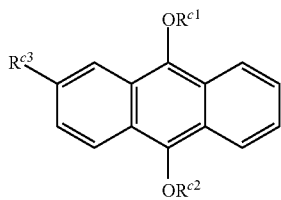

(XV)

In General Formula (XV), $R^{c1}$, $R^{c2}$, and $R^{c3}$ each independently represent a hydrogen atom or a substituent. As the substituent, it is possible to appropriately select a substituent from the substituents that can be employed as $R^1$ in General Formula (2), and an alkyl group and an alkoxyalkyl group are preferred.

Specific examples of the anthracene-based photosensitizer (C) represented by General Formula (XV) will be exemplified.
9,10-dimethoxyanthracene,
9,10-diethoxyanthracene,
9,10-dipropoxyanthracene,
9,10-diisopropoxyanthracene,
9,10-dibutoxyanthracene,
9,10-dipentyloxyanthracene,
9,10-dihexyloxyanthracene,
9,10-bis(2-methoxyethoxy)anthracene,
9,10-bis(2-ethoxyethoxy)anthracene,
9,10-bis(2-butoxyethoxy)anthracene,
9,10-bis(3-butoxypropoxy)anthracene,
2-methyl- or 2-ethyl-9,10-dimethoxyanthracene,
2-methyl- or 2-ethyl-9,10-diethoxyanthracene,
2-methyl- or 2-ethyl-9,10-dipropoxyanthracene,
2-methyl- or 2-ethyl-9,10-diisopropoxyanthracene,
2-methyl- or 2-ethyl-9,10-dibutoxyanthracene,
2-methyl- or 2-ethyl-9,10-dipentyloxyanthracene,
2-methyl- or 2-ethyl-9,10-dihexyloxyanthracene, and the like.

In addition, thioxanthone-based compounds such as 2-isopropylthioxanthone and 2,4-diethylthioxanthone can also be preferably used as the photosensitizer (C).

In a case where the photosensitizer (C) is blended into the photocurable adhesive, the curing property of the adhesive improves compared with a case where the photosensitizer is not blended thereinto. In a case where the amount of the photosensitizer (C) blended is set to 0.1 parts by mass or more with respect to 100 parts by mass of the photo-cation-curable component (A) configuring the photocurable adhesive, the above-described effect is developed. In a case where the amount of the photosensitizer (C) blended increases, a problem of precipitation or the like during low-temperature storage is caused, and the amount is set to 2 parts by mass or less with respect to 100 parts by mass of the photo-cation-curable component (A). From the viewpoint of maintaining the neutral gray of the polarizing plate, it is advantageous to decrease the amount of the photosensitizer (C) blended as long as the adhesive force between the polarizer and the protective film is appropriately maintained, and, for example, with respect to 100 parts by mass of the photo-cation-curable component (A), the amount of the photosensitizer (C) is preferably set to 0.1 to 1.5 parts by mass and, furthermore, in a range of 0.1 to 1 part by mass.

(Physical Properties of Photocurable Adhesive)

The photocurable adhesive is produced by blending the photo-cation-curable component (A), the photo-cationic polymerization initiator (B), and, as necessary, the photosensitizer (C) described above respectively in the predetermined amounts. The photocurable adhesive is obtained in a liquid form; however, from the viewpoint of coatability as an adhesive, the viscosity at 25° C. is preferably 100 mPa·sec or less.

Particularly, in a case where, as the photo-cation-curable component (A), the oxirane ring-containing epoxy cyclohexane compound (A2) represented by General Formula (XII) and the diglycidyl compound (A3) represented by General Formula (XIII) are caused to be present in the predetermined amounts, it is possible to attain such a low viscosity. The lower limit of the viscosity at 25° C. is not particularly limited, but becomes approximately 30 mPa·sec or more as long as the blending proportions described above are maintained. From the viewpoint of imparting high adhesiveness between the polarizer and the protective film while maintaining a favorable coating characteristic, it is preferable to exhibit at least the above-described degree of viscosity.

In the case of using the photocurable adhesive as the adhesive, a curing step of curing the photocurable adhesive is carried out by attaching the polarizing plate protective film to which a photocurable adhesive composition has been applied to the polarizing layer and then irradiating the polarizing plate protective film with active energy rays. The kind of the active energy ray is not particularly limited, but an active energy ray (ultraviolet ray) having a peak wavelength at a wavelength of 400 nm or shorter is preferred, and UV-B having a peak wavelength between wavelengths of 280 to 320 nm is more preferred.

As a light source of the active energy rays is not particularly limited, but a high-pressure mercury lamp, a low-pressure mercury lamp, a medium-pressure mercury lamp, an ultrahigh-pressure mercury lamp, a chemical lamp, a black light lamp, a microwave excitation mercury lamp, a metal halide lamp, and the like are preferably used.

The light irradiation intensity for the photocurable adhesive is appropriately determined depending on the composition of the photocurable adhesive and is preferably set so that the irradiation intensity in a wavelength range effective for the activation of the polymerization initiator reaches 0.1 to 6,000 mW/cm$^2$. In a case where the irradiation intensity is 0.1 mW/cm$^2$ or more, the reaction time does not become too long, and in a case where the irradiation intensity is 6,000 mW/cm$^2$ or less, the degree of a concern of the yellow discoloration of the photocurable adhesive caused by heat being radiated from the light source and heat being generated during the curing of the photocurable adhesive or the deterioration of the polarizer is small.

The light irradiation time for the photocurable adhesive is also appropriately determined depending on the composition of the photocurable adhesive and is preferably set so that the accumulated light amount represented by the product of the irradiation intensity and the irradiation time reaches 10 to 10,000 mJ/cm$^2$. In a case where the accumulated light amount is 10 mJ/cm$^2$ or more, a sufficient amount of an active species derived from the polymerization initiator is generated, and it is possible to cause a curing reaction to more reliably progress, and, in a case where the accumulated light amount is 10,000 mJ/cm$^2$ or less, the irradiation time does not become too long, and a favorable productivity can be maintained.

In addition, as the adhesive layer, it is also possible to apply a layer made from a pressure-sensitive adhesive composition in which a (meth)acrylic resin, a styrene-based resin, a silicone-based resin, or the like is used as a base polymer and a crosslinking agent such as an isocyanate compound, an epoxy compound, or an aziridine compound is added thereto.

<Production of Polarizing Plate>

The polarizing plate of the embodiment of the present invention can be produced using an ordinary method except for the configuration of the polarizing plate protective film and is produced by attaching the polarizing layer and the polarizing plate protective film so that the angle formed by the absorption axis of the polarizing layer and a direction in which the acoustic wave propagation velocity of the polarizing plate protective film is maximized become parallel or orthogonal to each other.

In the present specification, the expression "two straight lines being parallel to each other" means not only a case where the angle formed by the two straight lines is 0° but also a case where the two straight lines are substantially parallel to each other within an optically permissible margin of error. Specifically, in a case where two straight lines are parallel to each other, the angle formed by the two straight lines is preferably 0°±10°, the angle formed by the two straight lines is more preferably 0°±5°, and the angle formed by the two straight lines is particularly preferably 0±1°. Similarly, the expression "two straight lines being orthogonal (perpendicular) to each other" means not only a case where the angle formed by the two straight lines is 90° but also a case where the two straight lines are substantially orthogonal to each other within an optically permissible margin of error. Specifically, in a case where two straight lines are orthogonal (perpendicular) to each other, the angle formed by the two straight lines is preferably 90°±10°, the angle formed by the two straight lines is more preferably 90°±5°, and the angle formed by the two straight lines is particularly preferably 90°±1°.

To a surface of the polarizing layer opposite to the surface to which the polarizing plate protective film is attached, the polarizing plate protective film may be further attached or an optical film that is known in the related art may be attached. Regarding the optical film that is known in the related art, both the optical characteristic and the material are not particularly limited, but a film including (or including as a main component) a cellulose ester resin, an acrylic resin, a cyclic olefin resin, and/or polyethylene terephthalate can be preferably used, and an optically isotropic film or an optically anisotropic phase difference film may be used.

Regarding the optical film that is known in the related art, as the film including a cellulose ester resin, it is possible to use, for example, FUJITAC TD40UC (manufactured by Fujifilm Corporation) or the like.

Regarding the optical film that is known in the related art, as the film including an acrylic resin, it is possible to use an optical film including a (meth)acrylic resin containing a styrene-based resin described in JP4570042B, an optical film including a (meth)acrylic resin having a glutarimide ring structure in the main chain described in JP5041532B, an optical film including a (meth)acrylic resin having a lactone ring structure described in JP2009-122664A, and an optical film containing a (meth)acrylic resin having a glutaric anhydride unit described in JP2009-139754A.

In addition, regarding the optical film that is known in the related art, as the film including a cyclic olefin resin, it is possible to use a cyclic olefin-based resin film described in Paragraph [0029] and later of JP2009-237376A and a cyclic olefin resin film containing an additive for reducing Rth described in JP4881827B and JP2008-063536A.

[Liquid Crystal Display Device]

Next, a liquid crystal display device of the embodiment of the present invention will be described.

The liquid crystal display device of the embodiment of the present invention includes at least one polarizing plate of the embodiment of the present invention.

FIG. 1 is a schematic view showing an example of the liquid crystal display device of the embodiment of the present invention. In FIG. 1, a liquid crystal display device 10 is made up of a liquid crystal cell having liquid crystal layers 5 and a liquid crystal cell upper electrode substrate 3 and a liquid crystal cell lower electrode substrate 6 disposed above and below the liquid crystal layers 5, an upper side polarizing plate 1 and a lower side polarizing plate 8 disposed on both sides of the liquid crystal cell. A color filter layer may be laminated on the upper electrode substrate 3 or the lower electrode substrate 6. On a rear surface of the liquid crystal display device 10, a backlight is disposed. As a light source of the backlight, it is possible to use a light-emitting diode, a laser diode, an electroluminescent element, or the like, but a light-emitting diode (LED) is preferred from the viewpoint of brightness. Particularly, a white LED in which a blue LED and a yellow fluorescent body are combined to each other or a white LED in which a blue LED, a green fluorescent body, and a red fluorescent body are combined to each other is preferred from the viewpoint of improving color reproducibility in the combination with the polarizing plate of the embodiment of the present invention. In addition, a light source in which a blue LED and an optical member containing a quantum dot are combined to each other is also, similarly, preferred.

The upper side polarizing plate 1 and the lower side polarizing plate 8 each have a configuration in which two polarizing plate protective films and a polarizer are laminated so as to sandwich the polarizer with the polarizing plate protective films, and, in the liquid crystal display device 10 of the embodiment of the present invention, at least one polarizing plate is the polarizing plate of the embodiment of the present invention. The polarizing plate protective film of the embodiment of the present invention may be disposed between the liquid crystal cell and the polarizer and is disposed, for example, between the liquid crystal cell upper electrode substrate 3 and the polarizer.

As the liquid crystal display device 10, there are an image direct vision-type liquid crystal display, an image projection-type liquid crystal display device, or a light modulation-type liquid crystal display device. An active matrix liquid crystal display device in which a three-terminal or two-terminal semiconductor element such as TFT or MIM is used is also preferred. In addition, a passive matrix liquid crystal display device represented by an STN mode that is referred to as time division driving is also preferred.

In addition, an IPS-mode liquid crystal display device described in Paragraphs 128 to 136 of JP2010-102296A is also preferred as a form of the liquid crystal display device of the embodiment of the present invention.

<Pressure-Sensitive Adhesive Layer>

In the liquid crystal display device of the embodiment of the present invention, the polarizing plate of the embodiment of the present invention is preferably attached to the liquid crystal cell through a pressure-sensitive adhesive layer, and the surface on the polarizing plate protective film of the embodiment of the present invention is more preferably attached to the liquid crystal cell through the pressure-sensitive adhesive layer.

The composition of the pressure-sensitive adhesive composition that is used to form the pressure-sensitive adhesive layer is not particularly limited, and, for example, a pressure-sensitive adhesive composition including a base resin having a mass average molecular weight (Mw) of 500,000 or more may be used. In a case where the mass average molecular weight of the base resin is less than 500,000, there is a case where the degradation of the durability reliability of the pressure-sensitive adhesive such as the occurrence of an air bubble or peeling phenomenon under high temperature and/or high humidity conditions caused by the degradation of the cohesive force occurs. The upper limit of the mass average molecular weight of the base resin is not particularly limited, but is preferably 2,000,000 or less since there is a case where an excessive increase in the mass average molecular weight results in the deterioration of the coatability attributed to an increase in viscosity.

The specific kind of the base resin is not particularly limited, and, for example, an acrylic resin, a silicon-based resins, a rubber-based resin, are an EVA-based resin is exemplified. In the case of using the pressure-sensitive adhesive layer in an optical device such as a liquid crystal display device, from the viewpoint of excellency of transparency, oxidation resistance, and resistance to yellow discoloration, an acrylic resin is mainly used, but the kind is not limited thereto.

As the acrylic resin, for example, a polymer of a monomer mixture including 80 parts by mass to 99.8 parts by mass of a (meth)acrylic acid ester monomer; and 0.02 parts by mass to 20 parts by mass (preferably 0.2 parts by mass to 20 parts by mass) of other crosslinking monomer is exemplified.

The kind of the (meth)acrylic acid ester monomer is not particularly limited, and, for example, alkyl (meth)acrylate is exemplified. In this case, an alkyl group included in the monomer becoming an excessively long chain may results in a case where the cohesive force of the pressure-sensitive adhesive degrades and the adjustment of the glass transition temperature (Tg) or the pressure-sensitive adhesiveness becomes difficult, and thus a (meth)acrylic acid ester monomer having an alkyl group having 1 to 14 carbon atoms is preferably used. Examples of such a monomer include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, isobornyl (meth)acrylate, and tetradecyl (meth)acrylate. In the present invention, the monomers may be used singly or two or more monomers may be used in combination. The content of the (meth)acrylic acid ester monomer is preferably 80 parts by mass to 99.8 parts by mass with respect to 100 parts by mass of the monomer mixture. In a case where the content of the (meth)acrylic acid ester monomer is less than 80 parts by mass, there is a case where the initial adhesive force decreases, and, in a case where the content exceeds 99.8 parts by mass, there is a case where the durability degrades due to a decrease in the cohesive force.

The other crosslinking monomer included in the monomer mixture is capable of reacting with a polyfunctional crosslinking agent described below to impart a cohesive force to the pressure-sensitive adhesive and imparting a crosslinking functional group that plays a role of adjusting the pressure-sensitive adhesive force, durability reliability, and the like to a polymer. As such a crosslinking monomer, a hydroxyl group-containing monomer, a carboxyl group-containing monomer, and a nitrogen-containing monomer are exemplified. As the hydroxyl group-containing monomer, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate are exemplified. As the carboxyl group-containing monomer, acrylic acid, methacrylic acid, 2-(meth)acryloyloxyacetic acid, 3-(meth)acryloyloxypropyl acid, 4-(meth)acryloyloxybutyric acid, an acrylic acid dimer, itaconic acid, maleic acid, and a maleic anhydride are exemplified. As the nitrogen-containing monomer, (meth)acrylamide, N-vinyl pyrrolidone, or N-vinyl caprolactam are exemplified. In the present invention, these crosslinking monomers may be used singly or two or more crosslinking monomers may be used in combination.

The content of the other crosslinking monomer can be 0.02 parts by mass to 20 parts by mass with respect to 100 parts by mass of the monomer mixture. In a case where the content is less than 0.02 parts by mass, there is a case where the durability reliability of the pressure-sensitive adhesive degrades, and, in a case where the content exceeds 20 parts by mass, there is a case where the pressure-sensitive adhesiveness and/or the peel force degrades.

The monomer mixture may further include a monomer represented by General Formula (10). This monomer can be added for the purpose of adjusting the glass transition temperature of the pressure-sensitive adhesive and imparting other functions.

General Formula (10)

{In the formula, $R_1$ to $R_3$ each independently represent hydrogen or alkyl, $R_4$ represents cyano; alkyl-substituted or unsubstituted phenyl; acetyloxy; or $COR_5$ (here, $R_5$ represents alkyl or alkoxyalkyl-substituted or unsubstituted amino or glycidyloxy).)

Based on the definition of $R_1$ to $R_5$ in the formula, alkyl or alkoxy means alkyl or alkoxy having 1 to 12 carbon atoms, preferably having 1 to 8 carbon atoms, and more preferably having 1 to 12 carbon atoms, and, specifically, alkyl or alkoxy may be methyl, ethyl, methoxy, ethoxy, propoxy, or butoxy.

As the monomer represented by General Formula (10), one or more of a nitrogen-containing monomer such as (meth)acrylonitrile, (meth)acrylamide, N-methyl(meth)acrylamide, or N-butoxymethyl(meth)acrylamide; a styrene-based monomer such as styrene or methylstyrene; an epoxy group-containing monomer such as glycidyl (meth)acrylate; or a vinyl carboxylate ester such as vinyl acetate are exemplified, but the monomer is not limited thereto. The amount of the monomer represented by General Formula (10) can be 20 parts by mass or less with respect to a total of 100 parts by mass of the (meth)acrylic acid ester monomer and the other crosslinking monomer. In a case where the content exceeds 20 parts by mass, there is a case where the flexibility and/or peel force of the pressure-sensitive adhesive degrade.

A method for manufacturing a polymer using the monomer mixture is not particularly limited, and the polymer can be manufactured using, for example, an ordinary polymerization method such as solution polymerization, photopolymerization, bulk polymerization, suspension polymerization, or emulsion polymerization. In the present invention, particularly, a solution polymerization method is preferably used, and the solution polymerization is preferably carried out at a polymerization temperature of 50° C. to 140° C. by mixing an initiator in a state in which the respective monomers are uniformly mixed together. At this time, as the initiator being used, ordinary initiators such as an azo-based polymerization initiator such as azobisisobutyronitrile or azobiscyclohexanecarbonitrile; and/or a peroxide such as benzoyl peroxide or acetyl peroxide are exemplified.

The pressure-sensitive adhesive composition of the present invention may further include 0.1 parts by mass to 10 parts by mass of a crosslinking agent with respect to 100 parts by mass of the base resin. Such a crosslinking agent is capable of imparting a cohesive force to the pressure-sensitive adhesive through a crosslinking reaction with the base resin. In a case where the content of the crosslinking agent is less than 0.1 parts by mass, there is a case where the cohesive force of the pressure-sensitive adhesive decreases. In addition, in a case where the content exceeds 10 parts by mass, there is a case the durability reliability degrades such as the occurrence of interlayer peeling or a floating phenomenon.

The kind of the crosslinking agent is not particularly limited, and it is possible to use the same ordinary crosslinking agent as, for example, an isocyanate-based compound, an epoxy-based compound, an aziridine-based compound, and a metallic chelate-based compound.

As the isocyanate compound, for example, one or more selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate, and a reaction product between any of these compounds and a polyol (for example, trimethylolpropane) are exemplified; as the epoxy-based compound, one or more selected from the group consisting of ethylene glycol diglycidyl ether, triglycidyl ether, trimethylolpropane triglycidyl ether, N,N,N',N'-tetraglycidylethylenediamine, and glycerin diglycidyl ether are exemplified; as the aziridine-based compound, one or more selected from the group consisting of N,N'-toluene-2,4-bis(1-aziridinecarboxamide), N,N'-diphenylmethane-4,4'-bis(1-aziridinecarboxamide), triethylenemelamine, bisprotaloyl-1-(2-methylaziridine), and tri-1-aziridinylphosphine oxide are exemplified. In addition, as the metallic chelate-based compound, compounds in which acetylacetone, ethyl acetoacetate, or the like is coordinated with a polyvalent metal such as aluminum, iron, zinc, tin, titanium, antimony, magnesium and/or vanadium are exemplified.

The pressure-sensitive adhesive composition of the present invention may further include 0.01 parts by mass to 10 parts by mass of a silane-based coupling agent with respect to 100 parts by mass of the base resin. The silane-based coupling agent is capable of contributing to improvement in adhesion reliability when the pressure-sensitive adhesive is left to stand for a long period of time under a high temperature or high humidity condition and is capable of improving adhesion stability during adhesion to particularly a glass base material and improving heat resistance and moisture resistance. As the silane-based coupling agents, γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatopropyltriethoxysilane, γ-acetoacetatepropyltrimethoxysilane, and the like are exemplified. These silane-based coupling agents may be used singly or two or more silane-based coupling agents may be used in combination.

The amount of the silane-based coupling agent included is preferably 0.01 parts by mass to 10 parts by mass and more preferably 0.05 parts by mass to 1 part by mass with respect to 100 parts by mass of the base resin. In a case where the content is less than 0.01 parts by mass, there is a case where the pressure-sensitive adhesive force-increasing effect is not sufficient, and, in a case where the content exceeds 10 parts by mass, there is a case the durability reliability degrades such as the occurrence of an air bubble or peeling phenomenon.

The pressure-sensitive adhesive composition of the present invention may further include an antistatic agent, and, as the antistatic agent, any compound can be used as long as the compound is excellent in terms of compatibility with other components included in the pressure-sensitive adhesive composition such as an acrylic resin, does not have any adverse influences on the transparency, workability, durability, and the like of the pressure-sensitive adhesive, and is capable of imparting an antistatic performance to the pressure-sensitive adhesive. As the antistatic agent, an inorganic salt, an organic salt, and the like can be exemplified.

The inorganic salt is a salt including an alkali metal cation or an alkali earth metal cation as a cation component. As a cation, one or more of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$), and a barium ion ($Ba^{2+}$) can be exemplified, and a lithium ion ($Li^+$), a sodium ion ($Na^+$), a potassium ion ($K'$), a cesium ion ($Cs^+$), a beryllium ion ($Be^{2+}$), a magnesium ion ($Mg^{2+}$), a calcium ion ($Ca^{2+}$), and a barium ion ($Ba^{2+}$) are preferably exemplified. The inorganic salt may be used singly or two or more inorganic salts may be used in combination. A lithium ion ($Li^+$) is particularly preferred from the viewpoint of ion stability and mobility in the pressure-sensitive adhesive.

The organic salt is a salt including an onium cation as the cation component. The term "onium cation" refers to a positively (+)-charged ion in which at least some of charges are eccentrically present to one or more atoms selected from the group consisting of nitrogen (N), phosphorus (P), and sulfur (S). The onium cation is a cyclic or non-cyclic compound, and, in the case of a cyclic compound, the onium cation can be a non-aromatic or aromatic compound. In addition, in the case of a cyclic compound, the onium cation is capable of including one or more hetero atoms (for example, oxygen) other than a nitrogen, phosphorus, or sulfur atom. In addition, the cyclic or non-cyclic compound is randomly substituted with a substituent such as hydrogen, halogen, alkyl, or aryl. In addition, in the case of a non-cyclic compound, the onium cation is capable of including one or more, preferably four or more substitution products, and, at this time, the substitution product is a cyclic or non-cyclic substitution product or an aromatic or non-aromatic substitution product.

The onium cation is a cation including a nitrogen atom and preferably an ammonium ion. The ammonium ion is a quaternary ammonium ion or an aromatic ammonium ion.

The quaternary ammonium ion is, specifically, preferably a cation represented by General Formula 11.

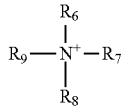

General Formula 11

In General Formula 11, $R_6$ to $R_9$ each independently represent hydrogen, substituted or unsubstituted alkyl, substituted or unsubstituted alkoxy, substituted or unsubstituted alkenyl, substituted or unsubstituted alkynyl, substituted or unsubstituted aryl, or substituted or unsubstituted heteroaryl.

In General Formula 11, the alkyl or alkoxy represents alkyl or alkoxy having 1 to 12, preferably 1 to 8 carbon atoms and preferably having 1 to 8 carbon atoms, and the alkenyl or alkynyl represents alkenyl or alkynyl having 2 to 12 carbon atoms and preferably having 2 to 8 carbon atoms.

In General Formula 11, the aryl represents a phenyl, biphenyl, naphthyl, or anthracenyl cyclic system as a substituent derived from an aromatic compound, and the heteroaryl represents a 5 to 12-membered heterocycle or aryl ring including one or more hetero atoms selected from O, N, and S and specifically represents furyl, pyrrolyl, pyrrolidinyl, thienyl, pyridinyl, piperidyl, indolyl, quinolyl, thiazole, benzothiazole, triazole, or the like.

In General Formula 11, the alkyl, the alkoxy, the alkenyl, the alkynyl, the aryl, or the heteroaryl may be substituted with one or more substituents, and, at this time, as the substituent, a hydroxyl group, a halogen, or alkyl or alkoxy having 1 to 12 carbon atoms, preferably having 1 to 8 carbon atoms, and more preferably having 1 to 4 carbon atoms can be exemplified.

In the present invention, as the cation represented by General Formula 11, a quaternary ammonium-based cation is preferably used, and a cation in which $R_1$ to $R_4$ each are independently substituted or unsubstituted alkyl having 1 to 12 carbon atoms and preferably having 1 to 8 carbon atoms is used.

As the quaternary ammonium ion represented by General Formula 11, an N-ethyl-N,N-dimethyl-N-(2-methoxyethyl) ammonium ion, an N,N-diethyl-N-methyl-N-(2-methoxyethyl) ammonium ion, an N-ethyl-N,N-dimethyl-N-propylammonium ion, an N-methyl-N,N,N-trioctylammonium ion, an N,N,N-trimethyl-N-propylammonium ion, a tetrabutylammonium ion, a tetramethylammonium ion, a tetrahexylammonium ion, and a N-methyl-N,N,N-tributylammonium ion, and the like can be exemplified.

As the aromatic ammonium ion, for example, one or more selected from the group consisting of pyridinium, pyridazinium, pyrimidinium, pyrazinium, imidazolium, pyrazolium, thiazolium, oxazolium, and triazolium can be exemplified, and N-alkylpyridinium substituted with an alkyl group having 4 to 16 carbon atoms, 1,3-alkylmethylimidazolium substituted with an alkyl group having 2 to 10 carbon atoms, and 1,2-dimethyl-3-alkylimidazolium substituted with an alkyl group having 2 to 10 carbon atoms are preferred. These aromatic ammonium ions may be used singly or two or more aromatic ammonium ions may be used in combination.

In addition, the aromatic ammonium ion is a compound represented by General Formula 12.

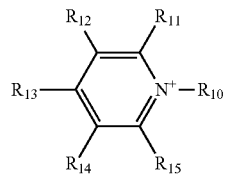

General Formula 12

In General Formula 12, $R_{10}$ to $R_{15}$ each independently represent hydrogen, substituted or unsubstituted alkyl, substituted or unsubstituted alkoxy, substituted or unsubstituted alkenyl, substituted or unsubstituted alkynyl, substituted or unsubstituted aryl, or substituted or unsubstituted heteroaryl.

In General Formula 12, the definitions of the alkyl, the alkoxy, the alkenyl, the alkynyl, the aryl, and the heteroaryl, and the substitution products thereof are the same as those in General Formula 11.

As the compound of General Formula 12, particularly, it is preferable that $R_{11}$ to $R_{15}$ each are independently hydrogen or alkyl and $R_{10}$ is alkyl.

As examples of an anion included in the inorganic salt or organic salt including the cation as described above in the antistatic agent of the present invention, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), sulfonate ($SO_4^-$), methylbenzenesulfonate ($CH_3(C_6H_4)SO_3^-$), p-toluenesulfonate ($CH_3C_6H_4SO_3^-$), carboxybenzenesulfonate ($COOH(C_6H_4^-)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), hexafluorophosphate ($PF_6^-$), trispentafluoroethyl trifluorophosphate ($P(C_2F_5)_3F_3^-$), bistrifluoromethanesulfonimide ($N(SO_2CF_3)_2^-$), bispentafluoroethanesulfonimide ($N(SOC_2F_5)_2^-$), bispentafluoroethanecarbonylimide ($N(COC_2F_5)_2^-$), bisperfluorobutanesulfonimide ($N(SO_2C_4F_9)_2^-$), bisperfluorobutanecarbonylimide ($N(COC_4F_9)_2$), tristrifluoromethanesulfonylmethide ($C(SO_2CF_3)_3$), and tristrifluoromethanecarbonylmethide ($C(SO_2CF_3)_3^-$) are preferred, but the anion is not limited thereto. Among the anions, an imide-base anion which is capable of playing an electron-withdrawing role, substituted with fluorine having favorable hydrophobicity, and has strong ion stability is preferably used.

The antistatic agent having the quaternary ammonium ion represented by General Formula 11 is particularly preferred from the viewpoint of enhancing the durability of the coloring agent of the present invention.

The content of the antistatic agent in the pressure-sensitive adhesive composition of the present invention is 0.01 parts by mass to 5 parts by mass, preferably 0.01 parts by mass to 2 parts by mass, and more preferably 0.1 parts by mass to 2 parts by mass with respect to 100 parts by mass of the base resin. In a case where the content is less than 0.01 parts by mass, there is a case where an intended antistatic effect cannot be obtained, and, in a case where the content exceeds 5 parts by mass, there is a case where the compatibility with other components is degraded and the durability reliability or transparency of the pressure-sensitive adhesive becomes poor.

The pressure-sensitive adhesive composition of the present invention is capable of further including a compound capable of forming a coordinate bond with the antistatic agent, specifically, the cation included in the antistatic agent (hereinafter, referred to as "coordinate bonding compound"). In a case where the pressure-sensitive adhesive appropriately includes the coordinate bonding compound, it is possible to increase the concentration of the anion in the pressure sensitive adhesive layer and effectively impart antistatic performance even in the case of using a relatively small amount of the antistatic agent.

The kind of the coordinate bonding compound that can be used is not particularly limited as long as the coordinate bonding compound has a functional group capable of forming a coordinate bond with the antistatic agent in the molecule, and, for example, an alkylene oxide-based compound is exemplified.

The alkylene oxide-based compound is not particularly limited, but an alkylene oxide-based compound including an alkylene oxide unit in which the number of carbon atoms in a basic unit is 2 or more, preferably 3 to 12, and more preferably 3 to 8 is preferably used.

The molecular weight of the alkylene oxide-based compound is preferably 5,000 or less. The term "molecular weight" used in the present invention refers to the molecular weight or mass average molecular weight of a compound. In the present invention, in a case where the molecular weight of the alkylene oxide-based compound exceeds 5,000, there is a case where the viscosity appropriately increases and the coatability becomes poor or a capability of forming a complex with metal degrades. The lower limit of the molecular weight of the alkylene oxide-based compound is not particularly limited, but is preferably 500 or more and more preferably 4,000 or more.

The alkylene oxide-based compound is not particularly limited as long as the above-described characteristics are exhibited, and, for example, a compound represented by General Formula 13 can be used.

General Formula 13

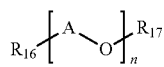

In General Formula 13, A represents alkylene having 2 or more carbon atoms, n represents 1 to 120, $R_{16}$ and $R_{17}$ each independently represent hydrogen, hydroxy, alkyl, or $C(=O)R_{18}$, and $R_{18}$ represents hydrogen or an alkyl group.

In General Formula 13, the alkylene represents alkylene having 3 to 12 carbon atoms and preferably having 3 to 8 carbon atoms and specifically represents ethylene, propylene, butylene, or pentylene.

In General Formula 13, the alkyl represents alkyl having 1 to 12 carbon atoms, more preferably 1 to 8 carbon atoms, and more preferably having 1 to 4 carbon atoms, and n preferably represents 1 to 80 and more preferably represents 1 to 40.

As the compound represented by General Formula 13, polyalkylene oxide (for example, polyethylene oxide, polypropylene oxide, polybutylene oxide, polypentylene oxide, or the like), aliphatic acid-basedalkyl esters of polyalkylene oxide (for example, polyethylene oxide, polypropylene oxide, polybutylene oxide, polypentylene oxide, or the like), carboxylic acid esters of polyalkylene oxide (for example, polyethylene oxide, polypropylene oxide, polybutylene oxide, polypentylene oxide, or the like), and the like can be exemplified, but the compound is not limited thereto.

In the present invention, in addition to the above-described alkylene oxide-based compound, an ester compound having one or more ether bond in the molecule disclosed in KR2006-0128659 or a variety of coordinate bonding compounds such as an oxalate group-containing compound, a diamine group-containing compound, a polyvalent carboxyl group-containing compound, or a ketone group-containing compound can be appropriately selected and used as necessary.

The coordinate bonding compound is included in the pressure-sensitive adhesive composition in a proportion of preferably 3 parts by mass or less, more preferably 0.1 parts by mass to 3 parts by mass, and still more preferably 0.5 parts by mass to 2 parts by mass in 100 parts by mass of the base resin. In a case where the content exceeds 3 parts by mass, there is a case where the physical properties of the pressure-sensitive adhesive such as the peel force degrade.

The pressure-sensitive adhesive composition may further include 1 part by mass to 100 parts by mass of a pressure-sensitive adhesiveness-imparting resin with respect to 100 parts by mass of the base resin from the viewpoint of adjusting the pressure-sensitive adhesive performance. In a case where the content of the pressure-sensitive adhesiveness-imparting resin is less than 1 part by mass, there is a case where the effect of adding the pressure-sensitive adhesiveness-imparting resin is insufficient, and, in a case where the content exceeds 100 parts by mass, there is a case where an effect for improving compatibility and/or the cohesive force degrades. Such a pressure-sensitive adhesiveness-imparting resin is not particularly limited, and, for example, a (hydrogenated) hydrocarbon-based resin, a (hydrogenated) rosin resin, a (hydrogenated) rosin ester resin, a (hydrogenated) terpene resin, a (hydrogenated) terpene phenol resin, a polymerized rosin resin, a polymerized rosin ester resins, and the like are exemplified. These pressure-sensitive adhesiveness-imparting resins may be used singly or two or more pressure-sensitive adhesiveness-imparting resins may be used in combination.

The pressure-sensitive adhesive composition of the present invention may further include one or more additives selected from the group consisting of an initiator such as a thermal initiator or a photoinitiator; an epoxy resin; a curing agent; an ultraviolet stabilizer; an antioxidant; a toning agent; a reinforcing agent; a filler; an anti-foaming agent; a surfactant; a photopolymerizable compound such as polyfunctional acrylate; and a plasticizer as long as the effect of the invention is not affected.

The pressure-sensitive adhesive layer is formed on the polarizing plate of the embodiment of the present invention, specifically, on the polarizing plate protective film side of the embodiment of the present invention. A method for forming the pressure-sensitive adhesive layer is not particularly limited, and, for example, a method in which the pressure-sensitive adhesive composition is applied to the polarizing plate using ordinary means such as a bar coater, dried, and cured; a method in which the pressure-sensitive adhesive composition is, first, applied to and dried on a surface of a peelable base material, then, the pressure-sensitive adhesive layer is transferred to the polarizing plate using the peelable base material, aged, and cured; or the like is used.

EXAMPLES

Hereinafter, the present invention will be more specifically described using examples. Materials, amounts used, processing contents, processing orders, and the like described in the following examples can be appropriately changed within the scope of the gist of the present invention. Therefore, the scope of the present invention is not limited by the examples described below.

[Production of Polarizing Plate Protective Film]

Materials used for polarizing plate protective films will be described below.

<Matrix Resin>

(Resin 1)

A commercially available polystyrene resin (manufactured by PS Japan Corporation, SGP-10 (trade name)), Tg: 100° C., fd: 0.86) was heated at 110° C., returned to normal temperature (23° C.), and then used.

(Resin 2)

A commercially available cyclic polyolefin resin (manufactured by JSR Corporation, ARTON RX4500 (trade name)), Tg: 140° C.) was heated at 110° C., returned to normal temperature (23° C.), and then used.

(Resin 3)

A commercially available cyclic polyolefin resin (manufactured by JSR Corporation, ARTON G7810 (trade name)), Tg: 140° C., fd: 0.81) was heated at 110° C., returned to normal temperature (23° C.), and then used.

(Resin 4)

A commercially available cyclic polyolefin resin (manufactured by Polyplastics Co., Ltd., TOPAS 8007 (trade name)), Tg: 78° C., copolymerized polymer of ethylene and norbornene, fd: 0.93)

(Resin 5)

A commercially available cyclic polyolefin resin (manufactured by Mitsui Chemicals, Inc., APL 6011T (trade name)), Tg: 105° C., copolymerized polymer of ethylene and norbornene, fd: 0.91)

(Resin 6)

Commercially available polymethyl methacrylate (manufactured by Mitsubishi Rayon Co., Ltd., DIANAL BR80 (trade name)), Tg: 110° C., fd: 0.70)

(Resin 7)

A commercially available polyphenylene ether resin (manufactured by Asahi Kasei Corporation, XYRON S201A (trade name), poly(2,6-dimethyl-1,4-phenylene oxide), Tg: 210° C.)

(Resin 8)

A commercially available cyclic polyolefin resin (manufactured by Polyplastics Co., Ltd., TOPAS 6013 (trade name)), Tg: 138° C., copolymerized polymer of ethylene and norbornene)

(Resin 9)

A commercially available cyclic polyolefin resin (manufactured by Mitsui Chemicals, Inc., APL 6509T (trade name)), Tg: 80° C., copolymerized polymer of ethylene and norbornene)

(Adhesiveness-Improving Resin 1)

EPOCROS RPS-1005 (trade name, oxazoline group-containing polystyrene-based resin, manufactured by Nippon Shokubai Co., Ltd.)

(Adhesiveness-Improving Resin 2)

A commercially available hydrogenated styrene-based thermoplastic elastomer (manufactured by Asahi Kasei Corporation, TUFTEC H1043 (trade name), hydrogen additive of a blocked copolymer of styrene/ethylene/butylene/styrene)

(Adhesiveness-Improving Resin 3)

A commercially available acid-modified hydrogenated styrene-based thermoplastic elastomer (manufactured by Asahi Kasei Corporation, TUFTEC M 1193 (trade name), maleic anhydride adduct of a hydrogen additive of a blocked copolymer of styrene/ethylene/butylene/styrene)

(Stretchable Resin Component 1)

ASAFLEX 810 (trade name, manufactured by Asahi Kasei Corporation, styrene-butadiene resin)

(Peel Property-Controlling Resin Component 1)

VYLON 550 (trade name, manufactured by Toyobo Co., Ltd., polyester-based additive)

(Borate Ester Group-Containing Copolymer (Copolymer (a))

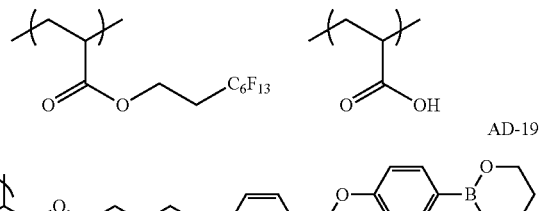

AD-19

<Coloring Agent>

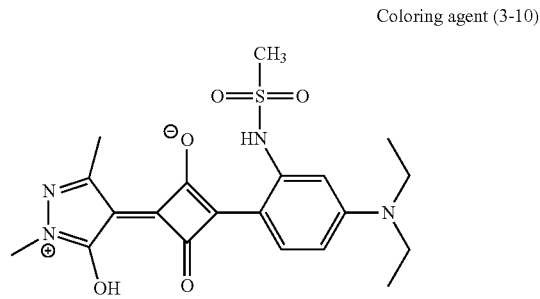

Coloring agent (3-10)

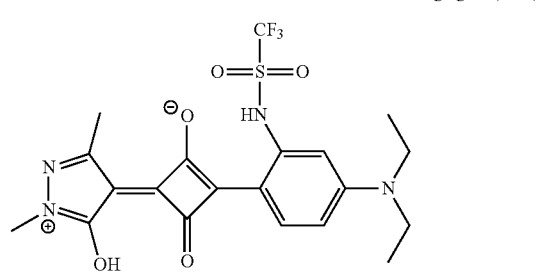

Coloring agent (3-11)

-continued
Coloring agent (3-44)
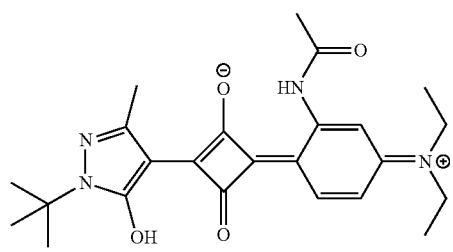
Coloring agent (3-45)
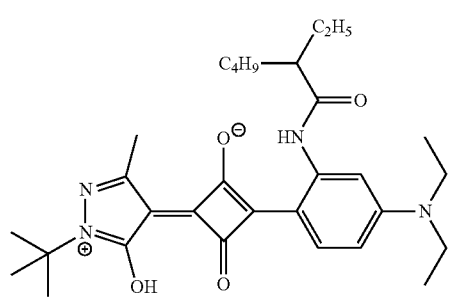
Coloring agent (3-69)
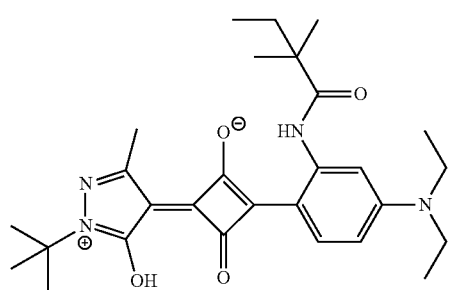
Coloring agent (7-3)
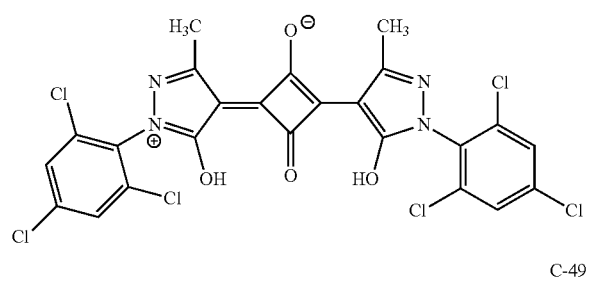
-continued
C-55
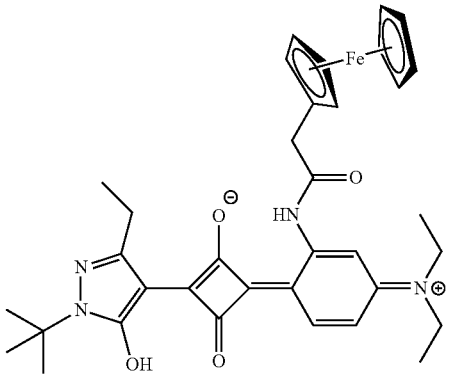
C-65
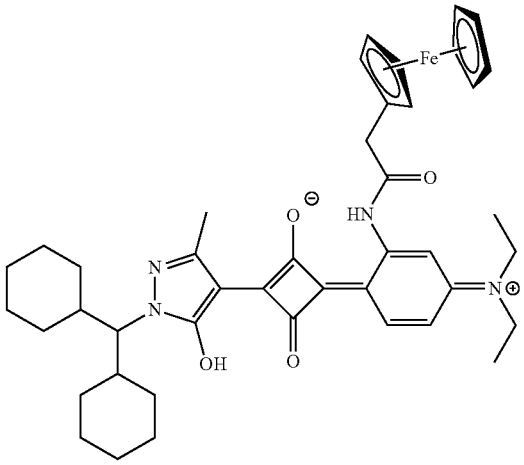
C-73
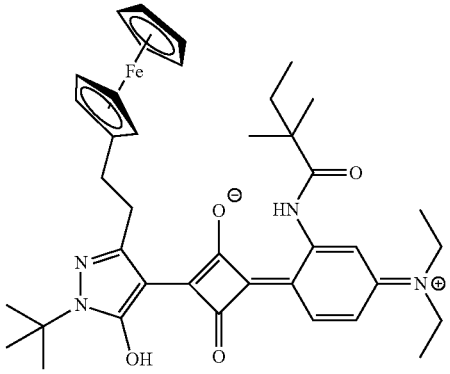
C-49
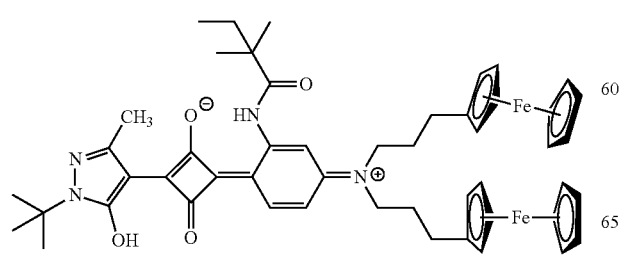
<Additives>
(Polarization Degree-Improving Agent)
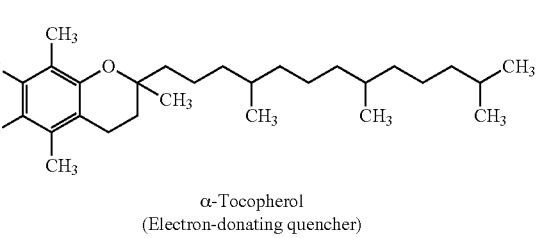
α-Tocopherol
(Electron-donating quencher)

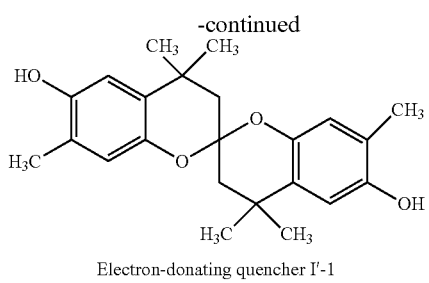

Electron-donating quencher I'-1

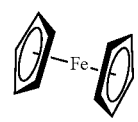

Electron-donating quencher I-1

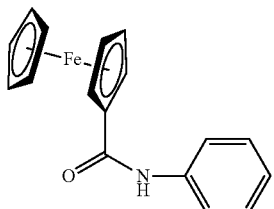

Electron-donating quencher I-13

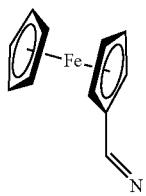

Electron-donating quencher I-21

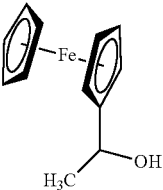

Electron-donating quencher I-27

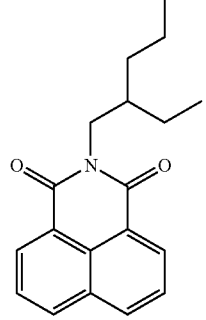

Electron-accepting quencher A

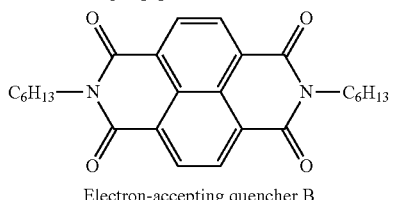

Electron-accepting quencher B

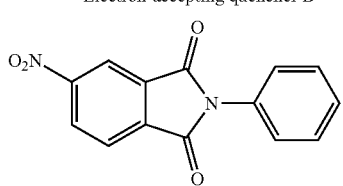

Electron-accepting quencher C

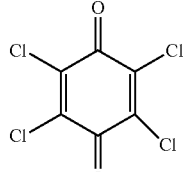

Electron-accepting quencher E

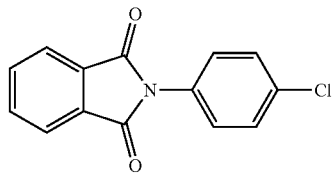

Electron-accepting quencher D

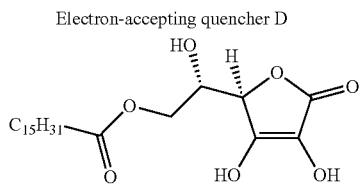

Electron-donating quencher F

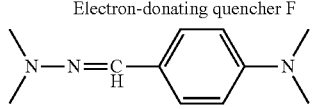

Electron-donating quencher G

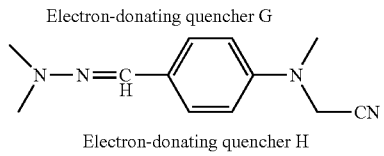

Electron-donating quencher H

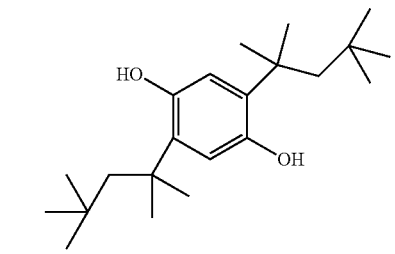

Electron-donating quencher I

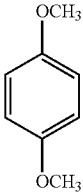

Electron-donating quencher J (Discoloration Preventer)

III-2, IV-1, IV-2, and IV-8 described above (Matting Agent 1)

Silicon dioxide fine particles, NX90S (manufactured by Nippon Aerosil Co., Ltd., particle size: 20 nm, Mohs hardness: approximately 7)

(Leveling Agent 1)

A surfactant having the following structure was used. In the following structural formula, t-Bu represents a tert-butyl group.

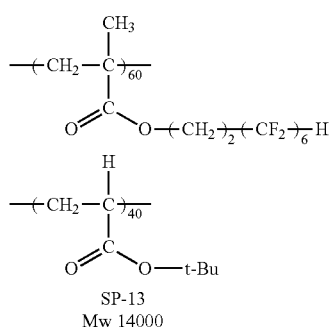

SP-13
Mw 14000

(Surfactant)
MEGAFACE F-552 (trade name, manufactured by DIC Corporation)
(Base Material Film)
(Base Material 1)
A commercially available polyethylene terephthalate film, LUMIRROR (R) S105 (film thickness: 38 μm, manufactured by Toray Industries, Inc.) was used as a base material 1.
(Base Material 2)
A commercially available polyethylene terephthalate film, LUMIRROR (R) SK50 (film thickness: 50 μm, manufactured by Toray Industries, Inc.) was used as a base material 2.

<Measurement of Oxidation Potential of Coloring Agent, Oxidation Potential of Polarization Degree-Improving Agent, and Reduction Potential of Polarization Degree-Improving Agent>

The oxidation potential and reduction potential of the coloring agent and the polarization degree-improving agent that are used in the present invention were measured using an electrochemical analyzer (660A manufactured by ALS Technology Co., Ltd.), a gold electrode as an working electrode, a platinum black electrode as an antipole, a Ag wire as a reference electrode, and tetrabutylammonium hexafluorophosphate as a supporting electrolyte respectively. As a measurement solvent, dichloromethane or acetonitrile was used.

In the present invention, the values of potentials were indicated using a ferrocene/ferricinium ion system ($Fc/Fc^+$) measured under the same conditions as a standard potential.

For polarization degree-improving agent-containing coloring agents (C-49), (C-55), and (C-65), two oxidation potentials were detected, the positive potential was assigned as the oxidation potential of a coloring agent portion, and the negative potential was assigned as the oxidation potential of a polarization degree-improving agent portion.

<Computation of Reduction Potential of Coloring Agent>

First, the absorption spectrum of the coloring agent was measured using a spectrophotometer (8430 manufactured by Hewlett-Packard Company), and, similarly, the fluorescent spectrum was measured using a fluorophotometer (Fluorog3 manufactured by Horiba, Ltd.). As a measurement solvent, the same solvent as in the above-described potential measurement was used.

Next, the absorption spectrum and the fluorescent spectrum obtained above were respectively standardized using the absorbance at the absorption maximum wavelength and the emission intensity at the light emission maximum wavelength, a wavelength at which both spectra intersect each other was obtained, and the value of this wavelength was converted to an energy unit (eV) and regarded as the HOMO-LUMO band gap.

The value of the HOMO-LUMO band gap was added to the value (eV) of the oxidation potential of the coloring agent measured above, thereby computing the reduction potential of the coloring agent.

<Production of Base Material-Attached Polarizing Plate Protective Film 101>
(Preparation of Resin Solution)
Individual components were mixed together in a composition described below, and a polarizing plate protective film-forming liquid (composition) Ba-1 was prepared.

| Composition of polarizing plate protective film-forming liquid Ba-1 | |
|---|---|
| Resin 1 | 100 parts by mass |
| Coloring agent 3-11 | 0.348 parts by mass |
| α-Tocopherol | 1.54 parts by mass |
| Matting agent 1 | 0.002 parts by mass |
| Ethyl acetate (solvent) | 574 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-1 after the filtration treatment was applied onto the base material 1 using a bar coater so that the dried film thickness reached 5.0 μm and dried at 100° C., thereby producing a base material-attached polarizing plate protective film 101.

<Production of Base Material-Attached Polarizing Plate Protective Films 102 to 114, 116 to 140, and 201 to 204, 211 to 213>

Base material-attached polarizing plate protective films 102 to 114 and 116 to 140 of the embodiment of the present invention and base material-attached polarizing plate protective films 201 to 204 and 211 to 213 of comparative examples were obtained in the same manner as the base material-attached polarizing plate protective film 101 except for the fact that the kind of the matrix resin, the kind, amount added, and film thickness of the coloring agent were changed to the contents of Table 1.

<Production of Base Material-Attached Polarizing Plate Protective Film 301>
(Preparation of Ethyl Acetate Solution of Stretchable Resin Component 1)

The stretchable resin component 1 (14.5 parts by mass) was dissolved in ethyl acetate (85.5 parts by mass). Next, KYOWAAD 700SEN-S (trade name, manufactured by Kyowa Chemical Industry Co., Ltd.) (5 parts by mass) was added thereto, stirred at room temperature for one hour, and then filtered using a metal-sintered filter having an absolute filtration accuracy of 2.5 μm (FH025 (trade name), manufactured by Pall Corporation) to remove KYOWAAD 700SEN-S, thereby preparing an ethyl acetate solution of the stretchable resin component 1 from which a basic component was removed.

(Preparation of Resin Solution)
Individual components were mixed together in a composition described below, and a polarizing plate protective film-forming liquid (composition) Ba-3 was prepared.

| Composition of polarizing plate protective film-forming liquid Ba-3 | |
| --- | --- |
| Resin 1 | 17.1 parts by mass |
| Adhesiveness-improving resin 1 | 49.8 parts by mass |
| Ethyl acetate solution of stretchable resin component 1 prepared above | 206.7 parts by mass |
| Peel property-controlling resin component 1 | 0.2 parts by mass |
| Borate ester group-containing copolymer (AD-19) | 0.3 parts by mass |
| Coloring agent C-73 | 0.33 parts by mass |
| Matting agent 1 | 0.002 parts by mass |
| Ethyl acetate (solvent) | 397.3 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-3 after the filtration treatment was applied onto the base material 1 using a bar coater so that the dried film thickness reached 5.0 μm and dried at 105° C., thereby producing a base material-attached polarizing plate protective film 301.

<Production of Base Material-Attached Polarizing Plate Protective Films 302 to 304>

Base material-attached polarizing plate protective films 302 to 304 of the embodiment of the present invention were obtained in the same manner as the base material-attached polarizing plate protective film 301 except for the fact that the kind and amount added of the matrix resin component and the amount added of the surfactant were changed to the contents of Table 2.

<Production of Base Material-Attached Polarizing Plate Protective Film 401>

(Preparation of Resin Solution)

Individual components were mixed together in a composition described below, and a polarizing plate protective film-forming liquid (composition) Ba-4 was prepared.

| Composition of polarizing plate protective film-forming liquid Ba-4 | |
| --- | --- |
| Resin 1 | 85.6 parts by mass |
| Resin 7 | 10.0 parts by mass |
| Peel property-controlling resin component 1 | 0.10 parts by mass |
| Coloring agent C-73 | 0.33 parts by mass |
| Discoloration preventer (IV-8) | 4.0 parts by mass |
| Matting agent 1 | 0.002 parts by mass |
| Toluene (solvent) | 767.3 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-4 after the filtration treatment was applied onto the base material 2 using a bar coater so that the dried film thickness reached 5.0 μm and dried at 120° C., thereby producing a base material-attached polarizing plate protective film 401.

<Production of Base Material-Attached Polarizing Plate Protective Films 402 to 407>

Base material-attached polarizing plate protective films 402 to 407 of the embodiment of the present invention were obtained in the same manner as the base material-attached polarizing plate protective film 401 except for the fact that the ratio between the resin 1 and the resin 7 in the matrix resin and the amount added and film thickness of the discoloration preventer were changed to the contents of Table 3.

<Production of Base Material-Attached Polarizing Plate Protective Film 501>

(Preparation of Resin Solution)

Individual components were mixed together in a composition described below, and a polarizing plate protective film-forming liquid (composition) Ba-5 was prepared.

| Composition of polarizing plate protective film-forming liquid Ba-5 | |
| --- | --- |
| Resin 4 | 68.6 parts by mass |
| Resin 8 | 29.4 parts by mass |
| Peel property-controlling resin component 1 | 0.10 parts by mass |
| Coloring agent C-73 | 0.73 parts by mass |
| Discoloration preventer (IV-8) | 1.1 parts by mass |
| Leveling agent: MEGAFACE F-554 (fluorine-based polymer manufactured by DIC Corporation) | 0.08 parts by mass |
| Matting agent 1 | 0.002 parts by mass |
| Toluene (solvent) | 770.0 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-5 after the filtration treatment was applied onto the base material 2 using a bar coater so that the dried film thickness reached 2.5 μm and dried at 120° C., thereby producing a base material-attached polarizing plate protective film 501.

<Production of Base Material-Attached Polarizing Plate Protective Films 502 to 507>

Base material-attached polarizing plate protective films 502 to 507 of the embodiment of the present invention were obtained in the same manner as the base material-attached polarizing plate protective film 501 except for the fact that the ratio of the matrix resin and the amount added and film thickness of the coloring agent were changed to the contents of Table 4.

(Evaluation of Polarizing Plate Protective Film)

The moisture contents of the base material-attached polarizing plate protective films of the embodiment of the present invention and the comparative examples were measured using the following method.

<Moisture Content>

The polarizing plate protective film of the embodiment of the present invention was peeled off from the base material-attached polarizing plate protective film, and the equilibrium moisture content of the polarizing plate protective film was computed using the following method.

The humidity of the specimen was adjusted for 24 hours or longer in an environment of a temperature of 25° C. and a humidity of 80%, then, the amount (g) of moisture was measured in a moisture measurement instrument and a specific drying device "CA-03" and "VA-05" (both manufactured by Mitsubishi Chemical Corporation) using the Karl Fischer method, and the moisture content (% by mass) was computed.

[Production of Polarizing Plate]

<Surface Treatment of Polarizing Plate Protective Film>

For the base material-attached polarizing plate protective films 101 to 114, 116 to 140, 201 to 204, 211 to 213, 301 to 304, 401 to 407, and 501 to 507, a corona treatment was carried out on a surface opposite to the base material film, thereby producing surface-treated base material-attached polarizing plate protective films 101 to 114, 116 to 140, 201 to 204, 211 to 213, 301 to 304, 401 to 407, and 501 to 507.

<Production of Polarizer (Polarizing Layer)>

According to Example 1 of JP2001-141926A, a circumferential velocity difference was imparted between two pairs of nip rollers to stretch a film in the longitudinal direction, thereby producing a polarizing layer including a 12 µm-thick polyvinyl alcohol resin.

<Production of Front-Side Polarizing Plate Protective Film (Outer Polarizing Plate Protective Film)>

(Preparation of Acrylic Resin)

Methyl methacrylate (MMA) (8,000 g), methyl 2-(hydroxymethyl)acrylate (MHMA) (2,000 g), and toluene (10,000 g) as a polymerization solvent were prepared in a reactor having an inner volume of 30 L which was equipped with a stirrer, a temperature sensor, a cooling pipe, and a nitrogen introduction pipe and heated up to 107° C. while passing nitrogen through the components. At the time of the beginning of a circulating flow caused by the heating, t-amyl peroxyisononanoate (10 g) was added thereto as a polymerization initiator, solution polymerization was caused to progress under the circulating flow at approximately 105° C. to 110° C. while adding a solution made up of t-amyl peroxyisononanoate (20 g) and toluene (100 g) dropwise for two hours, and aging was further carried out for four hours. The percentage of the polymerization reaction was 95%, and the content rate (mass ratio) of MHMA in the obtained polymer was 20%.

Next, a stearyl phosphate/distearyl phosphate mixture (manufactured by Sakai Chemical Industry Co., Ltd., Phoslex A-18) (10 g) was added to the obtained polymerized solution as a circulating flow catalyst, and a cyclization condensation reaction was caused to progress under the circulating flow at approximately 80° C. to 100° C. for 5.5 hours.

Next, the obtained polymerized solution was introduced to a vent-type screw twin-screw extruder having a barrel temperature of 260° C., a rotation speed of 100 rpm, a degree of pressure reduction of 13 to 400 hPa (10 to 300 mmHg), one rear vent and four fore-vents (0=29.75 mm, L/D=30) at a treatment rate of 2.0 kg/hour in terms of the resin amount, and a cyclization condensation reaction and devolatilization were carried out in the extruder. Next, after the completion of the devolatilization, the resin in a hot-melt state remaining in the extruder was discharged from a front end of the extruder and pelletized using a pelletizer, thereby obtaining a (meth)acrylic resin A. The acrylic resin A had a lactone ring structure. The mass average molecular weight of this resin was 110,000, and the glass transition temperature was 125° C.

(Production of Outer Polarizing Plate Protective Film)

The (meth)acrylic resin A (100 parts by mass) and a rubber elastic body C-1 (10 parts by mass) were supplied to a twin-screw extruder, melted and extruded in a sheet shape at approximately 280° C., thereby producing a 40 µm-thick long outer polarizing plate protective film. As the rubber elastic body C-1, KANE ACE M-210 (manufactured by Kaneka) was used.

(Attachment)

The polarizing layer and the surface-treated base material-attached polarizing plate protective film were laminated together using a 3% by mass aqueous solution of polyvinyl alcohol (manufactured by Kuraray Co., Ltd., PVA-117H) in a roll-to-roll manner so that the corona-treated surface of the protective film was located on the polarizing layer side and the absorption axis of the polarizing layer and the longitudinal direction of the base material-attached polarizing plate protective film became parallel to each other.

Next, an adhesive M having the following composition was applied to the outer polarizing plate protective film using a microgravure coater (gravure roll: #300, rotation speed: 140%/line speed) so that the thickness reached 5 µm, thereby producing an adhesive-attached front polarizing plate protective film. Next, the adhesive-attached front polarizing plate protective film and the polarizing layer were attached together such that a surface of the adhesive-attached front polarizing plate protective film to which an adhesive was attached and a surface of the polarizing layer to which the base material-attached polarizing plate protective film was not attached were attached together and irradiated with ultraviolet rays from the base material-attached polarizing plate protective film side, thereby producing a polarizing plate. The line speed was set to 20 m/min, and the accumulated light amount of ultraviolet rays was set to 300 mJ/cm². Here, the polarizer and the outer polarizing plate protective film were disposed so that the transmission axis of the polarizer and the transportation direction of the outer polarizing plate protective film were orthogonal to each other.

| - Composition of adhesive M - | |
|---|---|
| 2-Hydroxyethyl acrylate | 100 parts by mass |
| Tolylene diisocyanate | 10 parts by mass |
| Photopolymerization initiator (IRGACURE907, manufactured by BASF) | 3 parts by mass |

Subsequently, the polarizing plate was dried at 70° C., then, polyethylene terephthalate that was the base material film of the base material-attached polarizing plate protective film was continuously peeled off using the same device as a separator-peeling device having a peeling roller, and, furthermore, a commercially available acrylate-based pressure-sensitive adhesive was applied thereto, thereby producing a polarizing plate.

The degree of polarization of the obtained polarizing plate (5 cm×5 cm) was measured. The polarizing plate was attached onto glass through a pressure-sensitive adhesive so that each of the polarizing plate protective films 101 to 114, 116 to 140, 201 to 204, 211 to 213, 301 to 304, 401 to 407, and 501 to 507 was on the glass side. This sample was set in an automatic polarizing film measurement instrument VAP-7070 manufactured by JASCO Corporation so that the glass side of the sample faced a light source, and the orthogonal transmittance and the parallel transmittance in a wavelength range of 380 nm to 700 nm were measured. A polarization degree spectrum was computed from the measurement values of the orthogonal transmittance and the parallel transmittance using the following expression, and, furthermore, the weighted average of the light source (auxiliary illuminant C) and the CIE luminosity factor (Y) was computed, thereby computing the degree of polarization. The results are shown in Tables 1 to 4.

Degree of polarization(%)=[(parallel transmittance−orthogonal transmittance)/(parallel transmittance+orthogonal transmittance)]$^{1/2}$×100

The results of the respective evaluations described above are shown in the following tables.

TABLE 1

| | Polarizing plate protective film No. | Matrix resin | | Coloring agent A | | Coloring agent B | | |
|---|---|---|---|---|---|---|---|---|
| | | Kind | fd value | Kind | Absorption maximum wavelength (nm) | Amount blended[1] | Kind | Absorption maximum wavelength (nm) | Amount blended[1] |
| Example 101 | Polarizing plate protective film 101 | Resin 1 | 0.86 | (3-11) | 585 | 0.348 | | | |
| Example 102 | Polarizing plate protective film 102 | Resin 2 | — | (3-11) | 585 | 0.348 | | | |
| Example 103 | Polarizing plate protective film 103 | Resin 1 | 0.86 | (3-10) | 588 | 0.263 | | | |
| Example 104 | Polarizing plate protective film 104 | Resin 1 | 0.86 | (3-44) | 593 | 0.284 | | | |
| Example 105 | Polarizing plate protective film 105 | Resin 1 | 0.86 | (3-45) | 593 | 0.284 | | | |
| Example 106 | Polarizing plate protective film 106 | Resin 1 | 0.86 | (3-11) | 585 | 0.132 | | | |
| Example 107 | Polarizing plate protective film 107 | Resin 1 | 0.86 | (3-11) | 585 | 0.097 | | | |
| Example 108 | Polarizing plate protective film 108 | Resin 1 | 0.86 | (3-11) | 585 | 0.284 | | | |
| Example 109 | Polarizing plate protective film 109 | Resin 1 | 0.86 | (3-11) | 585 | 0.284 | | | |
| Example 110 | Polarizing plate protective film 110 | Resin 1 | 0.86 | (3-11) | 585 | 0.284 | | | |
| Example 111 | Polarizing plate protective film 111 | Resin 1 | 0.86 | (3-11) | 585 | 0.284 | | | |
| Example 112 | Polarizing plate protective film 112 | Resin 1 | 0.86 | (3-11) | 585 | 0.284 | | | |
| Example 113 | Polarizing plate protective film 113 | Resin 1 | 0.86 | (3-11) | 585 | 0.464 | | | |
| Example 114 | Polarizing plate protective film 114 | Resin 1 | 0.86 | (3-11) | 585 | 0.377 | (7-3) | 500 | 0.633 |

| | Polarization degree-improving agent | | | | Discoloration preventer | | Characteristics of protective film | | Degree of polarization Average |
|---|---|---|---|---|---|---|---|---|---|
| | Kind | $E_{Ld} - E_{Lq}$ | $E_{Hq} - E_{Hd}$ | Amount blended[1] | Kind | Amount blended[1] | Thickness (μm) | Moisture content (%) | |
| Example 101 | α-Tocopherol (electron-donating quencher) | −0.08 | | 1.54 | | | 5 | 0.1 | 99.90 |
| Example 102 | α-Tocopherol (electron-donating quencher) | −0.08 | | 1.54 | | | 18 | 0.1 | 99.90 |
| Example 103 | α-Tocopherol (electron-donating quencher) | −0.08 | | 1.54 | | | 5 | 0.1 | 99.90 |
| Example 104 | α-Tocopherol (electron-donating quencher) | −0.08 | | 1.29 | | | 5 | 0.1 | 99.92 |
| Example 105 | α-Tocopherol (electron-donating quencher) | −0.08 | | 1.16 | | | 5 | 0.1 | 99.92 |

TABLE 1-continued

| | | | | | | | | |
|---|---|---|---|---|---|---|---|---|
| Example 106 | α-Tocopherol (electron-donating quencher) | −0.08 | 0.58 | | | 10 | 0.1 | 99.87 |
| Example 107 | α-Tocopherol (electron-donating quencher) | −0.08 | 0.43 | | | 18 | 0.1 | 99.85 |
| Example 108 | | | | | | 5 | 0.1 | 99.83 |
| Example 109 | Electron-donating quencher (I'-1) | 0.00 | 4.30 | | | 5 | 0.1 | 99.89 |
| Example 110 | α-Tocopherol (electron-donating quencher) | −0.08 | 1.26 | (III-2) | 1.47 | 5 | 0.1 | 99.90 |
| Example 111 | α-Tocopherol (electron-donating quencher) | −0.08 | 1.26 | (IV-2) | 1.83 | 5 | 0.1 | 99.90 |
| Example 112 | α-Tocopherol (electron-donating quencher) | −0.08 | 1.26 | (IV-8) | 1.83 | 5 | 0.1 | 99.90 |
| Example 113 | | | | | | 10 | 0.1 | 99.83 |
| Example 114 | α-Tocopherol (electron-donating quencher) | −0.08 | 1.26 | | | 10 | 0.1 | 99.83 |

[1]Parts by mass with respect to 100 parts by mass of matrix resin

TABLE 1-1

| | Polarizing plate protective film No. | Matrix resin | | Coloring agent A | | Coloring agent B | |
|---|---|---|---|---|---|---|---|
| | | Kind | fd value | Kind | Absorption maximum wavelength (nm) | Amount blended[1] | Kind | Absorption maximum wavelength (nm) | Amount blended[1] |
| Example 116 | Polarizing plate protective film 116 | Resin 1 | 0.86 | (3-69) | 591 | 0.250 | | | |
| Example 117 | Polarizing plate protective film 117 | Resin 1 | 0.86 | (3-69) | 591 | 0.250 | | | |
| Example 118 | Polarizing plate protective film 118 | Resin 1 | 0.86 | (3-69) | 591 | 0.250 | | | |
| Example 119 | Polarizing plate protective film 119 | Resin 1 | 0.86 | (3-69) | 591 | 0.250 | | | |
| Example 120 | Polarizing plate protective film 120 | Resin 1 | 0.86 | (3-69) | 591 | 0.250 | | | |
| Example 121 | Polarizing plate protective film 121 | Resin 1 | 0.86 | (3-69) | 591 | 0.250 | | | |
| Example 122 | Polarizing plate protective film 122 | Resin 1 | 0.86 | (3-69) | 591 | 0.250 | | | |
| Example 123 | Polarizing plate protective film 123 | Resin 1 | 0.86 | (3-69) | 591 | 0.250 | | | |
| Example 124 | Polarizing plate protective film 124 | Resin 1 | 0.86 | (3-69) | 591 | 0.250 | | | |
| Example 125 | Polarizing plate protective film 125 | Resin 1 | 0.86 | (3-69) | 591 | 0.250 | | | |
| Example 126 | Polarizing plate protective film 126 | Resin 1 | 0.86 | (3-69) | 591 | 0.250 | | | |
| Example 127 | Polarizing plate protective film 127 | Resin 1 | 0.86 | (3-69) | 591 | 0.250 | | | |
| Example 128 | Polarizing plate protective film 128 | Resin 1 | 0.86 | (3-69) | 591 | 0.250 | | | |
| Example 129 | Polarizing plate protective film 129 | Resin 1 | 0.86 | (3-69) | 591 | 0.250 | | | |

TABLE 1-1-continued

| | | | | | | | | |
|---|---|---|---|---|---|---|---|---|
| Example 130 | Polarizing plate protective film 130 | Resin 1 | 0.86 | (3-69) | 591 | 0.250 | | |
| Example 131 | Polarizing plate protective film 131 | Resin 1 | 0.86 | (3-69) | 591 | 0.250 | | |
| Example 132 | Polarizing plate protective film 132 | Resin 1 | 0.86 | (3-69) | 591 | 0.250 | | |

| | Polarization degree-improving agent | | | Discoloration preventer | | Characteristics of protective film | | Degree of polarization Average |
|---|---|---|---|---|---|---|---|---|
| | Kind | $E_{Ld} - E_{Lq}$ | $E_{Hq} - E_{Hd}$ | Amount blended[1] | Kind | Amount blended[1] | Thickness (μm) | Moisture content (%) |
| Example 116 | | | | | (IV-8) | 2.57 | 5 | 0.1 | 99.83 |
| Example 117 | Electron-donating quencher (I-1) | | −0.45 | 0.94 | (IV-8) | 2.57 | 5 | 0.1 | 99.93 |
| Example 118 | Electron-donating quencher (I-1) | | −0.45 | 1.88 | (IV-8) | 2.57 | 5 | 0.1 | 99.95 |
| Example 119 | Electron-donating quencher (I-1) | | −0.45 | 3.76 | (IV-8) | 2.57 | 5 | 0.1 | 99.97 |
| Example 120 | Electron-donating quencher (I-13) | | −0.26 | 3.08 | (IV-8) | 2.57 | 5 | 0.1 | 99.94 |
| Example 121 | Electron-donating quencher (I-21) | | −0.34 | 2.32 | (IV-8) | 2.57 | 5 | 0.1 | 99.95 |
| Example 122 | Electron-donating quencher (I-27) | | −0.45 | 2.33 | (IV-8) | 2.57 | 5 | 0.1 | 99.93 |
| Example 123 | Electron-accepting quencher A | 0.02 | | 2.21 | (IV-8) | 2.57 | 5 | 0.1 | 99.81 |
| Example 124 | Electron-accepting quencher B | −0.74 | | 3.11 | (IV-8) | 2.57 | 5 | 0.1 | 99.96 |
| Example 125 | Electron-accepting quencher C | −0.49 | | 1.92 | (IV-8) | 2.57 | 5 | 0.1 | 99.94 |
| Example 126 | Electron-accepting quencher D | −0.37 | | 1.76 | (IV-8) | 2.57 | 5 | 0.1 | 99.85 |
| Example 127 | Electron-accepting quencher E | −1.61 | | 1.84 | (IV-8) | 2.57 | 5 | 0.1 | 99.95 |
| Example 128 | Electron-donating quencher E | | — | 2.96 | (IV-8) | 2.57 | 5 | 0.1 | 99.93 |
| Example 129 | Electron-donating quencher G | | −0.41 | 1.37 | (IV-8) | 2.57 | 5 | 0.1 | 99.95 |
| Example 130 | Electron-donating quencher H | | −0.21 | 1.55 | (IV-8) | 2.57 | 5 | 0.1 | 99.93 |
| Example 131 | Electron-donating quencher I | | 0.16 | 2.39 | (IV-8) | 2.57 | 5 | 0.1 | 99.91 |
| Example 132 | Electron-donating quencher J | | 0.44 | 0.99 | (IV-8) | 2.57 | 5 | 0.1 | 99.82 |

[1] Parts by mass with respect to 100 parts by mass of matrix resin

TABLE 1-2

| Polarizing plate protective film No. | Matrix resin | | Coloring agent A | | | Coloring agent B | | |
|---|---|---|---|---|---|---|---|---|
| | Kind | fd value | Kind | Absorption maximum wavelength (nm) | Amount blended[1] | Kind | Absorption maximum wavelength (nm) | Amount blended[1] |
| Example 133 | Polarizing plate protective film 133 | Resin 1 | 0.86 | (3-69) | 591 | 0.250 | | | |
| Example 134 | Polarizing plate protective film 134 | Resin 1 | 0.86 | (3-69) | 591 | 0.250 | | | |
| Example 135 | Polarizing plate protective film 135 | Resin 1 | 0.86 | (C-49) | 594 | 0.450 | | | |
| Example 136 | Polarizing plate protective film 136 | Resin 1 | 0.86 | (C-55) | 594 | 0.322 | | | |
| Example 137 | Polarizing plate protective film 137 | Resin 1 | 0.86 | (C-65) | 593 | 0376 | | | |

TABLE 1-2-continued

| Example | Film | Resin | | | | | Polarization degree-improving agent Kind | $E_{Ld} - E_{Lq}$ | $E_{Hq} - E_{Hd}$ | Amount blended[1] | Discoloration preventer Kind | Amount blended[1] | Thickness (μm) | Moisture content (%) | Degree of polarization Average |
|---|---|---|---|---|---|---|---|---|---|---|---|---|---|---|---|
| Example 133 | | | | | | | α-Tocopherol (electron-donating quencher) | −0.08 | 3.08 | | (IV8) | 2.57 | 5 | 0.1 | 99.93 |
| Example 134 | | | | | | | Electron-donating quencher (I'-1) | 0.00 | 2.63 | | (IV-8) | 2.57 | 5 | 0.1 | 99.92 |
| Example 135 | | | | | | | | | −0.55 | | (IV-8) | 2.57 | 5 | 0.1 | 99.99 |
| Example 136 | | | | | | | | | −0.52 | | (IV-8) | 2.57 | 5 | 0.1 | 99.99 |
| Example 137 | | | | | | | | | −0.55 | | (IV-8) | 2.57 | 5 | 0.1 | 99.99 |
| Example 138 | Polarizing plate protective film 138 | Resin 3 | 0.81 | (3-69) | 591 | 0.250 | | | | | (IV-8) | 2.57 | 5 | 0.3 | 99.72 |
| Example 139 | Polarizing plate protective film 139 | Resin 4 | 0.93 | (3-69) | 591 | 0.250 | | | | | (IV-8) | 2.57 | 5 | 0.1 | 99.93 |
| Example 140 | Polarizing plate protective film 140 | Resin 5 | 0.92 | (3-69) | 591 | 0.250 | | | | | (IV-8) | 2.57 | 5 | 0.1 | 99.93 |
| Comparative Example 201 | Polarizing plate protective film 201 | Resin 1 | 0.86 | (3-11) | 585 | 0.024 | | | | | | | 43 | 0.1 | 99.80 |
| Comparative Example 202 | Polarizing plate protective film 202 | Resin 1 | 0.86 | (3-11) | 585 | 0.018 | | | | | | | 58 | 0.1 | 99.80 |
| Comparative Example 203 | Polarizing plate protective film 203 | Resin 1 | 0.86 | (3-11) | 585 | 0.016 | α-Tocopherol (electron-donating quencher) | 0.12 | | 0.061 | | | 58 | 0.1 | 99.81 |
| Comparative Example 204 | Polarizing plate protective film 204 | Resin 1 | 0.86 | (3-11) | 585 | 0.016 | α-Tocopherol (electron-donating quencher) | 0.12 | | 0.061 | (IV-8) | 0.104 | 58 | 0.1 | 99.81 |
| Comparative Example 211 | Polarizing plate protective film 211 | Resin 6 | 0.70 | (3-69) | 591 | 0.250 | | | | | (IV-8) | 2.57 | 5 | 1.6 | 99.40 |
| Comparative Example 212 | Polarizing plate protective film 212 | Resin 1 | 0.86 | (3-11) | 585 | 0.024 | α-Tocopherol (electron-donating quencher) | 0.45 | | 0.94 | (IV-8) | 2.57 | 43 | 0.1 | 99.80 |
| Comparative Example 213 | Polarizing plate protective film 213 | Resin 1 | 0.86 | (3-11) | 585 | 0.018 | α-Tocopherol (electron-donating quencher) | 0.45 | | 0.94 | (IV-8) | 2.57 | 58 | 0.1 | 99.80 |

[1] Parts by mass with respect to 100 parts by mass of matrix resin

TABLE 2

| Polarizing plate protective film No. | Matrix resin | | | | |
|---|---|---|---|---|---|
| | Resin 1 | Adhesiveness-improving resin 1 | Borate ester group-containing copolymer | Stretchable resin component 1 | Peel property-controlling resin component 1 |
| Example 301 Polarizing plate protective film 301 | 17.6 | 51.1 | 0.3 | 30.8 | 0.2 |
| Example 302 Polarizing plate protective film 302 | 16.8 | 51.1 | 1.0 | 30.8 | 0.2 |
| Example 303 Polarizing plate protective film 303 | 17.8 | 51.2 | — | 30.8 | 0.2 |
| Example 304 Polarizing plate protective film 304 | — | 69.0 | — | 30.8 | 0.2 |

| | Surfactant[(1)] | Coloring agent | | Characteristics of protective film | | |
|---|---|---|---|---|---|---|
| | MEGAEACE F-552 | Kind | Absorption maximum wavelength (nm) | Amount added[(1)] | Thickness (µm) | Moisture content (%) | Degree of polarization Average |
| Example 301 | — | C-73 | 593 | 0.34 | 5 | 0.1 | 99.99 |
| Example 302 | — | C-73 | 593 | 0.34 | 5 | 0.1 | 99.99 |
| Example 303 | 0.1 | C-73 | 593 | 0.34 | 5 | 0.1 | 99.99 |
| Example 304 | 0.1 | C-73 | 593 | 0.34 | 5 | 0.1 | 99.99 |

[(1)]Parts by mass with respect to 100 parts by mass of matrix resin

TABLE 3

| Polarizing plate protective film No. | Matrix resin | | | Discoloration preventer[(1)] IV-8 | Coloring agent Kind |
|---|---|---|---|---|---|
| | Resin 1 | Resin 7 | Peel property-controlling resin component 1 | | |
| Example 401 Polarizing plate protective film 401 | 89.4 | 10.4 | 0.1 | 4.2 | C-73 |
| Example 402 Polarizing plate protective film 402 | 94.7 | 5.2 | 0.1 | 2.1 | C-73 |
| Example 403 Polarizing plate protective film 403 | 79.0 | 20.9 | 0.1 | 9.4 | C-73 |
| Example 404 Polarizing plate protective film 404 | 68.5 | 31.3 | 0.1 | 18.8 | C-73 |
| Example 405 Polarizing plate protective film 405 | 90.2 | 9.7 | 0.1 | 4.1 | C-73 |
| Example 406 Polarizing plate protective film 406 | 90.2 | 9.7 | 0.1 | 4.1 | C-73 |
| Example 407 Polarizing plate protective film 407 | 90.2 | 9.7 | 0.1 | 4.1 | C-73 |

| | Characteristics of protective film | | | | |
|---|---|---|---|---|---|
| | Coloring agent | | Thickness (µm) | Moisture content (%) | Degree of polarization Average |
| | Absorption maximum wavelength (nm) | Amount added[(1)] | | | |
| Example 401 | 593 | 0.34 | 5 | 0.1 | 99.99 |
| Example 402 | 593 | 0.34 | 5 | 0.1 | 99.99 |
| Example 403 | 593 | 0.34 | 5 | 0.1 | 99.99 |
| Example 404 | 593 | 0.34 | 5 | 0.1 | 99.99 |
| Example 405 | 593 | 0.34 | 4 | 0.1 | 99.99 |
| Example 406 | 593 | 0.34 | 3 | 0.1 | 99.99 |
| Example 407 | 593 | 0.34 | 2 | 0.1 | 99.99 |

[(1)]Parts by mass with respect to 100 parts by mass of matrix resin

TABLE 4

| | Polarizing plate protective film No. | Matrix resin Resin 4 | Matrix resin Resin 8 | Peel property-controlling resin component 1 | Coloring agent Kind | Coloring agent Absorption maximum wavelength (nm) |
|---|---|---|---|---|---|---|
| Example 501 | Polarizing plate protective film 501 | 69.9 | 30.0 | 0.1 | C-73 | 593 |
| Example 502 | Polarizing plate protective film 502 | 79.9 | 20.0 | 0.1 | C-73 | 593 |
| Example 503 | Polarizing plate protective film 503 | 89.9 | 10.0 | 0.1 | C-73 | 593 |
| Example 504 | Polarizing plate protective film 504 | 59.9 | 40.0 | 0.1 | C-73 | 593 |
| Example 505 | Polarizing plate protective film 505 | 69.9 | 30.0 | 0.1 | C-73 | 593 |
| Example 506 | Polarizing plate protective film 506 | 90.2 | 9.7 | 0.1 | C-73 | 593 |
| Example 507 | Polarizing plate protective film 507 | 90.2 | 9.7 | 0.1 | C-73 | 593 |

| | Characteristics of protective film Coloring agent Amount added[1] | Thickness (μm) | Moisture content (%) | Degree of polarization Average |
|---|---|---|---|---|
| Example 501 | 0.74 | 2.5 | 0.1 or less | 99.99 |
| Example 502 | 0.74 | 2.5 | 0.1 or less | 99.99 |
| Example 503 | 0.74 | 2.5 | 0.1 or less | 99.99 |
| Example 504 | 0.74 | 2.5 | 0.1 or less | 99.99 |
| Example 505 | 0.62 | 3.0 | 0.1 or less | 99.99 |
| Example 506 | 0.93 | 2.0 | 0.1 or less | 99.99 |
| Example 507 | 1.24 | 1.5 | 0.1 or less | 99.99 |

[1]Parts by mass with respect to 100 parts by mass of matrix resin

The results of Tables 1 to 4 show that the polarizing plate protective films of Examples 117 to 122, 124 to 131, 133 to 137, 301 to 304, 401 to 407, and 501 to 507 to which the electron-donating quencher satisfying the relational expression [A-1], the electron-accepting quencher satisfying the relational expression [B-1], or the polarization degree-improving agent-containing coloring agent was added had a higher degree of polarization than the polarizing plate protective film 116 not including the polarization degree-improving agent, which is preferable.

Particularly, the polarizing plate protective films of Examples 135 to 137, 301 to 304, 401 to 407, and 501 to 507 in which the polarization degree-improving agent was bonded to the coloring agent had a particularly significant polarization degree-improving effect.

On the other hand, in Comparative Examples 212 and 213 in which the film thickness exceeded the range of the present invention, the degrees of polarization did not improve even in the case of adding the polarization degree-improving agent.

In addition, the polarizing plate protective films 116 and 138 to 140 of the embodiment of the present invention in which the resin having an fd value satisfying the relational expression [C] was used had a higher degree of polarization than the polarizing plate protective film 211 of the comparative example, which is preferable.

Subsequently, the influence of the resin on the light fastness of the polarizing plate protective film was investigated.

A base material-attached polarizing plate protective film 115 of the embodiment of the present invention and base material-attached polarizing plate protective films 206 and 207 of the comparative examples were obtained in the same manner as the base material-attached polarizing plate protective film 101 except for the fact that the kind of the matrix resin and the kind, amount added, and film thickness of the coloring agent were changed to the contents of Table 5. As a base material-attached polarizing plate protective film 104, the base material-attached polarizing plate protective film obtained above was used.

<Light Fastness>

(Absorption Maximum Value of Polarizing Plate Protective Film)

The absorbance of the base material-attached polarizing plate protective film in a wavelength range of 400 nm to 800 nm was measured every nanometer using a UV3150 spectrophotometer manufactured by Shimadzu Corporation. The absorbance differences between the absorbances of the base material-attached polarizing plate protective film at the respective wavelengths and the absorbance of a base material-attached polarizing plate protective film not containing the coloring agent (but containing the same matrix resin) was computed, and the maximum value of these absorbance differences was defined as the absorption maximum value.

(Light Fastness)

The base material-attached polarizing plate protective film was irradiated with light for 200 hours in an environment of 60° C. and a relative humidity of 50% using a super xenon weather meter SX75 manufactured by Suga Test Instruments Co., Ltd., the absorption maximum values were measured before and after the irradiation, and the light fastness was computed using the following expression.

[Light fastness(%)]=([absorption maximum value after 200 hours of light irradiation]/[absorption maximum value before light irradiation])×100
The results are shown in the following table.

TABLE 5

| Polarizing plate protective film No. | Matrix resin | Coloring agent A Kind | Absorption maximum wavelength (nm) | Amount blended[1] | Polarization degree-improving agent Kind |
|---|---|---|---|---|---|
| Example 104 | Polarizing plate Protective film 104 | Resin 1 | (3-44) | 593 | 0.284 | α-Tocopherol |
| Example 115 | Polarizing plate Protective film 115 | Resin 1 | (3-11) | 585 | 0.284 | α-Tocopherol |
| Comparative Example 206 | Polarizing plate Protective film 206 | Polyester[2] | (3-44) | 593 | 0.260 | α-Tocopherol |
| Comparative Example 207 | Polarizing plate Protective film 207 | Polyester[2] | (3-11) | 585 | 0.260 | α-Tocopherol |

| | Polarization degree-improving agent Amount blended[1] | Characteristics of protective film | | |
|---|---|---|---|---|
| | | Thickness (μm) | Moisture content (%) | Light fastness (%) |
| Example 104 | 1.29 | 5 | 0.1 | 70 |
| Example 115 | 1.29 | 5 | 0.1 | 79 |
| Comparative Example 206 | 1.18 | 5 | 1.0 | 55 |
| Comparative Example 207 | 1.18 | 5 | 1.0 | 61 |

[1]Parts by mass with respect to 100 parts by mass of matrix resin
[2]VYLON 100 manufactured by Toyobo Co., Ltd.

As shown in Table 5, in a case where the moisture content of the matrix resin used in the polarizing plate protective film was 1.0%, a result of poor light fastness was obtained. That is, it is found that it is important for the matrix resin to have a certain degree of a hydrophobic property in terms of improvement in light fastness.

Base material-attached polarizing plate protective films 208 to 210 of the comparative examples were obtained in the same manner as the base material-attached polarizing plate protective film 101 except for the fact that the kind of the matrix resin and the kind, amount added, and film thickness of the coloring agent were changed to the contents of Table 5. Polarizing plates were obtained in the same manner as described above using these base material-attached polarizing plate protective films.

As the base material-attached polarizing plate protective films 101 to 114 and 116 to 122 and the polarizing plates for which the above-described base material-attached polarizing plate protective films were used, the polarizing plate protective films and the polarizing plates were used.

[Production of Liquid Crystal Display Device]

The liquid crystal panel was removed from a commercially available liquid crystal display device (SJ8500 55V manufactured by LG Electronics), the polarizing plate on the front side (viewer side) was peeled off, and, instead, the polarizing plate prepared above was attached thereto through a pressure-sensitive adhesive. A liquid crystal display device was produced as described above. As the light source of SJ8500, a white LED produced by combining a blue LED, a green fluorescent body, and a red fluorescent body was used.

[Evaluation of Color Reproduction Range]

White, red, green, and blue were displayed on the full screen of the produced liquid crystal display device, and the brightness of the white display and the chromaticity of each of red, green, and blue were measured using a spectroradiometer (SR-UL2 manufactured by Topcon Technohouse Corporation). The area of a portion in which a triangle formed by connecting the chromaticity points of the measured red, green, and blue on an xy chromaticity diagram of the CIE color system overlapped a triangle formed by connecting three primary color points of the DCI-P3 standard was obtained and divided by the area of the triangle formed by connecting three primary color points of the DCI-P3 standard, thereby computing the cover ratio to the DCI-P3 standard. The results are shown in Table 5.

The three primary color points of the DCI-P3 standard are as described below.

Red: x=0.680, y=0.320 Green: x=0.265, y=0.690, blue: x=0.150, y=0.060

TABLE 6

| | Polarizing plate protective film No. | Matrix resin | Coloring agent A | | | Coloring agent B | | |
|---|---|---|---|---|---|---|---|---|
| | | | Kind | Absorption maximum wavelength (nm) | Amount blended[1] | Kind | Absorption maximum wavelength (nm) | Amount blended[1] |
| Example 101 | Polarizing plate protective film 101 | Resin 1 | (3-11) | 585 | 0.348 | | | |
| Example 102 | Polarizing plate protective film 102 | Resin 2 | (3-11) | 585 | 0.348 | | | |
| Example 103 | Polarizing plate protective film 103 | Resin 1 | (3-10) | 588 | 0.263 | | | |
| Example 104 | Polarizing plate protective film 104 | Resin 1 | (3-44) | 593 | 0.284 | | | |
| Example 105 | Polarizing plate protective film 105 | Resin 1 | (3-45) | 593 | 0.284 | | | |
| Example 106 | Polarizing plate protective film 106 | Resin 1 | (3-11) | 585 | 0.132 | | | |
| Example 107 | Polarizing plate protective film 107 | Resin 1 | (3-11) | 585 | 0.097 | | | |
| Example 108 | Polarizing plate protective film 108 | Resin 1 | (3-11) | 585 | 0.284 | | | |

TABLE 6-continued

| | | | | | | | |
|---|---|---|---|---|---|---|---|
| Example 109 | Polarizing plate protective film 109 | Resin 1 | (3-11) | 585 | 0.284 | | |
| Example 110 | Polarizing plate protective film 110 | Resin 1 | (3-11) | 585 | 0.284 | | |
| Example 111 | Polarizing plate protective film 111 | Resin 1 | (3-11) | 585 | 0.284 | | |
| Example 112 | Polarizing plate protective film 112 | Resin 1 | (3-11) | 585 | 0.284 | | |
| Example 113 | Polarizing plate protective film 113 | Resin 1 | (3-11) | 585 | 0.464 | | |
| Example 114 | Polarizing plate protective film 114 | Resin 1 | (3-11) | 585 | 0.377 | (7-3) | 500 | 0.633 |
| Example 116 | Polarizing plate protective film 116 | Resin 1 | (3-69) | 591 | 0.250 | | |
| Example 117 | Polarizing plate protective film 117 | Resin 1 | (3-69) | 591 | 0.250 | | |
| Example 118 | Polarizing plate protective film 118 | Resin 1 | (3-69) | 591 | 0.250 | | |
| Example 119 | Polarizing plate protective film 119 | Resin 1 | (3-69) | 591 | 0.250 | | |
| Example 120 | Polarizing plate protective film 120 | Resin 1 | (3-69) | 591 | 0.250 | | |
| Example 121 | Polarizing plate protective film 121 | Resin 1 | (3-69) | 591 | 0.250 | | |
| Example 122 | Polarizing plate protective film 122 | Resin 1 | (3-69) | 591 | 0.250 | | |
| Comparative Example 208 | Polarizing plate protective film 208 | Resin 1 | | | | | |
| Comparative Example 209 | Polarizing plate protective film 209 | Resin 2 | | | | | |
| Comparative Example 210 | Polarizing plate protective film 210 | Polyester[(2)] | | | | | |

| | Polarization degree-improving agent | | Discoloration preventer | | Characteristics of protective film | | Color reproducibility of liquid crystal display device (DCI-P3 cover ratio) |
|---|---|---|---|---|---|---|---|
| | Kind | Amount blended[(1)] | Kind | Amount blended[(1)] | Thickness (μm) | Moisture content (%) | |
| Example 101 | α-Tocopherol | 1.54 | | | 5 | 0.1 | 87.3 |
| Example 102 | α-Tocopherol | 1.54 | | | 18 | 0.1 | 87.3 |
| Example 103 | α-Tocopherol | 1.54 | | | 5 | 0.1 | 87.3 |
| Example 104 | α-Tocopherol | 1.29 | | | 5 | 0.1 | 87.3 |
| Example 105 | α-Tocopherol | 1.16 | | | 5 | 0.1 | 87.3 |
| Example 106 | α-Tocopherol | 0.58 | | | 10 | 0.1 | 87.3 |
| Example 107 | α-Tocopherol | 0.43 | | | 18 | 0.1 | 87.3 |
| Example 108 | | | | | 5 | 0.1 | 87.3 |
| Example 109 | (I'-1) | 4.30 | | | 5 | 0.1 | 87.3 |
| Example 110 | α-Tocopherol | 1.26 | (III-2) | 1.47 | 5 | 0.1 | 87.3 |
| Example 111 | α-Tocopherol | 1.26 | (IV-2) | 1.83 | 5 | 0.1 | 87.0 |
| Example 112 | α-Tocopherol | 1.26 | (IV-8) | 1.83 | 5 | 0.1 | 87.0 |
| Example 113 | | | | | 10 | 0.1 | 91.1 |
| Example 114 | α-Tocopherol | 1.26 | | | 10 | 0.1 | 88.6 |
| Example 116 | | | (IV-8) | 2.57 | 5 | 0.1 | 87.5 |
| Example 117 | (1-1) | 0.94 | (IV-8) | 2.57 | 5 | 0.1 | 87.5 |
| Example 118 | (1-1) | 1.88 | (IV-8) | 2.57 | 5 | 0.1 | 87.5 |
| Example 119 | (1-1) | 3.76 | (IV-8) | 2.57 | 5 | 0.1 | 87.5 |
| Example 120 | (1-13) | 3.08 | (IV-8) | 2.57 | 5 | 0.1 | 87.5 |
| Example 121 | (1-21) | 2.32 | (IV-8) | 2.57 | 5 | 0.1 | 87.5 |
| Example 122 | (1-27) | 2.33 | (IV-8) | 2.57 | 5 | 0.1 | 87.5 |
| Comparative Example 208 | | | | | 5 | 0.1 | 54.8 |
| Comparative Example 209 | | | | | 5 | 0.1 | 54.8 |
| Comparative Example 210 | | | | | 5 | 1.0 | 54.8 |

[(1)]Parts by mass with respect to 100 parts by mass of matrix resin
[(2)]VYLON 200 manufactured by Toyobo Co., Ltd.

As shown in Table 6, it is found that, in the case of using the polarizing plate protective film of the embodiment of the present invention, the color reproducibility of the liquid crystal display device is enhanced.

<Production of Base Material-Attached Polarizing Plate Protective Film 601>

(Preparation of Resin Solution)

Individual components were mixed together in a composition described below, and a polarizing plate protective film-forming liquid (composition) Ba-6 was prepared.

| Composition of polarizing plate protective film-forming liquid Ba-6 | |
|---|---|
| Resin 1 | 48.0 parts by mass |
| Adhesiveness-improving resin 1 | 50.8 parts by mass |
| Peel property-controlling resin component 1 | 0.2 parts by mass |
| Borate ester group-containing copolymer (AD-19) | 1.0 parts by mass |
| Coloring agent C-73 | 0.55 parts by mass |
| Matting agent 1 | 0.002 parts by mass |
| Ethyl acetate (solvent) | 397.3 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-6 after the filtration treatment was applied onto the base material 1 using a bar coater so that the dried film thickness reached 3.0 μm and dried at 105° C., thereby producing a base material-attached polarizing plate protective film 601.

<Pressure-Sensitive Adhesive Layer-Attached Polarizing Plate 601-A>

A polarizing plate 601 was produced in the same manner as Example 301 except for the fact that, in Example 301, the base material-attached polarizing plate protective film 301 was changed to the base material-attached polarizing plate protective film 601 obtained above.

<Manufacturing of Acrylic Copolymer (A-1)>

A monomer mixture of n-butyl acrylate (n-BA) (95.8 parts by mass), acrylic acid (AA) (4 parts by mass), and hydroxyethyl methacrylate (2-HEMA) (0.2 parts by mass) was injected into a 1 L reactor vessel including a cooling device so that nitrogen gas was circulated and the temperature was easily adjusted, and ethyl acetate (EAc) (100 parts by mass) was injected thereinto as a solvent. Next, the nitrogen gas was purged for one hour in order to remove oxygen and then the mixture was held at 62° C. After that, the mixture was uniformed, then, azobisisobutyronitrile (AIBN) (0.03 parts by mass) diluted to a concentration of 50% using ethyl acetate was injected thereinto as a reaction initiator, and a reaction was caused for eight hours, thereby manufacturing an acrylic copolymer (A-1).

A tolylene diisocyanate adduct (TDI-1) of isocyanate-based trimethylolpropane (0.5 parts by mass) as a crosslinking agent and tributylmethylammonium bis(trifluoromethanesulfonyl)imide (0.5 parts by mass) as an antistatic agent were injected into the acrylic copolymer A-1 manufactured above (100 parts by mass), diluted to an appropriate concentration to uniformly mix the components, then, applied to and dried on exfoliate paper, thereby manufacturing a 25 μm-thick uniform pressure-sensitive adhesive layer.

The pressure-sensitive adhesive layer produced above was caused to pressure-sensitively adhere to the polarizing plate protective film 601 side of the embodiment of the present invention of the polarizing plate protective film 601 of the embodiment the present invention, thereby manufacturing a pressure-sensitive adhesive-attached polarizing plate 601-A.

<Production of Pressure-Sensitive Adhesive-Attached Polarizing Plates 601-B and 601-C>

Polarizing plates 601-B and 601-C of the embodiment of the present invention were produced in the same manner as in the manufacturing of the polarizing plate 601-A except for the fact that, in the production of the pressure-sensitive adhesive-attached polarizing plate 601-A, the kind of the antistatic agent was changed to compounds shown in Table 7.

Antistatic Agent A
Tributylmethylammonium bis(trifluoromethanesulfonyl)imide
Antistatic Agent B
1-Butyl-4-methylpyridinium hexafluorophosphate
Antistatic agent C
Tributylmethylammonium bis(trifluoromethanesulfonyl)imide <Base Material-Attached Polarizing Plate Protective Film 602>

A base material-attached polarizing plate protective film 602 of the embodiment of the present invention was obtained in the same manner as in the production of the base material-attached polarizing plate protective film 601 except for the fact that, in the production of the base material-attached polarizing plate protective film 601, the amounts added of the resin 1 and the stretchable resin component 1 were changed to amounts shown in Table 7.

<Production of Pressure-Sensitive Adhesive Layer-Attached Polarizing Plate 602-A>

A polarizing plate 602-A of the embodiment of the present invention were produced in the same manner as in the manufacturing of the polarizing plate 601-A except for the fact that, in the manufacturing of the pressure-sensitive adhesive layer-attached polarizing plate 601-A, the polarizing plate 601 was changed to the polarizing plate 602.

Each of the pressure-sensitive adhesive layer-attached polarizing plates 601-A, 601-B, 601-C, and 602-A manufactured above was cut to 4 cm×4 cm and attached to glass. Next, the glass-attached polarizing plate was set in an automatic polarizing film measurement instrument VAP-7070 manufactured by JASCO Corporation so that the glass side of the sample faced a light source, and the single plate transmittance at a wavelength of 595 nm was measured. Furthermore, the glass-attached polarizing plate was stored in an environment of 80° C. for 500 hours, and, again, the single plate transmittance at a wavelength of 595 nm was measured using VAP-7070. A change in the single plate transmittance attributed to the storage in the environment of 80° C. for 500 hours was computed using the following expression and is shown in Table 7.

$\Delta Ts$=(single plate transmittance after storage at 80° C. for 500 hours)−(initial single plate transmittance)

TABLE 7

|  | Polarizing plate protective film No. | Resin 1 | Adhesiveness-improving resin 1 | Borate ester group-containing copolymer | Stretchable resin component 1 | Peel property-controlling resin component 1 |
|---|---|---|---|---|---|---|
| | | | | Matrix resin | | |
| Example 601-A | Polarizing plate protective film 601 | 48 | 50.8 | 1.0 | 0.0 | 0.2 |
| Example 601-B | Polarizing plate protective film 601 | 48 | 50.8 | 1.0 | 0.0 | 0.2 |
| Example 601-C | Polarizing plate protective film 601 | 48 | 50.8 | 1.0 | 0.0 | 0.2 |
| Example 602-A | Polarizing plate protective film 602 | 17.4 | 50.8 | 1.0 | 30.6 | 0.2 |

TABLE 7-continued

| | Coloring agent | | Characteristics of protective film | | Pressure-sensitive adhesive layer Antistatic agent | Characteristics of polarizing plate | |
|---|---|---|---|---|---|---|---|
| | Kind | Absorption maximum wavelength (nm) | Amount added[1] | Thickness (μm) | Moisture content (%) | | Average degree of polarization | Heat resistance ΔTs |
| Example 601-A | C-73 | 593 | 0.57 | 3.0 | 0.1 | A | 99.99 | 0.2% |
| Example 601-B | C-73 | 593 | 0.57 | 3.0 | 0.1 | B | 99.99 | 1.0% |
| Example 601-C | C-73 | 593 | 0.57 | 3.0 | 0.1 | C | 99.99 | 0.9% |
| Example 602-A | C-73 | 593 | 0.57 | 3.0 | 0.1 | A | 99.99 | 0.6% |

[1]Parts by mass with respect to 100 parts by mass of matrix resin

From the results of Table 7, it is found that, in the pressure-sensitive adhesive layer-attached polarizing plate 601-A in which the antistatic agent A having a cation represented by General Formula 11, the heat resistance of the polarizing plate was more favorable than in the pressure-sensitive adhesive layer-attached polarizing plates 601-B and 601-C, which is particularly preferable.

<Production of Base Material-Attached Polarizing Plate Protective Film 701>

(Preparation of Resin Solution)

Individual components were mixed together in a composition described below, and a polarizing plate protective film-forming liquid (composition) Ba-7 was produced.

| Composition of polarizing plate protective film-forming liquid Ba-7 | |
|---|---|
| Resin 4 | 37.4 parts by mass |
| Resin 8 | 56.1 parts by mass |
| Coloring agent C-73 | 0.73 parts by mass |
| Discoloration preventer (IV-8) | 1.1 parts by mass |
| Color tone adjuster: m-Terphenyl | 4.5 parts by mass |
| Leveling agent: MEGAFACE F-554 (fluorine-based polymer manufactured by DIC Corporation) | 0.08 parts by mass |
| Matting agent 1 | 0.002 parts by mass |
| Cyclohexane (solvent) | 770.0 parts by mass |

Subsequently, the obtained solution was filtered using filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Base Material-Attached Polarizing Plate Protective Film)

The forming liquid Ba-7 after the filtration treatment was applied onto the base material 2 using a bar coater so that the dried film thickness reached 2.5 μm and dried at 120° C., thereby producing a base material-attached polarizing plate protective film 701.

For the base material-attached polarizing plate protective film 701, a corona treatment was carried out on a surface opposite to the base material, thereby producing a surface-treated base material-attached polarizing plate protective film 701.

[Production of Adhesive Composition A]

Omnicat 250 (trade name, manufactured by IGM Resins B. V.) (aromatic iodonium salt) that was the photo-cationic polymerization initiator (B) (5 parts by mass) and 2-isopropylthioxanthone (manufactured by Tokyo Chemical Industry Co., Ltd.) that was the photosensitizer (C) (0.9 parts by mass) were added to a resin composition (photo-cationcurable component (A)) (100 parts by mass) produced by feeding 3,4-epoxycyclohexylmethyl 3,4-epoxycyclohexane carboxylate (Celloxide 2021P (trade name) manufactured by Daicel Corporation) (alicyclic diepoxy compound (A1)) (25% by mass), 1,4-cyclohexanedimethanol diglycidyl ether (diglycidyl compound (A3)) (25% by mass), and 3-ethyl-3-[(3-ethyloxetane-3-yl)methoxymethyl]oxetane (ARON OXETANE DOX221 (trade name) of Toagosei Co., Ltd.) (other cationic polymerizable compounds (oxetane compound)) (50% by mass), thereby producing an adhesive composition for a polarizing plate A.

(Attachment)

The polarizing layer and the surface-treated base material-attached polarizing plate protective film 701 were laminated together using the adhesive composition for a polarizing plate A produced above in a roll-to-roll manner so that the corona-treated surface of the protective film was located on the polarizing layer side and the absorption axis of the polarizing layer and the longitudinal direction of the base material-attached polarizing plate protective film 701 became parallel to each other. Next, the adhesive composition for a polarizing plate A was applied to the same outer polarizing plate protective film as used in the production of the polarizing plate 501 so that the thickness reached 3 μm, thereby producing an adhesive-attached front polarizing plate protective film. Next, the adhesive-attached front polarizing plate protective film and the polarizing layer were attached together such that a surface of the adhesive-attached front polarizing plate protective film to which an adhesive was attached and a surface of the polarizing layer to which the base material-attached polarizing plate protective film was not attached were attached together and irradiated with ultraviolet rays from the base material-attached polarizing plate protective film side, thereby producing a polarizing plate 701. The line speed was set to 20 m/min, and the accumulated light amount of ultraviolet rays was set to 300 mJ/cm$^2$. Here, the polarizer and the outer polarizing plate protective film were disposed so that the transmission axis of the polarizer and the transportation direction of the outer polarizing plate protective film were orthogonal to each other.

The pressure-sensitive adhesive layer produced in the production of the pressure-sensitive adhesive-attached polarizing plate 601-B was attached to the polarizing plate 701 side of the polarizing plate 701, thereby producing a pressure-sensitive adhesive-attached polarizing plate 701-B of the embodiment of the present invention.

<Production of Base Material-Attached Polarizing Plate Protective Films 702 to 708>

Surface-treated base material-attached polarizing plate protective films 702 to 708 of the embodiment of the present invention were obtained in the same manner as the surface-treated base material-attached polarizing plate protective film 701 except for the fact that the kind and ratio of the matrix resin and the amount added of m-terphenyl were changed to the contents of Table 8.

<Production of Pressure-Sensitive Adhesive Layer-Attached Polarizing Plates 701-B and 708-B>

Pressure-sensitive adhesive layer-attached polarizing plates 702-B to 708-B were produced in the same manner as the pressure-sensitive adhesive-attached polarizing plate 701-B except for the fact that the surface-treated base material-attached polarizing plate protective film 701 was changed to the surface-treated base material-attached polarizing plate protective films 702 to 708 obtained above.

(Measurement of Glass Transition Temperature of Polarizing Plate Protective Film)

The base material was peeled off from the base material-attached polarizing plate protective film 701, the remaining polarizing plate protective film 701 (20 mg) was put into a measurement pan, heated up to 120° C. from 30° C. at a rate of 10° C./minute in a nitrogen stream, held for 15 minutes, and then cooled to 30° C. at −20° C./minute. After that, again, the polarizing plate protective film is heated up to 250° C. from 30° C., and a temperature at which the baseline begins to deviate from the low-temperature side is regarded as the glass transition temperature Tg.

For the base material-attached polarizing plate protective films 702 to 708, Tg's were measured in the same manner as described above. The results are shown in Table 8.

(Measurement of Degree of Polarization)

The degrees of polarization of the pressure-sensitive adhesive-attached polarizing plates 701-B to 708-B were measured in the same manner as that of the pressure-sensitive adhesive-attached polarizing plate 101. Furthermore, the degrees of polarization of the pressure-sensitive adhesive-attached polarizing plates 701-B to 708-B were measured after being stored in an environment of a temperature of 85° C. and a relative humidity of 85% for 500 hours. The results are shown in Table 8.

TABLE 8

| | Polarizing plate protective film No. | Matrix resin | | | | | | Coloring agent Kind |
|---|---|---|---|---|---|---|---|---|
| | | Resin 3 | Resin 4 | Resin 8 | Resin 9 | Adhesiveness-improving resin 2 | Adhesiveness-improving resin 3 | |
| Example 701-B | Polarizing plate protective film 701 | — | 40.0 | 60.0 | — | — | — | C-73 |
| Example 702-B | Polarizing plate protective film 702 | — | 45.0 | 55.0 | — | — | — | C-73 |
| Example 703-B | Polarizing plate protective film 703 | — | 50.0 | 50.0 | — | — | — | C-73 |
| Example 704-B | Polarizing plate protective film 704 | — | 55.0 | 45.0 | — | — | — | C-73 |
| Example 705-B | Polarizing plate protective film 705 | — | 100.0 | 0.0 | — | — | — | C-73 |
| Example 706-B | Polarizing plate protective film 706 | 95.7 | — | — | — | 3.4 | 0.9 | C-73 |
| Example 707-B | Polarizing plate protective film 707 | 77.9 | — | — | 19.5 | 1.7 | 0.9 | C-73 |
| Example 708-B | Polarizing plate protective film 708 | 57.4 | — | — | 38.3 | 3.4 | 0.9 | C-73 |

| | Coloring agent | Additives | | Characteristics of protective film | | | Characteristics of polarizing plate | |
|---|---|---|---|---|---|---|---|---|
| | Absorption maximum wavelength (nm) | Amount added[1] | Discoloration preventer (IV-8)[1] | Color tone adjuster m-Terphenyl[1] | Thickness (μm) | Moisture content (%) | Tg (° C.) | Initial degree of polarization | Degree of polarization after 500 hours at 85° C. RH85% |
| Example 701-B | 593 | 0.78 | 1.2 | 4.8 | 2.5 | 0.1 or less | 88 | 99.99 | 99.8 |
| Example 702-B | 593 | 0.78 | 1.2 | 4.8 | 2.5 | 0.1 or less | 84 | 99.99 | 99.8 |
| Example 703-B | 593 | 0.78 | 1.2 | 4.8 | 2.5 | 0.1 or less | 82 | 99.99 | 99.8 |
| Example 704-B | 593 | 0.78 | 1.2 | 4.8 | 2.5 | 0.1 or less | 80 | 99.99 | 99.8 |
| Example 705-B | 593 | 0.78 | 1.2 | 4.8 | 2.5 | 0.1 or less | 65 | 99.99 | 99.0 |
| Example 706-B | 593 | 0.78 | 1.2 | 4.8 | 2.5 | 0.1 or less | 82 | 99.99 | 99.8 |
| Example 707-B | 593 | 0.78 | 1.2 | 4.8 | 2.5 | 0.1 or less | 78 | 99.99 | 99.8 |
| Example 708-B | 593 | 0.78 | 1.2 | 4.8 | 2.5 | 0.1 or less | 72 | 99.99 | 99.8 |

[1]Parts by mass with respect to 100 parts by mass of matrix resin

From the results of Table 8, it is found that, in the pressure-sensitive adhesive-attached polarizing plates 701-B to 704-B and 706-B to 708-B in which Tg of the polarizing plate protective film was 70° C. or higher, decreases in the degree of polarization attributed to the storage in the environment of a temperature of 85° C. and a relative humidity of 85% for 500 hours were smaller than that of the pressure-sensitive adhesive-attached polarizing plate 705-B in which Tg of the polarizing plate protective film was lower than 70° C., which is particularly preferable.

The present invention has been described together with the embodiment, but the present inventors, unless particularly otherwise described, do not intend to limit our invention in any of the details of the description and think that the present invention is supposed to be broadly interpreted within the scope of the concept and scope of the invention described in the claims.

Priority is claimed on JP2017-192085 filed in Japan on Sep. 29, 2017, JP2017-247933 filed in Japan on Dec. 25, 2017, JP2018-035024 filed in Japan on Feb. 28, 2018, JP2018-104900 filed in Japan on May 31, 2018, and JP2018-122094 filed in Japan on Jun. 27, 2018, the contents of which are incorporated herein by reference.

EXPLANATION OF REFERENCES

1: upper side polarizing plate
2: direction of upper side polarizing plate absorption axis
3: liquid crystal cell upper electrode substrate
4: orientation control direction of upper substrate
5: liquid crystal layer
6: liquid crystal cell lower electrode substrate
7: orientation control direction of lower substrate
8: lower side polarizing plate
9: direction of lower side polarizing plate absorption axis
10: liquid crystal display device

What is claimed is:

1. A polarizing plate protective film comprising:
a resin; and
a coloring agent having an absorption maximum wavelength in a range of 560 to 620 nm or 460 to 520 nm in an amount of 0.1 parts by mass or more with respect to 100 parts by mass of the resin,
wherein a film thickness is 2 to 8 μm, and a moisture content is 0.5% by mass or less, and
wherein the coloring agent is a squarine-based coloring agent represented by General Formula (3)

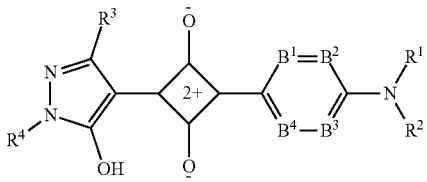

General Formula (3)

wherein in General Formula (3), $R^1$ and $R^2$ each independently represent a hydrogen atom or a substituent, $B^1$ to $B^4$ each independently represent a carbon atom or a nitrogen atom, and $R^3$ and $R^4$ each independently represent a hydrogen atom or a substituent.

2. The polarizing plate protective film according to claim 1,
wherein the polarizing plate protective film contains an electron-donating quencher, and a HOMO energy level of the coloring agent and a HOMO energy level of the electron-donating quencher satisfy a relational expression [A-1] below, $$E_{Hq} - E_{Hd} \leq 0.40 \text{ eV} \qquad \text{relational expression [A-1]:}$$

here, $E_{Hd}$ and $E_{Hq}$ each represent values below,
$E_{Hd}$: HOMO energy level of coloring agent
$E_{Hq}$: HOMO energy level of electron-donating quencher.

3. The polarizing plate protective film according to claim 1,
wherein the polarizing plate protective film contains an electron-accepting quencher, and a LUMO energy level of the coloring agent and a LUMO energy level of the electron-accepting quencher satisfy a relational expression [B-1] below, $$E_{Ld} - E_{Lq} \leq 0 \text{ eV} \qquad \text{relational expression [B-1]:}$$

here, $E_{Ld}$ and $E_{Lq}$ each represent values below,
$E_{Ld}$: LUMO energy level of coloring agent
$E_{Lq}$: LUMO energy level of electron-accepting quencher.

4. The polarizing plate protective film according to claim 1,
wherein the resin satisfies a relational expression [C] below, $$0.80 \leq fd \leq 0.95 \qquad \text{relational expression [C]:}$$

here, an fd value is defined by a relational expression I below, $$fd = \delta d / (\delta d + \delta p + \delta h) \qquad \text{relational expression I:}$$

in the relational expression I, δd, δp, and δh each represent a term corresponding to the London dispersion force, a term corresponding to the dipole-dipole force, and a term corresponding to the hydrogen bond force relative to a solubility parameter δt computed by the Hoy method.

5. The polarizing plate protective film according to claim 1, wherein the resin includes a polystyrene resin.

6. The polarizing plate protective film according to claim 1, wherein the resin includes a cyclic polyolefin resin.

7. A polarizing plate comprising:
the polarizing plate protective film according to claim 1.

8. A liquid crystal display device comprising:
the polarizing plate according to claim 7.

9. The liquid crystal display device according to claim 8,
wherein the polarizing plate protective film in the polarizing plate is disposed between a liquid crystal cell and a polarizer.

* * * * *